(12) United States Patent
Beppu et al.

(10) Patent No.: US 11,518,550 B2
(45) Date of Patent: Dec. 6, 2022

(54) COUPLING/UNCOUPLING DEVICE

(71) Applicant: CANON DENSHI KABUSHIKI KAISHA, Saitama (JP)

(72) Inventors: Shinji Beppu, Tokyo (JP); Tsumori Sato, Tokyo (JP); Ryota Fujikawa, Tokyo (JP); Yoshifumi Okamoto, Kanagawa-ken (JP); Yuki Morooka, Tokyo (JP); Tomohiro Tomaru, Gunma-ken (JP); Kanata Shirotori, Tokyo (JP); Yusuke Akaike, Tokyo (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 1014 days.

(21) Appl. No.: 16/233,639

(22) Filed: Dec. 27, 2018

(65) Prior Publication Data
US 2019/0135459 A1 May 9, 2019

Related U.S. Application Data

(63) Continuation of application No. PCT/JP2017/024865, filed on Jul. 6, 2017.

(30) Foreign Application Priority Data

Jul. 6, 2016 (JP) .............................. JP2016134312
Aug. 26, 2016 (JP) .............................. JP2016-166274
(Continued)

(51) Int. Cl.
*B64G 1/64* (2006.01)
*F16B 2/18* (2006.01)
(Continued)

(52) U.S. Cl.
CPC .............. *B64G 1/64* (2013.01); *A45C 13/126* (2013.01); *F16B 2/08* (2013.01); *F16B 2/18* (2013.01); *A45C 13/10* (2013.01)

(58) Field of Classification Search
CPC ......... B64G 1/64; A45C 13/126; A45C 13/10; F16B 2/08; F16B 2/18
See application file for complete search history.

(56) References Cited

U.S. PATENT DOCUMENTS 2,395,426 A * 2/1946 Petrovich ................. B61G 5/10
439/195
5,645,303 A * 7/1997 Warehime ............... F16L 23/10
285/410

(Continued)

FOREIGN PATENT DOCUMENTS

EP 1548347 6/2005
JP 145710 C2 6/1941
(Continued)

OTHER PUBLICATIONS

Japanese Office Action, dated Oct. 23, 2020, in Japanese Application No. 2016-206688.
(Continued)

*Primary Examiner* — David M Upchurch
(74) *Attorney, Agent, or Firm* — Venable LLP

(57) ABSTRACT

A coupling/uncoupling device includes a columnar member configured by a divided pair of semicircular members, and a pair of coupling members forming a circular holding section that holds the columnar member. The circular holding section includes a circular inner surface section with which an outer circumferential surface of the columnar member is in slide contact, the circular inner surface section being formed from inner circumferential surfaces of a semicircular section in one coupling member and a semicircular section in the other coupling member. The columnar mem- (Continued)

ber is configured to be rotatable in both clockwise and counterclockwise directions along the circular inner surface section about a reference position where a contact surface of the pair of coupling members and a dividing surface of the columnar member are flush with each other.

4 Claims, 103 Drawing Sheets

(30) Foreign Application Priority Data

| Aug. 26, 2016 | (JP) | JP2016166273 |
|---|---|---|
| Oct. 21, 2016 | (JP) | JP2016-206688 |
| Oct. 21, 2016 | (JP) | JP2016206687 |
| Mar. 21, 2017 | (JP) | JP2017053862 |
| Jun. 16, 2017 | (JP) | JP2017118665 |

(51) Int. Cl.
  *F16B 2/08* (2006.01)
  *A45C 13/12* (2006.01)
  *A45C 13/10* (2006.01)

(56) References Cited

U.S. PATENT DOCUMENTS

| 6,199,801 | B1 | 3/2001 | Wilke et al. | 244/170 |
|---|---|---|---|---|
| 6,202,961 | B1 | 3/2001 | Wilke et al. | 244/173.2 |
| 8,820,543 | B2* | 9/2014 | Huang | F16B 2/246 |
| | | | | 248/230.4 |
| 9,151,422 | B2 | 10/2015 | Kayacik et al. | |
| 2002/0125388 | A1* | 9/2002 | Eslick | F16B 2/18 |
| | | | | 248/231.51 |
| 2003/0215284 | A1* | 11/2003 | Wang | F16B 2/18 |
| | | | | 403/374.3 |
| 2008/0135687 | A1 | 6/2008 | Penzo | 244/173.1 |
| 2013/0009012 | A1 | 1/2013 | Kobayashi et al. | |
| 2013/0011189 | A1 | 1/2013 | Kamiya et al. | |
| 2015/0050073 | A1* | 2/2015 | Forgrave | B62K 21/16 |
| | | | | 403/188 |
| 2015/0097085 | A1 | 4/2015 | Holemans | |
| 2016/0061282 | A1 | 3/2016 | Thuswaldner et al. | 267/141 |

FOREIGN PATENT DOCUMENTS

| JP | S49-13203 Y1 | 4/1974 |
|---|---|---|
| JP | S59-199400 A | 11/1984 |
| JP | S60-27000 U | 2/1985 |
| JP | S41-11285 Y1 | 5/1996 |
| JP | 2007-100752 | 4/2007 |
| JP | 2010-116977 | 5/2010 |
| JP | 2010-133493 | 6/2010 |
| JP | 2010-234824 A | 10/2010 |
| JP | 2011-168176 A | 9/2011 |
| JP | 2011-168189 A | 9/2011 |
| JP | 2014-001848 A | 1/2014 |

OTHER PUBLICATIONS

Japanese Office Action dated Jul. 3, 2020, in Japanese Patent Application No. 2016-206687.
Office Action dated Jan. 12, 2021 in counterpart Japanese Application No. 2017-053862, together with English translation thereof.

* cited by examiner

F I G. 54
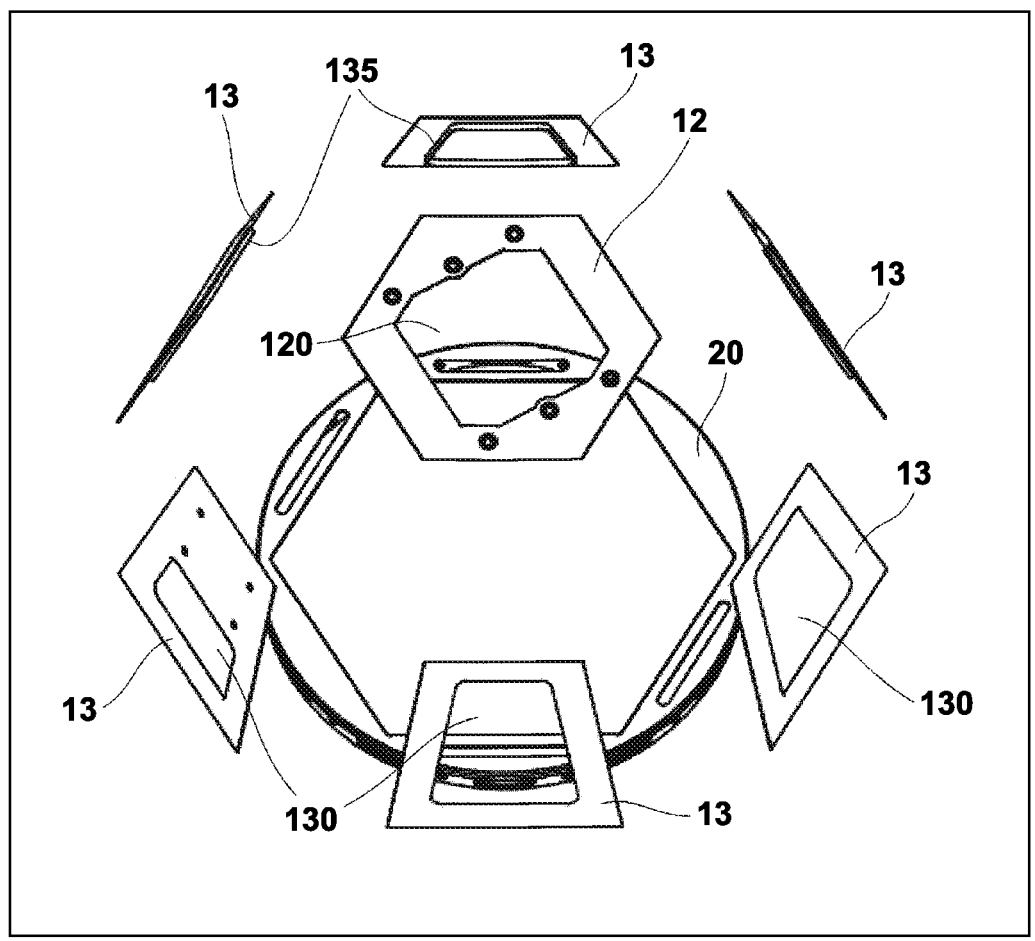

F I G. 57
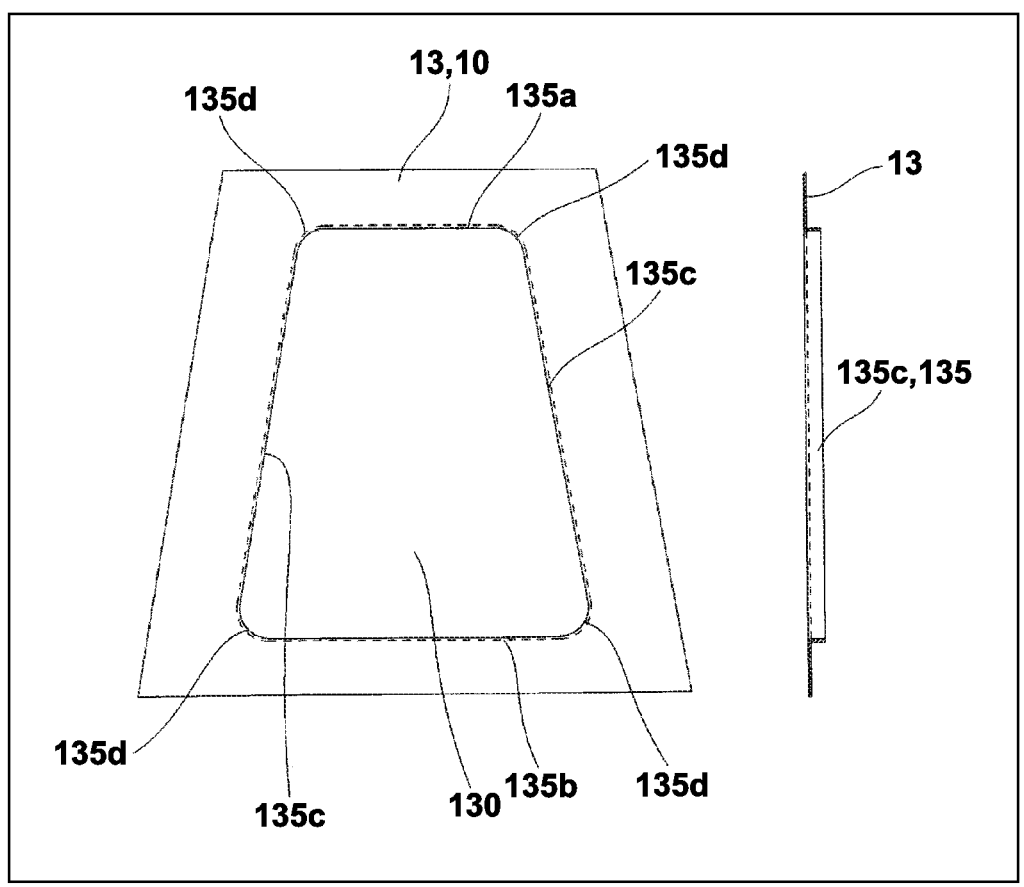

F I G. 69
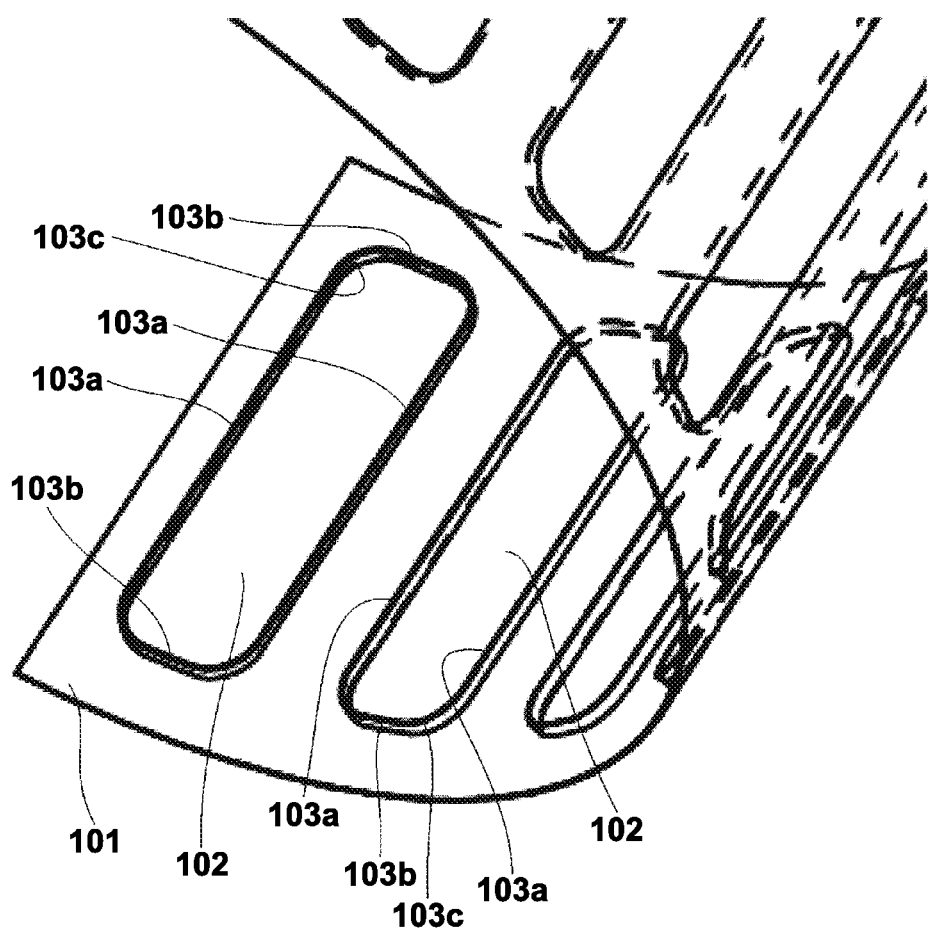

F I G. 77
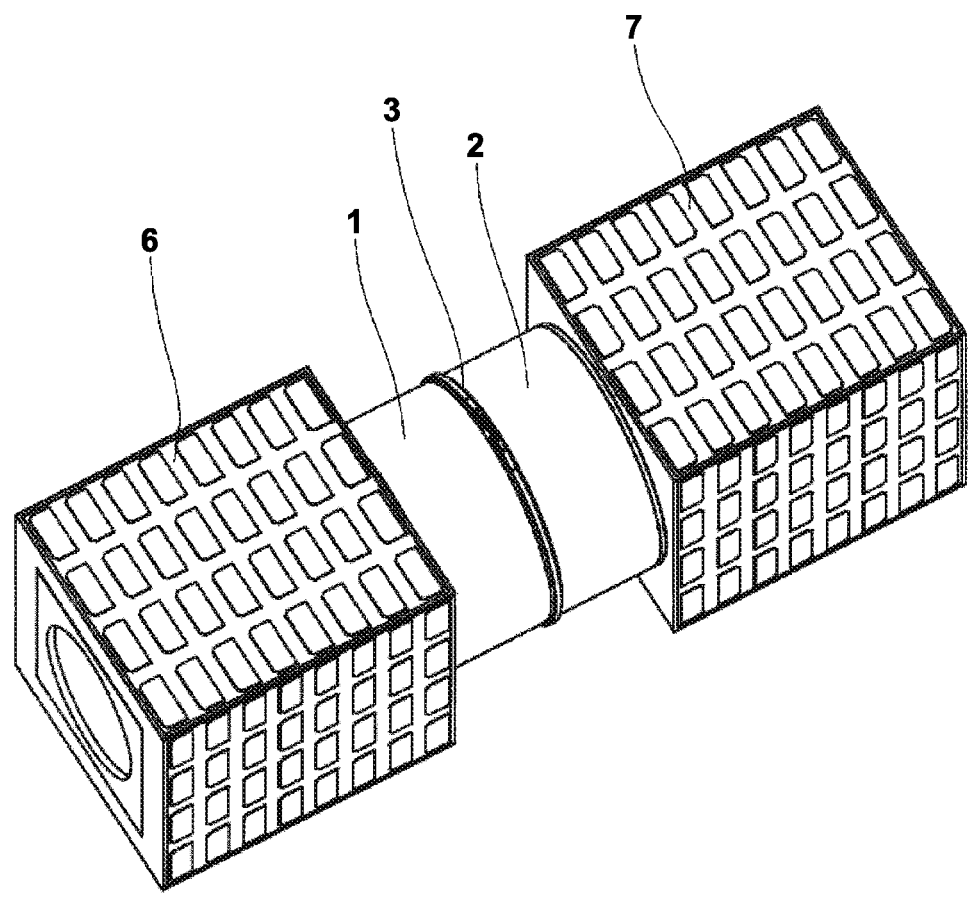

COUPLING/UNCOUPLING DEVICE

CROSS-REFERENCE TO RELATED APPLICATIONS

This application is a continuation of International Patent Application No. PCT/JP2017/024865 filed on Jul. 6, 2017, which claims priority to and the benefit of Japanese Patent Application No. 2016-134312 filed on Jul. 6, 2016, Japanese Patent Application No. 2016-166273 filed on Aug. 26, 2016, Japanese Patent Application No. 2016-166274 filed on Aug. 26, 2016, Japanese Patent Application No. 2016-206687 filed on Oct. 21, 2016, Japanese Patent Application No. 2016-206688 filed on Oct. 21, 2016, Japanese Patent Application No. 2017-053862 filed on Mar. 21, 2017, and Japanese Patent Application No. 2017-118665 filed on Jun. 16, 2017, the entire disclosures of which are incorporated herein by reference.

TECHNICAL FIELD

The present invention relates to a coupling/uncoupling device that can couple and separably hold a plurality of objects.

BACKGROUND ART

A structure for coupling and separably holding a plurality of objects has been used in various fields. A variety of structures have been proposed.

As an example, as a coupling structure in coupling of railroad vehicles, Japanese Patent Laid-Open No. 2010-234824 proposes a technique capable of coupling and closely attaching coupling surfaces even when the coupling surfaces are not in contact from the front and have different heights during the coupling.

However, when a coupled state of coupled objects is released, an unexpected load is sometimes generated between the coupled objects, on the inside of the objects, or the like. This is undesirable depending on a device to which a coupling/uncoupling device is applied. On the other hand, there is a demand to use the coupling/uncoupling device in a device that needs to uncouple objects as quick as possible without caring about a load on the objects.

SUMMARY OF INVENTION

According to an aspect of the present invention, there is provided a coupling/uncoupling device comprising: a columnar member configured by a divided pair of semicircular members; and a pair of coupling members forming a circular holding section that is in contact with the columnar member along an outer circumferential surface of the columnar member and holds the columnar member, wherein the circular holding section includes a circular inner surface section with which an outer circumferential surface of the columnar member is in slide contact, the circular inner surface section being formed from inner circumferential surfaces of a semicircular section in one coupling member and a semicircular section in the other coupling member by disposing the semicircular section in one coupling member and the semicircular section in the other coupling member to be opposed to each other so that the inner circumferential surfaces are continuous, and the columnar member is configured to be rotatable in both clockwise and counterclockwise directions along the circular inner surface section about a reference position where a contact surface of the pair of coupling members and a dividing surface of the columnar member are flush with each other.

Further features of the present invention will become apparent from the following description of exemplary embodiments with reference to the attached drawings.

BRIEF DESCRIPTION OF DRAWINGS

FIG. 54 is a development view of the space appliance adapter in another embodiment of the present invention.

FIG. 57 is a main part enlarged view of the space appliance adapter in another embodiment of the present invention.

FIG. 69 is a main part enlarged view of the space airframe structure in another embodiment of the present invention.

FIG. 77 is a perspective view of an example of the space airframe structure in another embodiment of the present invention.

DESCRIPTION OF EMBODIMENTS

First Embodiment

A coupling/uncoupling device according to a first embodiment of the present invention is explained with reference to FIG. 1 to FIG. 5. As shown in an exploded perspective view of FIG. 1, the coupling/uncoupling device according to an embodiment of the present invention is configured from a first coupling member 101 and a second coupling member 201 and a first semicircular fixed member (a first semicircular member) and a second semicircular fixed member (a second semicircular member).

Figure 1:
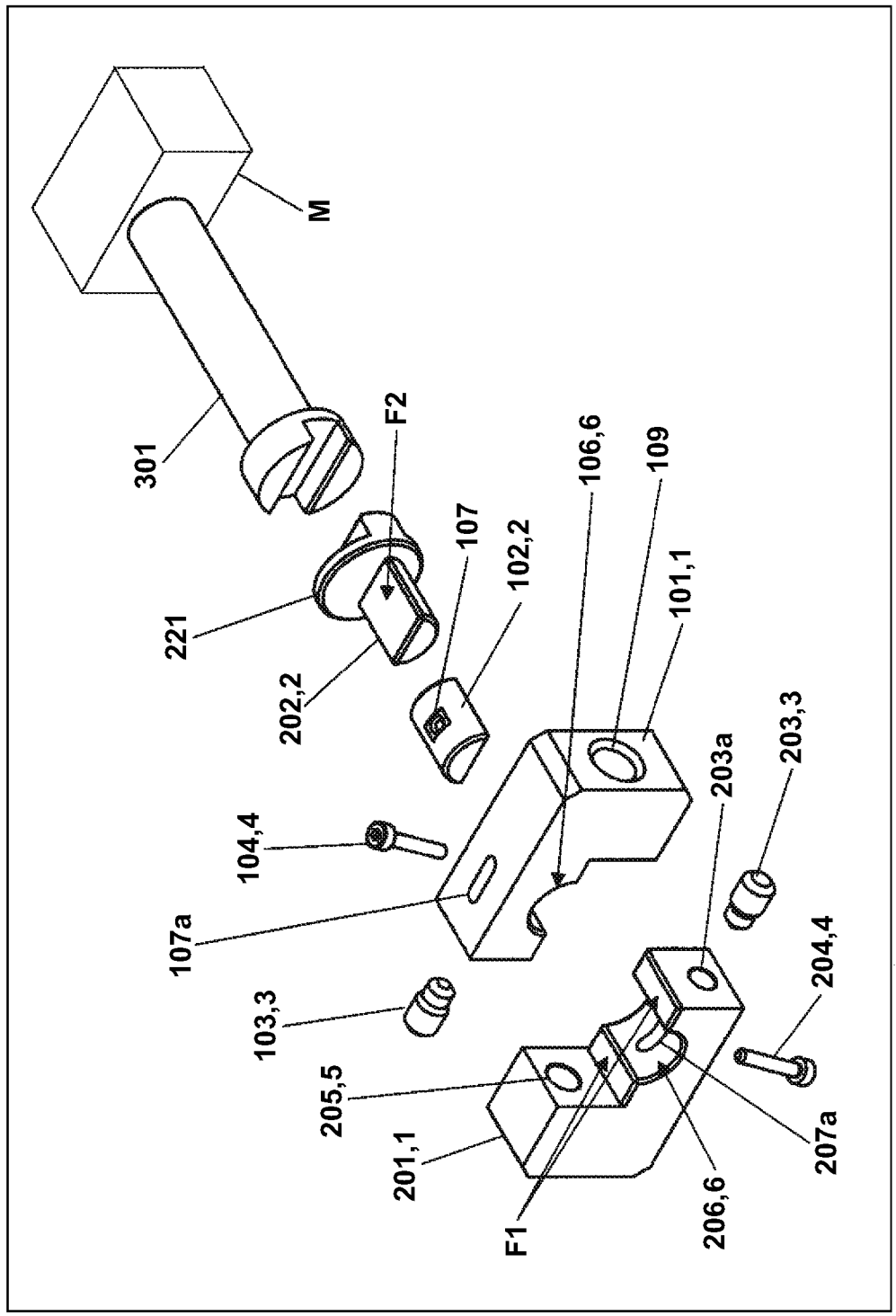
FIG. 1 is an exploded perspective view of a coupling/uncoupling device in an embodiment of the present invention.

The first coupling member 101 and the second coupling member 201 are respectively formed in L shapes. The first coupling member 101 and the second coupling member 201 are configured such that external shapes thereof are substantially equal. This prevents a gap from being formed when the first coupling member 101 and the second coupling member 201 are point-symmetrically disposed and set in contact with each other as shown in FIG. 1. Note that, in the following explanation, the first coupling member 101 and the second coupling member 201 are collectively described as coupling members 1.

A first guide pin 103 and a second guide pin 203 are respectively provided in the first coupling member 101 and the second coupling member 201. The first guide pin 103 is fixed in a not-shown first guide pin hole 103a. The second guide pin 203 is fixed in a second guide pin hole 203*a*. Note that, in the following explanation, the first guide pin 103 and the second guide pin 203 are collectively described as guide pins 3.

In a state in which the first coupling member 101 and the second coupling member 201 are in contact (hereinafter, coupled state), the guide pin 103 is inserted through a guide hole 205 provided in the second coupling member and the guide pin 203 is inserted through a not-shown guide hole 105 provided in the first coupling member. Consequently, moving directions of the first coupling member 101 and the second coupling member 201 are restricted. The first coupling member 101 and the second coupling member 201 are capable of moving only in an extending direction of the guide pins 3. Note that, in the following explanation, the guide hole 105 and the guide hole 205 are collectively described as guide holes 5.

The first coupling member 101 includes a first concave section 106 on a surface (a contact surface F1) parallel to the guide pin 3 among three surfaces in contact with the second coupling member 201 in the coupled state. Similarly, the second coupling member 201 includes a second concave section 206 on a surface (the contact surface F1) parallel to the guide pin 3 among three surfaces in contact with the first coupling member 101 in the coupled state.

The first concave section 106 and the second concave section 206 are respectively recessed along semicircles, more specifically, shapes (in the following explanation, referred to as semi-columns) obtained by dividing a columnar shape, which has perfect circles as a top surface and a bottom surface, along a surface (a dividing surface F2) passing the center of the perfect circles forming the top surface and the bottom surface. That is, in the coupled state, the first concave section 106 and the second concave section 206 are opposed to front surfaces thereof each other and form a through-hole (a circular holding section) 6. The through-hole 6 has a columnar shape obtained by extending a perfect circular shape. For explanation, the sectional shape of the through-hole 6 is explained as the perfect circle. However, when the through-hole 6 is actually machined, it is difficult to accurately form the through-hole 6 as the perfect circle. It goes without saying that the perfect circle includes a circle close to the perfect circle. As explained below, even in a state in which a gap is formed between the first concave section 106 and the second concave section 206, the first concave section 106 and the second concave section 206 can be regarded as forming a perfect circular shape in a state in which the first concave section 106 and the second concave section 206 are opposed to each other. Naturally, if the through-hole 6 can be formed in the perfect circle, adhesion of coupling in a coupling principle explained below can be suitably increased.

A first fixed shaft (a first semicircular fixed member) 102 having a semi-columnar shape and a second fixed shaft (a second semicircular fixed member) 202 having a semi-columnar shape are inserted into the through-hole 6. The first fixed shaft 102 and the second fixed shaft 202 are formed in the same shape in portions opposed in the through-hole 6. The first fixed shaft 102 and the second fixed shaft 202 form a columnar fixed shaft (a columnar member) 2. In this embodiment, an end portion on the opposite side of a side inserted into the coupling member 1 in the second fixed shaft 202 is formed as a drive shaft 221 that fits with a driving shaft 301, which transmits a driving force from a not-shown motor M, to be driven.

In the through-hole 6, the fixed shaft 2 formed by the first fixed shaft 102 and the second fixed shaft 202 is in slide contact with through-hole 6. That is, the inner surface of the through-hole 6 forms a circular inner surface section. The fixed shaft 2 functioning as a columnar member is smoothly in slide contact with the circular inner surface section.

The driving force from the motor M is transmitted through the drive shaft 221. The fixed shaft 2 is driven to rotate. That is, the driving shaft 301 rotates with a rotational driving force generated in the motor M. Subsequently, the drive shaft 221 in contact to be turnable in association with the driving shaft 301 rotates. The second fixed shaft 202 formed integrally with the drive shaft 221 and the first fixed shaft 102, which receives a load from the second fixed shaft 202 are supported to be integrally rotatable along the circumferential direction of the through-hole 6 in the through-hole 6.

The first fixed shaft 102 and the second fixed shaft 202 respectively include a first restricting hole 107 and a second restricting hole 207 on columnar (semi-columnar) side surfaces of the first fixed shaft 102 and the second fixed shaft 202 in order to restrict movement in an extending direction of the fixed shaft 2 when the fixed shaft 2 is driven to rotate in the through-hole 6.

A first long hole 107*a* extending in the extending direction of the guide pin 3 is provided in the first coupling member 101 to be opposed to the first restricting hole 107 of the first fixed shaft 102. A first restricting member 104 is fit in the first restricting hole 107 extending through the first long hole 107*a* to restrict the first fixed shaft 102 from moving in an extending direction of the driving shaft 301.

When a separating operation explained below acts on the coupling member 1, the first restricting member 104 restricts the first fixed shaft 102 from separating from the first coupling member 101 to come off.

Further, the first restricting member 104 comes into contact with an end face in the extending direction of the guide pin 3 of the first long hole 107*a* to thereby restrict a rotation angle of the first fixed shaft 102.

Similarly, a second long hole 207*a* extending in the extending direction of the guide pin 3 is provided in the second coupling member 201 to be opposed to the second restricting hole 207 of the second fixed shaft 202. A second restricting member 204 is fit in the second restricting hole 207 extending through the second long hole 207*a* to thereby limit (restrict) the movement of the second fixed shaft 202 in the extending direction of the driving shaft 301 to a predetermined range.

When the separating operation explained below acts on the coupling member 1, the second restricting member 204 restricts the second fixed shaft 202 from separating from the first coupling member 101 to come off.

Further, the second restricting member 204 comes into contact with an end face in the extending direction of the guide pin 3 of the second long hole 207*a* to thereby restrict a rotation angle of the second fixed shaft 202.

In the coupling/uncoupling device configured in this way, coupling targets are fixed to a first coupling section 109 provided on a surface opposed to a surface on which the guide hole pin 103*a* is provided in the first coupling member 101 and a second coupling section 209 provided on a surface opposed to a surface on which the guide hole 203*a* is provided in the second coupling member 201. Consequently, it is possible to couple the coupling targets through the coupling/uncoupling device. It is possible to release the coupling by performing the separating operation explained below.

Stress due to an external force in a separating direction explained below concentrates on contact parts of the coupling members 1 and the fixed shaft 2 and the coupling members 1 and the guide pins 3. Therefore, SUS630-H900, which is a high-strength material, is suitable. It is also suitable to divide the components into pluralities of pieces and apply the high-strength material to only contact points.

From the viewpoint of prevention of corrosion due to aging, SUS630-H900, which is a type of stainless steel that is a material with corrosion resistance, is suitable.

In surface states of the members, sliding occurs among the members when the separating operation explained below acts. Therefore, it is necessary to form surface states and the like having a desired coefficient of friction. In particular, a motor output for obtaining a desired separating operation can be reduced by reducing a coefficient of friction of a sliding section. Therefore, it is suitable to reduce surface roughness and apply molybdenum disulfide coating (equivalent to MIL-L-23398) or DLC (Diamond-Like Carbon) coating.

Figure 2:
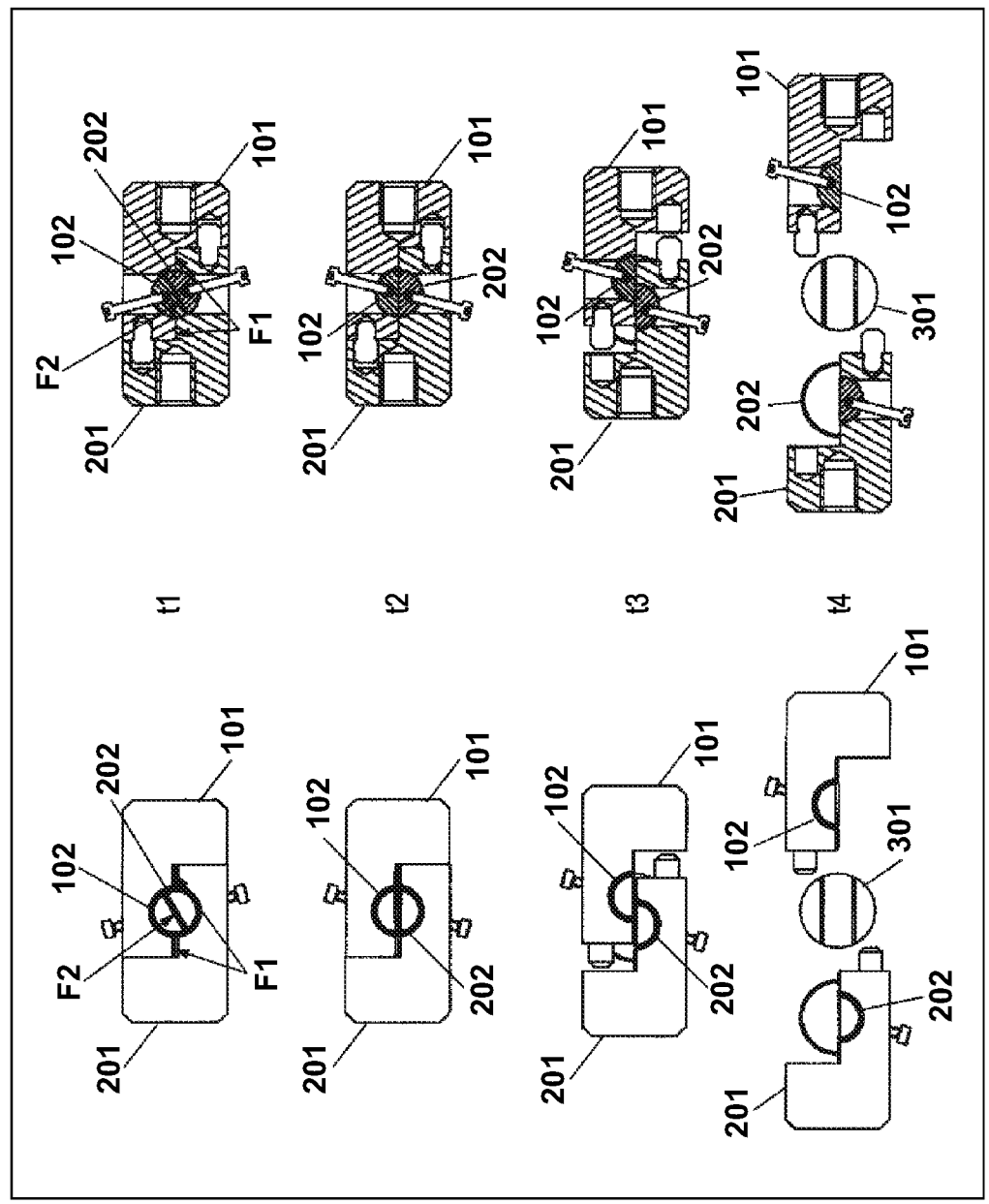
FIG. 2 is a separating operation explanatory diagram of the coupling/uncoupling device in an embodiment of the present invention.

An explanatory diagram of a separating operation (clockwise separation) of the coupling/uncoupling device in an embodiment of the present invention is shown in FIG. 2. A front view of the coupling members 1 is shown on the left side of the figure. A sectional view of the coupling members 1 is shown on the right side of the figure.

In FIG. 2, t1 to t4 indicate steps in coupling or separation. In the following explanation, each of the steps is explained in order.

Step t1 indicates a coupled state of the coupling/uncoupling device according to this embodiment. In step t1, both of the first fixed shaft 102 and the second fixed shaft 202 in the fixed shaft 2 are in positions across the first coupling member 101 and the second coupling member 201. More in detail, the coupling/uncoupling device changes to a state in which the fixed shaft 2 is rotated by a first predetermined angle (an initial angle) θ1 in a counterclockwise (CCW) direction as shown in step t1 from an uncoupled state in an uncoupled position where the dividing surface F2 of the fixed shaft 2 is flush with the contact surface F1 of the coupling member 1 shown in step t2.

When the fixed shaft 2 is rotated in a clockwise (CW) direction in FIG. 2 by the motor M, the first fixed shaft 102 and the second fixed shaft 202 gradually escape from the inside of the other coupling member 1. When the rotation is further continued, the coupling/uncoupling device reaches a state in step t2. Note that, in this embodiment, an example is explained in which the fixed shaft 2 is rotated using the motor M. However, the present invention is not limited to this. The present invention includes, for example, a form in which the user manually rotates the fixed shaft 2 with a grip or the like provided in the drive shaft 221 in FIG. 1.

When the coupling/uncoupling device reaches step t2, the first fixed shaft 102 is present only in the first coupling member 101 and the second fixed shaft 202 is present only in the second coupling member 201. At this time, for example, an external force in a separating direction is applied to the two members, which are the coupling targets, coupled by the coupling device in this embodiment. Therefore, the first coupling member 101 and the second coupling member 201 slide on the contact surfaces F1 while being guided by the guide pins 3 and relative positions of the first coupling member 101 and the second coupling member 201 become wider apart. Note that, as a method of applying the external force, it is conceivable that the external force is always applied from the coupling targets themselves in the coupled state or the external force does not act in particular in the coupled state and the external force is applied by another means in the separating operation.

In step t3, a state is shown in which the first coupling member 101 and the second coupling member 201 slide while being guided by the guide pins 3 and the relative positions are wider apart. At a point in time of step t3, the guide pins 3 slip off from the guide holes 5 and the coupling targets are completely uncoupled. In step t4, a state is shown in which engagement is released and the first coupling member 101 and the second coupling member are separated.

Note that, in the separating operation, separating and moving directions of the first coupling member 101 and the second coupling member 201 are restricted by the first guide pin 103 and the second guide pin 203. The first coupling member 101 and the second coupling member 201 move in the extending direction of the guide pins 3 at least up to step t3. By restricting the moving directions of the coupling members 1 with the guide pins 3, it is possible to restrict the movement of the coupling members 1 in a direction orthogonal to the extending direction of the guide pins and cause the separating operation of the present invention to appropriately operate.

By rotating the fixed shaft 2 in the CW direction to release the engagement, it is possible to slightly loosen an adhesion state of the first coupling member 101 and the second coupling member 201 from the coupled state in step t1 until transition to the uncoupled state in step t2. A principle for this is explained below.

For explanation, a state is assumed in which an external force in the separating direction is applied to the coupling members 1 by the coupling targets. The state is a state in which the first coupling member 101 is pulled to the right side in FIG. 2 by an external force of an object connected to the first coupling section 109 and the second coupling member 201 is pulled to the left side in FIG. 2 by an external force of an object connected to the second coupling section 209.

In that case, in the state in step t1, the first fixed shaft 102 receives a force in the right direction in FIG. 2 from the first coupling member 101. At that time, with an adjustment gap S formed between the first guide pin 103 and the second guide hole 205 with respect to the radial direction of the first guide pin 103, the first coupling member 101 receives a force in a pulling direction to the right side while being in slide contact with the first fixed shaft 102. The first coupling member 101 slightly moves to the right side while moving to the upper side by the adjustment gap S.

As a result, before the transition to step t2, the first coupling member 101 can slightly move to the right side with respect to the second coupling member 201. The movement becomes conspicuous because dethroughtion between the first concave section 106 and the second concave section 206 increases as the fixed shaft 2 advances to the CW direction (clockwise direction). Therefore, the coupled state of the first coupling member 101 and the second coupling member 201 can be loosened before the transition to the state in step t2. An impact at the time when first coupling member 101 and the second coupling member 201 are uncoupled can be reduced.

In the above explanation, the state in which the external force is applied is assumed. However, the same applies when the external force is not applied. It is possible to loosen the coupled state of the first coupling member 101 and the second coupling member 201 before the transition to step t2.

Figure 3:
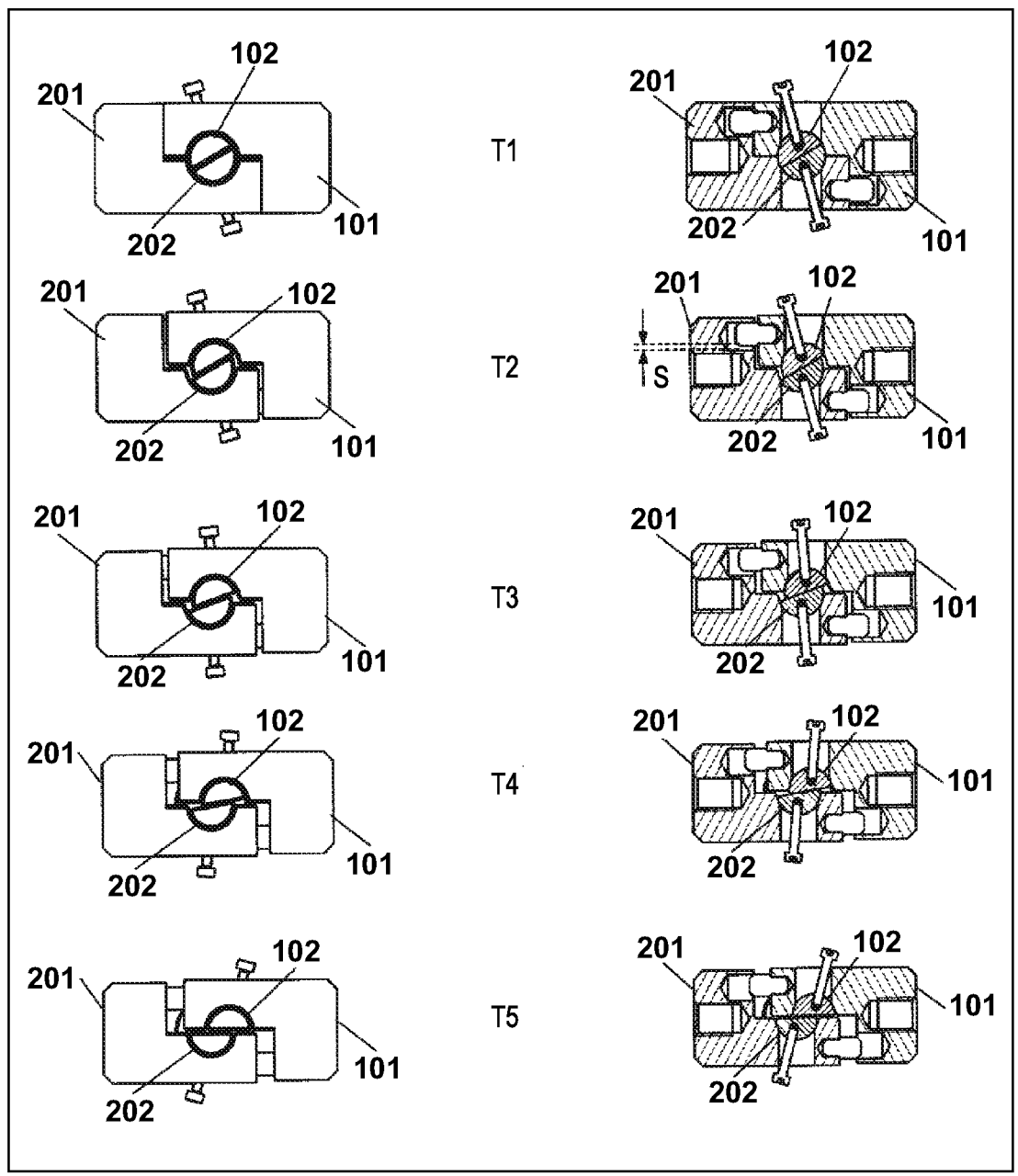
FIG. 3 is a detailed separating operation explanatory diagram of the coupling/uncoupling device in an embodiment of the present invention.

To make the above explanation clearer, a figure representing the adjustment gap S large is shown in FIG. 3. The separating operation advances in the order of steps T1 to T5. The separating operation is specifically explained below with reference to FIG. 4 to FIG. 8. Note that steps T1 and T5 respectively correspond to steps t1 and t2 in FIG. 2.

Figure 4:
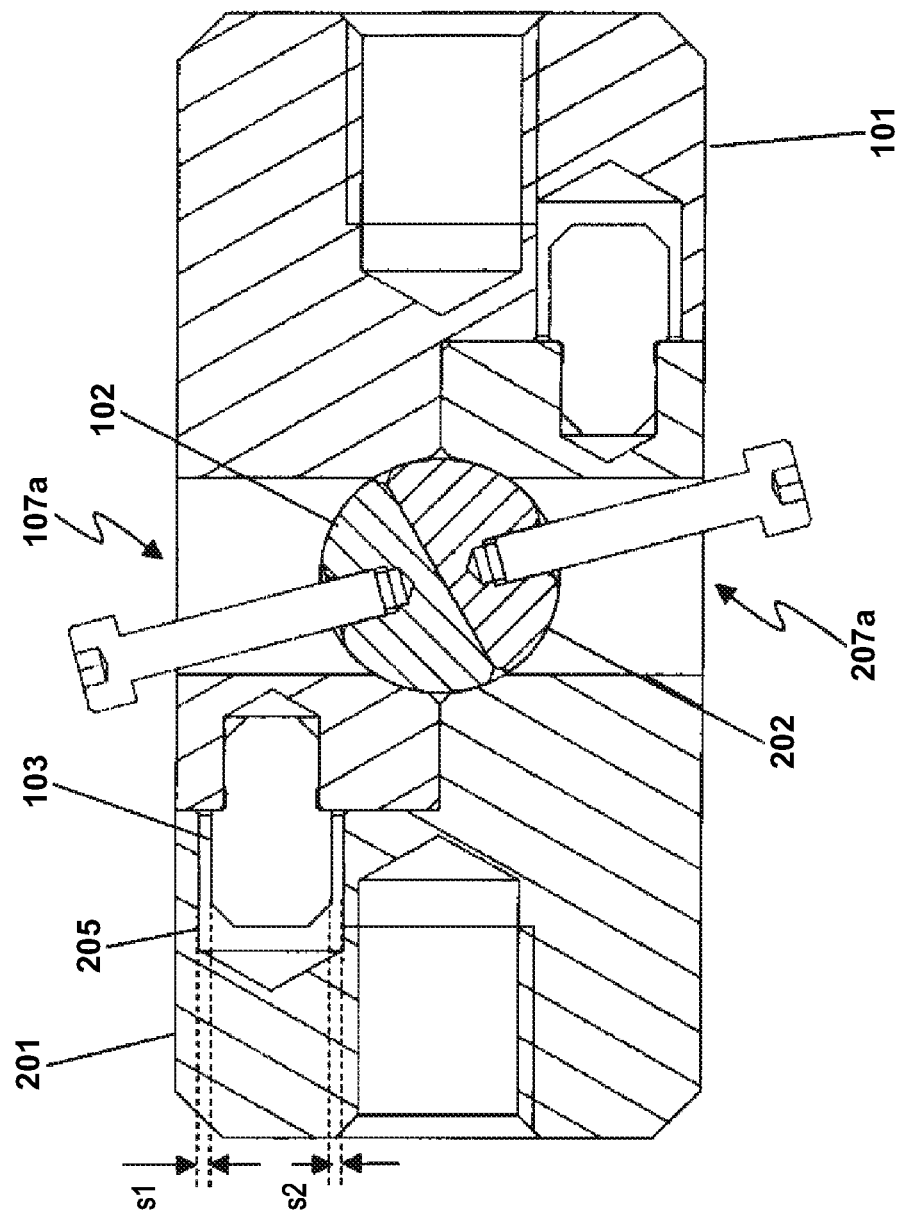
FIG. 4 is an actuation principle explanatory diagram of the coupling/uncoupling device in an embodiment of the present invention.

A state in step T1 in FIG. 3 is shown in FIG. 4. In this state, when tension due to an external force does not act on the coupling members 1, the adjustment gap S is given between the guide pins 103 and the guide holes 105. In the state shown in FIG. 4, a total of a gap s1 and a gap s2 formed beside the guide pin 3 is the adjustment gap S.

Figure 5:
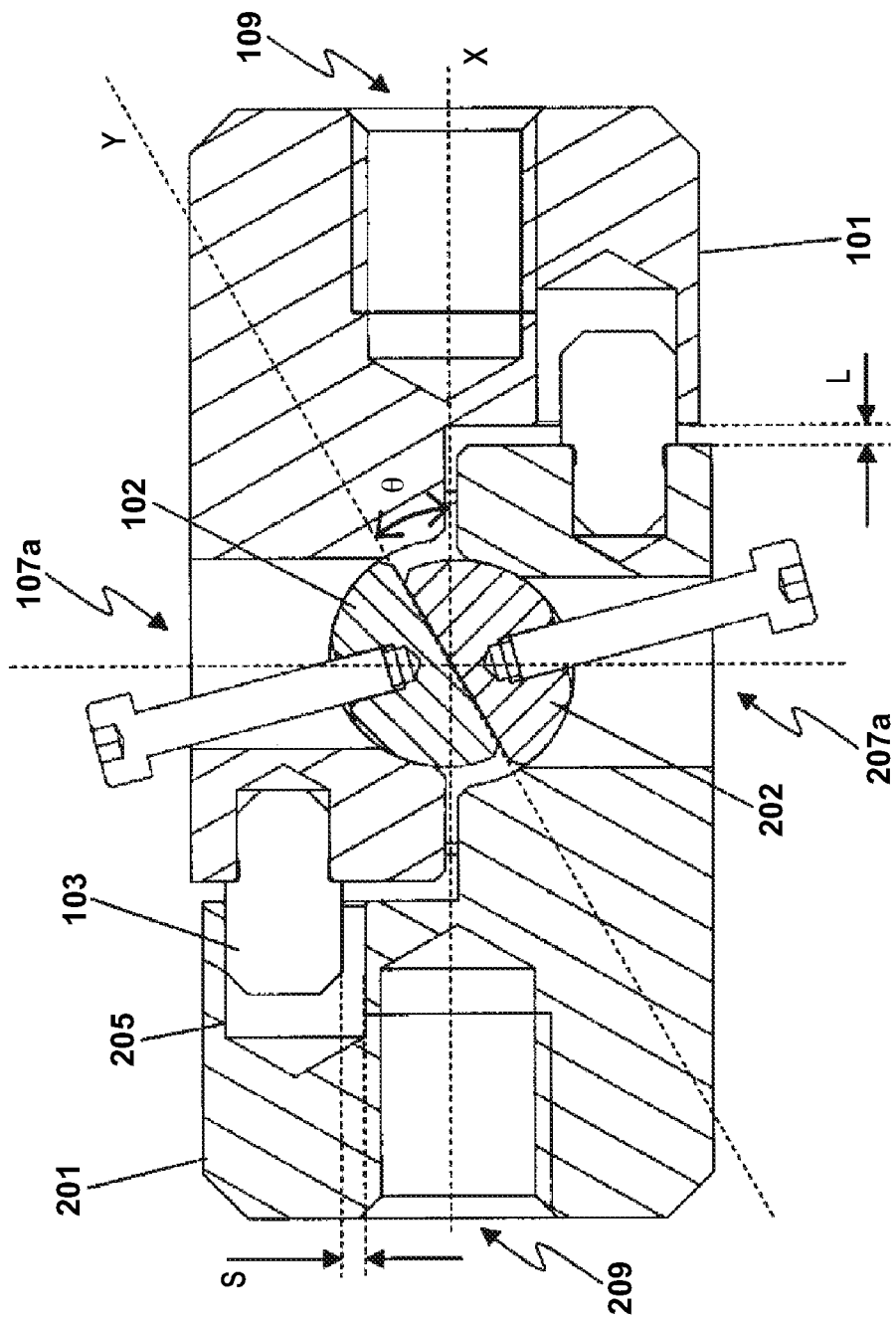
FIG. 5 is an actuation principle explanatory diagram of the coupling/uncoupling device in an embodiment of the present invention.

In FIG. 5, a state is shown in which tension due to an external force acts on the coupling members 1 in the same state as FIG. 4. The state corresponds to step T2 in FIG. 3. In this state, the fixed shaft 2 slides from the dividing surface F2 with the tension.

When the first coupling member 101 moves by the adjustment gap S upward in FIG. 5, the guide pin 103 and the guide hole 205 come into contact and the sliding stops. When an angle formed by a reference plane X and a contact surface Y at this time is represented as θ, a movement amount L in a reference plane X direction at this time is $L = S/\tan \theta$.

As it is seen from the equation for calculating the movement amount L, a relation between the first predetermined angle θ1 and the movement amount L can be optionally determined by setting a dimension of S to an appropriate value during design of the guide pins 3 and the guide holes 5. Note that, when the movement amount L is increased to a certain degree, the centers of the first coupling section 109 and the second coupling section 209 dethroughte. Therefore, when an external force is applied by the coupling targets connected to the first coupling section 109 and the second coupling section 209, the centers of the first coupling section 109 and the second coupling section may be aligned in the state shown in FIG. 5, that is, a state in which the first coupling member 101 and the second coupling member 201 respectively move up and down and the guide pins 3 come into contact with surfaces on the outer side of the guide holes 5.

Figure 6:
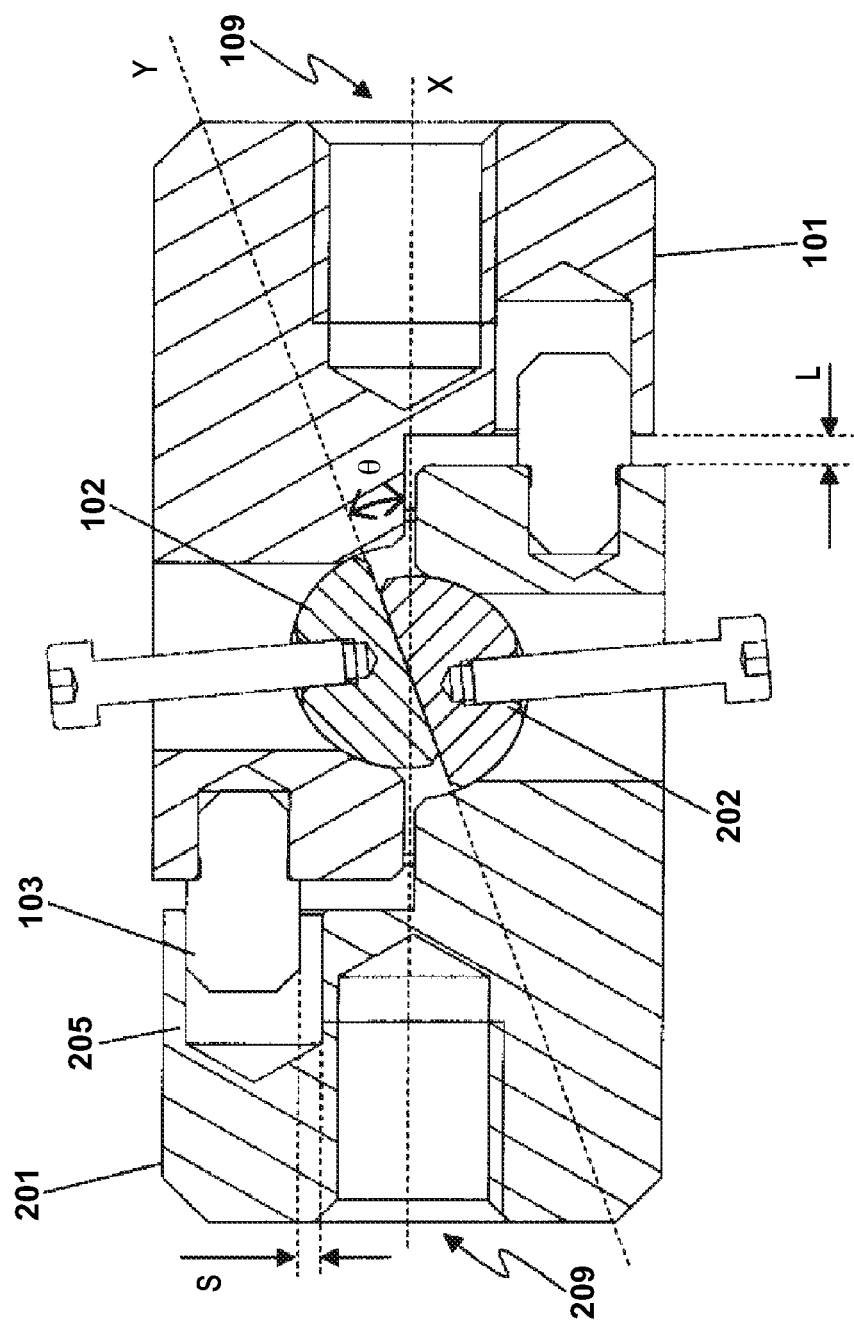
FIG. 6 is an actuation principle explanatory diagram of the coupling/uncoupling device in an embodiment of the present invention.

When the rotation of the fixed shaft 2 is advanced by the motor M or the like, the movement amount L gradually increases as the angle θ decreases. That state is shown in FIG. 6. The state corresponds to step T3 shown in FIG. 3. Even if the number of revolutions is fixed, the movement amount L does not linearly increase. That is, as it is seen from the equation for calculating the movement amount L, a change in the movement amount L is small with respect to a change in the angle θ when the angle θ is 90 degrees or less and is relatively large. An impact applied to the coupling/uncoupling device is also small. It is seen from the equation for calculating L that the movement amount L suddenly diverges to infinity as the angle θ decreases and approaches 0.

Actually, at a point in time when L reaches predetermined magnitude, the guide pins 3 come off the guide holes 5, whereby restriction of the first coupling member 101 and the second coupling member 201 is released and the first coupling member 101 and the second coupling member 201 are separated. However, depending on setting of parameters such as the force of rotation of a motor, a rotating direction distal end of the fixed shaft 2 comes into contact with the surfaces forming the contact surfaces F1 of the coupling members 1 and then the guide pins 3 slip off the guide holes 5 and the coupling members 1 are separated. It is possible to control a temporal change amount of L by controlling the number of revolutions of the motor.

That is, the coupling/uncoupling device may change to the uncoupled state in which the guide pins 3 come off the guide holes 5 in the state in step T4 and the first coupling member 101 and the second coupling member 201 are uncoupled. The coupling/uncoupling device may change to the uncoupled state in which the first coupling member 101 and the second coupling member 201 are uncoupled in the state in step T5.

That is, to summarize the above explanation, step T1 in FIG. 3 is the coupled state corresponding to t1 in FIG. 2. When the rotation of the fixed shaft 2 is advanced, the coupled state changes to the state in step T5 in FIG. 3, which is the uncoupled state, through a transitional state after the start of the separating operation shown in steps T2 and T3 in FIG. 3. Step T5 in FIG. 3 corresponds to t2 in FIG. 2. Steps t3 and t4 in FIG. 2 show a separated state in the case in which a force in a direction for separating the first coupling member 101 and the second coupling member 201 is applied by an external force after the uncoupled state.

A case of a change of the first predetermined angle θ1 will be explained. When the first predetermined angle θ1 is reduced, torque necessary for rotating the fixed shaft 2 with the driving force of the motor M can be reduced when the separating operation is started from the coupled state. That is, a small motor can be used as the motor M. The coupling/uncoupling device or the entire apparatus can be reduced in size.

Note that, in the embodiment described above, the first predetermined angle θ1 is set to approximately 30 degrees. Driving at relatively small driving torque can be performed while keeping a certain degree of tension as the coupled state. A reduction in the size of the coupling/uncoupling device is achieved.

Figure 7:
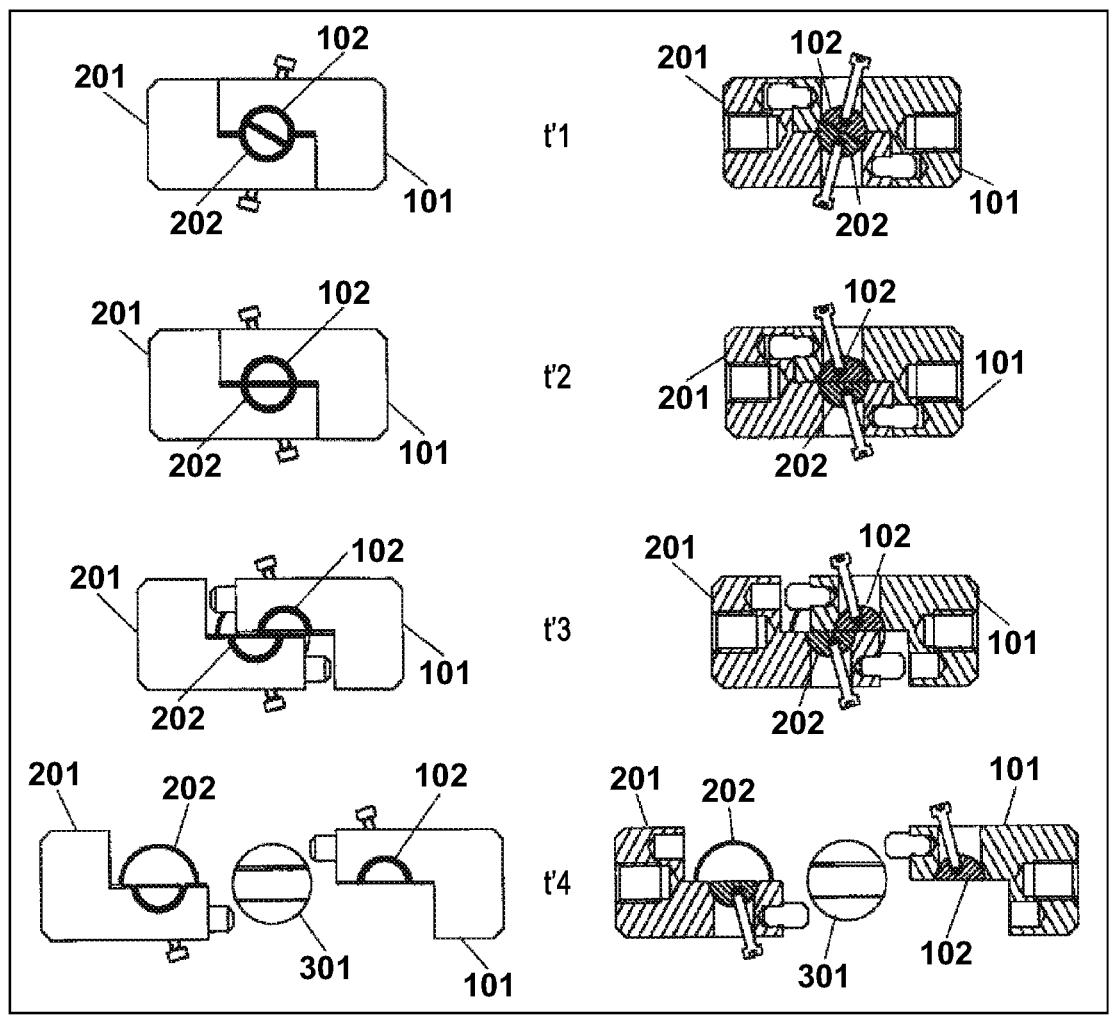
FIG. 7 is another separating operation explanatory diagram of the coupling/uncoupling device in an embodiment of the present invention.

An explanatory diagram of another separating operation (counterclockwise separation) of the coupling/uncoupling device in an embodiment of the present invention is shown in FIG. 7. A front view of the coupling members 1 is shown on the left side of the figure. A sectional view of the coupling members 1 is shown on the right side of the figure. A method of a basic separating operation is the same as the separating operation explained above. Therefore, details are omitted. Only differences are explained.

Step t'1 shows the coupled state of the coupling/uncoupling device according to this embodiment. In step t'1, both of the first fixed shaft 102 and the second fixed shaft 202 in the fixed shaft 2 are in positions across the first coupling member 101 and the second coupling member 201. More in detail, the coupling/uncoupling device changes to a state in which the fixed shaft 2 is rotated by a second predetermined angle (an initial angle) θ'1 in a clockwise (CW) direction as shown in step t'1 from a state in which the dividing surface F2 of the fixed shaft 2 is in flush with (continuous to) the contact surfaces F1 of the coupling members 1 shown in step t'2.

When the fixed shaft 2 is rotated in the counterclockwise (CCW) direction in FIG. 7 by the motor M, the first fixed shaft 102 and the second fixed shaft 202 gradually escape from the inside of the other coupling member 1. When the rotation is further continued, the coupling/uncoupling device reaches a state in step t2. Note that the rotation of the fixed shaft 2 does not always need to be performed by the motor M. For example, the user may manually perform the rotation of the fixed shaft. For example, the fixed shaft 2 may be urged by a torsion spring in a state in which the fixed shaft 2 is held by an electromagnetic clutch. The rotation of the fixed shaft 2 may be performed by a restoration force of the torsion spring by release of the electromagnetic clutch.

When the coupling/uncoupling device reaches step t'2, the first fixed shaft 102 is present only in the first coupling member 101 and the second fixed shaft 202 is present only in the second coupling member 201. Separation of the coupling members 1 is possible.

By rotating the fixed shaft 2 in the CCW direction to release engagement, the coupled state of the first coupling member 101 and the second coupling member 201 can be secured and the adhesion state of the first coupling member 101 and the second coupling member 201 can be kept until transition from step t'1 to step t'2. Separation can be quickly performed according with reaching step t'3. A principle for this is explained below.

For explanation, a state is assumed in which an external force in a separating direction is applied to the coupling members 1 by the coupling targets. The state is a state in which the first coupling member 101 is pulled to the right side in FIG. 7 by an external force of an object connected to the first coupling section 109 and the second coupling member 201 is pulled to the left side in FIG. 7 by an external force of an object connected to the second coupling section 209.

In that case, in the state in step t'1, the first fixed shaft 102 receives a rightward force in FIG. 7 from the first coupling member 101. At that time, the first fixed shaft 102 is in direct contact with the second coupling member 201. Even if the adjustment gap S is formed between the guide pins 3 and the guide holes 5 as in the separating method between the members or by the rotation in the CW direction, a relative position to the second coupling member 201 changes only by the adjustment gap S or less.

As a result, the first coupling member 101 does not move to the right side with respect to the second coupling member 201 before transition to step t'2. The coupled state of the first coupling member 101 and the second coupling member 201 can be kept until transition to the state in step t'2. The first coupling member 101 and the second coupling member 201 can be relatively suddenly uncoupled according with reaching step t'2.

That is, the coupling/uncoupling device in this embodiment is used in a state immediately before the reach to step t'2. The coupling can be released immediately after the start of the uncoupling operation (a rising time of the uncoupling operation can be reduced) by slight rotation in the CCW direction. Therefore, the device is used by setting the second predetermined angle θ'1 in the coupled state to an angle for uncoupling by small rotation unlike the first predetermined angle θ1 set to a certain degree of magnitude to perform sure coupling. Consequently, the first coupling member 101 and the second coupling member 201 can be instantaneously uncoupled when it is requested to quickly uncouple the first coupling member 101 and the second coupling member 201. Naturally, the second predetermined angle θ2 may be equal to the first predetermined angle θ1 or is not prevented from being set larger than the first predetermined angle θ1.

Starting the uncoupling operation means, for example, a point in time when a driving command for the uncoupling operation is output to the motor M or a point in time when the user starts manual operation for the drive shaft 221 in order to rotate the fixed shaft 2.

Figure 8:
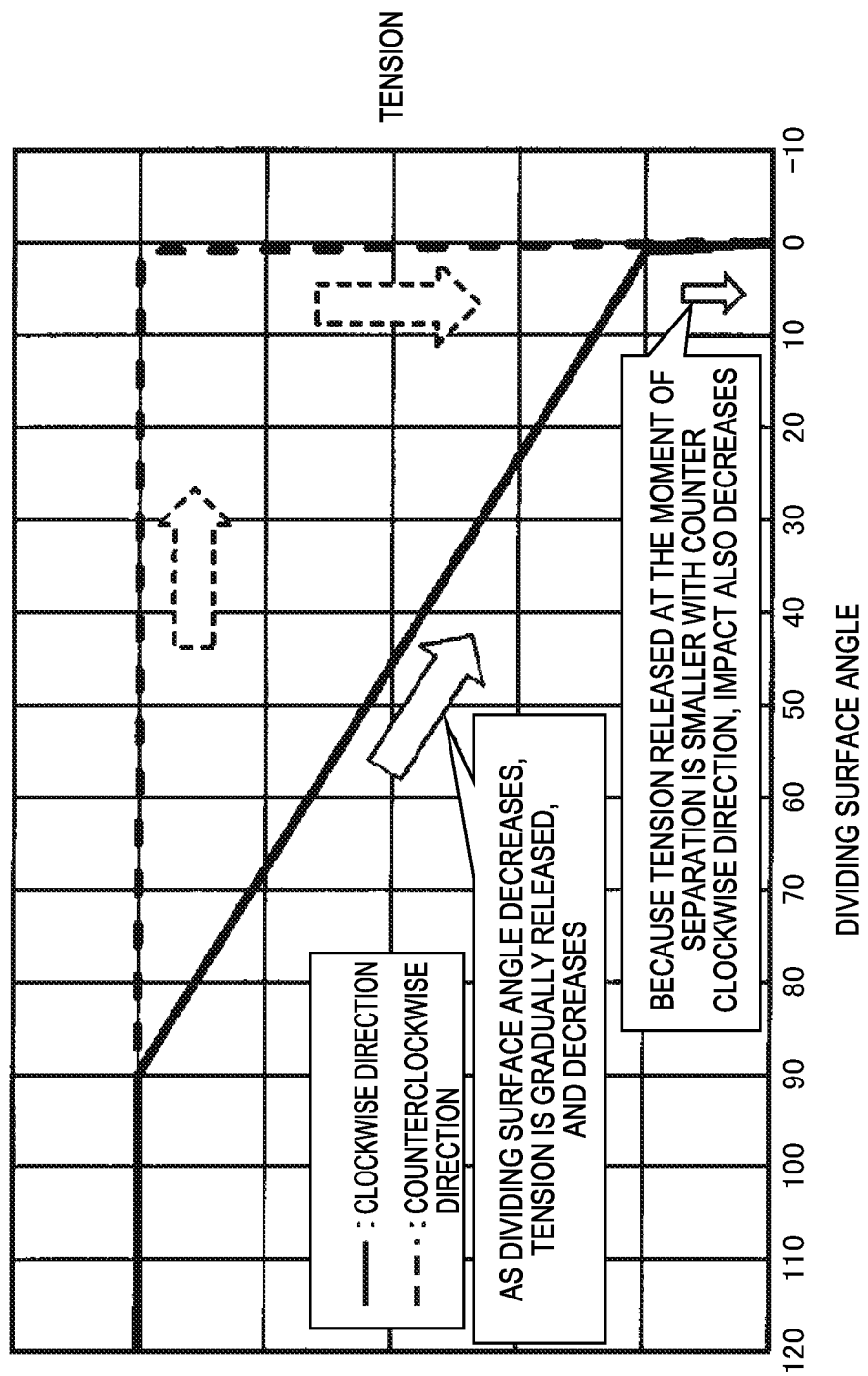
FIG. 8 is a comparative diagram of the operation of the coupling/uncoupling device in an embodiment of the present invention.

FIG. 8 is a conceptual diagram showing comparison of tensions applied to the coupling members 1 when the clockwise separation (the separation in the CW direction) is performed and when the counterclockwise separation (the separation in the CCW direction) is performed. Note that, like the change in the movement amount L with respect to the angle θ explained above, actually, the tensions do not linearly decrease. However, in FIG. 8, the tensions are simplified and linearly represented for explanation.

The tension applied when the clockwise separation is performed indicated by a solid line in FIG. 8 decreases as the angle θ of the dividing surface (the contact surface) F2 of the first fixed shaft 102 and the second fixed shaft 202 decreases as explained above. On the other hand, the tension applied when the counterclockwise separation is performed indicated by a broken line in FIG. 8 instantaneously decreases to 0 when the angle θ' of the dividing surface (the contact surface) F2 of the first fixed shaft 102 and the second fixed shaft 202 approaches 0 as explained above.

On the other hand, the impact applied to the coupling members 1 and the like during the uncoupling can be set smaller when the clockwise separation is performed.

By realizing structure including a plurality of methods of uncoupling in one coupling/uncoupling device in this way, it is possible to select an uncoupling method according to a use and a purpose of an apparatus. It is possible to increase versatility of the coupling/uncoupling device.

Figure 9:
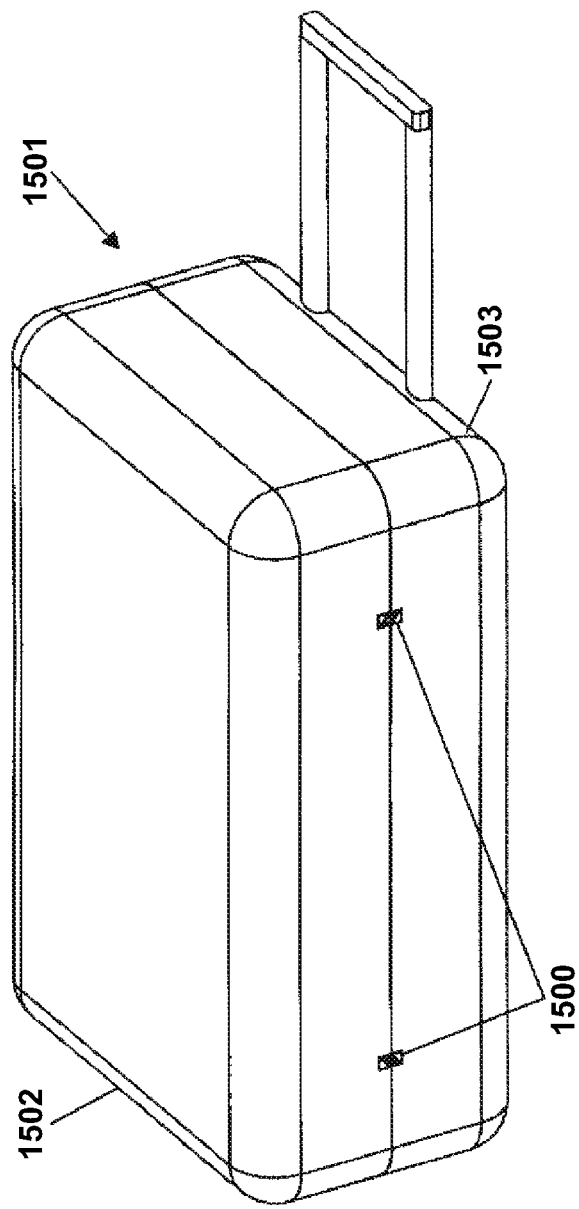
FIG. 9 is a general view of an example in which the coupling/uncoupling device in an embodiment of the present invention is mounted.

As an example of the apparatus applied with the coupling/uncoupling device according to this embodiment, an example is explained in which the coupling/uncoupling device is provided in a lock mechanism of a carry bag. FIG. 9 is a general view showing a carry bag according to this embodiment. Note that, as in the embodiment explained above, a first coupling member 1101 and a second coupling member 1201 are collectively described as coupling members 1001 and a first fixed shaft 1102 and a second fixed shaft 1202 are collectively described as fixed shaft 1002.

A carry bag body 1501 includes, on a side surface thereof, a coupling/uncoupling device 1500 according to this embodiment. A hinge is attached to a side surface on a side opposed to the side surface on which the coupling/uncoupling device 1500 is provided. A front housing 1502 is attached turnably around the hinge. Baggage and the like stored in the carry bag body 1501 can be put in and out by opening and closing the front housing 1502.

Figure 10:
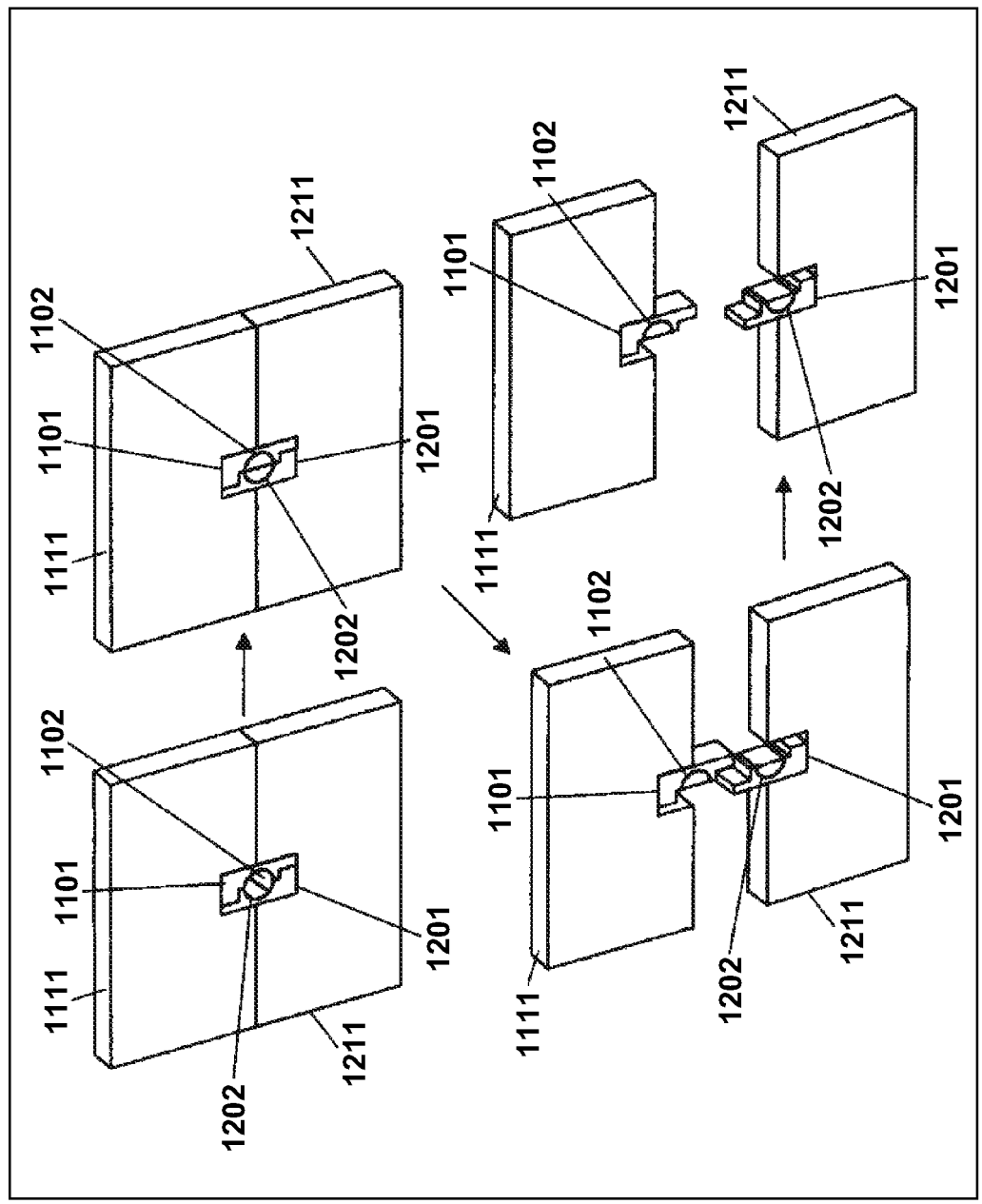
FIG. 10 is a main part enlarged view of the example in which the coupling/uncoupling device in an embodiment of the present invention is mounted.

A main part enlarged view of the coupling/uncoupling device 1500 according to this embodiment is shown in FIG. 10. A separating operation is performed according to arrows from a coupled state shown on the upper left in FIG. 10 and the coupling is released.

The first coupling member 1101 is fixed to the front housing 1502. As a method of the fixing, the first coupling member 1101 only has to be surely fastened to the front housing 1502 by inserting screws fixed to the front housing 1502 through the first coupling section 109 explained in the first embodiment. Similarly, the second coupling member 1201 is fixed to a rear housing 1503 shown in FIG. 9. The second coupling member 1201 only has to be surely fastened to the rear housing 1503 by inserting screws fixed to the rear housing 1503 through the second coupling section 209.

The first fixed shaft 1102 and the second fixed shaft 1202 are rotated in the CCW direction in FIG. 10 using, for example, a key formed by a magnet capable of adhering to the first fixed shaft 1102 and the second fixed shaft 1202. Consequently, the first fixed shaft 1102 and the second fixed shaft 1202 are rotated to a position where the dividing surface (the contact surface) F2 of the first fixed shaft 1102 and the second fixed shaft 1202 are flush with the contact surface (the dividing surface) F1 of the first coupling member 1101 and the second coupling member 1201. Note that the rotation of the fixed shaft 1002 may be performed by a member such as the key as explained above. The fixed shaft 1002 may be configured to rotate in association with another structure provided in the carry bag body 1501. The fixed shaft 1002 may be configured to be automatically rotated (electrically controlled) by the motor M.

The first coupling member 1101 and the second coupling member 1201 starts to be uncoupled as explained above immediately before the dividing surface of the fixed shaft 1002 and the contact surface of the coupling members 1001 become flush with each other. That is, an impact in the separating operation can be reduced by gradually performing separation. Sudden opening of the front housing 1502 can be prevented. Consequently, for example, the baggage or the like stored in the carry bag body 1501 can be prevented from popping out.

Second Embodiment

Figure 11:
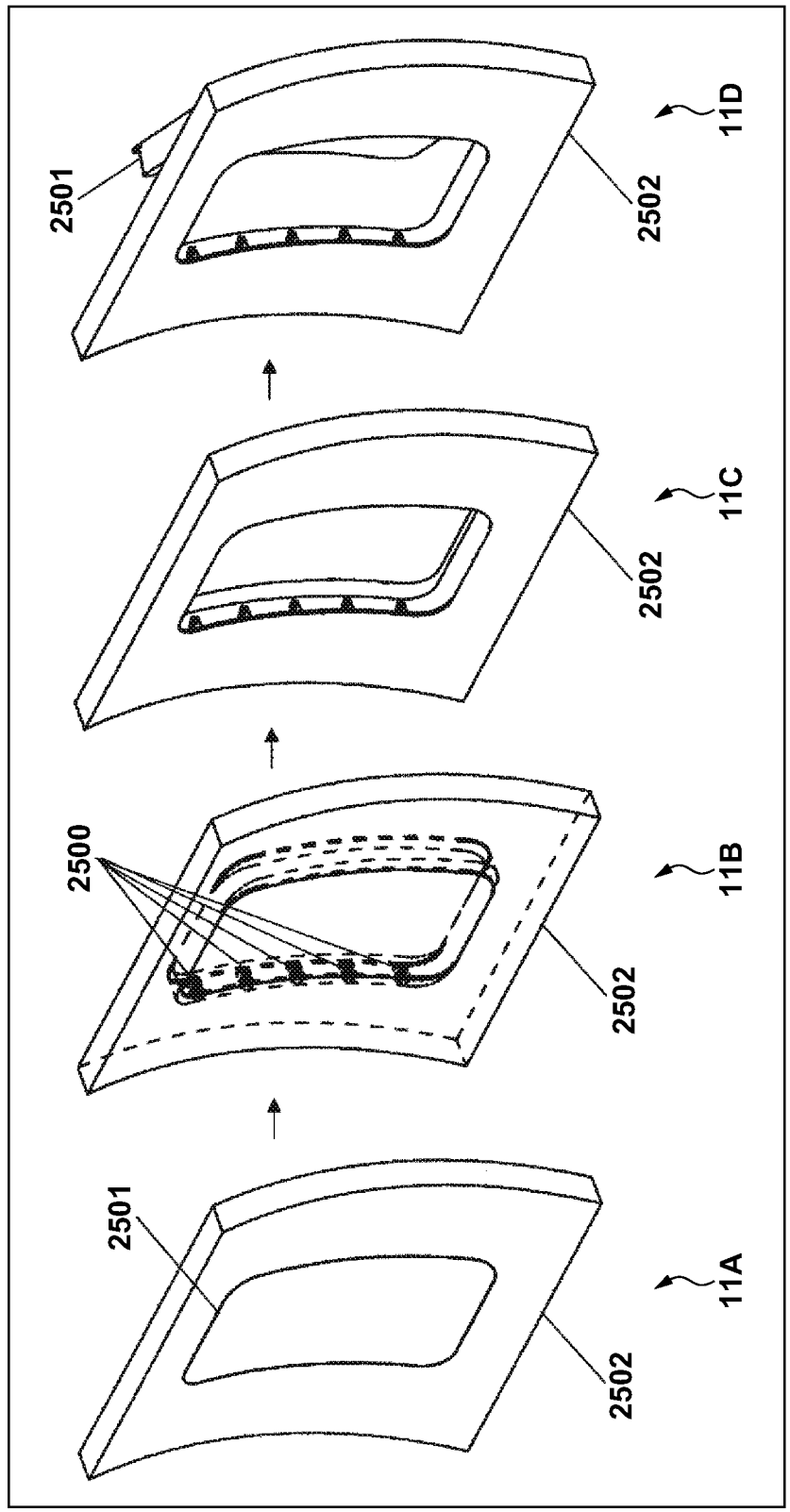
FIG. 11 is a general view of another example in which a coupling/uncoupling device in an embodiment of the present invention is mounted.

As another example of an apparatus applied with a coupling/uncoupling device according to an embodiment of the present invention, an example is explained in which the coupling/uncoupling device is provided in a door lock mechanism of an airplane. FIG. 11 is a general view showing a door of an airplane according to this embodiment. Note that, as in the embodiment explained above, a first coupling member 2101 and a second coupling member 2201 are collectively described as coupling members 2001. A first fixed shaft 2102 and a second fixed shaft 2202 are collectively described as fixed shaft 2002.

Figure 12:
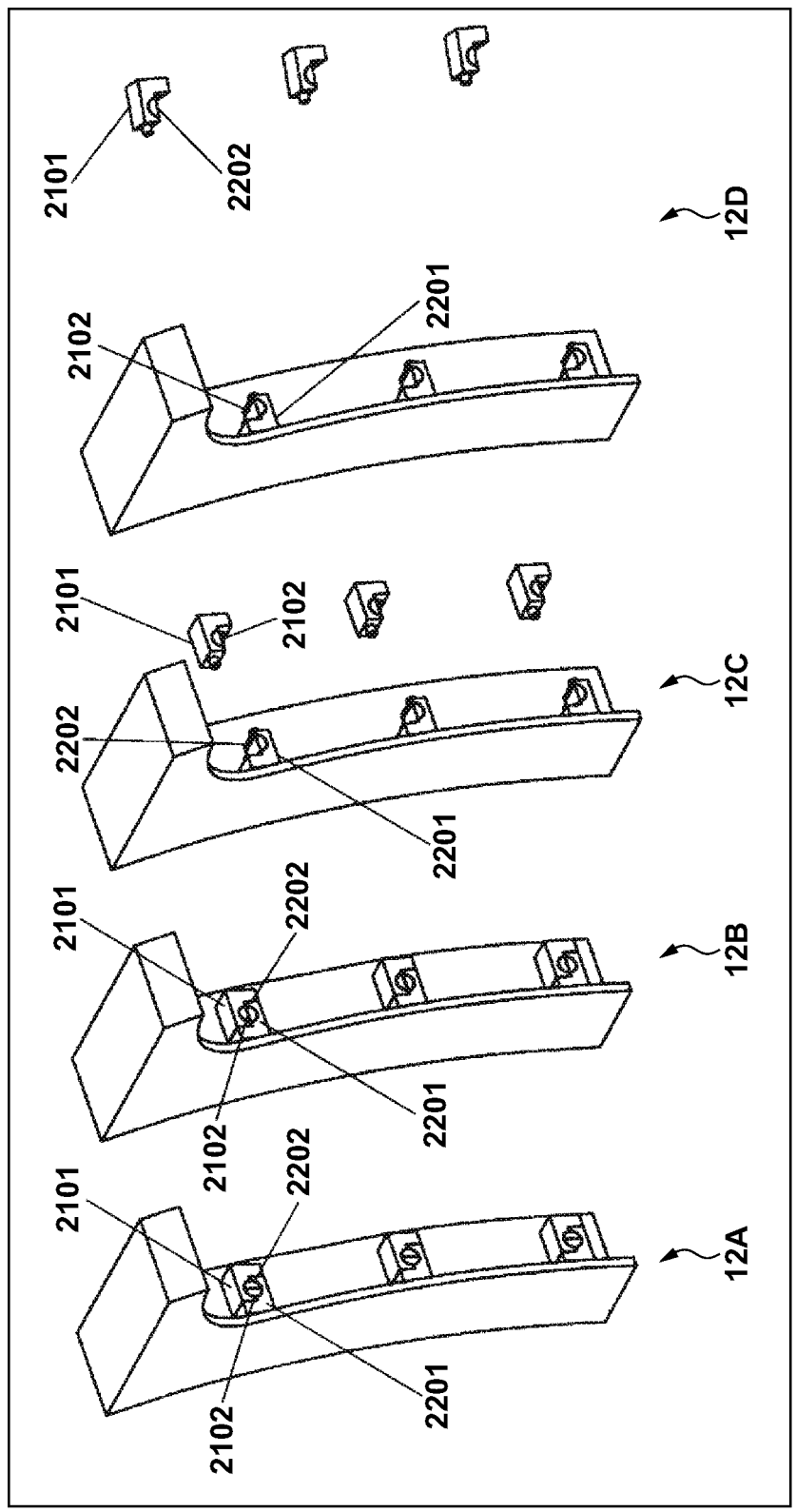
FIG. 12 is a main part enlarged view of another example in which the coupling/uncoupling device in an embodiment of the present invention is mounted.

In FIG. 11, a state is shown in which a separating operation is performed in the order of a state 11A, a state 11B, a state 11C, and a state 11D from the left and the door is opened. In FIG. 12, states 12A to 12D of a coupling/uncoupling device 2500 in this embodiment corresponding to the state 11A, the state 11B, the state 11C, and the state 11D in FIG. 11 are shown. The state 11A in FIG. 11 is a closed state in which a door 2501 of the airplane is present in a predetermined position in a door frame 2502. The state 11B in FIG. 11 is a point in time when the coupling/uncoupling device 2500 starts the separating operation. The state 11C in FIG. 11 shows a state in which the separating operation is completed and the door 2501 is unlocked. The state 11D in FIG. 11 shows an opened state in which the door 2501 is opened from the door frame 2502.

In the state 12A in FIG. 12, the coupling/uncoupling device 2500 in the coupled state is shown. In the coupled state, the dividing surface (the contact surface) F2 of the first fixed shaft 2102 and the second fixed shaft 2202 is controlled by the motor M to be in a position orthogonal to the contact surface (the dividing surface) F1 of the first coupling member 2101 and the second coupling member 2201. Note that, in FIG. 12, the door 2501 is omitted for explanation.

The state 12B in FIG. 12 is a state in which the first fixed shaft 2102 and the second fixed shaft 2202 rotate to a position where the dividing surface (the contact surface) F2 of the first fixed shaft 2102 and the second fixed shaft 2202 is flush with the contact surface (the dividing surface) F1 of the first coupling member 2101 and the second coupling member 2201. After this state, as shown in the state 12C in FIG. 12, the first coupling member 2101 and the second coupling member 2201 are uncoupled. As shown in the state 12D in FIG. 12, the door 2501 is opened from the door frame 2502.

In this embodiment, the dividing surface (the contact surface F2) of the first fixed shaft 2102 and the second fixed shaft 2202 in the coupled state is set in a position where the dividing surface (the contact surface F2) is orthogonal to the contact surface (the dividing surface) F1 of the first coupling member 2101 and the second coupling member 2201 to make it easy to perform two kinds of separating operations.

In a landing time or the like in normal operation, as explained in the first embodiment, the coupled state can be gradually loosened by rotating the fixed shaft 2002 in the CW direction on the paper surface. The pressure in the airplane can be gradually regulated. Therefore, an impact on the door 2501 and the door frame 2502 or the airplane itself connected to the door 2501 and the door frame 2502 can be reduced.

On the other hand, when the door 2501 is quickly opened at emergency time or the like, the coupled state can be instantaneously released by rotating the fixed shaft 2002 in the CCW direction.

In this embodiment, the contact surface of the first fixed shaft 2102 and the second fixed shaft 2202 in the coupled state is located to be orthogonal to the contact surface of the first coupling member 2101 and the second coupling member 2201 to make it possible to select the separating operation by the rotation of the fixed shaft 2002 in the CW direction and the separating operation by the rotation of the fixed shaft 2002 in the CCW direction. However, the present invention is not always limited to this. For example, the coupling/uncoupling device 2500 may be used by setting a state in which the fixed shaft 2002 is further rotated in the CCW direction as the coupled state in order to improve responsiveness of the separating operation in the CCW direction. Even in that case, influence is little on the separating operation in the CW direction for gently releasing the coupled state.

Note that, in this embodiment as well, the rotation of the fixed shaft 2002 is not limited to the control by the motor M. The fixed shaft 2002 may be manually operated by a lever or the like provided near the door 2501. In that case, it is desirable to indicate, beside the lever, with respect to a movable direction of the lever, a direction in which the lever is moved in normal use or a direction in which the lever is moved in emergency time. More suitably, it is desirable that a member that restricts a rotating direction of the fixed shaft 2002 (a member that restricts the movable direction of the lever) is configured such that the lever can be moved to a side for use at emergency time, for example, only in a state actually regarded as an emergency state in which an emergency signal from a control device of the airplane is notified.

Third Embodiment

Figure 13:
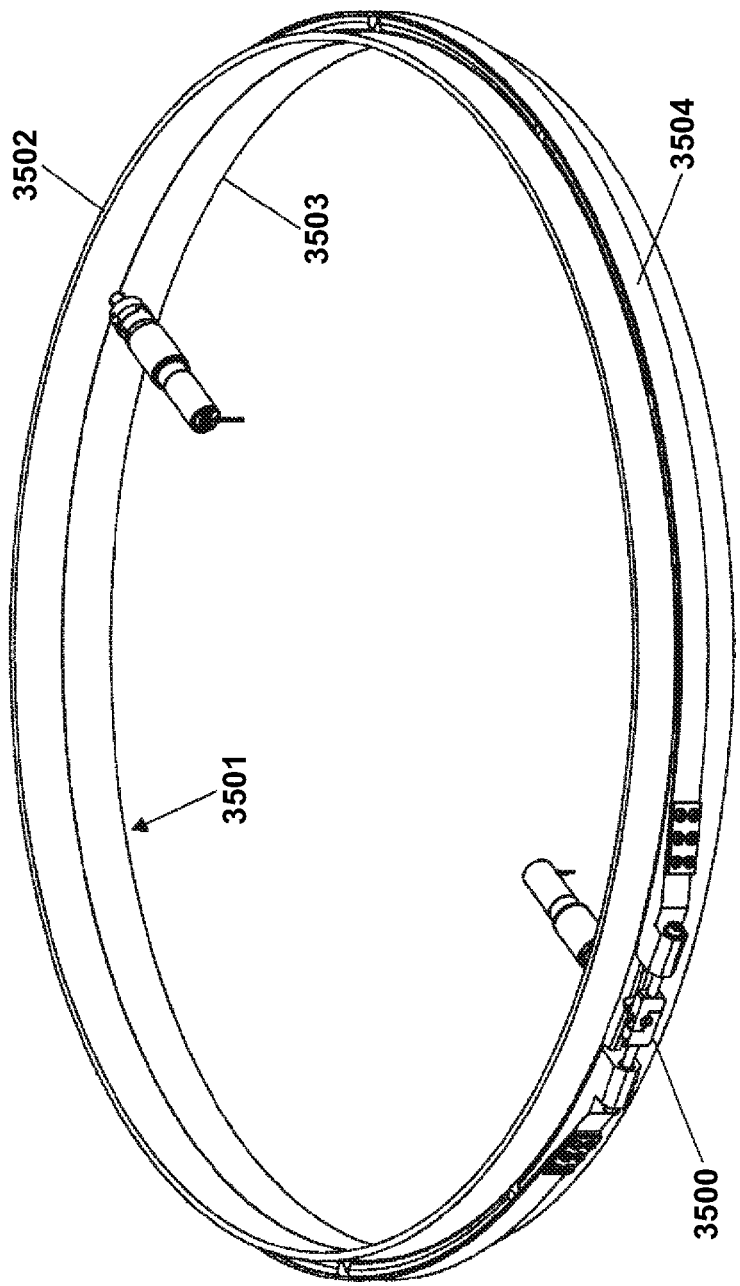
FIG. 13 is a general view of another example in which a coupling/uncoupling device in an embodiment of the present invention is mounted.

As another example of an apparatus applied with a coupling/uncoupling device according to an embodiment of the present invention, an example is explained in which the coupling/uncoupling device is provided in a separating mechanism of a spacecraft such as a rocket. FIG. 13 is a general view showing a separating mechanism according to this embodiment.

FIG. 13 shows an inter-stage joint 3501 of the rocket. An upper stage member 3502 and a lower stage member 3503 set in contact with each other are fixed by a band 3504 called Maruman band. Disconnection of the upper stage member 3502 and the lower stage member 3503 of the rocket is performed by performing a separating operation of a coupling/uncoupling device 3500 to separate the band 3504. Note that this embodiment is also applicable in coupling of the rocket and an apparatus such as a satellite.

Figure 14:
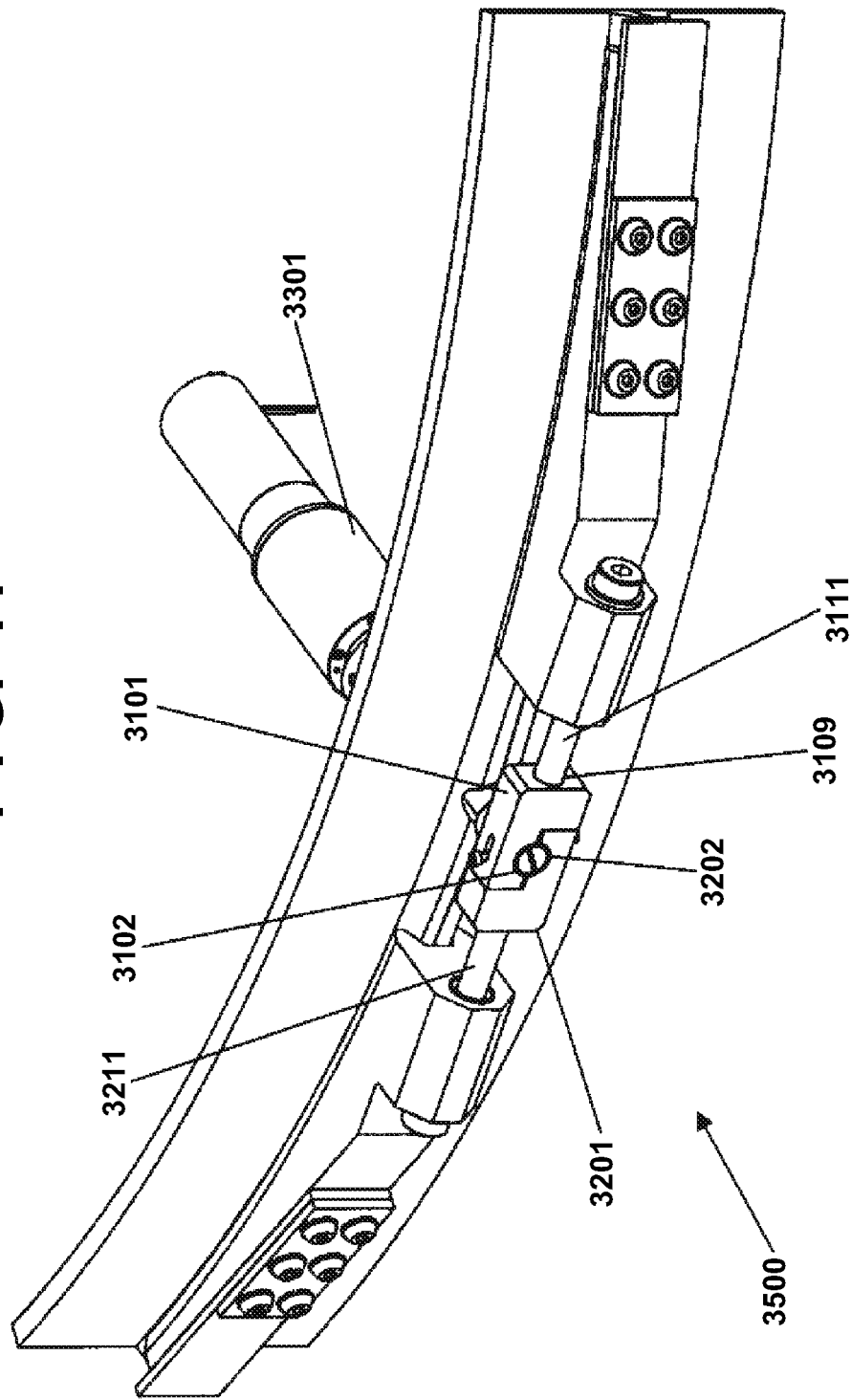
FIG. 14 is a main part enlarged view of another example in which the coupling/uncoupling device in an embodiment of the present invention is mounted.

An enlarged view of the coupling/uncoupling device 3500 according to this embodiment is shown in FIG. 14. A first coupling member 3101 is fixed to the band 3504 by a first coupling bar 3111 connected to a first coupling section 3109. Similarly, a second coupling member 3201 is fixed to the band 3504 by a second coupling bar 3211 connected to a second coupling section 3209. Note that the first coupling bar 3111 may be formed integrally with the first coupling section 3109. Similarly, the second coupling bar 3211 may be formed integrally with the second coupling section 3209. The same applies to embodiments explained below.

A fixed shaft 3002 is rotated by a driving shaft 3301 connected to the motor M. As described in the embodiments explained above, the separation in the CW direction and the separation in the CCW direction are possible.

Note that the driving shaft 3301 is connected to, such that an axis is located on a contact surface of the upper stage member 3502 and the lower stage member 3503, a drive shaft 3221 fixed to or formed integrally with the fixed shaft 3002 extending through a hole section formed across a part of the contact surface of the upper stage member 3502 and the lower stage member 3503.

In this embodiment, as shown in FIG. 13, two coupling/uncoupling devices 3500 are provided in positions opposed to each other at 180 degrees with respect to the circumference of the band 3504. However, three or more coupling/uncoupling devices 3500 may be provided at equal distances from one another with respect to the circumference.

When the separating operation is performed, an impact is determined by a force for tightening the band 3504 with the coupling/uncoupling device 3500 and a time for releasing the tightening force. Conventionally, when a joint was cut by an explosive device, the impact was large because the time for releasing the tightening force was an instant. However, in this embodiment, since the coupled state is gradually released, it is possible to reduce the impact.

Figure 15:
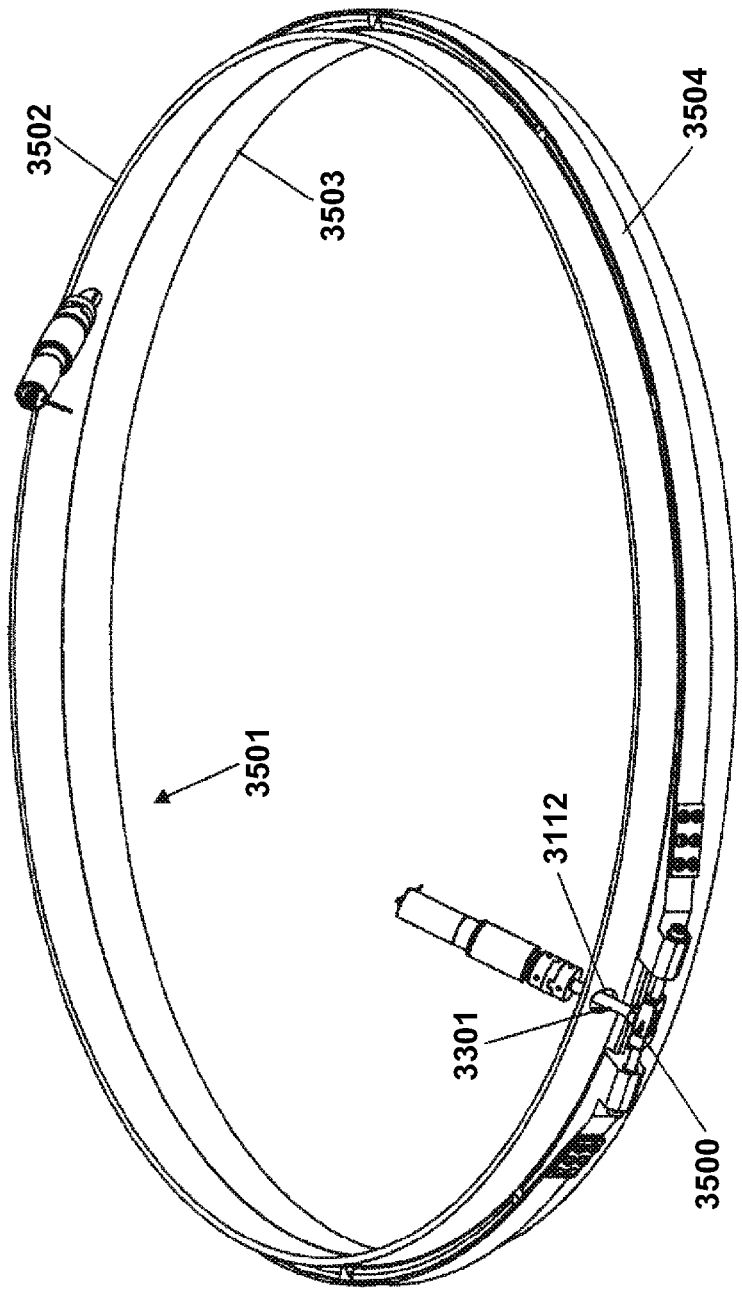
FIG. 15 is a main part enlarged view of another example in which the coupling/uncoupling device in an embodiment of the present invention is mounted.

FIG. 15 is a general view showing another form of this embodiment. Unlike the form explained above, a hole section 3112 for connecting the driving shaft 3301 to the drive shaft 3221 is provided in the upper stage member 3502.

Figure 16:
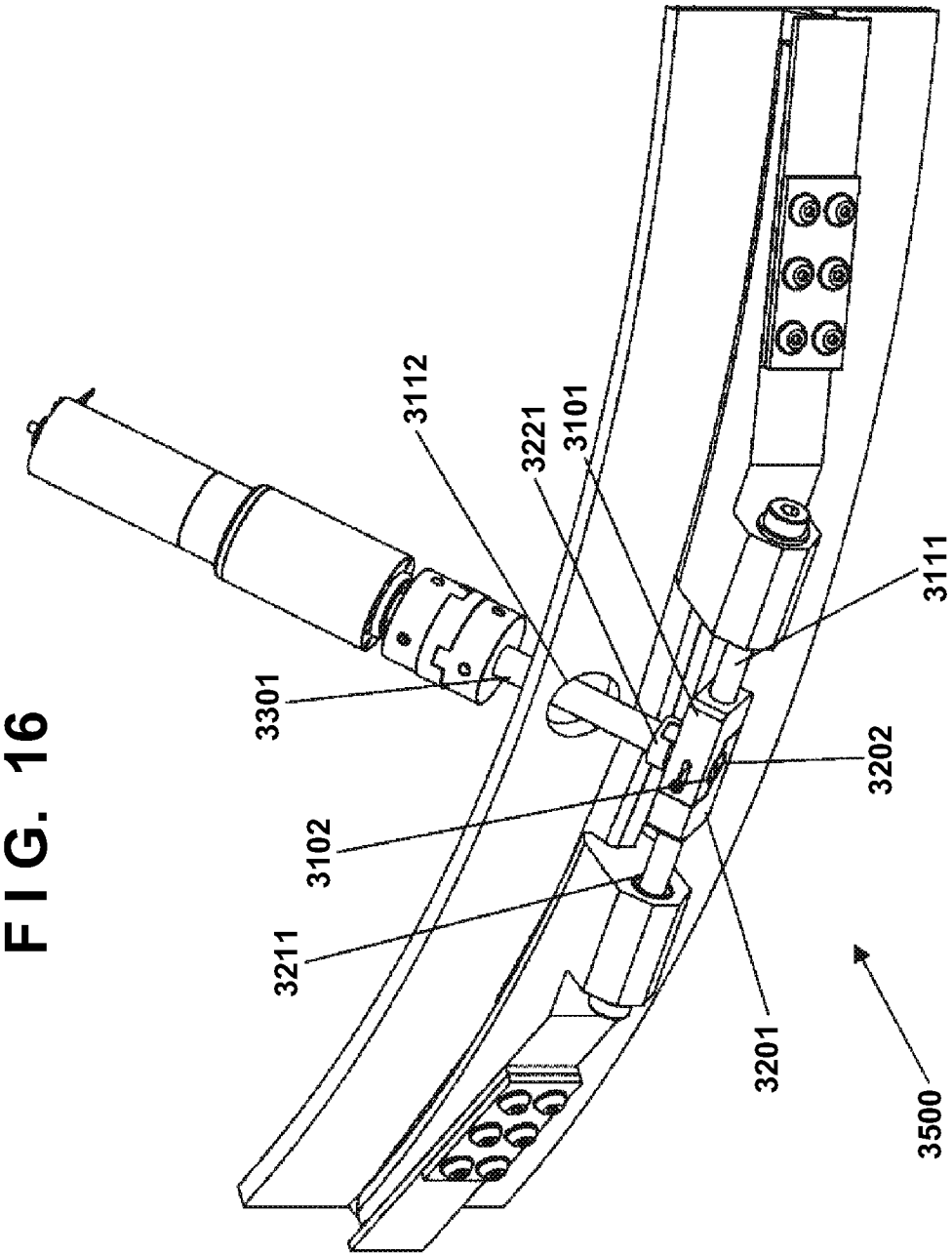
FIG. 16 is a main part enlarged view of another example in which the coupling/uncoupling device in an embodiment of the present invention is mounted.

An enlarged view of this form is shown in FIG. 16. By inserting the driving shaft 3301 through the hole section 3112 and connecting the driving shaft 3301 to the drive shaft 3221, it is unnecessary to provide a hole on the contact surface of the upper stage member 3502 and the lower stage member 3503. The strength of the band 3504 can be improved.

Note that the hole section 3112 may be provided in the lower stage member 3503. The hole section 3112 may be provided anywhere if the hole section 3112 is not provided on the contact surface of the upper stage member 3502 and the lower stage member 3503.

Figure 17:
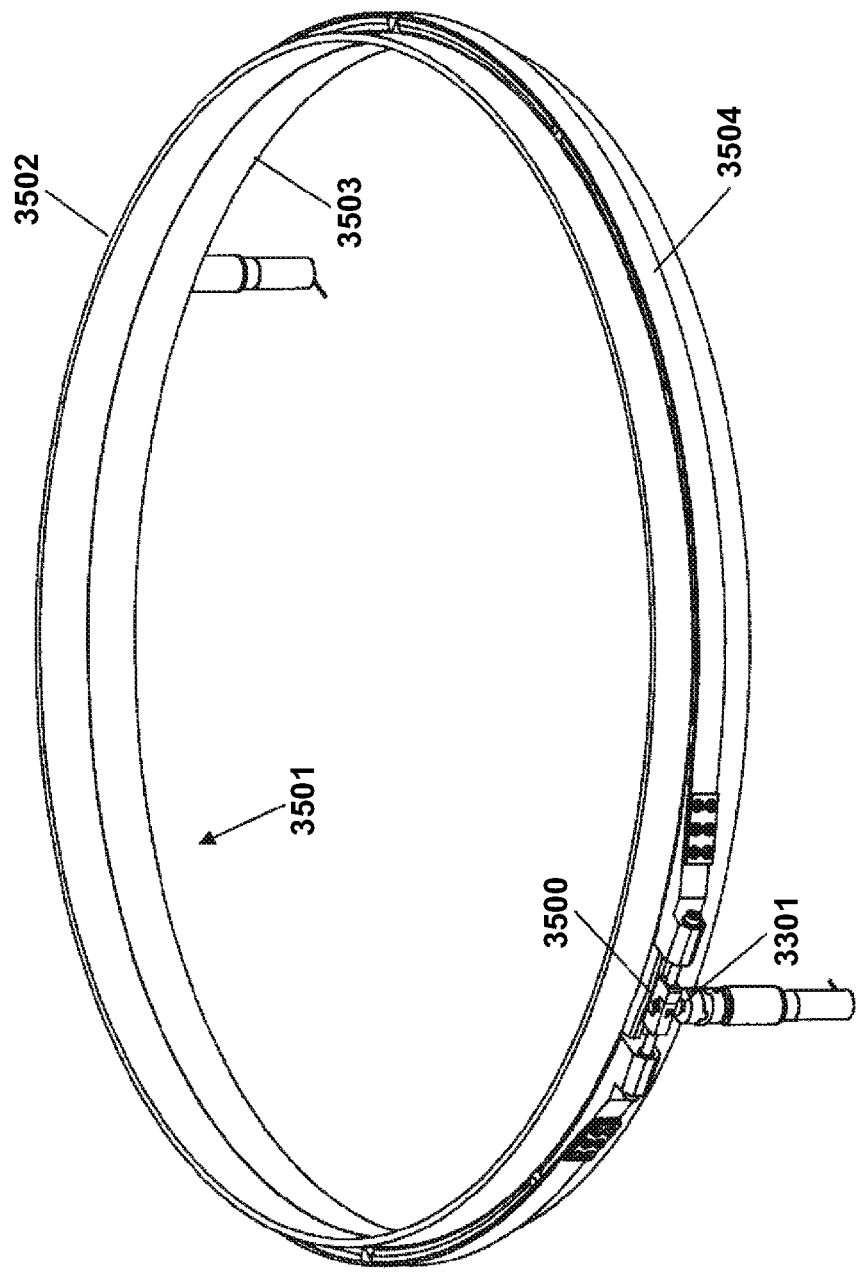
FIG. 17 is a general view of another example in which the coupling/uncoupling device in an embodiment of the present invention is mounted.

FIG. 17 is a general view showing another form of this embodiment. Unlike the forms explained above, the driving shaft 3301 is disposed perpendicularly to the contact surface of the upper stage member 3502 and the lower stage member 3503 without providing the hole section 3112 for connecting the driving shaft 3301 to the drive shaft 3221.

Figure 18:
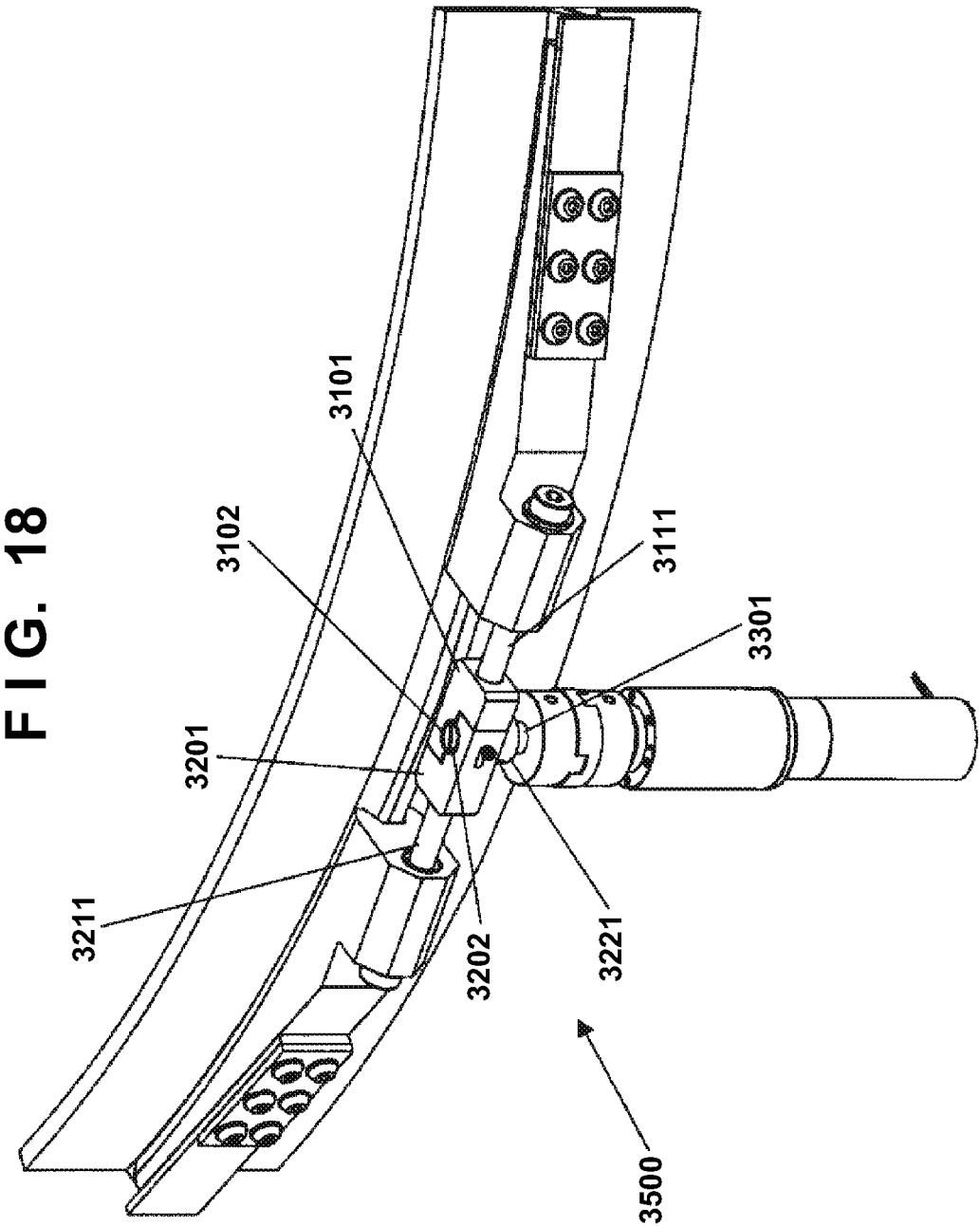
FIG. 18 is a main part enlarged view of another example in which the coupling/uncoupling device in an embodiment of the present invention is mounted.

An enlarged view of this form is shown in FIG. 18. By connecting the driving shaft 3301 to the drive shaft 3221 perpendicularly to the contact surface of the upper stage member 3502 and the lower stage member 3503, it is unnecessary to provide a hole section. The strength of the band 3504 can be improved.

Note that the driving shaft 3301 only has to be provided perpendicularly to the contact surface of the upper stage member 3502 and the lower stage member 3503. Naturally, a direction and a shape of the driving shaft 3301 may be any direction and any shape. A motor may be freely disposed in any position.

Figure 19:
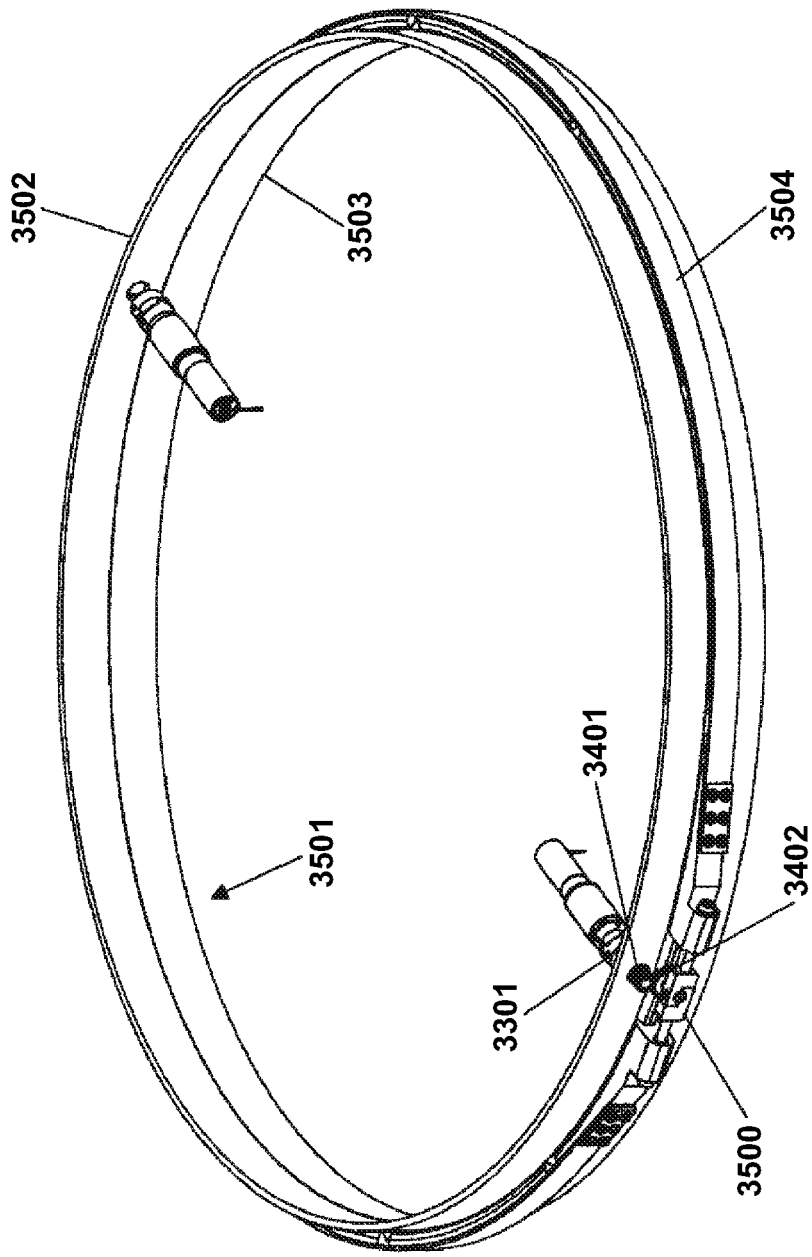
FIG. 19 is a general view of another example in which the coupling/uncoupling device in an embodiment of the present invention is mounted.

FIG. 19 is a general view showing another form of this embodiment. The driving shaft 3301 is connected to the drive shaft 3221 through a gear 3401 and a gear 3402.

Figure 20:
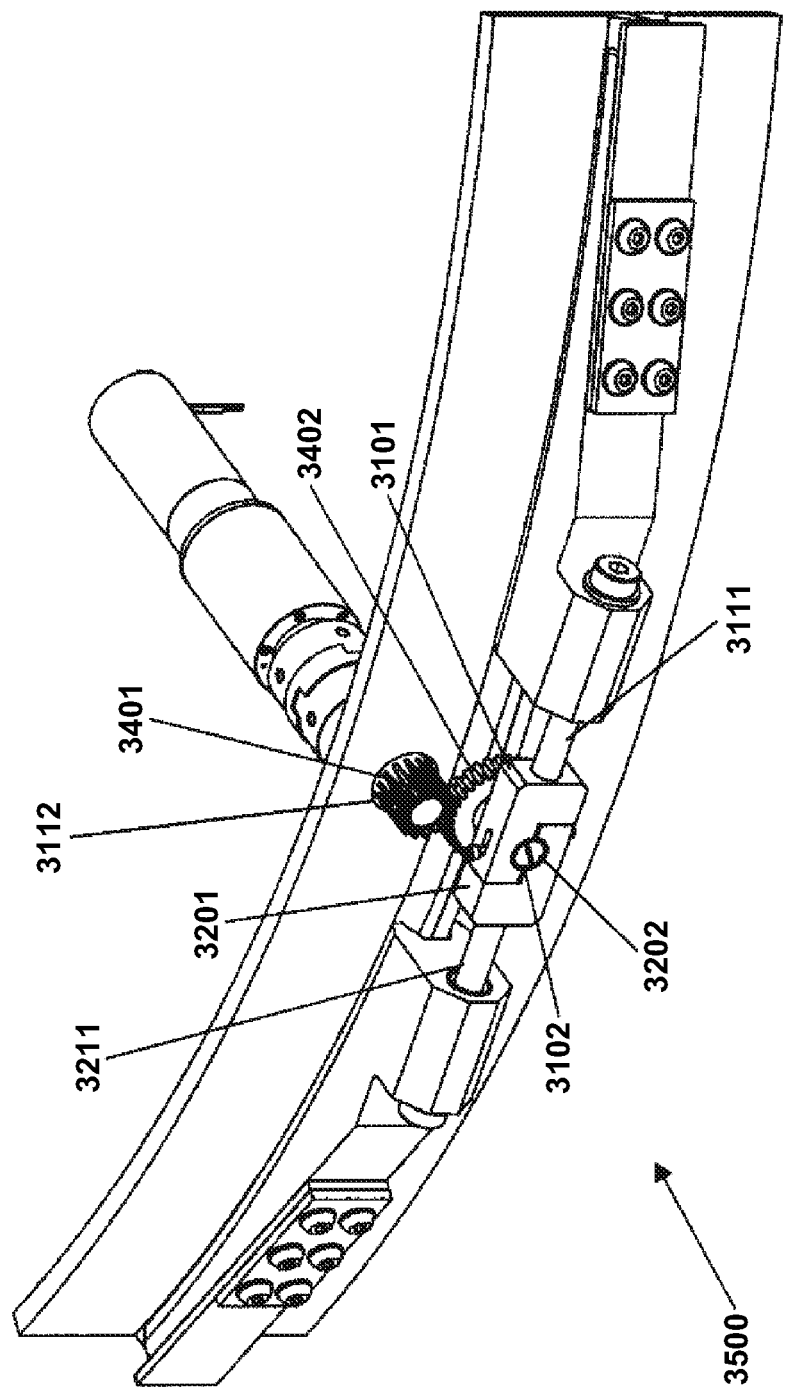
FIG. 20 is a main part enlarged view of another example in which the coupling/uncoupling device in an embodiment of the present invention is mounted.
Figure 21:
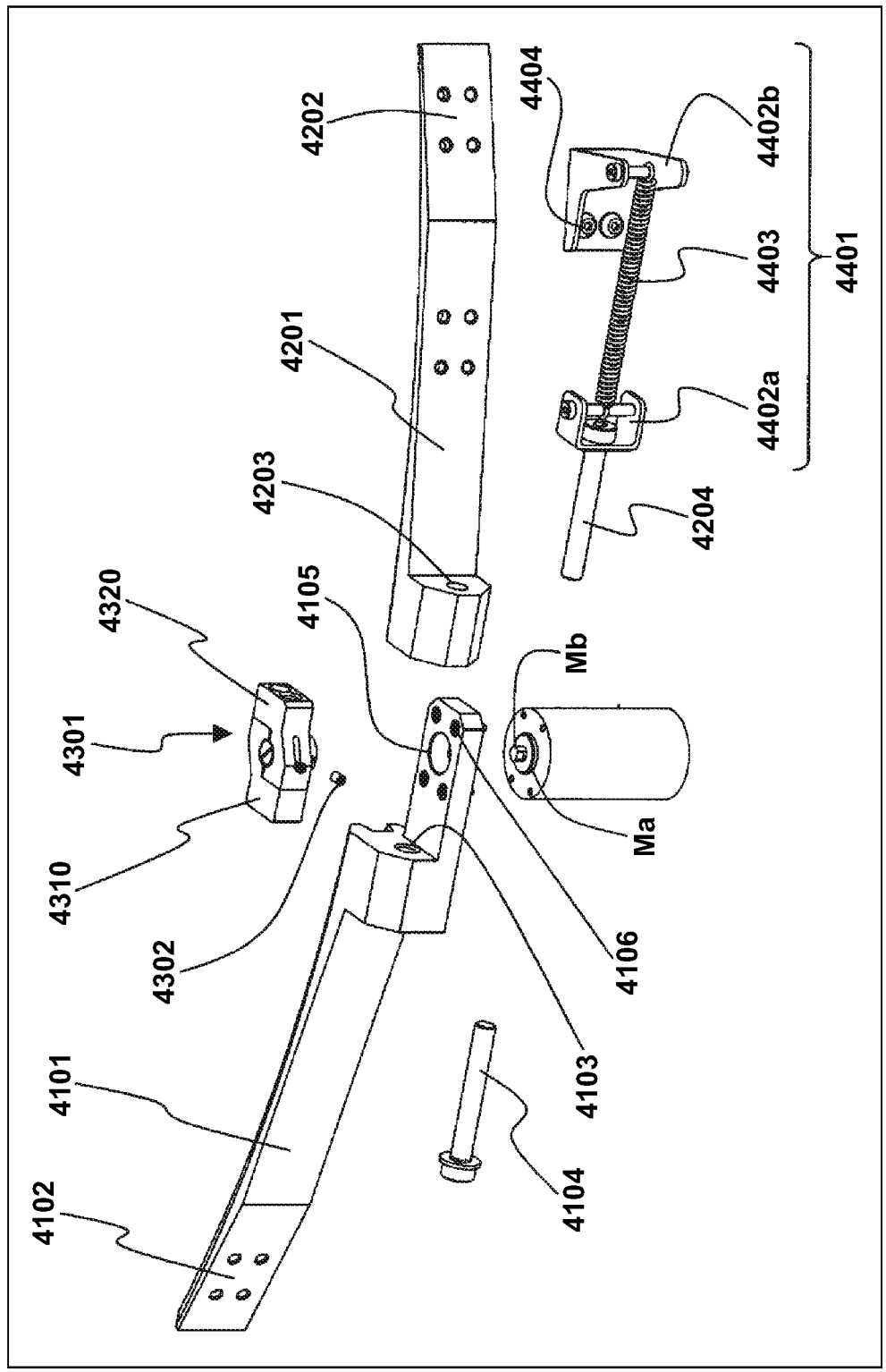
FIG. 21 is an exploded perspective view of a coupling/uncoupling device in another embodiment of the present invention.

An enlarged view of this form is shown in FIG. 20. The gear 3401 is attached to the distal end of the driving shaft 3301. The gear 3401 is inserted through the hole section 3112 provided in the upper stage member 3502. To mesh with the gear 3401, the gear 3402 is attached to fit with the drive shaft 3221 provided integrally with the second fixed shaft 3102.

With this configuration, it is unnecessary to provide a hole on the contact surface of the upper stage member 3502 and the lower stage member 3503. The strength of the band 3504 can be improved. In addition, by adjusting a reduction ratio of the gear 3401 and the gear 3402, the separating operation of coupling members 3001 can be performed even when a motor small in size and having small torque is used as the motor M. A reduction in the size of the apparatus is possible. In the case as well, the gear 3401 and the gear 3402 can be disposed on the outside of the apparatus. Therefore, gears having relatively large diameters can be used.

In this form, a spur gear is used for explanation. However, the gears are not limited to this. Various gears such as a worm gear and a bevel gear can be used.

Note that, in this embodiment, the coupling/uncoupling device 3500 can be configured small in size. More in detail, the coupling/uncoupling device 3500 having a short diameter with respect to the circumferential direction of the band 3504 can be realized. Therefore, the coupling/uncoupling device 3500 can be disposed in a part close to the circumference of the band 3504. Therefore, a load applied to the coupling/uncoupling device 3500 by the band 3504 can be generated only in the extending direction of the guide pins 3 (the sliding direction of the guide pins 3). A load in the radial direction by the band 3504 on the coupling/uncoupling device 3500 can be reduced. That is, the coupling of the band 3504 can be surely performed without using a member having high strength or using a reinforcing member in order to improve the rigidity of the coupling/uncoupling device 3500.

The coupling/uncoupling device of the present invention is explained in detail above. However, the present invention is not limited to the embodiment described above. Various improvements and changes can be made in a range not departing from the spirit of the present invention.

For example, in the embodiment described above, the guide pins having the circular shape in section, that is, the substantially cylindrical shape are used as the guide pins 3 for explanation. However, actually, the guide pins 3 may be formed in a rectangular parallelepiped shape. The guide holes 5 may be formed in an elliptical shape.

For example, the coupling/uncoupling device can be used in a coupling mechanism of a ship as well and can be used in an industrial apparatus as well.

Fourth Embodiment

A coupling/uncoupling device according to a fourth embodiment of the present invention is explained with reference to FIG. 21 to FIG. 25. As shown in an exploded perspective view of FIG. 21, a coupling/uncoupling device 4100 according to an embodiment of the present invention is configured from a first end member (a first intermediate member) 4101 and a second end member (a second intermediate member) 4201, a separating mechanism 4301 and an unlocking motor M, and a separation assisting mechanism 4401.

In order to couple a separation target object and the separating mechanism 4301 and the like, the first end member 4101 and the second end member 4201 include, at one ends, a first attaching section 4102 and a second attaching section 4202 for coupling to the separation target object.

The other end of the first end member 4101 is coupled to the separating mechanism 4301 through a first adjusting member 4104 inserted into a guide hole 4103 and coupled to the unlocking motor M inserted into a motor hole 4105 through a motor fixing member 4106.

The other end of the second end member 4201 is coupled to the separating mechanism 4301 through a second adjusting member 4204 inserted into a guide hole 4203. The separation assisting mechanism 4401 is fixed to both of the second end member 4201 and the second adjusting member 4204 through a supporting-section fixing member 4404.

The separating mechanism 4301 and the unlocking motor M are fixed by a shaft fixing member 4302. Rotation power generated in the unlocking motor M is transmitted to the separating mechanism 4301.

Figure 22:
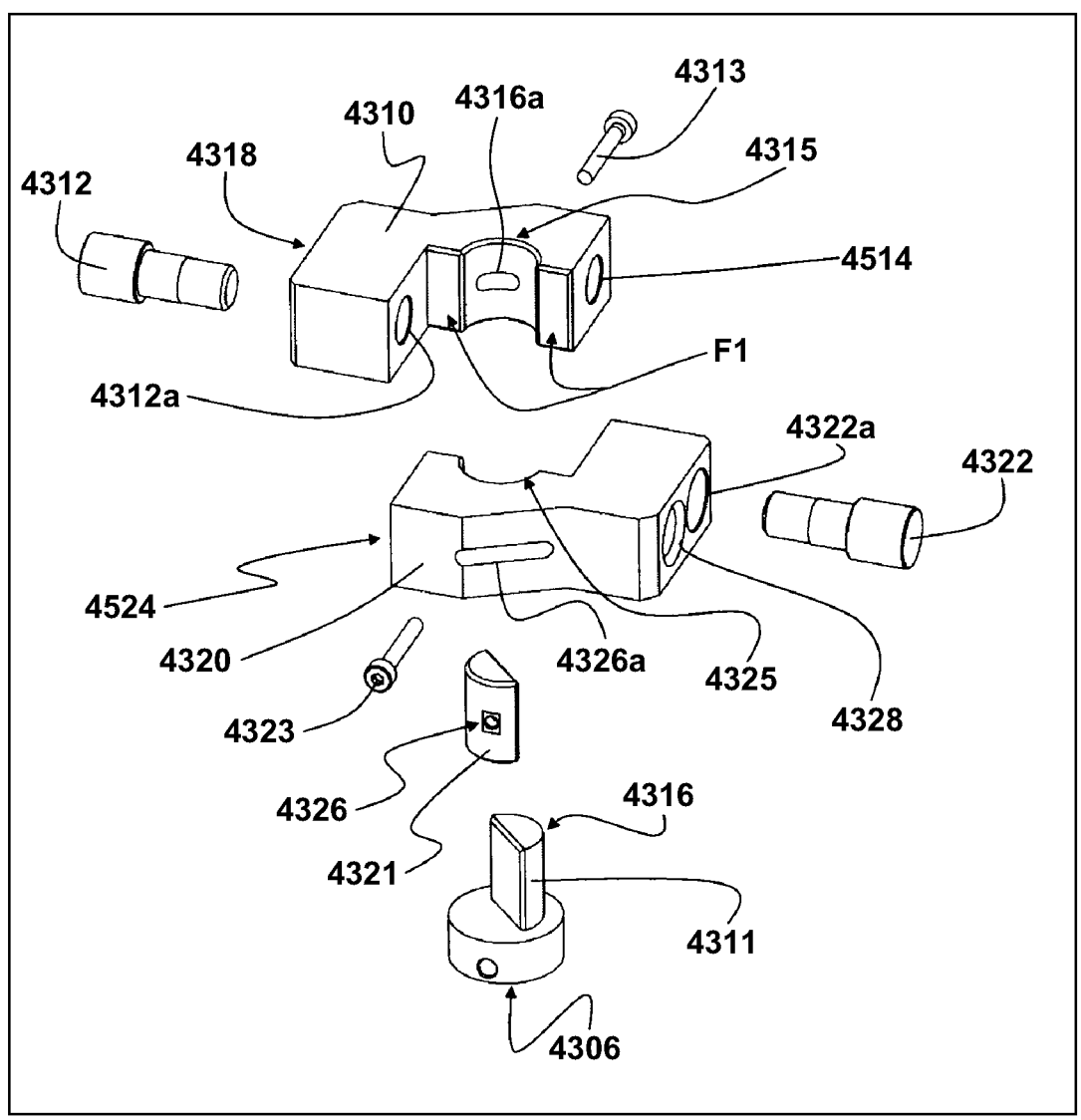
FIG. 22 is a main part exploded perspective view of the coupling/uncoupling device in another embodiment of the present invention.

As shown in FIG. 22, the separating mechanism 4301 is configured from a first coupling member 4310 and a second coupling member 4320 and a first semicircular fixed member (a first semicircular member) 4311 functioning as a first fixed shaft and a second semicircular fixed member (a second semicircular member) 4321 functioning as a second fixed shaft.

The first coupling member 4310 and the second coupling member 4320 are respectively formed in L shapes. The first coupling member 4310 and the second coupling member 4320 are configured such that external shapes thereof are substantially equal. This prevents a gap from being formed when the first coupling member 4310 and the second coupling member 4320 are point-symmetrically disposed and set in contact with each other as shown in FIG. 22. Note that, in the following explanation, the first coupling member 4310 and the second coupling member 4320 are collectively described as coupling members 4001.

A first guide pin 4312 and a second guide pin 4322 are respectively provided in the first coupling member 4310 and the second coupling member 4320. The first guide pin 4312 is fixed in a not-shown first guide pin hole 4312a. The second guide pin 4322 is fixed in a second guide pin hole 4322a. Note that, in the following explanation, the first guide pin 4312 and the second guide pin 4322 are collectively described as guide pins 4003.

In a state in which the first coupling member 4310 and the second coupling member 4320 are in contact (hereinafter, coupled state), the guide pin 4312 is inserted through a not-shown guide hole 4524 provided in the second coupling member and the guide pin 4322 is inserted through a guide hole 4514 provided in the first coupling member. Consequently, moving directions of the first coupling member 4310 and the second coupling member 4320 are restricted. The first coupling member 4310 and the second coupling member 4320 are capable of moving only in an extending direction of the guide pins 4003. Note that, in the following explanation, the guide hole 4514 and the guide hole 4524 are collectively described as guide holes 4005.

The first coupling member 4310 includes a first concave section 4315 on a surface (the contact surface F1) parallel to the guide pin 4003 among three surfaces in contact with the second coupling member 4320 in the coupled state. Similarly, the second coupling member 4320 includes a second concave section 4325 on a surface (the contact surface F1) parallel to the guide pin 4003 among three surfaces in contact with the first coupling member 4310 in the coupled state.

The first concave section 4315 and the second concave section 4325 are respectively recessed along semicircles, more specifically, shapes (in the following explanation, referred to as semi-columns) obtained by dividing a columnar shape, which has perfect circles as a top surface and a bottom surface, along a surface (the dividing surface F2) passing the center of the perfect circles forming the top surface and the bottom surface. That is, in the coupled state, the first concave section 4315 and the second concave section 4325 are opposed to front surfaces thereof each other and form a through-hole (a circular holding section) 4006. The through-hole 4006 has a columnar shape obtained by extending a perfect circular shape. For explanation, the sectional shape of the through-hole 4006 is explained as the perfect circle. However, when the through-hole 4006 is actually machined, it is difficult to accurately form the through-hole 4006 as the perfect circle. It goes without saying that the perfect circle includes a circle close to the perfect circle. As explained below, even in a state in which a gap is formed between the first concave section 4315 and the second concave section 4325, the first concave section 4315 and the second concave section 4325 can be regarded as forming a perfect circular shape in a state in which the first concave section 4315 and the second concave section 4325 are opposed to each other. Naturally, if the through-hole 4006 can be formed in the perfect circle, adhesion of coupling in a coupling principle explained below can be suitably increased.

A first fixed shaft (a first semicircular fixed member) 4311 having a semi-columnar shape and a second fixed shaft (a second semicircular fixed member) 4321 having a semi-columnar shape are inserted into the through-hole 4006. The first fixed shaft 4311 and the second fixed shaft 4321 are formed in the same shape in portions opposed in the through-hole 4006. The first fixed shaft 4311 and the second fixed shaft 4321 form a columnar fixed shaft (a columnar member) 4002. In this embodiment, an end portion on the opposite side of a side inserted into the first coupling member 4310 in the first fixed shaft 4311 includes a not-shown through-hole 4306 for fitting with the unlocking motor M. Structure that can obtain desired rotation power necessary for unlocking is formed by coupling the end portion to a drive shaft Ma of the unlocking motor M.

Note that the unlocking motor M is coupled to not only the first fixed shaft 4311 but also the first end member 4101. Therefore, the first coupling member 4310 and the first fixed shaft 4311 are coupled to the unlocking motor M through the first end member 4101 and integrally formed. With the structure, even if the coupling members 4001 are displaced with respect to the separation target object during unlocking, the unlocking motor M is also displaced in the same manner. Therefore, an unexpected load is not generated in the drive shaft Ma. Transmission of power is not interrupted.

A cable for supplying electric power to the unlocking motor M is formed in sufficiently long structure with respect to the displacement. Consequently, an unexpected load is not generated in the cable. Even if the coupling members 4001 are displaced with respect to the separation target object, a driving force to the unlocking motor M is transmitted and the displacement is not restricted.

In the through-hole 4006, the fixed shaft 4002 formed by the first fixed shaft 4311 and the second fixed shaft 4321 is in slide contact with through-hole 4006. That is, the inner surface of the through-hole 4006 forms a circular inner surface section. The fixed shaft 4002 functioning as a columnar member is smoothly in slide contact with the circular inner surface section.

The driving force from the unlocking motor M is transmitted through the drive shaft Ma. The fixed shaft 4002 is driven to rotate. That is, the drive shaft Ma and a driving shaft Mb rotate with a rotational driving force generated in the unlocking motor M. Subsequently, the through-hole 4306 coupled to be turnable in association with the driving shaft Mb rotates. The first fixed shaft 4311 in which the through-hole 4306 is formed and the second fixed shaft 4321 that receives a load from the first fixed shaft 4311 are supported to be integrally rotatable along the circumferential direction of the through-hole 4006 in the through-hole 4006.

The first fixed shaft 4311 and the second fixed shaft 4321 respectively include a first restricting hole 4316 and a second restricting hole 4326 on columnar (semi-columnar) side surfaces of the first fixed shaft 4311 and the second fixed shaft 4321 in order to provide structure for restricting movement in an extending direction of the fixed shaft 4002 when the first fixed shaft 4311 and the second fixed shaft 4321 are driven to rotate in the through-hole 4006.

A first long hole 4316a extending in the extending direction of the guide pin 4003 is provided in the first coupling member 4310 to be opposed to the first restricting hole 4316 of the first fixed shaft 4311. A first restricting member 4313 is fit in the first restricting hole 4316 extending through the first long hole 4316a to limit (restrict) the movement of the second fixed shaft 4321 in the extending direction of the fixed shaft 4002 to a predetermined range. In this embodiment, the width (the length in the extending direction of the fixed shaft 4002) of the first long hole 4316a and the diameter of the first restricting member 4313 are set substantially equal. The first fixed shaft 4311 is prevented from moving in the extending direction of the fixed shaft 4002.

When a separating operation explained below acts on the coupling member 4001, the first restricting member 4313 restricts the first fixed shaft 4311 from separating from the first coupling member 4310. As an example, the first restricting member 4313 is configured by a screw. The first restricting hole 4316 is configured by a screw hole. If the diameter of a head shape of the screw is larger than the width of the first long hole 4316a, the first restricting member 4313 can be restricted from separating from the first coupling member 4310.

Further, the first restricting member 4313 comes into contact with an end face in the extending direction of the guide pin 4003 of the first long hole 4316a to thereby restrict a rotation angle of the first fixed shaft 4311.

Similarly, a second long hole 4326a extending in the extending direction of the guide pin 4003 is provided in the second coupling member 4320 to be opposed to the second restricting hole 4326 of the second fixed shaft 4321. A second restricting member 4323 is fit in the second restricting hole 4326 extending through the second long hole 4326a to limit (restrict) the movement of the second fixed shaft 4321 in the extending direction of the fixed shaft 4002 to a predetermined range. In this embodiment, the width (the length in the extending direction of the fixed shaft 4002) of the second long hole 4326a and the diameter of the second restricting member 4323 are set substantially equal. The second fixed shaft 4321 is prevented from moving in the extending direction of the fixed shaft 4002.

When the separating operation explained below acts on the coupling member 4001, the second restricting member 4323 restricts the second fixed shaft 4321 from separating from the second coupling member 4320. As an example, the second restricting member 4323 is configured by a screw. The second restricting hole 4326 is configured by a screw hole. If the diameter of a head shape of the screw is larger than the width of the second long hole 4326a, the second restricting member 4323 can be restricted from separating from the second coupling member 4320.

Further, the second restricting member 4323 comes into contact with an end face in the extending direction of the guide pin 4003 of the second long hole 4326a to thereby restrict a rotation angle of the second fixed shaft 4321.

Targets coupled by the separating mechanism 4301 configured in this way are coupled through the coupling/uncoupling device 4100 by being fixed to a not-shown first coupling section 4318 provided adjacent to a position through which the first guide pin 4312 is inserted on an outer surface on which the guide pin hole 4312a is provided in the first coupling member 4310 and a second coupling section 4328 provided adjacent to a position through which the second guide pin 4322 is inserted on an outer surface on which the guide pin hole 4322a is provided in the second coupling member 4320. The coupling can be released by performing a separating operation explained below.

Stress due to an external force in a separating direction explained below concentrates on contact parts of the coupling members 4001 and the fixed shaft 4002 and the coupling members 4001 and the other guide pin 4003. Therefore, SUS630-H900, which is a high-strength material, is suitable. It is also suitable to divide the components into pluralities of pieces and apply the high-strength material to only contact points of the components.

From the viewpoint of preventing strength from being deteriorated by corrosion due to aging, SUS630-H900, which is a type of stainless steel that is a material with corrosion resistance, is suitable.

In surface states of the members, sliding occurs among the members when the separating operation explained below acts. Therefore, it is necessary to form surface states and the like having a desired coefficient of friction. In particular, a motor output of the unlocking motor M for obtaining a desired separating operation can be reduced by reducing a coefficient of friction of a sliding section. Therefore, it is suitable to reduce surface roughness and apply molybdenum disulfide coating (equivalent to MIL-L-23398) or DLC (Diamond-Like Carbon) coating.

Figure 23:
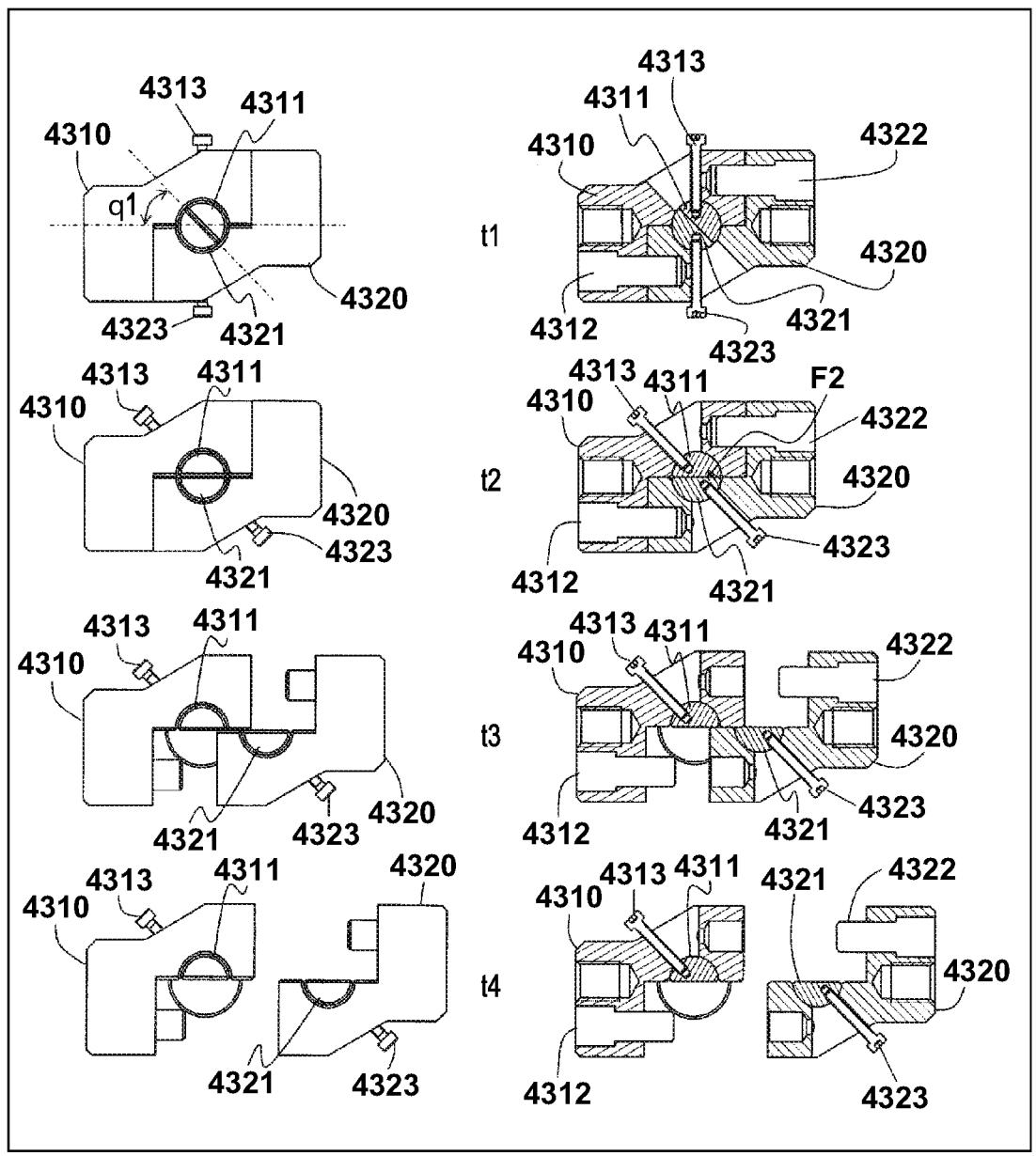
FIG. 23 is a separating operation explanatory diagram of the coupling/uncoupling device in another embodiment of the present invention.

An explanatory diagram of a separating operation (counterclockwise separation) of the coupling/uncoupling device in an embodiment of the present invention is shown in FIG. 23. States of the coupling/uncoupling device between t1 and t2 (or t3) in FIG. 23 are shown in detail in FIG. 24. A front view of a coupling/uncoupling device 100 is shown on the left side of the figure. A sectional view of the coupling/uncoupling device 100 is shown on the right side of the figure.

In FIG. 23, t1 to t4 indicate steps in coupling or separation. However, explanation of the basis separating operation is omitted because the basic separating operation is the same as the separating operation in the first embodiment. Only differences are explained.

In the first embodiment, the first guide pin 103 provided on the surface opposed to the first coupling section 109 in the first coupling member 101 is inserted through the second guide hole 205 provided in the second coupling member 201. Similarly, the second guide pin 203 is provided to restrict relative moving directions of the first coupling member 101 and the second coupling member 201 in the separating operation.

On the other hand, in this embodiment, the first guide pin 4312 provided to be inserted through the guide pin hole 4312a provided adjacent to the first coupling section 4318 is inserted through the guide hole 4524. Similarly, the second guide pin 4322 provided to be inserted through the guide pin hole 4322a provided adjacent to the second coupling section 4328 is inserted through the guide hole 4514 to restrict relative moving directions of the first coupling member 4310 and the second coupling member 4320 in the separating operation.

Figure 25:
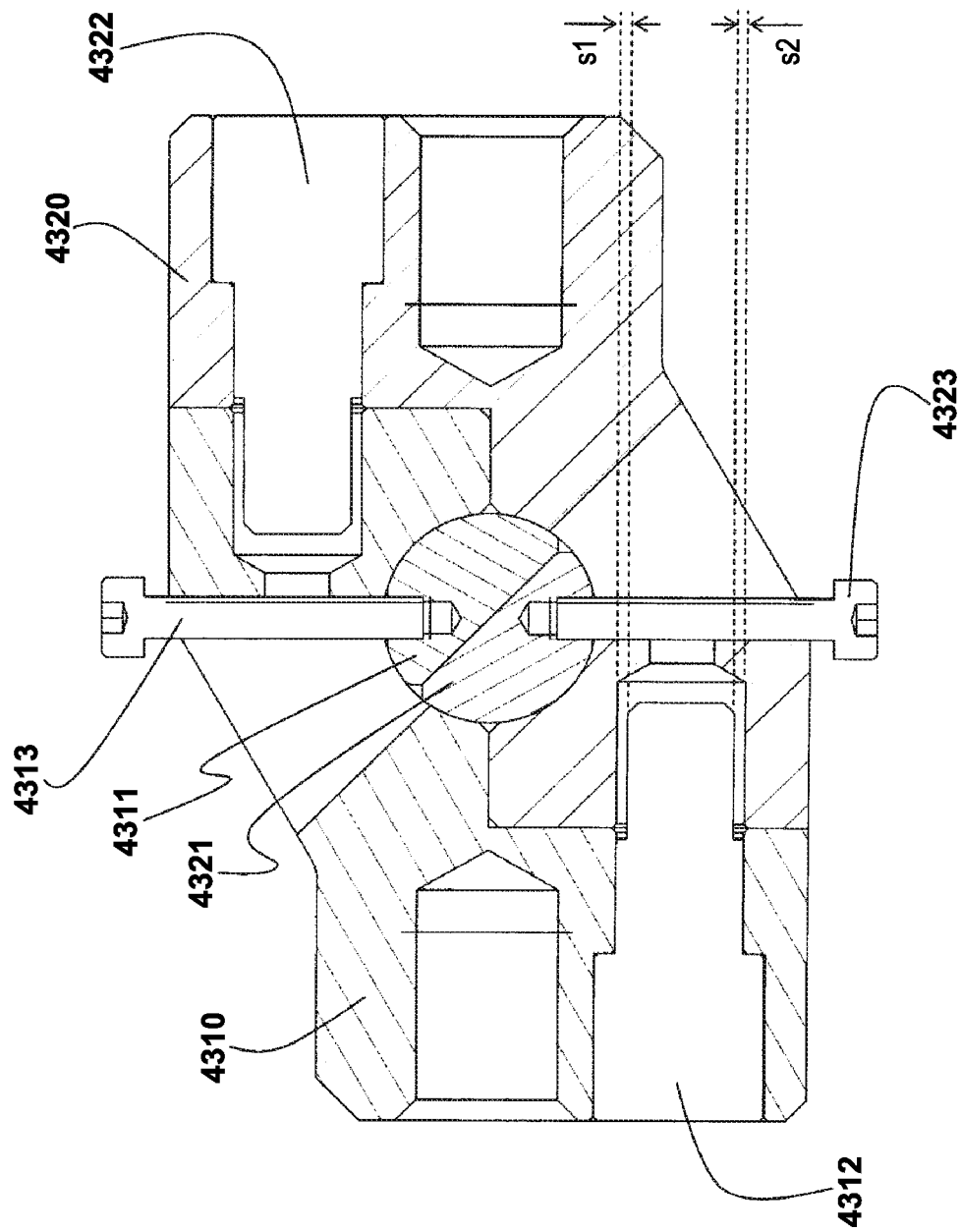
FIG. 25 is an actuation principle explanatory diagram of the coupling/uncoupling device in another embodiment of the present invention.

With this configuration, as it is seen from FIG. 25, reaction applied to the other coupling member 4001 by the guide pin 4003 in the separating operation is directed to the fixed shaft 4002 side (the inner side) in the guide hole 4005. The inner side of the guide hole 4005 is formed thick compared with the outer side because the fixed shaft 4002 and the like are provided on the inner side. Further, a part of the coupling member 4001 on a side to which the guide pin 4003 is attached is located in the direction in which the reaction is applied. Therefore, deformation of the coupling members 4001 can be prevented.

When the coupling members 4001 are urged in a separating direction only by a restoration force of a separation target object, the restoration force of the separation target object decreases because relative positions of the first coupling member 4310 and the second coupling member 4320 become wider apart. The restoration force disappears before the guide pins 4003 come off the guide holes 4005 and the separation is not completed. It is likely that the separating operation of the present invention cannot be appropriately actuated.

On the other hand, in the coupling/uncoupling device according to this embodiment, a restoration force by a tension spring 4403 also decreases because relative positions of the first coupling member 4310 and the second coupling member 4320 become wider apart. However, by disposing the tension spring 4403 having a displacement amount equal to or larger than a distance for the guide pins 4003 to come off the guide holes 4005, an urging force in the separating direction of the first coupling member 4310 and the second coupling member 4320 can be applied irrespective of the restoration force of the separation target object. The separating operation can be appropriately actuated.

Note that the tension spring 4403 is provided to be separated from the second end member 4201 by the supporting-section fixing member 4404 such that a restoration force by the tension spring 4403 acts in the extending direction of the guide pins 4003. More in detail, the tension spring 4403 is disposed on extension of the second adjusting member 4204. As shown in FIG. 22, the second coupling section 4328, to which the second adjusting member 4204 is connected, is provided adjacent to the second guide pin hole 4322a as much as possible. The second coupling section 4328 and the second guide pin hole 4322a may be set to coincide with each other. In that case, the second guide pin 4322 and the second adjusting member 4204 may be integrally configured.

In step t4 in FIG. 23, a state is shown in which engagement is released and the first coupling member 4310 and the second coupling member 4320 are separated.

Note that, in the separating operation, separating and moving directions of the first coupling member 4310 and the second coupling member 4320 are restricted by the first guide pin 4312 and the second guide pin 4322. The first coupling member 4310 and the second coupling member 4320 move in the extending direction of the guide pins 4003 at least up to step t3. By restricting moving directions of the coupling members 4001 with the guide pins 4003, it is possible to restrict the movement of the coupling members 4001 in a direction orthogonal to the extending direction of the guide pins and cause the separating operation of the present invention to appropriately operate.

Figure 24:
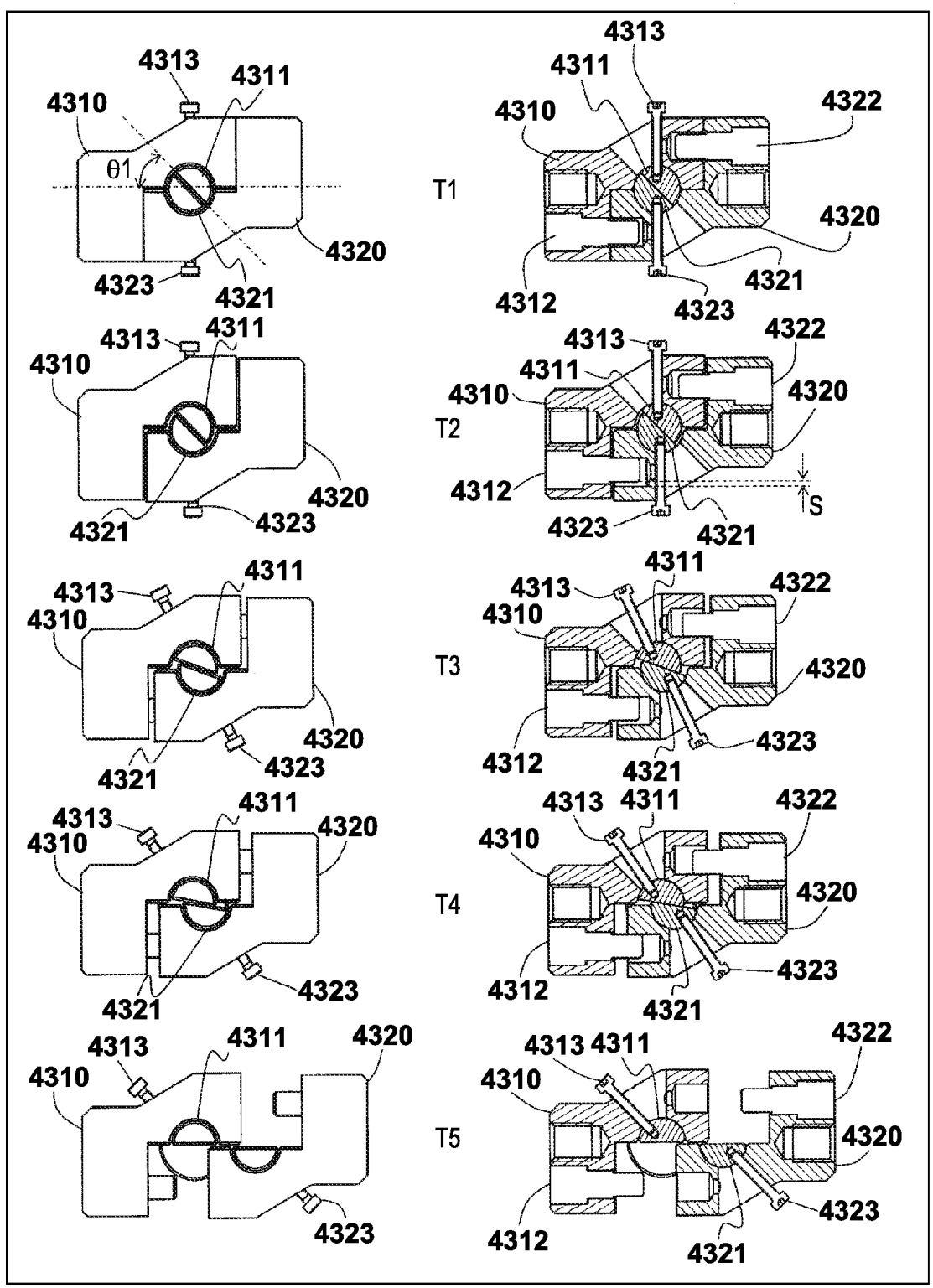
FIG. 24 is a detailed separating operation explanatory diagram of the coupling/uncoupling device in another embodiment of the present invention.
Figure 26:
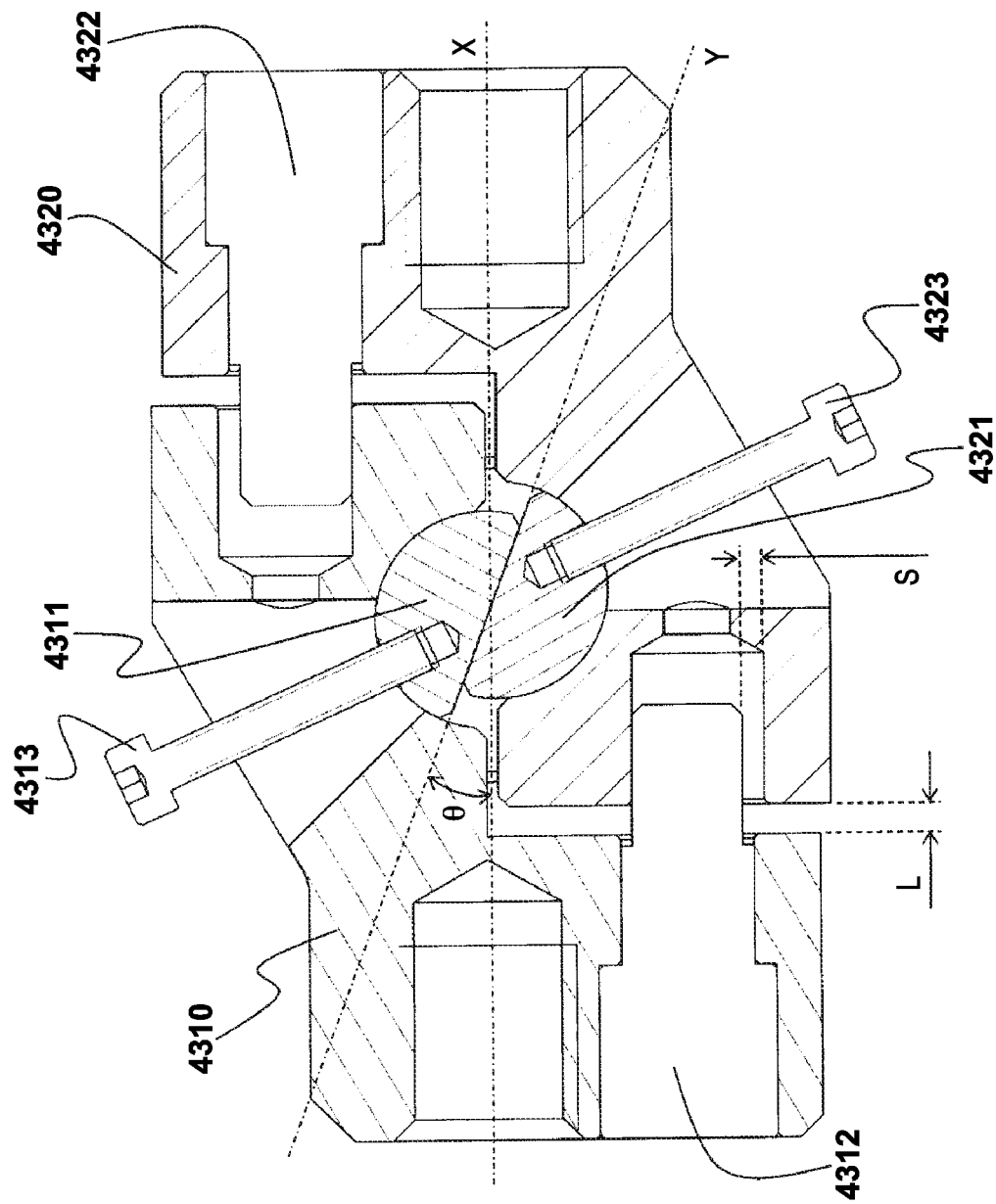
FIG. 26 is an actuation principle explanatory diagram of the coupling/uncoupling device in another embodiment of the present invention.
Figure 27:
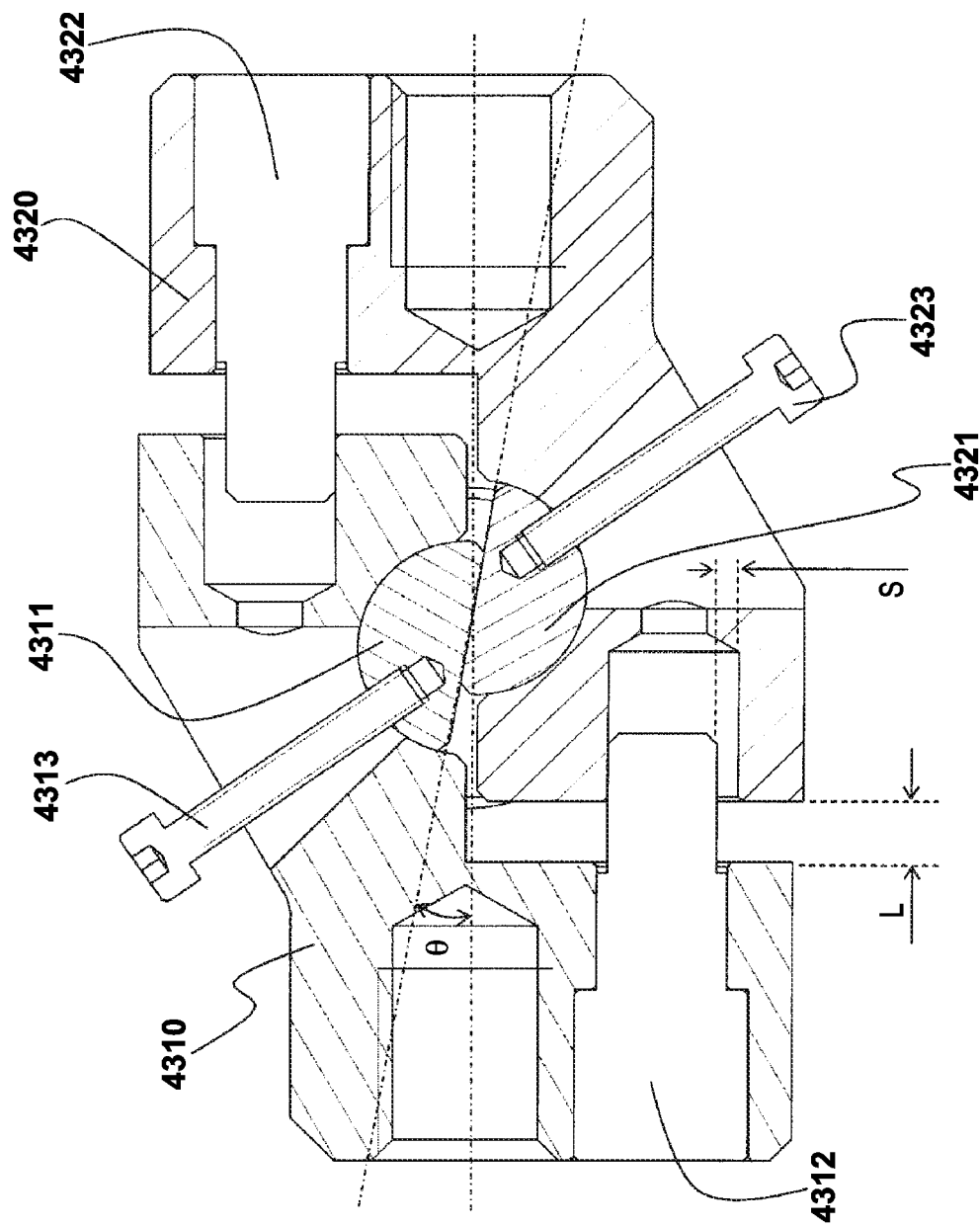
FIG. 27 is an actuation principle explanatory diagram of the coupling/uncoupling device in another embodiment of the present invention.

A state in step T1 in FIG. 24 is shown in FIG. 25. A state in step T2 in FIG. 24 is shown in FIG. 26. A state in step T3 in FIG. 24 is shown in FIG. 27.

Figure 28:
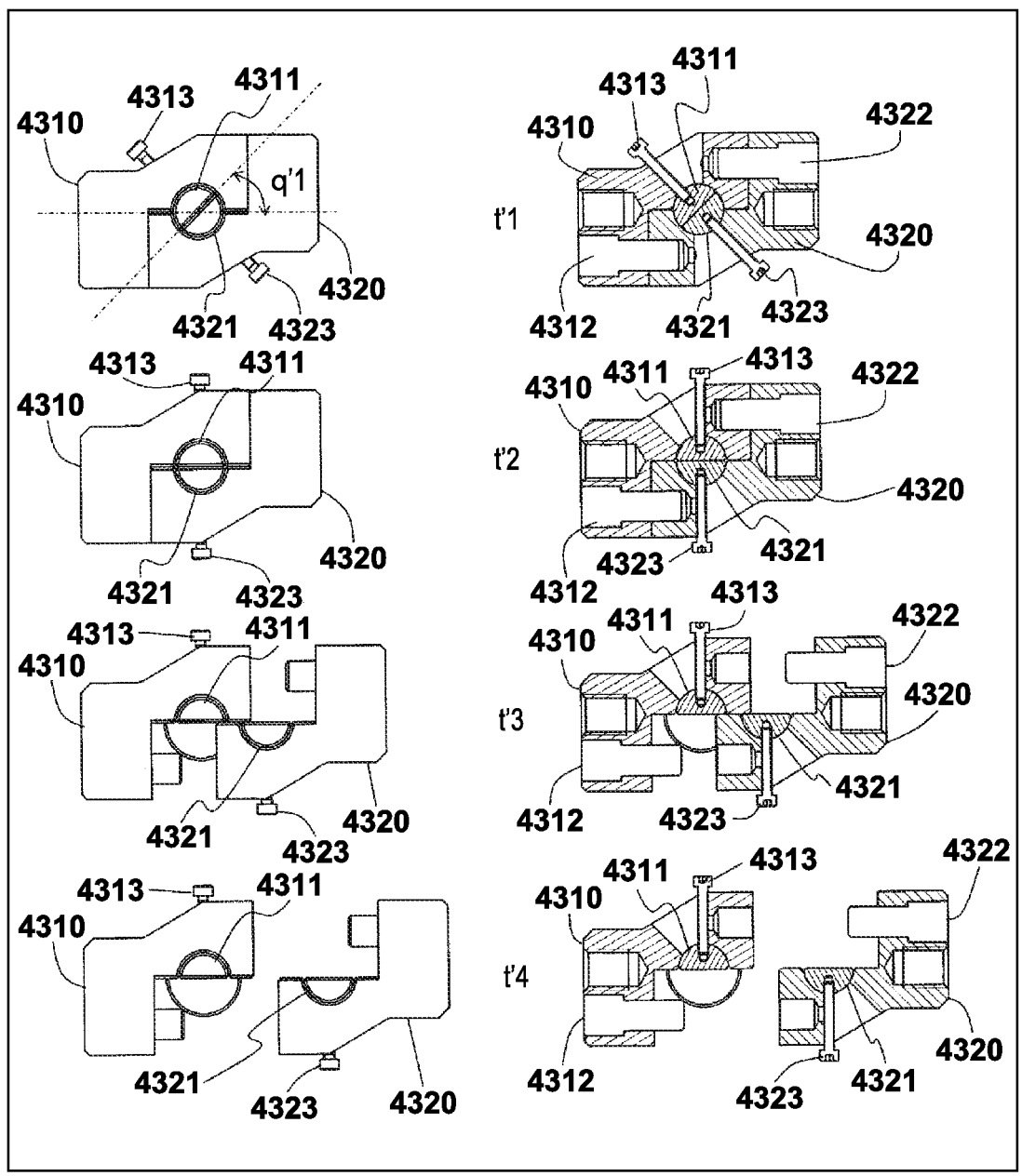
FIG. 28 is another separating operation explanatory diagram of the coupling/uncoupling device in another embodiment of the present invention.
Figure 29:
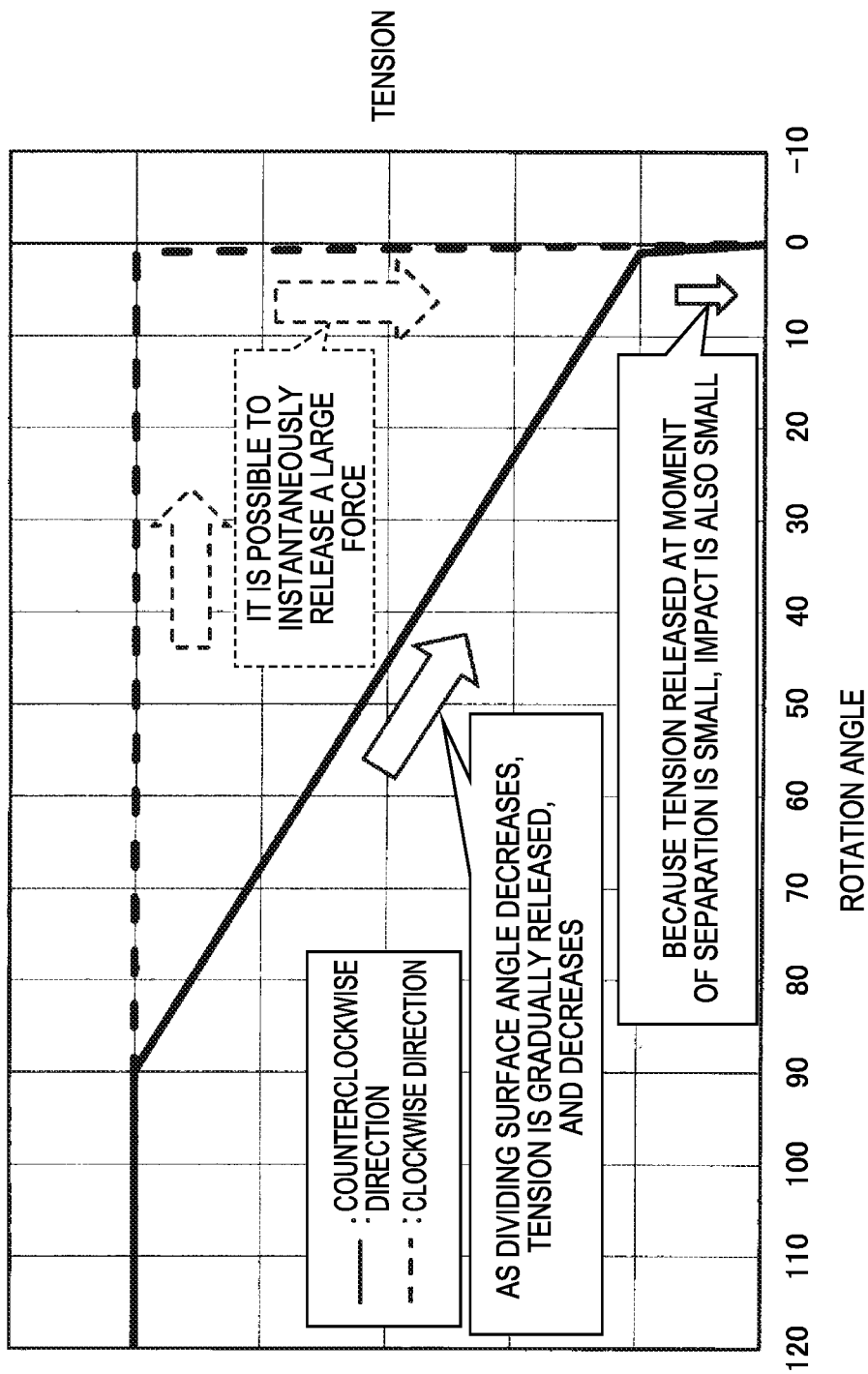
FIG. 29 is a comparative diagram of the operation of the coupling/uncoupling device in another embodiment of the present invention.

An explanatory diagram of another separating operation (clockwise separation) of the coupling/uncoupling device in this embodiment is shown in FIG. 28. A front view of the coupling/uncoupling device 4100 is shown on the left side of the figure. A sectional view of the coupling/uncoupling device 4100 is shown on the right side of the figure. A method of a basic separating operation is the same as the separating operation explained above. Therefore, details are omitted.

Figure 30:
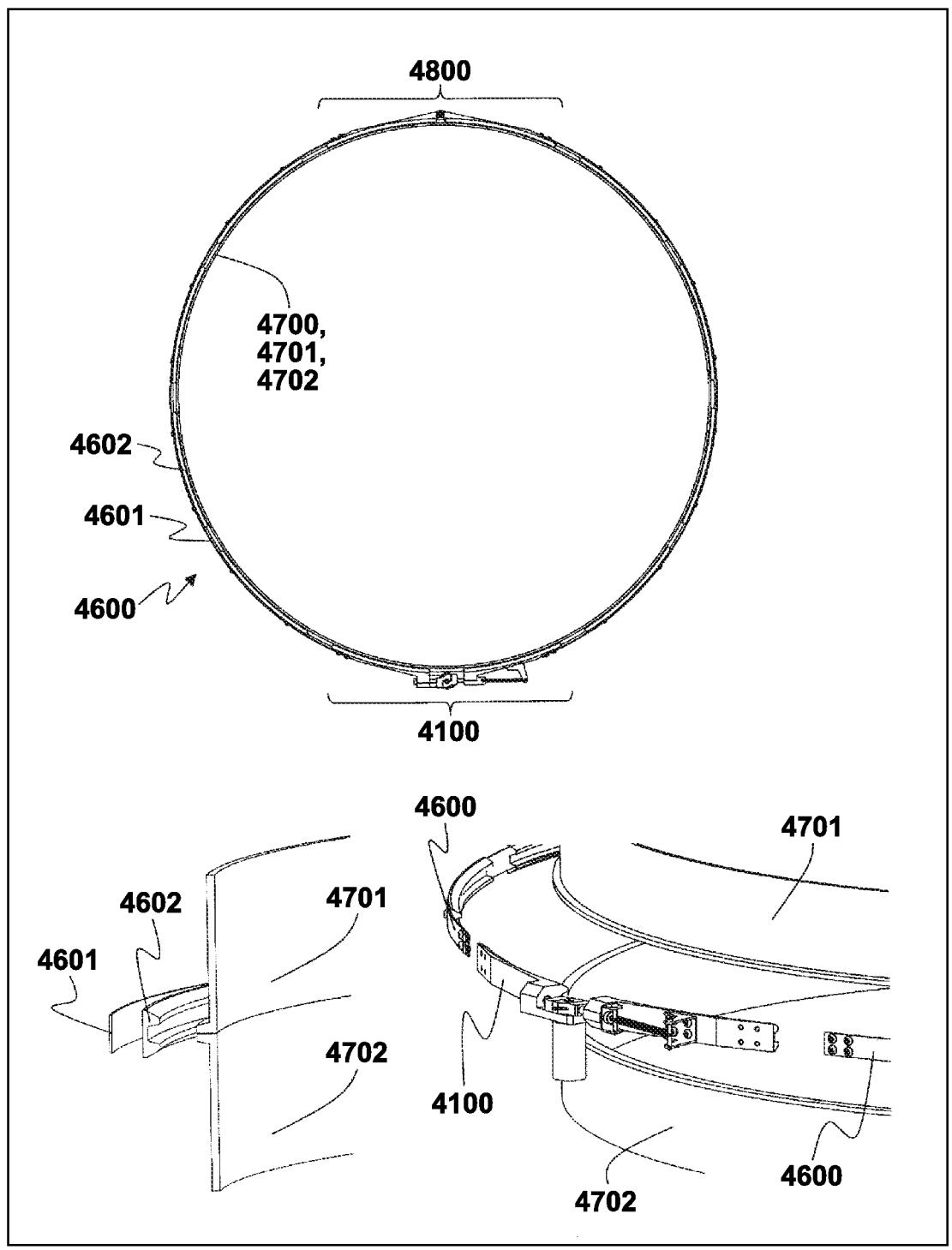
FIG. 30 is a general view of an example in which the coupling/uncoupling device in another embodiment of the present invention is mounted.
Figure 31:
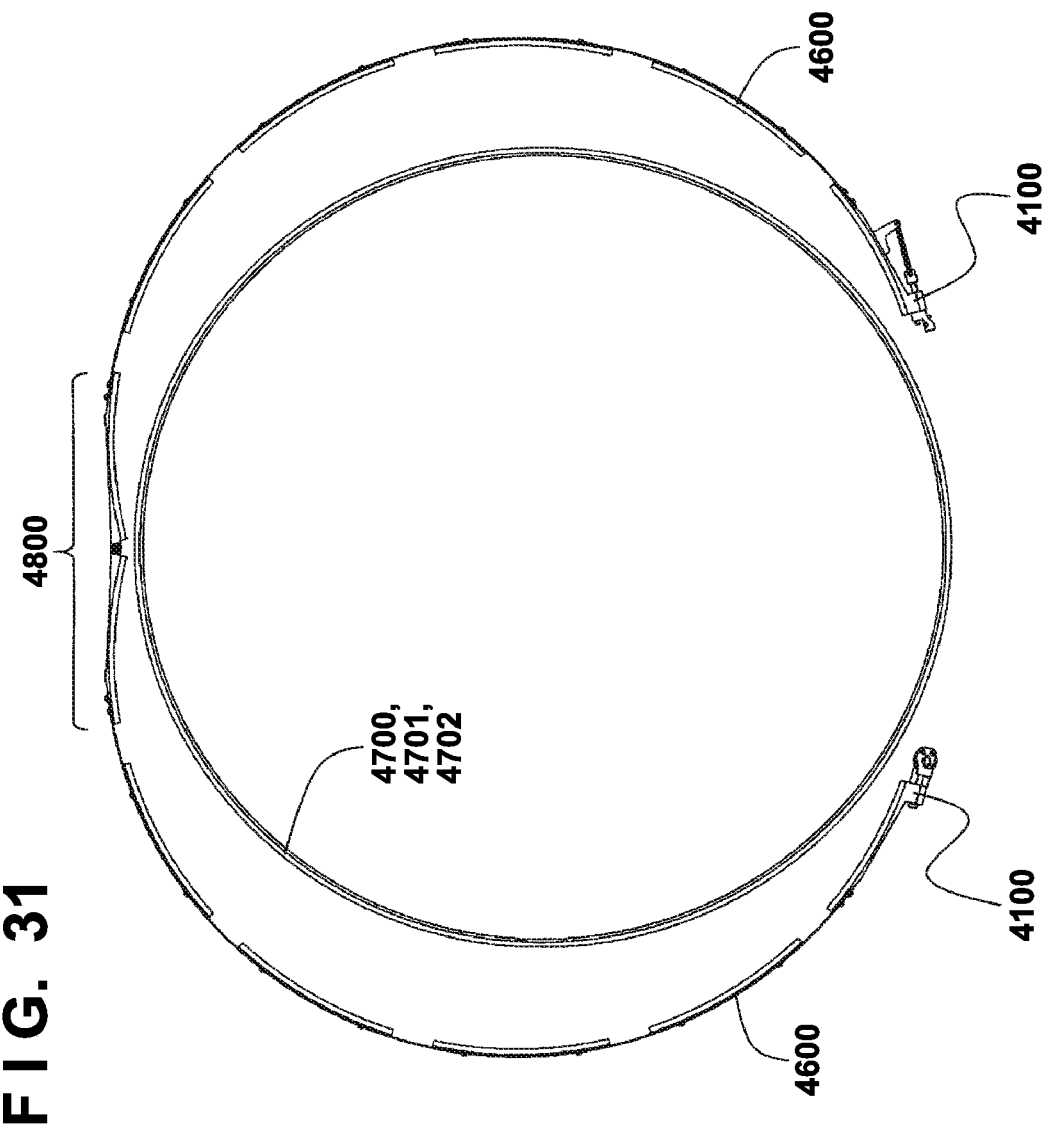
FIG. 31 is a general view of an example in which the coupling/uncoupling device in another embodiment of the present invention is actuated.

As an example of the apparatus applied with the coupling/uncoupling device according to this embodiment, an example is explained in which the coupling/uncoupling device is provided in a separating device of a spacecraft such as a rocket or a satellite. In FIG. 18, an example is shown in which the coupling/uncoupling device according to this embodiment is applied as a separating device, for example, between a fairing on which a satellite or the like is mounted and a rocket. With this configuration, an impact caused when the fairing and the rocket are uncoupled can be reduced compared with when the fairing and the rocket are separated using an explosive device. At the same time, the separating operation can be more surely performed. The same effect can be suitably obtained when the coupling/uncoupling device according to this embodiment is applied between an upper stage member and a lower stage member of the rocket. Specific structure of the separating device is explained in detail below. FIGS. 30 and 31 are general views showing the separating device according to this embodiment. By performing the separating operation of the coupling/uncoupling device 4100, a Maruman band 4600 is separated to disconnect the satellite and the upper stage member of the rocket and disconnect the upper stage member of the rocket and the lower stage member of the rocket. In the following explanation, the upper stage side of the two members held by the separating mechanism 4301 is collectively represented as an upper stage member 4701 and the lower stage side of the two members is collectively represented as a lower stage member 4702.

FIG. 30 shows an inter-stage joint 4700 of the rocket. The satellite and the upper stage member of the rocket set in contact with each other and the upper stage member of the rocket and the lower stage member of the rocket set in contact with each other are fixed by the Maruman band 4600.

The Maruman band 4600 is obtained by coupling a plurality of clamps 4602 to a band 4601. The coupling/uncoupling device 4100 in this embodiment or an end clamp 4800 is coupled to an end portion of the Maruman band 4600. Note that a plurality of coupling/uncoupling devices 4100 can be disposed for a redundancy purpose or the like. Note that a plurality of end clamps 4800 can also be disposed considering behaviors of the Maruman band 4600 during adjustment of band tension and during separation explained below.

During fixing of the Maruman band 4600, the band 4601 is pulled by the coupling/uncoupling device 4100 and the end clamp 4800 in the circumferential direction of the inter-stage joint 4700 of the rocket to close the band 4601. Consequently, the coupling/uncoupling device 4100, the end clamp 4800, and the clamp 4602 are urged in the center direction of the inter-stage joint 4700. The upper stage member 4701 and the lower stage member 4702 are coupled.

Note that the band 4601 is fixed in a state in which the band 4601 is urged in the circumferential direction. As shown in FIG. 31, when the coupling/uncoupling device 4100 is actuated, a restoration force of the band 4601 acts in a separating direction of the coupling/uncoupling device 4100. That is, the restoration force acts in an increasing direction of the diameter of the band 4601.

Figure 32:
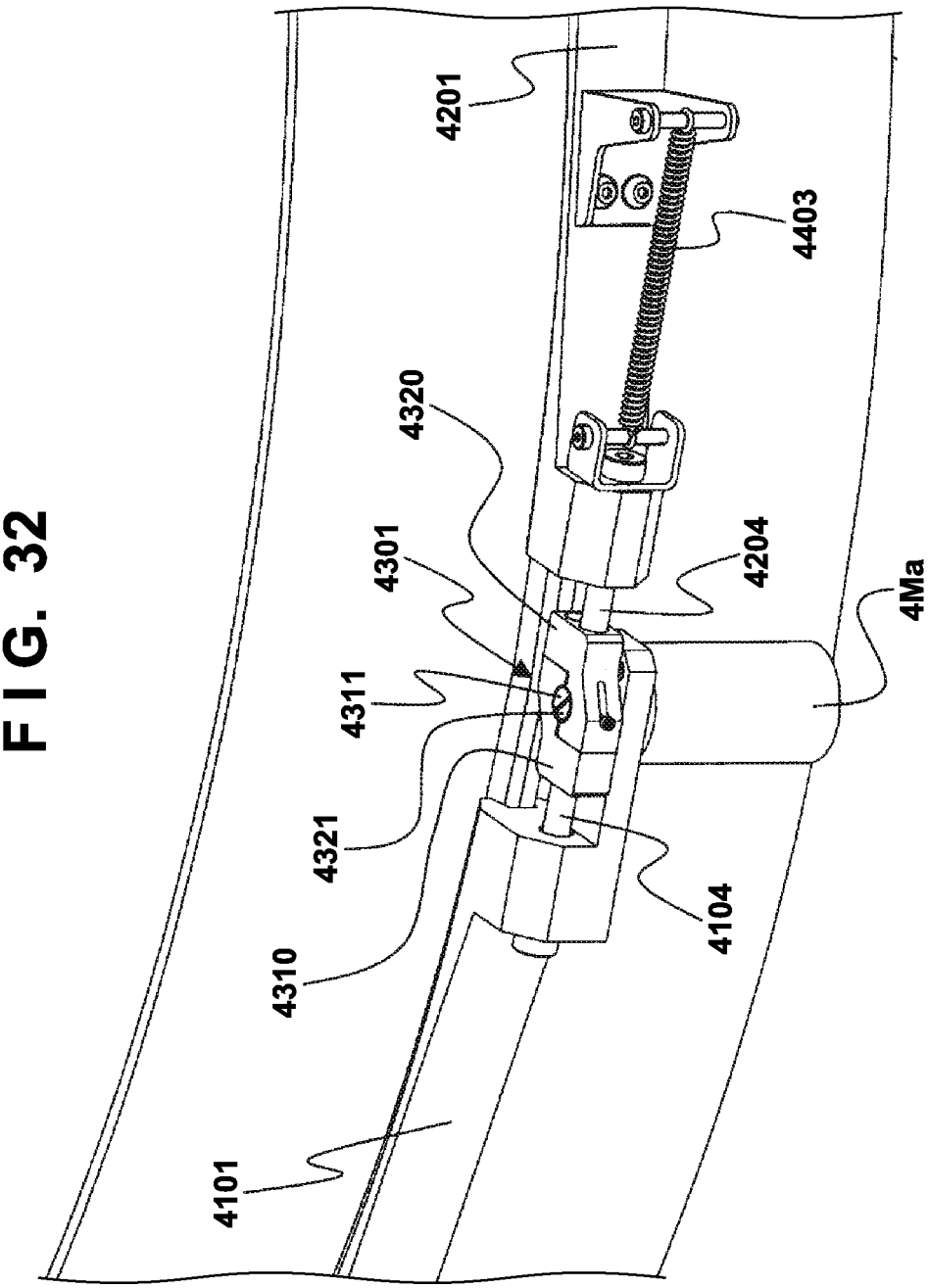
FIG. 32 is a main part enlarged view of an example in which the coupling/uncoupling device in another embodiment of the present invention is mounted.
Figure 33:
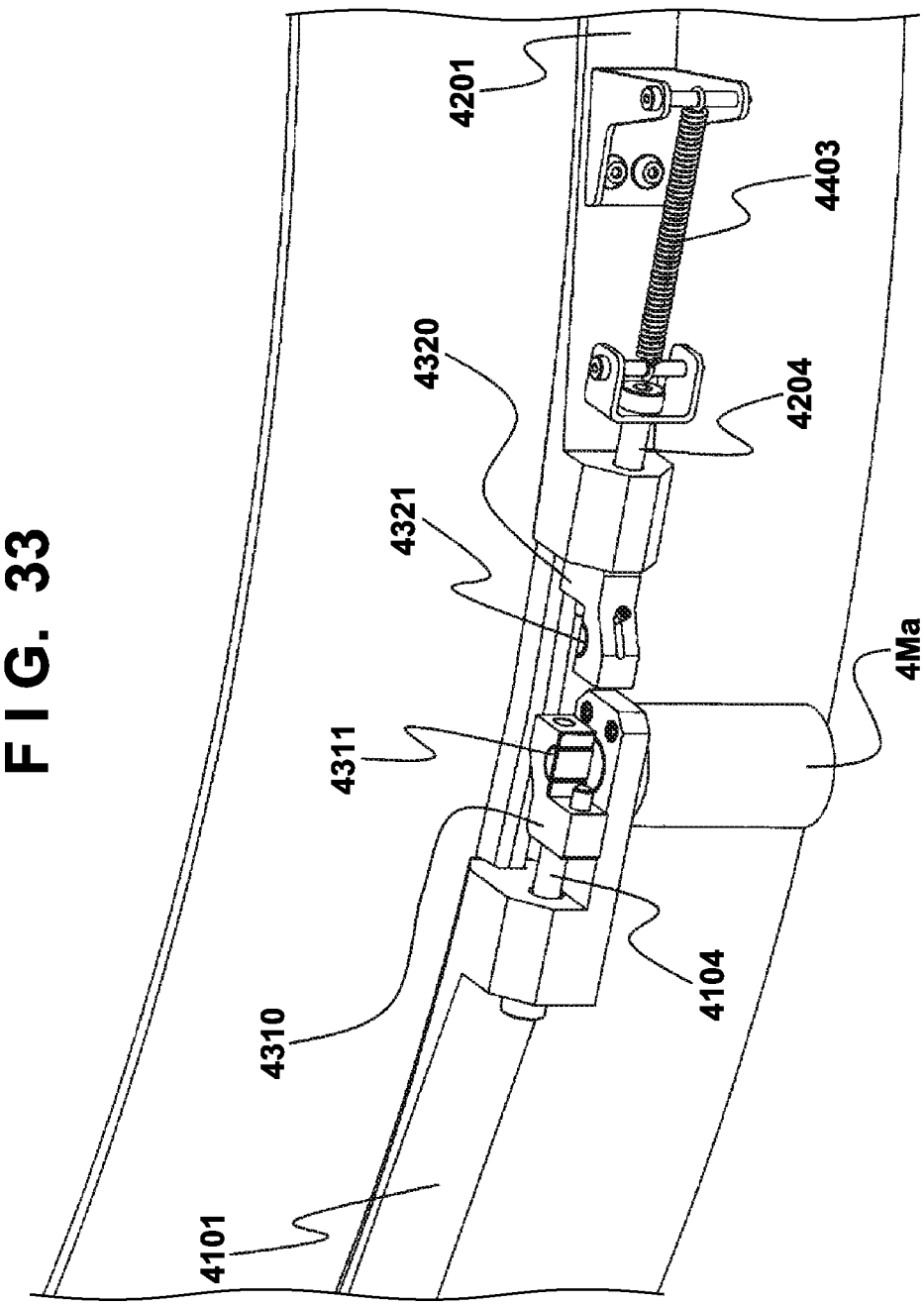
FIG. 33 is a main part enlarged view of the example in which the coupling/uncoupling device in another embodiment of the present invention is actuated.

Enlarged views of the coupling/uncoupling device 4100 according to this embodiment are shown in FIG. 32 and FIG. 33. The first coupling member 4310 is fixed to the first end member 4101 by the first adjusting member 4104 connected to the first attaching section 4102. Similarly, the second coupling member 4320 is fixed to the second end member 4201 by the second adjusting member 4204 connected to the second attaching section 4202. Note that the first end member 4101 and the second end member 4201 are respectively connected to the Maruman band 4600.

As shown in FIG. 32, an unlocking motor 4Ma is coupled to the first end member 4101. A drive shaft 4Ma of the unlocking motor is connected to the first fixed shaft 4311 and can be rotated together with the second fixed shaft 4321 that is in contact with the first fixed shaft 4311. As explained above, the separation by the rotation in the CW direction and the separation by the rotation in the CCW direction are possible.

Note that, as explained above, by integrally coupling the first end member 4101, the unlocking motor 4Ma, and the first fixed shaft 4311, even if unexpected displacement occurs in the Maruman band 4600 with the restoration force of the band 4601 during unlocking, the members are also displaced in the same manner. Therefore, power is not interrupted halfway in the unlocking. The unlocking can be more surely performed.

As shown in FIG. 33, when the unlocking motor 4Ma is actuated, the first fixed shaft 4311 and the second fixed shaft 4321 rotate. When a separating surface of the first fixed shaft 4311 and the second fixed shaft 4321 and a separating surface of the first coupling member 4310 and the second coupling member 4320 coincide with each other, the restoration force of the band 4601 and a restoration force of the tension spring 4403 act on the second coupling member 4320 through the second adjusting member 4204. The second coupling member 4320 and the first coupling member 4310 are separated.

At this time, if only by the restoration force of the band 4601, the restoration force disappears before the second coupling member 4320 comes off the first coupling member 4310, and the separating mechanism 4301 of the coupling/uncoupling device 4100 cannot possibly separate the first coupling member 4310 and the second coupling member 4320 according to setting of a shape, band tension, and the like of the band 4601 restricted by the inter-stage joint 4700 of the rocket.

On the other hand, the tension spring 4403 is not restricted by the inter-stage joint 4700 of the rocket. Therefore, the restoration force of the tension spring 4403 can be adjusted such that the first coupling member 4310 and the second coupling member 4320 can be displaced until the second coupling member 4320 comes off the first coupling member 4310. Therefore, the first coupling member 4310 and the second coupling member 4320 can be more surely separated.

Note that, when the separating operation is performed, an impact is determined by a force of tightening the band 4601 with the coupling/uncoupling device 4100 and a time required to release the tightening force. Conventionally, when a joint was cut by an explosive device, the impact was large because the time for releasing the tightening force was an instance. However, in this embodiment, since the coupled state can be gradually released, it is possible to reduce the impact.

Fifth Embodiment

As another example of an apparatus applied with a coupling/uncoupling device according to an embodiment of the present invention, an example is explained in which an unlocking motor is disposed in an airframe shaft orthogonal direction of an inter-stage joint. This form is effective when, concerning a space in which the unlocking motor is disposed, there is no space in an airframe shaft direction and there is space in the airframe shaft orthogonal direction. In particular, in a spacecraft, application between a rocket and stages of an artificial satellite disposed on the inside of a fairing is suitable.

Figure 34:
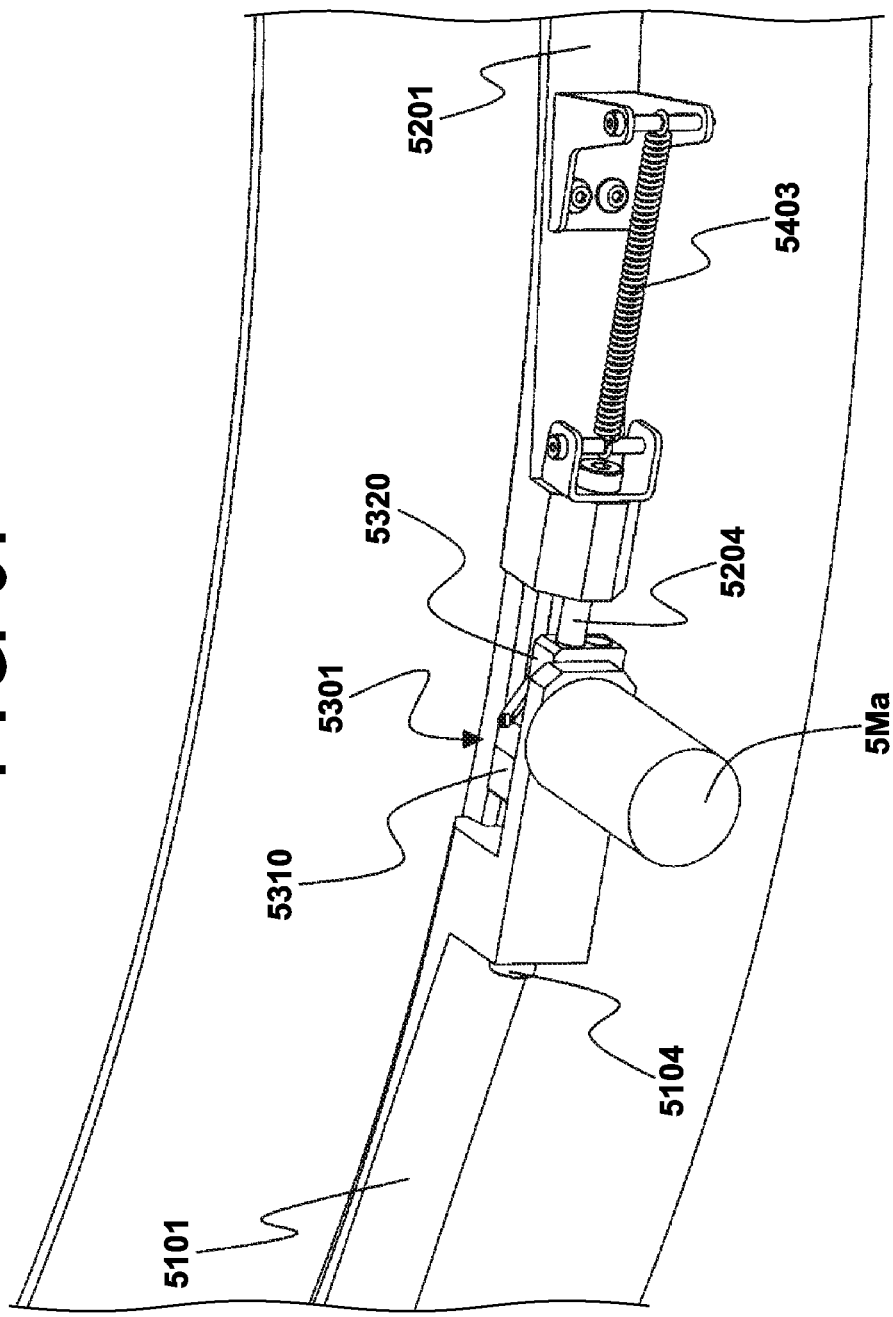
FIG. 34 is a main part enlarged view of another example in which a coupling/uncoupling device in another embodiment of the present invention is mounted.
Figure 35:
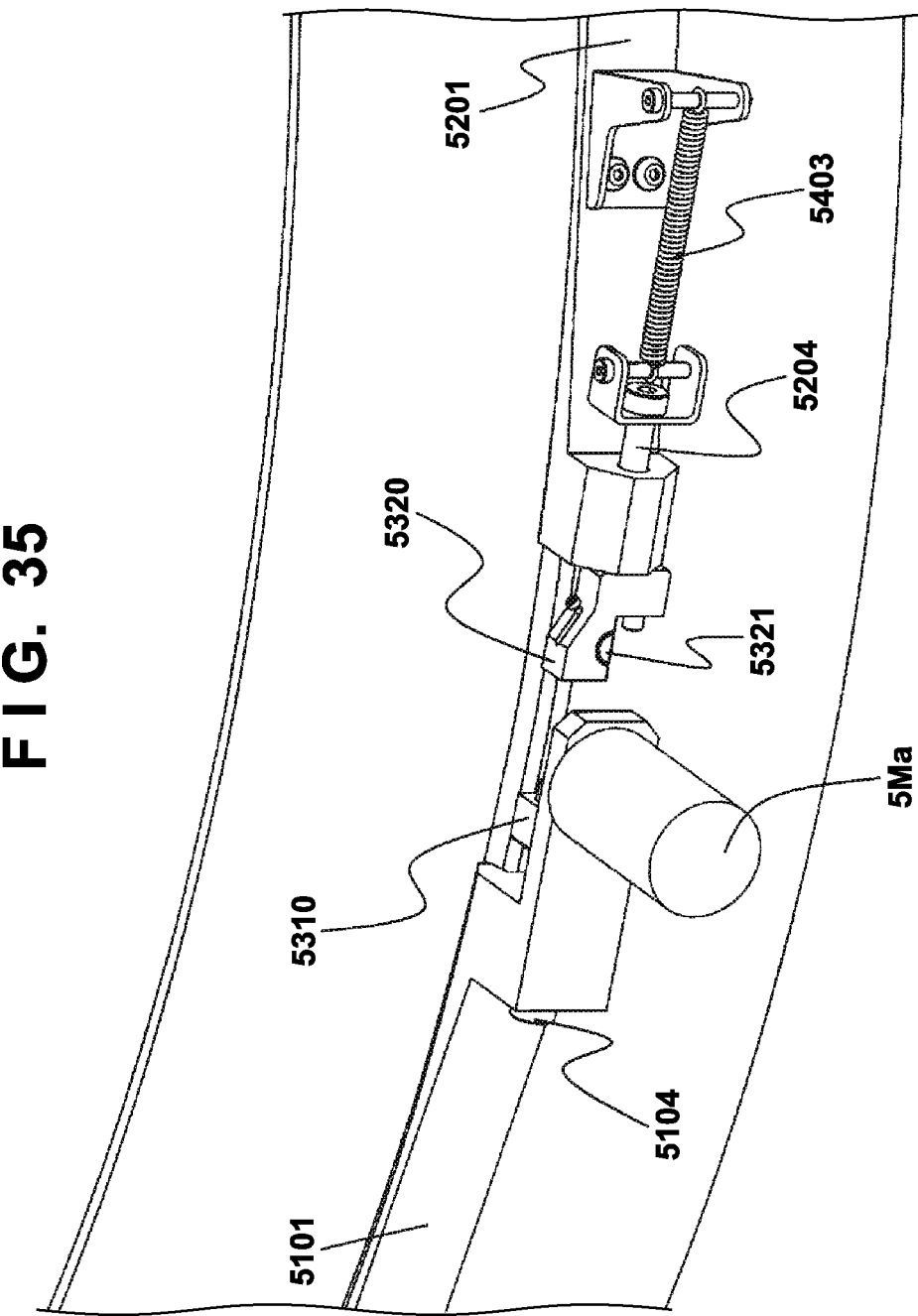
FIG. 35 is a main part enlarged view of another example in which the coupling/uncoupling device in another embodiment of the present invention is actuated.

FIGS. 34 and 35 are enlarged views of a coupling/uncoupling device in this embodiment. A coupling/uncoupling device 5100 is disposed such that, according to disposition of an unlocking motor 5Ma in the airframe shaft orthogonal direction, a not-shown first fixed shaft 5311 connected to the unlocking motor 5Ma is also disposed in the airframe shaft orthogonal direction. (The disposition is rotated 90° from the disposition in the first embodiment.)

As shown in FIG. 34, in a first end member 5101, according to disposition of the coupling/uncoupling device 5100 in the airframe shaft orthogonal direction, a not-shown motor hole 5105 is disposed in the airframe shaft orthogonal direction and the unlocking motor 5Ma is disposed in the airframe shaft orthogonal direction. With this disposition, a separating mechanism 5301, that is, a first adjusting member 5104 and a second adjusting member 5204 can be brought close to the outer circumferential surface of a Maruman band 5600. A fastening force from the Maruman band 5600 acts in the axial direction of the first adjusting member 5104 and the second adjusting member 5204. Therefore, loads applied to a separation target object by the first end member 5101 and the second end member 5201 attached to the Maruman band 5600 can be made uniform (stress concentration can be reduced). Damage to the sections can be prevented.

A separating operation is the same as the separating operation in the first embodiment. As shown in FIG. 35, the unlocking motor 5Ma is actuated, whereby a not-shown first fixed shaft 5311 connected to the unlocking motor 5Ma rotates. A second fixed shaft 5321 set in contact with the first fixed shaft 5311 also rotates together with the first fixed shaft 5311.

When a separating surface of the first fixed shaft 5311 and the second fixed shaft 5321 reaches a separating surface of a first coupling member 5310 and a second coupling member 5320, the second coupling member 5320 comes off the first coupling member 5310 with a restoration force of a band 5601 and a restoration force of a tension spring 5403. The coupling/uncoupling device 5100 is separated.

Note that, as explained above, by integrally coupling the first end member 5101, the motor 5Ma, and the first fixed shaft 5311, even if unexpected displacement occurs in the Maruman band 5600 by the restoration force of the band 5601 during unlocking, the members are also displaced in the same manner. Therefore, power is not interrupted halfway in the unlocking. The unlocking can be more surely performed.

Sixth Embodiment

As another example of an apparatus applied with a coupling/uncoupling device according to an embodiment of the present invention, an example is explained in which the unlocking motor M is disposed in a tangential direction on an inter-stage joint outer side. This embodiment is effective when, concerning a space in which the unlocking motor is disposed, there is no space in an airframe shaft direction and an airframe shaft orthogonal direction. In particular, in a spacecraft, when the coupling/uncoupling device is mounted to couple rocket stages and the like, the coupling/uncoupling device protrudes in the airframe shaft orthogonal direction. Air resistance during flying increases and rocket performance is deteriorated. Therefore, this embodiment that can reduce the protrusion in the airframe shaft orthogonal direction is suitable.

Figure 36:
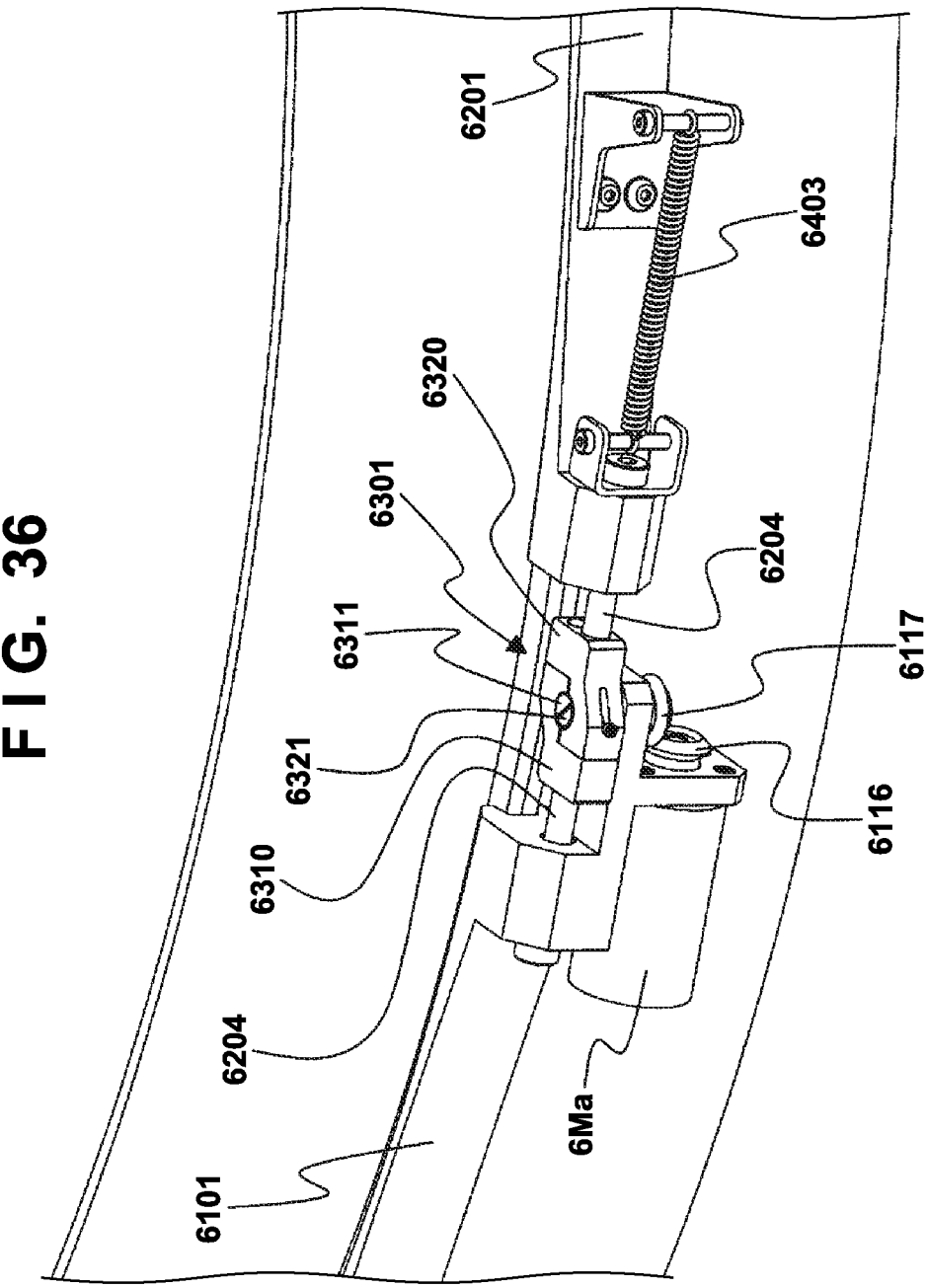
FIG. 36 is a main part enlarged view of another example in which a coupling/uncoupling device in another embodiment of the present invention is mounted.
Figure 37:
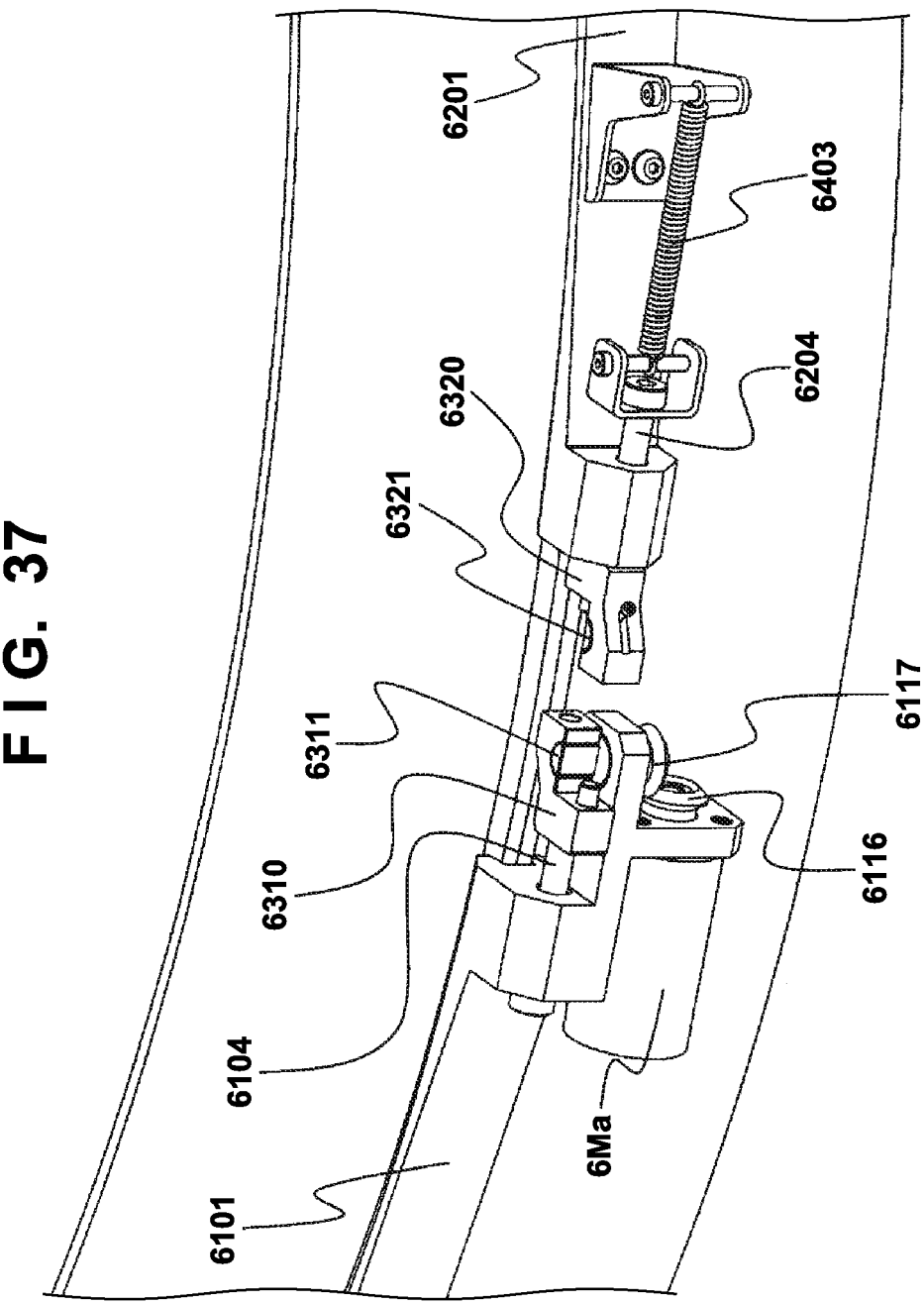
FIG. 37 is a main part enlarged view of another example in which the coupling/uncoupling device in another embodiment of the present invention is actuated.

FIGS. 36 and 37 are enlarged view of the coupling/uncoupling device in this embodiment. An unlocking motor 6Ma is disposed below a first end member 6101 toward (in parallel to) the tangential direction on the inter-stage joint outer side, that is, the same direction as the axis of a first adjusting member 6104. The unlocking motor 6Ma is connected to the first end member 6101.

As shown in FIG. 36, the unlocking motor 6Ma and the axis of a first fixed member 6311 are orthogonal. Therefore, unlike the embodiment explained above, the unlocking motor 6Ma and the first fixed member 6311 cannot be directly connected. The unlocking motor 6Ma is indirectly connected to the first fixed member 6311 through a first gear 6116 and a second gear 6117. Note that the second gear 6117 is connected and fixed to the first fixed member 6311.

Torque of the unlocking motor 6Ma can be amplified by differentiating the numbers of teeth of the first gear 6116 and the second gear 6117 and interposing the first gear 6116 and the second gear 6117. Therefore, it is possible to reduce the size of the unlocking motor 6Ma.

Types and angle change amounts of the first gear 6116 and the second gear 6117 are optional. Therefore, it is also possible to optionally change the position of the motor.

A separating operation is the same as the separating operation in the embodiment explained above. As shown in FIG. 37, the unlocking motor 6Ma is actuated, whereby the first gear 6116, the second gear 6117, and the first fixed shaft 6311 connected to the unlocking motor 6Ma are rotated in this order. A second fixed shaft 6321 in contact with the first fixed shaft 6311 also rotates together with the first fixed shaft 6311.

When a separating surface of the first fixed shaft 6311 and the second fixed shaft 6321 reaches a separating surface of a first coupling member 6310 and a second coupling member 6320, the second coupling member 6320 comes off the first coupling member 6310 with a restoration force of a band 6601 and a restoration force of a tension spring 6403. A coupling/uncoupling device 6100 is separated.

Note that, as explained above, by integrally coupling the first end member 6101, the unlocking motor 6Ma, and the first fixed shaft 6311, even if unexpected displacement occurs in a Maruman band 6600 by the restoration force of the band 6601 during unlocking, the members are also displaced in the same manner. Therefore, power is not interrupted halfway in the unlocking. The unlocking can be more surely performed.

According to this embodiment, in particular, in the spacecraft, by disposing the unlocking motor 6Ma on the rear side in a traveling direction of the spacecraft such as a rocket or a satellite, it is possible to reduce a protrusion to the airframe shaft orthogonal direction of the coupling/uncoupling device that couples the rocket stages and the like and reduce air resistance during flying. A separating mechanism 6301 in this embodiment performs the separating operation by sliding. Therefore, a certain degree of a space is necessary in a separating direction (a moving direction of a first guide pin 6312 and a second guide pin 6322). On the other hand, the air resistance can be reduced by disposing the longitudinal direction of the unlocking motor 6Ma along the separating direction and providing the unlocking motor 6Ma on the rear side of the separating mechanism 6301 as much as possible with respect to the traveling direction of the spacecraft. It is possible to reduce a projection amount to the lower stage member side of the unlocking motor 6Ma. In separation of a separation target object, it is possible to prevent contact with the separation target object and the like.

Seventh Embodiment

As another example of an apparatus applied with a coupling/uncoupling device according to an embodiment of the present invention, an example is explained in which a compression spring for separation is provided in a second end member. This form is effective when, concerning a spring for urging in a separating direction, there is a limit in a space for disposing the spring for urging. In particular, in a spacecraft, when the coupling/uncoupling device is mounted to couple rocket stages and the like, the coupling/uncoupling device protrudes in an airframe shaft orthogonal direction. Air resistance during flying increases and rocket performance is deteriorated. Therefore, this embodiment that can reduce the protrusion in the airframe shaft orthogonal direction is suitable.

Figure 38:
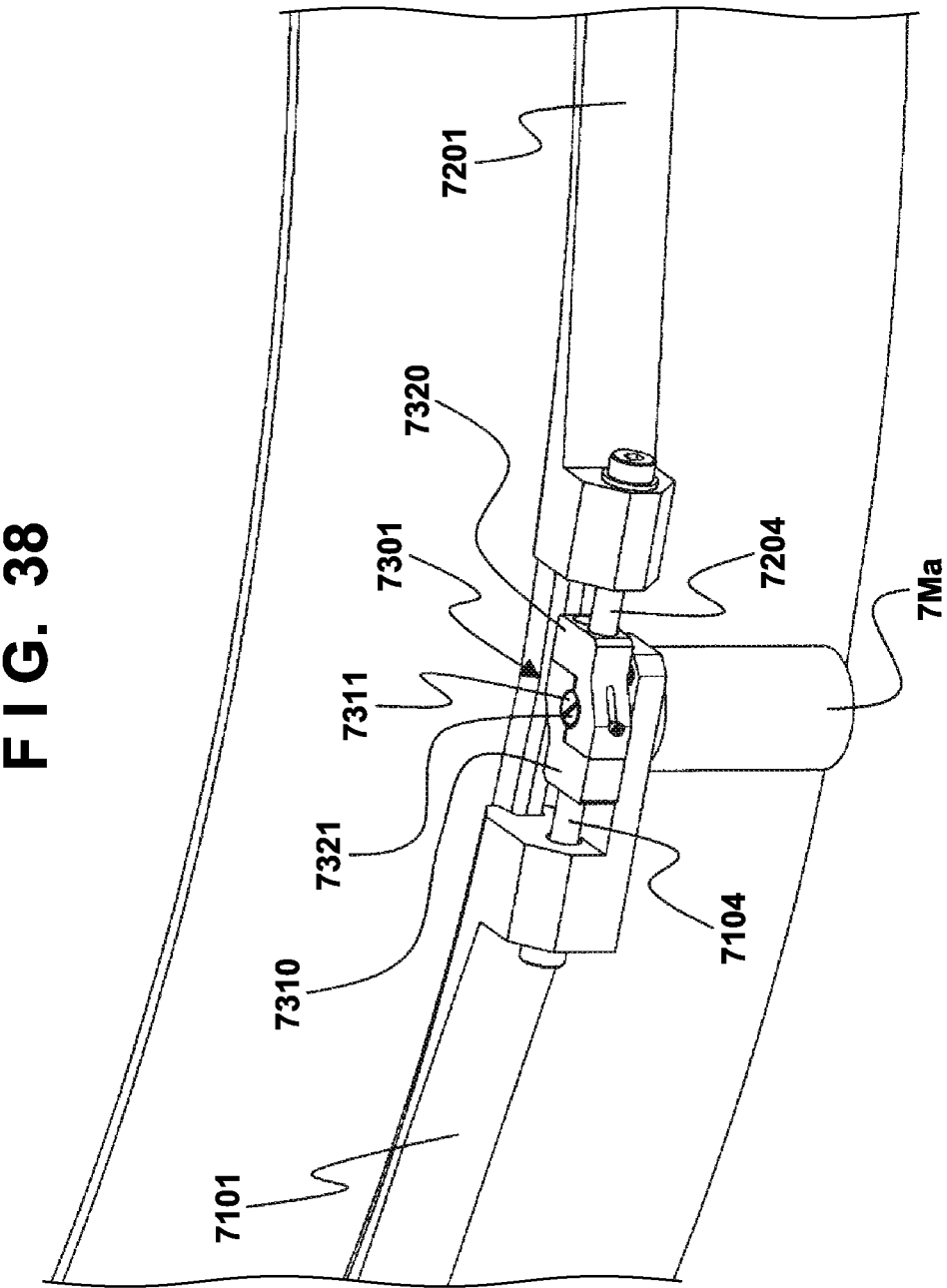
FIG. 38 is a main part enlarged view of another example of in which a coupling/uncoupling device in another embodiment of the present invention is mounted.
Figure 39:
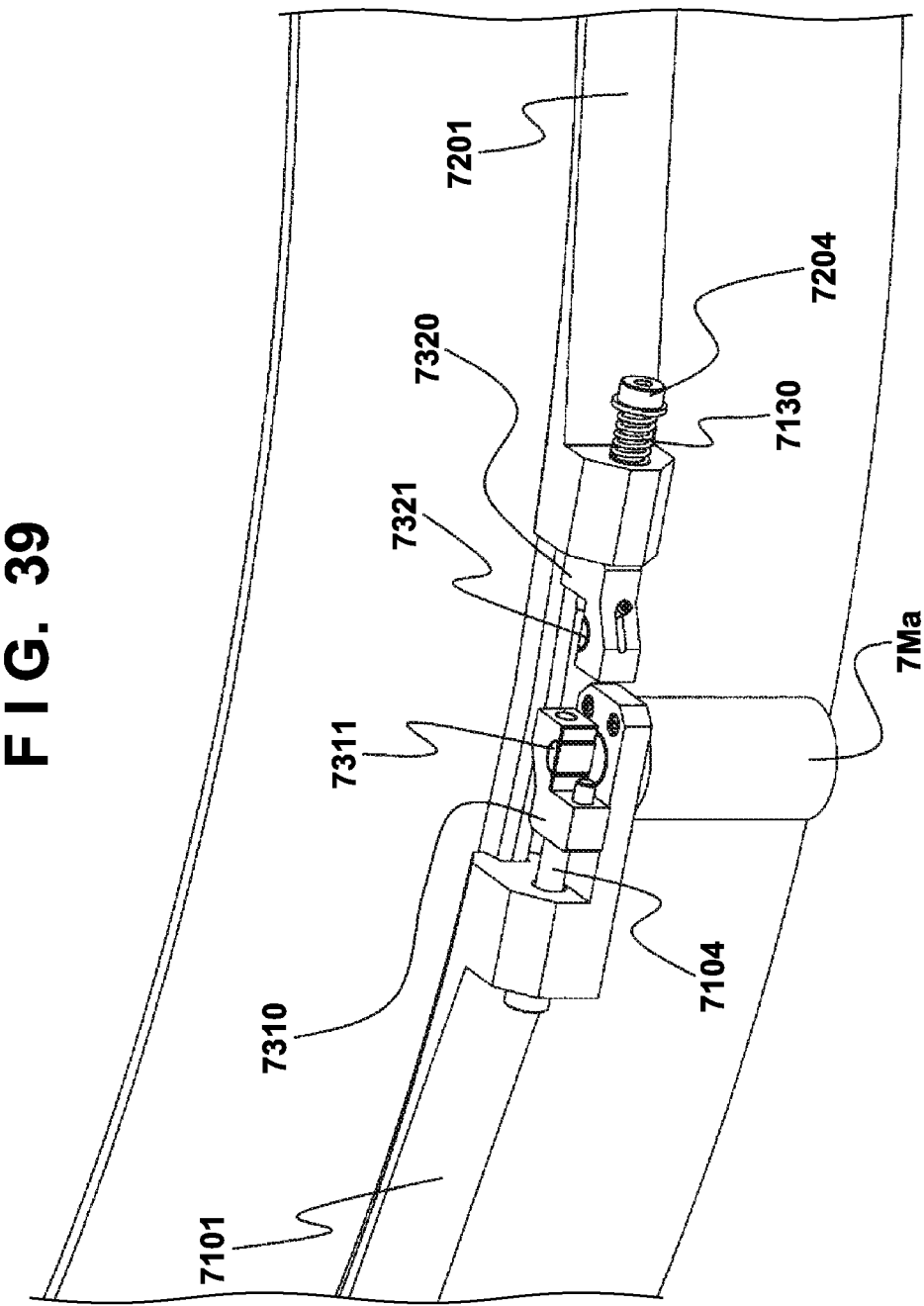
FIG. 39 is a main part enlarged view of another example in which the coupling/uncoupling device in another embodiment of the present invention is actuated.

FIGS. 38 and 39 are enlarged view of the coupling/uncoupling device in this embodiment. In this embodiment, since the spring for urging in the separating direction is compressed, it is possible to remove the tension spring 7403 and the like used in the first embodiment. It is possible to eliminate the protrusion in the airframe shaft orthogonal direction of the rocket.

As shown in FIG. 38, a compression spring 7130 is disposed between a second end member 7201 and a second adjusting member 7204. Before separation, the compression spring 7130 is held in a state in which the compression spring 7130 is urged in the axial direction of the second adjusting member 7204. Specifically, one end of the compression spring 7130 is in contact with a head shape of a screw used as the second adjusting member 7204 or a washer provided adjacent to the head shape and the other end is in contact with a contact section provided in a guide hole 7203 of the not-shown second end member 7201, whereby the compression spring 7130 is held in the compressed state.

A separating operation is the same as the separating operation in the first embodiment. As shown in FIG. 39, an unlocking motor 7Ma is actuated, whereby a first fixed shaft 7311 connected to the unlocking motor 7Ma rotates and a second fixed shaft 7321 set in contact with the first fixed shaft 7311 also rotates together with the first fixed shaft 7311.

When a separating surface of the first fixed shaft 7311 and the second fixed shaft 7321 reaches a separating surface of a first coupling member 7310 and a second coupling member 7320, the second coupling member 7320 comes off the first coupling member 7310 with a restoration force of a band 7601 and a restoration force of the compression spring 7130. A coupling/uncoupling device 7100 is separated.

Note that, as explained above, the restoration force of the compression spring 7130 and the like can be optionally initially set because the initial setting is not restricted from external components. By setting the compression spring 7130 to a restoration force and a movement amount for enabling the second coupling member 7320 to surely separate from the first coupling member 7310, the separating operation is not interrupted halfway in the separating operation. Unlocking can be surely performed.

According to this embodiment, in particular, in the spacecraft, by disposing the unlocking motor 7Ma on the rear side in a traveling direction of the spacecraft such as a rocket or a satellite, it is possible to reduce a protrusion in the airframe shaft orthogonal direction of the coupling/uncoupling device that couples rocket stages and the like and reduce air resistance during flying.

Eighth Embodiment

As another example of an apparatus applied with a coupling/uncoupling device according to an embodiment of the present invention, an example is explained in which a first compression spring 8130 and a second compression spring 8131 for urging in a separating direction are disposed on the inside of a separating mechanism.

When a plurality of coupling/uncoupling devices are disposed with respect to a separation target object, it is difficult to separate the coupling/uncoupling devices strictly simultaneously. At a point in time when one coupling/uncoupling device is separated, the other coupling/uncoupling devices are sometimes in a coupled state. Therefore, as in the embodiment explained above, when an urged spring is disposed between a second end member 8201 and a second adjusting member 8204, if a load necessary for pulling the second end member 8201 to a separating mechanism 8301 is smaller than a load necessary for separating the separating mechanism 8301 with the spring, it is conceivable that the second adjusting member 8204 does not move in the separating direction, the second end member 8201 moves in the separating mechanism 8301 direction, and separation is not completed.

Therefore, in this embodiment, by disposing a spring for urging in the separating direction in the separating mechanism 8301, the separating mechanism 8301 is more surely urged in the separating direction even when the separation of the coupling/uncoupling devices is not simultaneously performed.

Accordingly, in particular, it is suitable to apply this embodiment to a spacecraft in which a plurality of coupling/uncoupling devices are disposed for redundancy. However, only one coupling/uncoupling device 8100 in this embodiment is not prevented from being attached to the separation target object. Even in that case, the same effect as the effect in another embodiment can be obtained.

Figure 40:
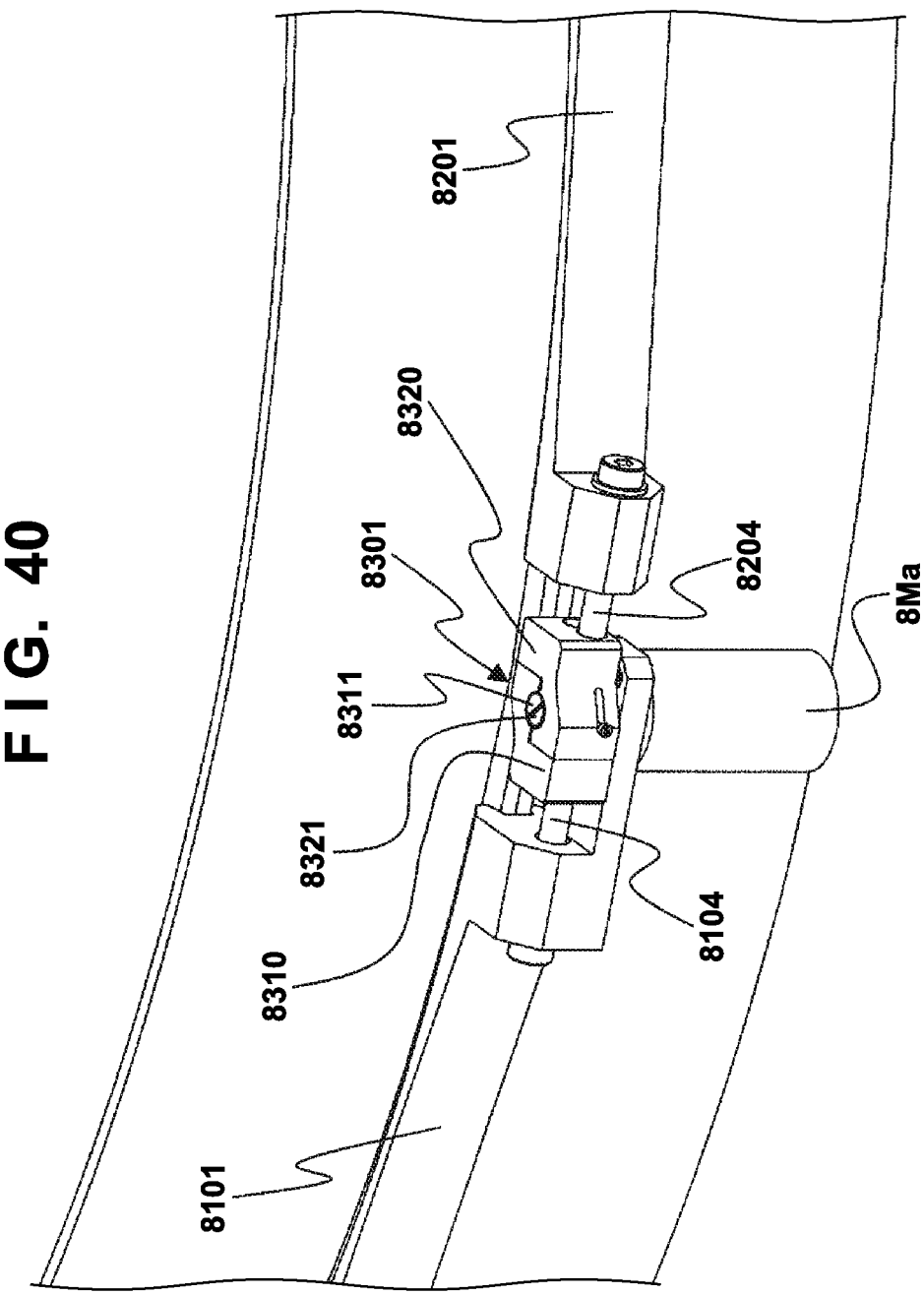
FIG. 40 is a main part enlarged view of another example in which a coupling/uncoupling device in another embodiment of the present invention is mounted.
Figure 41:
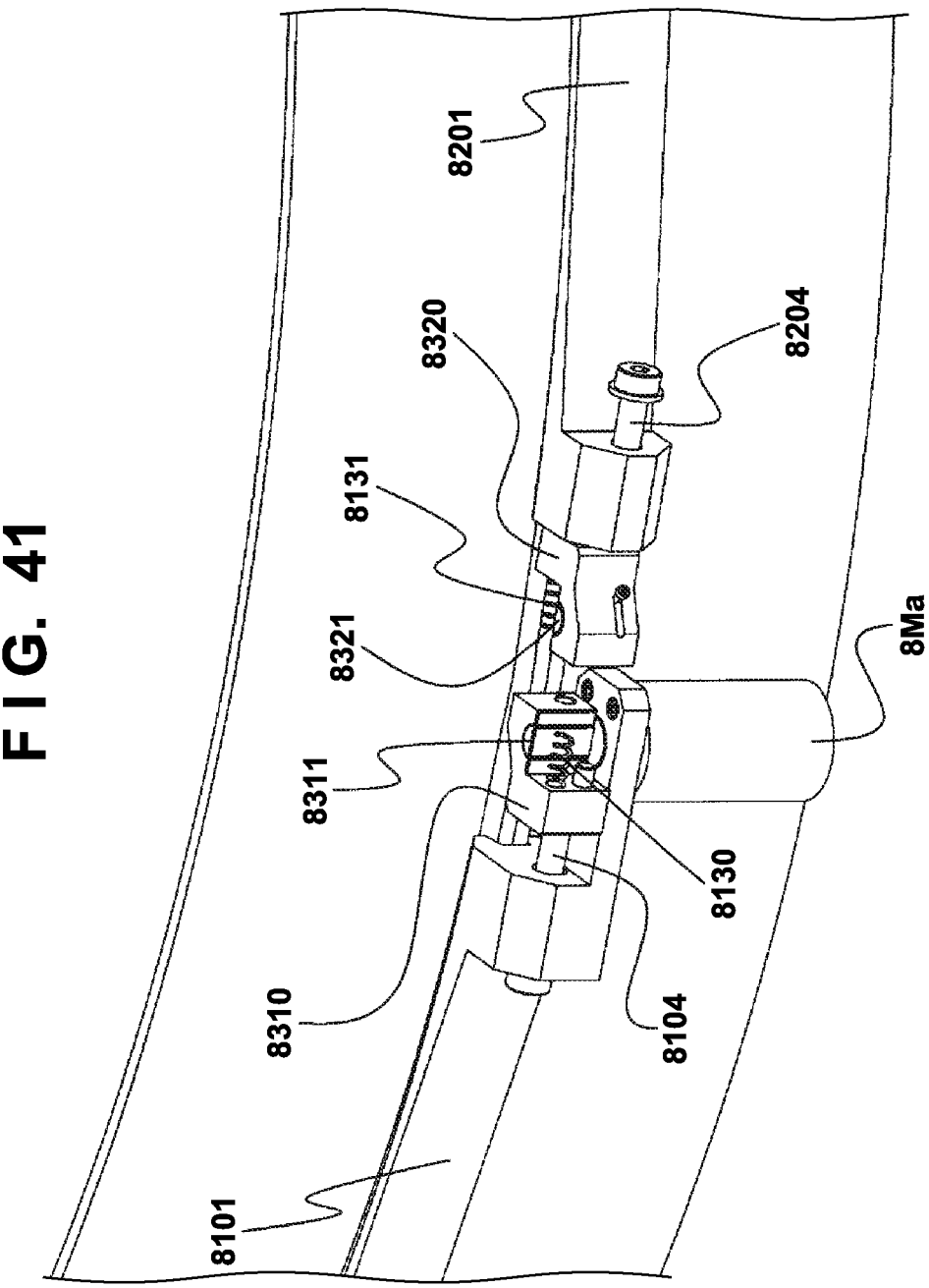
FIG. 41 is a main part enlarged view of another example in which the coupling/uncoupling device in another embodiment of the present invention is actuated.

FIGS. 40 and 41 are enlarged views of the coupling/uncoupling device in this embodiment. As shown in FIGS. 40 and 41, the first compression spring 8130 and the second compression spring 8131 are disposed between a first coupling member 8310 and a second coupling member 8320. Before separation, the first compression spring 8130 and the second compression spring 8131 are held in a state in which the first compression spring 8130 and the second compression spring 8131 are urged in the axial direction of a first adjusting member 8104 and the second adjusting member 8204.

A separating operation is the same as the separating operation in the first embodiment. As shown in FIG. 41, an unlocking motor 8Ma is actuated, whereby a first fixed shaft 8311 connected to the unlocking motor 8Ma rotates and a second fixed shaft 8321 set in contact with the first fixed shaft 8311 also rotates together with the first fixed shaft 8311.

When a separating surface of the first fixed shaft 8311 and the second fixed shaft 8321 reaches a separating surface of the first coupling member 8310 and the second coupling member 8320, the second coupling member 8320 comes off the first coupling member 8310 with a restoration force of a band 8601 and a restoration force of the first compression spring 8130 and the second compression spring 8131, and a coupling/uncoupling device 8100 is separated.

Note that, as explained above, the restoration force of the compression springs and the like can be optionally initially set because the initial setting is not restricted from external components. By setting the compression springs to a restoration force and a movement amount for enabling the second coupling member 8320 to surely separate from the first coupling member 8310, the separating operation is not interrupted halfway in the separating operation. Unlocking can be surely performed.

In this embodiment, the first adjusting member 8104 is disposed in the center in the extending direction of the fixed shaft 2 in the first coupling member 8310. A guide pin 8312 and the compression spring 8130 are provided to be symmetrically disposed on both sides of the first adjusting member 8104 in the extending direction of the fixed shaft 2. Similarly, the second adjusting member 8204 is disposed in the center in the extending direction of the fixed shaft 2 in the second coupling member 8320. A guide pin 8322 and the compression spring 8131 are provided to be symmetrically disposed on both sides of the second adjusting member 8204 in the extending direction of the fixed shaft 2.

With this configuration, when the coupling members 1 are urged by the compression springs 8130 and 8131, it is possible to reduce a sliding loss in the separating operation by the guide pins 8322 and the compression springs 8130 and 8131 and efficiently assist the separating operation. It is desirable that, in a contact position of the compression springs 8130 and 8131 in the coupling member on the other side with which the compression springs 8130 and 8131 are in contact, a contact structure for setting an urging direction by the compression springs to the axial direction of the guide pins 3 after a separating operation start is provided. The contact structure is formed by concave-shaped grooves or the like into which the compression springs 8130 and 8131 are inserted.

When a plurality of coupling/uncoupling devices 8100 according to this embodiment are disposed in a separation target object, a Maruman band 8600 is sometimes unexpectedly displaced when one coupling/uncoupling device is separated. However, even in a state in which the other coupling/uncoupling devices 8100 in the coupled state do not receive an urging force from the band 8600 according to the separation of the one coupling/uncoupling device 8100, the first compression spring 8130 and the second compression spring 8131 are always disposed between the first coupling member 8310 and the second coupling member 8320 and apply an urging force. Therefore, the separating operation of the first coupling member 8310 and the second coupling member 8320 can be urged.

As explained above, when the Maruman band is attached to a separation target object such as the inter-stage joint of the rocket in order to cause the second coupling member to come off the first coupling member with the urging force of the tension spring 4403 or the compression spring 7130 functioning urging means, it is desirable to fasten the Maruman band in a state in which the urging means is extended or compressed as much as possible and the head shape of the second coupling member comes into contact with the guide hole of the second end member. Consequently, an urging force (an elastic force) of the urging means can be suitably effectively applied between the coupling members. The same applies when the compression springs 8130 and 8131 are used. The compression springs 8130 and 8131 are desirably disposed in the coupling members in a compressed state as much as possible The outer surface of the first attaching section included in the first end member is explained in detail. The outer surface of the first attaching section is formed as a flat surface. The Maruman band is attached such that the inner circumferential surface is in contact with the flat surface. The first attaching section is formed to include the end portion on the opposite side of the side where the separating mechanism is provided in the first end member. The outer surface of the first attaching section is perpendicular to a straight line passing the end portion and the center of the Maruman band. That is, the outer surface of the first coupling section is formed to coincide with, during coupling of the separation target object, a tangential line at an intersection with the end portion of the first attaching section on the inner circumferential surface (the inner circumference) of the Maruman band formed to have a perfect circular shape in positions other than a position in contact with the first attaching section.

With this configuration, the direction of the load applied to the Maruman band by the first end member and the like can be set in the tangential direction by the restoration force of the Maruman band. Loads applied to the separation target object and the like can be made uniform (stress concentration can be reduced). Damage to the sections can be prevented. Loads are made uniform in the same manner in the second end member and the second coupling section.

Ninth Embodiment

A coupling/uncoupling device according to an embodiment of the present invention is explained with reference to FIGS. 42 and 43. As shown in a general view 42A (during holding) of FIG. 42, the coupling/uncoupling device according to an embodiment of the present invention is configured from hinge sections 9800, a forced driving section 9100, urging springs 9900, which are urging means, Maruman bands (annular joining members) 9600, and a separating section 9700.

The coupling/uncoupling device according to this embodiment is used for coupling, for example, a spacecraft such as a rocket or a satellite. For example, as shown in a partial view 42B of FIG. 42, the coupling/uncoupling device couples an upper stage clamp 9701 provided in an upper stage member of the rocket and a lower stage clamp 9702 provided in the lower stage member of the rocket.

The hinge section 9800 is configured from a pair of a first hinge clamp 9801 and a second hinge clamp 9802 and a rotating shaft member 9803. The first hinge clamp 9801 and the second hinge clamp 9802 can rotate around the rotating shaft member 9803.

Both end portions of the hinge section 9800 are coupled to the Maruman bands 9600. When the rotating operation occurs, the Maruman bands 9600 also bend around the rotating shaft member 9803 following the rotating operation.

Figure 42:
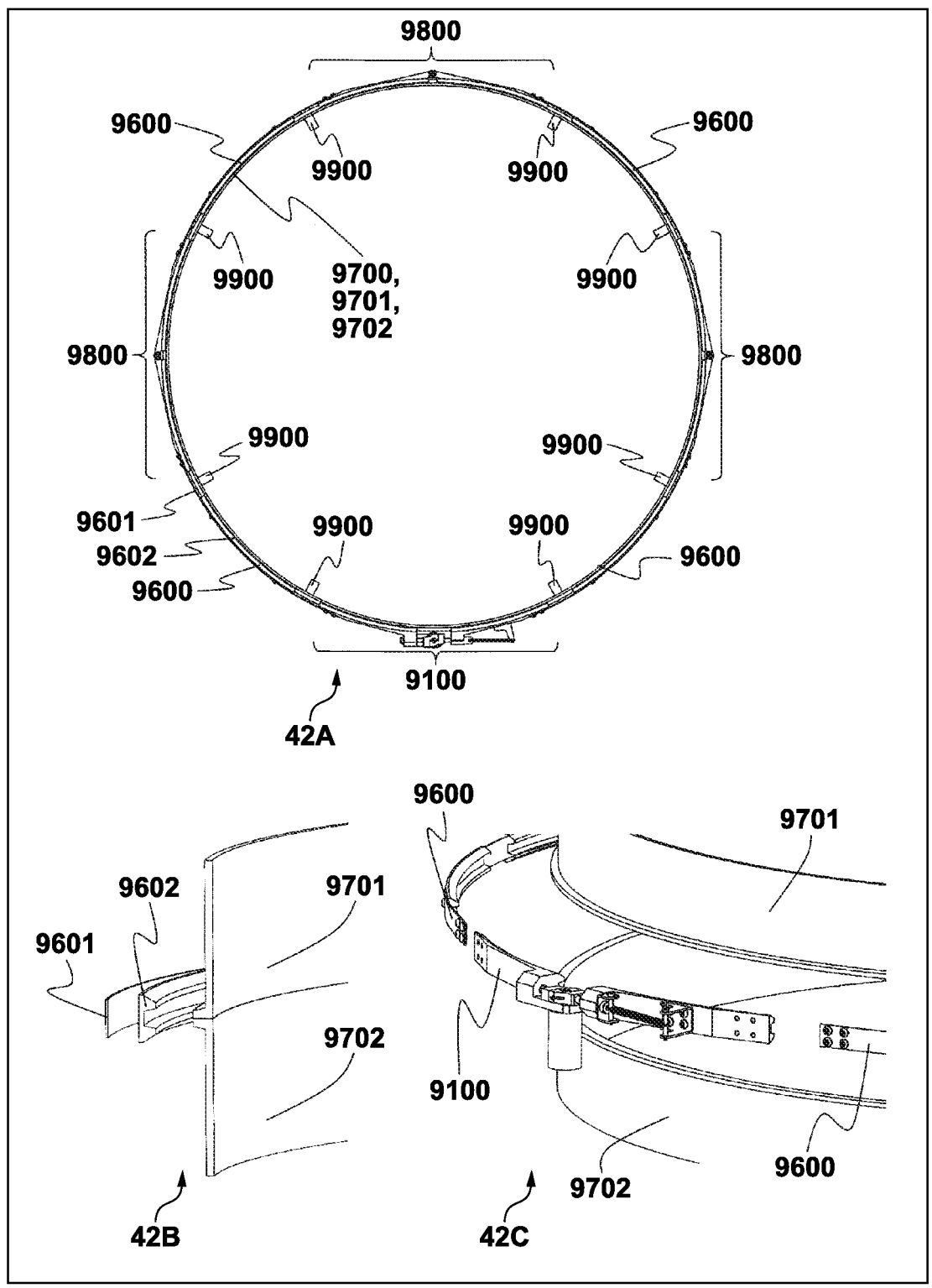
FIG. 42 is a general view of a coupling/uncoupling device in another embodiment of the present invention.

As shown in a partial view 42C of FIG. 42, the forced driving section 9100 has a force by a driving source, a spring, or the like on the inside. The forced driving section 9100 is held in a state in which the forced driving section 9100 is urged outward in an airframe shaft orthogonal direction of a spacecraft by a restoration force of the Maruman bands 9600 themselves.

Figure 43:
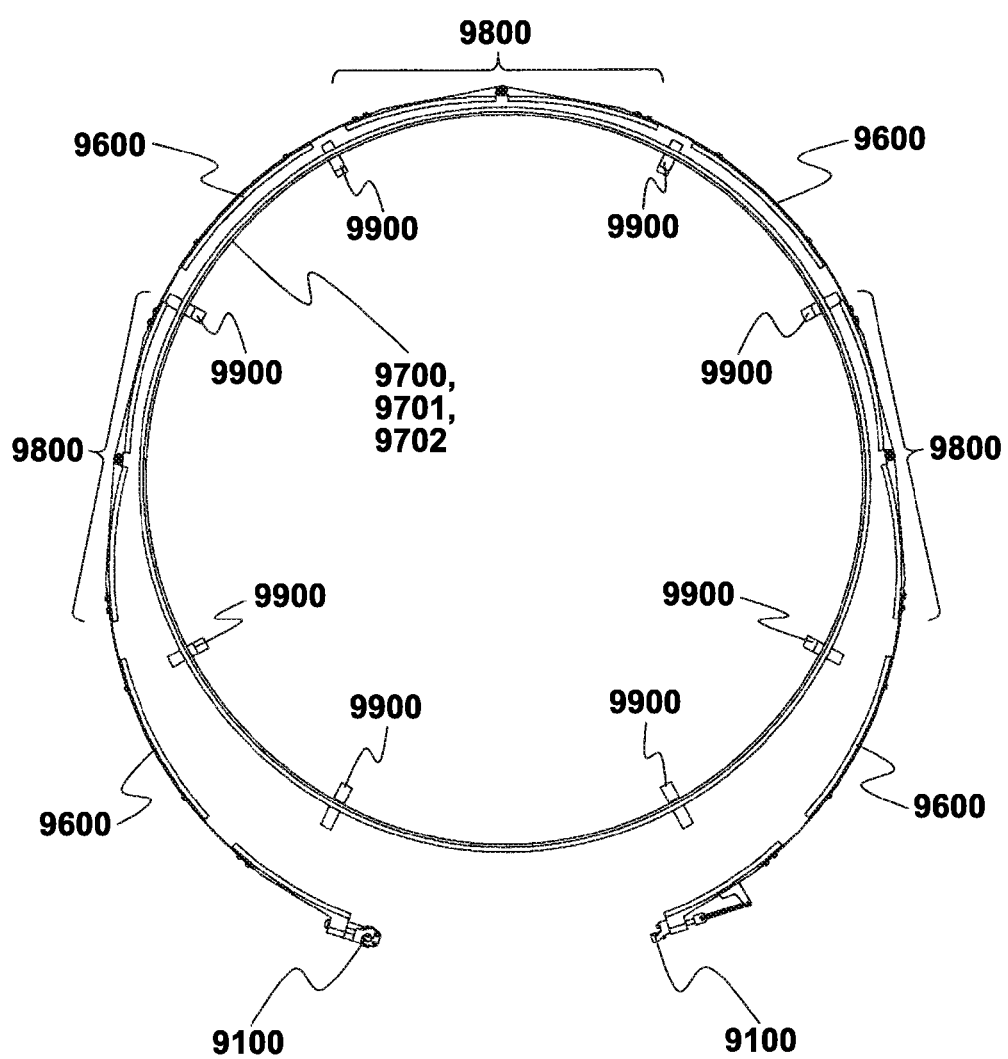
FIG. 43 is a general view of an example in which the coupling/uncoupling device in another embodiment of the present invention is actuated.

As shown in a general view 42A of FIG. 42 and in FIG. 43, the urging spring 9900 is configured by a spring and the like and disposed to apply an urging force to urge the Maruman band 9600 to a base airframe shaft orthogonal direction outer direction of a spacecraft. A plurality of urging springs 9900 are preferably disposed at equal intervals in the circumferential direction of the Maruman bands 9600. However, a single urging spring 9900 may be provided in any part.

The Maruman band 9600 is configured from a clamp 9601 and a band 9602. The band 9602 is pulled in a tangential direction, whereby the diameter of the band 9602 decreases. The clamp 9601 is urged in the center direction in a base airframe shaft direction of the spacecraft. The upper stage clamp 9701 and the lower stage clamp 9702 are coupled.

In FIG. 43, a state is shown in which the forced driving section 9100 is driven and the separating section 9700 is separated. As explained below, when the separating section 9700 is separated, as shown in a general view of FIG. 43 (during separation), the Maruman band 9600 released from the urging force of the forced driving section 9100 is displaced in an airframe shaft orthogonal direction outer direction of the spacecraft.

The Maruman band 9600 rotates (bends) around the hinge section 9800. Therefore, compared with when the hinge section 9800 is absent, the Maruman band 9600 is capable of coming off the spacecraft with smaller displacement. In other words, since the Maruman band 9600 bends around the hinge section 9800, the diameter of the Maruman band 9600 can easily increase. The hinge section 9800 functions as a separation assisting section that assists separation. In this embodiment, a plurality of hinge sections 9800 are disposed at equal intervals on the circumference of the Maruman bands 9600 in order to further improve the effect. As a specific example, as shown in FIG. 43, the hinge sections 9800 only have to be provided in three parts in total, that is, a position opposed to the forced driving section 9100 and two parts at intermediate points.

Note that the coupling/uncoupling devices explained in the first to eighth embodiments are applicable to the forced driving section 9100 in this embodiment.

Tenth Embodiment

Figure 44:
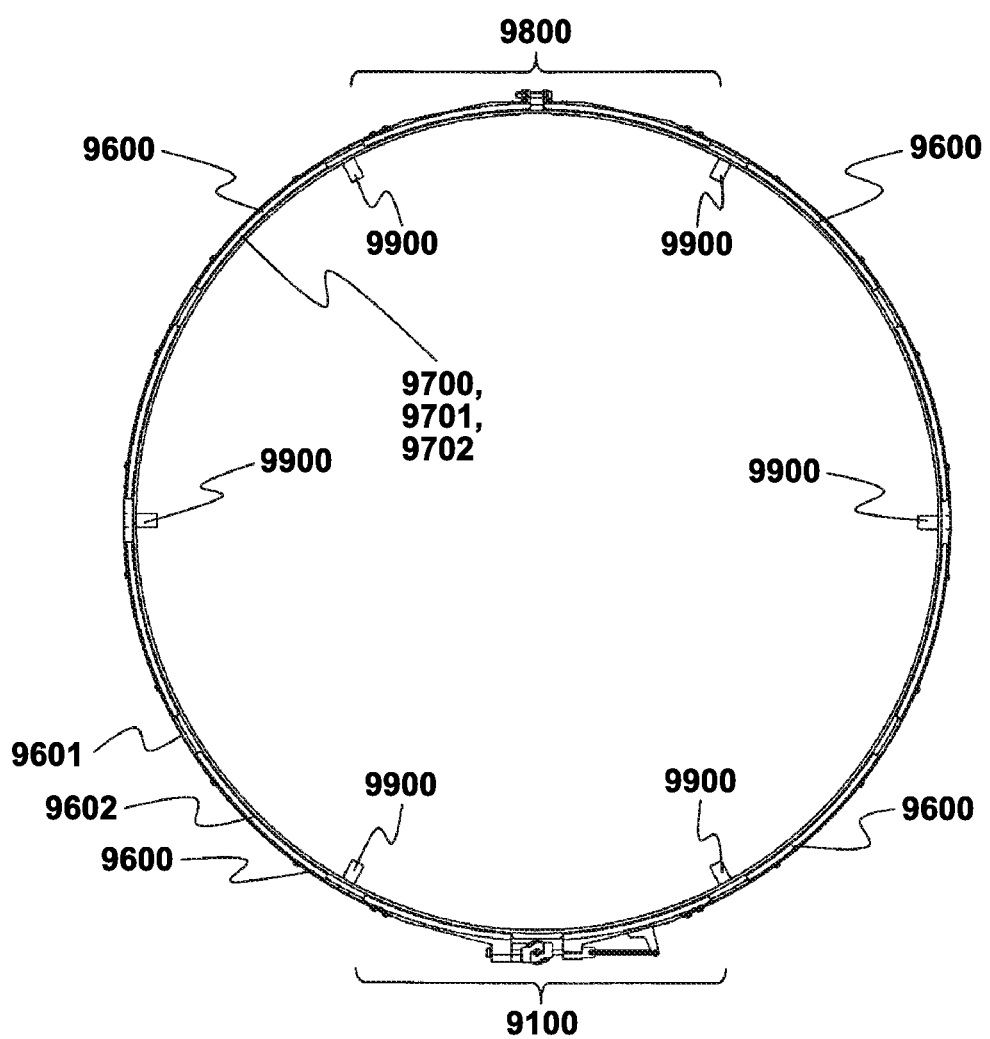
FIG. 44 is a general view of an example in which a coupling/uncoupling device in another embodiment of the present invention is mounted.

As another example of an apparatus applied with a coupling/uncoupling device according to an embodiment of the present invention, an example in which hinge sections are removed and only the urging springs 9900 are provided is shown in FIG. 44. This form is effective for improvement of reliability through a reduction in the weight of the coupling/uncoupling device and a reduction in the number of components. In particular, in a spacecraft, since a band tightening force is smaller in an upper stage, coming-off by a restoration force of the Maruman band 9600 during separation cannot be expected. The influence on deterioration in rocket performance due to an increase in weight is larger in an upper stage. Therefore, this embodiment in which weight can be reduced and the Maruman band 9600 can be forcibly displaced to an airframe shaft orthogonal direction outer side of the spacecraft is suitable. Note that the same components as the components in the ninth embodiment are explained using the same reference numerals and signs.

This embodiment is configured from the forced driving section 9100, a band-tension adjusting section 9800, the urging springs 9900, the Maruman bands 9600, and the separating section 9700.

The coupling/uncoupling device according to this embodiment is used for coupling of a spacecraft such as a rocket or a satellite. The coupling/uncoupling device couples an upper stage member 9701 and a lower stage member 9702.

The band-tension adjusting section 9800 is configured form the pair of the first hinge clamp 9801 and the second hinge clamp 9802 and the adjusting member 9803. Tension of the Maruman band 9600 can be adjusted by tightening the adjusting member 9803. As shown in FIG. 44, a bolt may be used as an example of the adjusting member 9803. The bolt may be pierced through screw holes formed in the first adjusting clamp 9801 and the second adjusting clamp 9802. Another means that can adjust tension for tightening the Maruman band 9600 may be used.

The urging spring 9900 has an urging force by a spring or the like on the inside. The urging spring 9900 is held in a state in which the Maruman band 9600 is urged in the airframe shaft orthogonal direction outer direction of the spacecraft.

The Maruman band 9600 is configured from the clamp 9601 and the band 9602. The band 9602 is pulled in the tangential direction, whereby the clamp 9601 is urged in a spacecraft center direction. The upper stage member 9701 and the lower stage member 9702 are coupled.

The separating operation is as explained above. The separating section 9700 is separated, whereby the urged urging springs 9900 are released. The Maruman band 9600 is displaced to the airframe shaft orthogonal direction outer side of the spacecraft and comes off the spacecraft.

At this time, by adjusting the number, disposition parts, an urging force, and the like of the urging springs 9900, the Maruman bands 9600 can be equally separated to the airframe shaft orthogonal direction outer side of the spacecraft.

The urging springs 9900 may, by setting of band tension and the like, change a displacement amount among the Maruman bands 9600 by changing an urging force (an elastic force) among the urging springs 9900.

When there is no disposition space on the inner side of the spacecraft, the urging springs 9900 may be disposed on the outer side of the Maruman bands 9600. At that time, the urging springs 9900 are configured to be displaced in a pulling direction.

Figure 45:
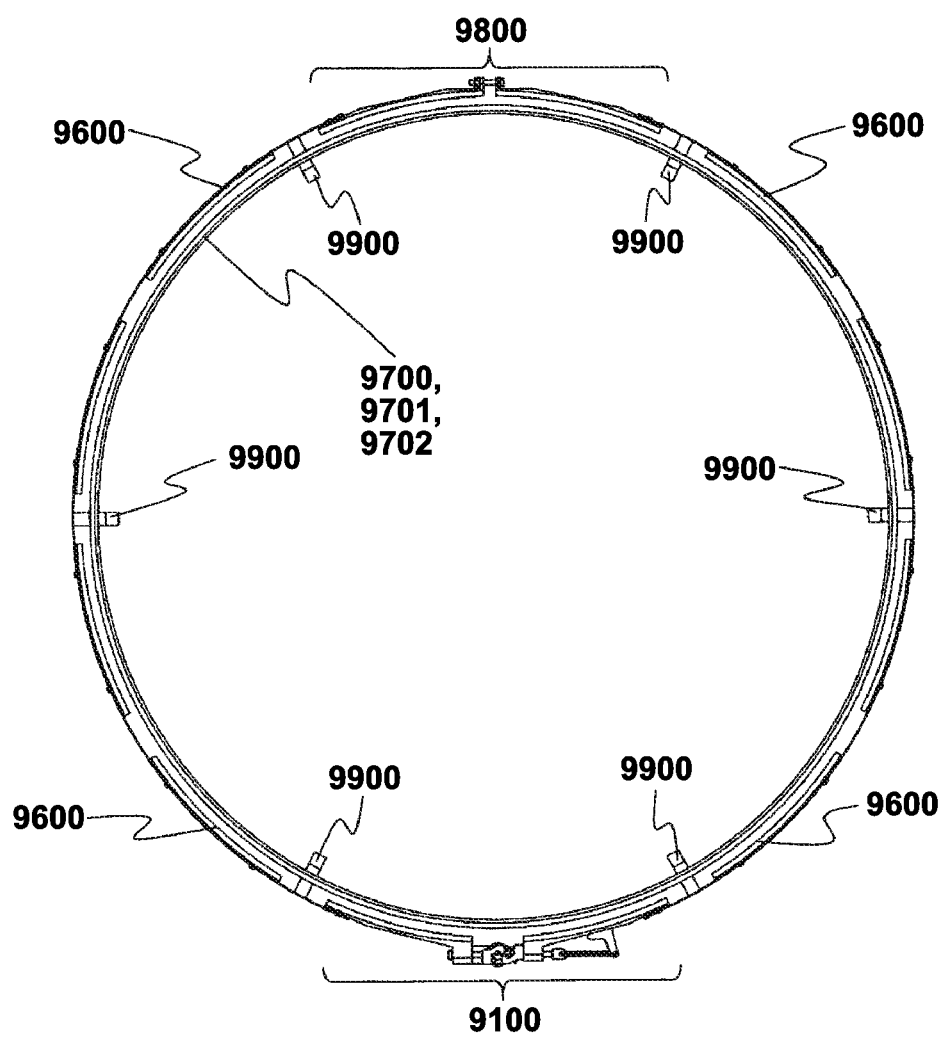
FIG. 45 is a general view of another example in which the coupling/uncoupling device in another embodiment of the present invention is mounted.
Figure 46:
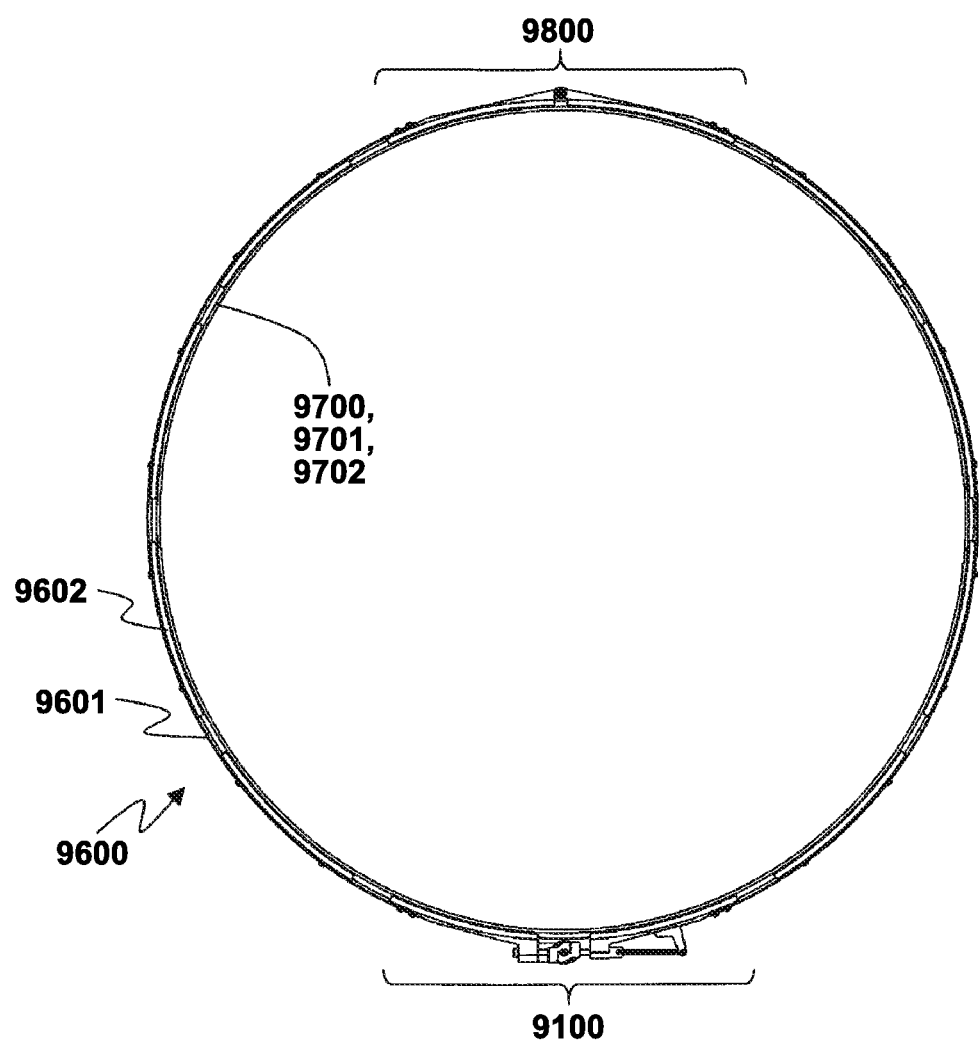
FIG. 46 is a general view of another example in which a coupling/uncoupling device in another embodiment of the present invention is mounted.

As shown in FIG. 45, the urging springs 9900 and the Maruman bands 9600 may be coupled in order to prevent scattering of the Maruman bands 9600 after separation. At this time, it is desirable to consider coupling that does not prevent actuation of the urging springs 9900. In addition, by attaching the other side of the urging spring 9900 to the lower stage member 9702 side, after the separating operation, the Maruman band 9600 held by the urging spring 9900 can be integrated with the lower stage member 9702. In that case, unnecessary structure is not attached to the upper stage member 9701 side. This is suitable from the viewpoint of weight as well. It is desirable that a holding structure is provided in one or both of the urging spring 9900 and the lower stage member 9702 such that the urging spring 9900 does not come off the lower stage member 9702. Further, after the coupling members are moved by a distance necessary for separation, the forced driving section 9100 desirably prevents the distance between the two coupling members from further increasing.

Eleventh Embodiment

As another example of an apparatus applied with a coupling/uncoupling device according to an embodiment of the present invention, an example is explained in which urging springs are removed and only the hinge section 9800 is provided. This form is effective for improvement of reliability through a reduction in the weight of the coupling/uncoupling device and a reduction in the number of components. In particular, in a spacecraft, since a band tightening force is larger in a lower stage, coming-off by a restoration force of the Maruman band 9600 during separation can be expected. Therefore, this embodiment in which weight can be reduced and the Maruman band 9600 can be forcibly displaced to an airframe shaft orthogonal direction outer side of the spacecraft is suitable. Note that the same components as the components in the ninth embodiment are explained using the same reference numerals and signs.

This embodiment is configured from the hinge section 9800, the Maruman bands 9600, and the separating section 9700.

The coupling/uncoupling device according to this embodiment is used for coupling of a spacecraft such as a rocket or a satellite. The coupling/uncoupling device couples the upper stage member 9701 and the lower stage member 9702.

The hinge section 9800 is configured from the pair of the first hinge clamp 9801 and the second hinge clamp 9802 and the rotating shaft member 9803. The first hinge clamp 9801 and the second hinge clamp 9802 can rotate around the rotating shaft member 9803.

Both end portions of the hinge section 9800 are coupled to the Maruman bands 9600. When the rotating operation occurs, the Maruman bands 9600 also bend around the rotating shaft member 9803 following the rotating operation.

Figure 47:
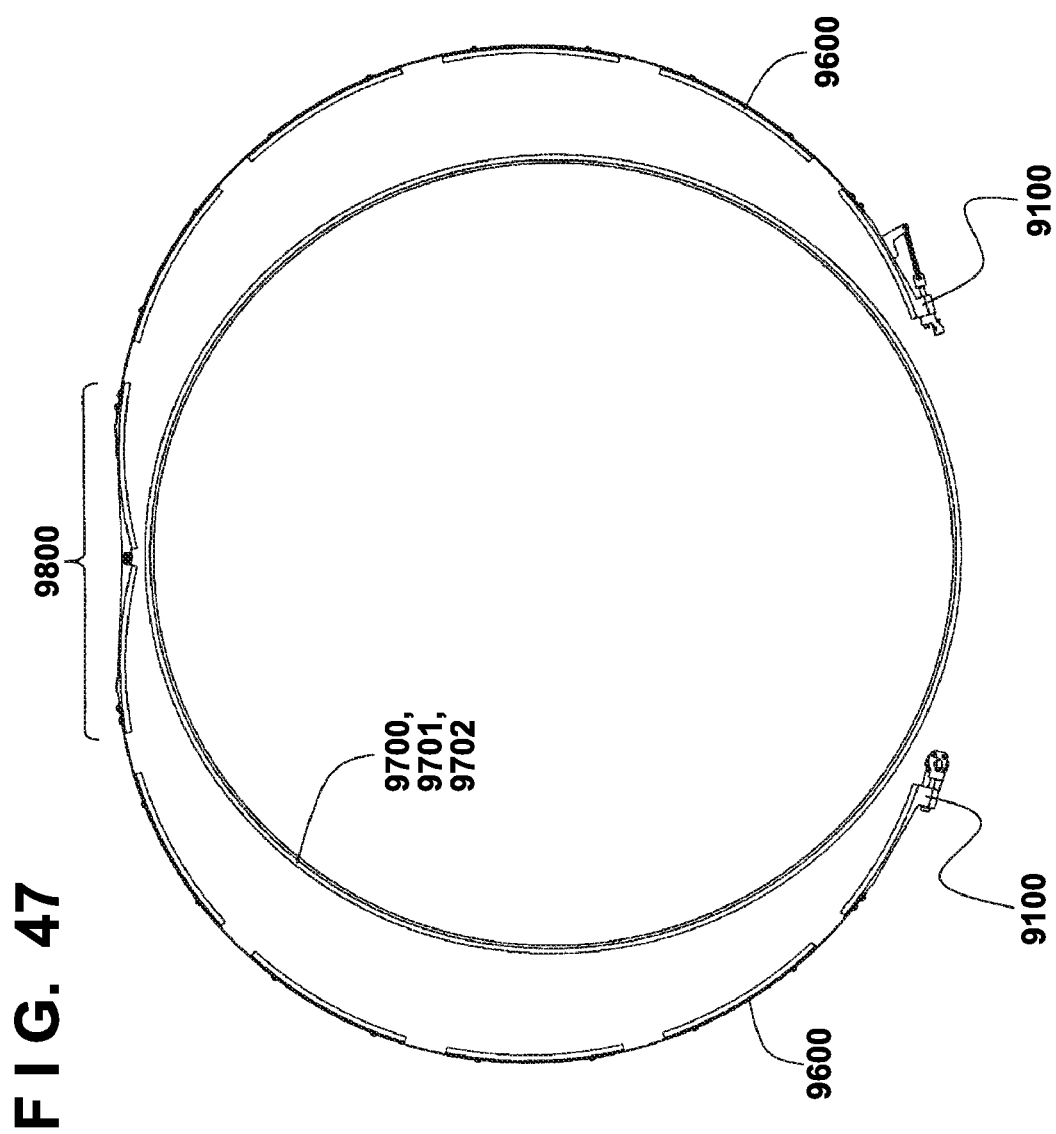
FIG. 47 is a general view of another example in which the coupling/uncoupling device in another embodiment of the present invention is actuated.

The separating operation is as explained above. As shown in FIG. 47, the separating section 9700 is separated, whereby the Maruman bands 9600 urged by the forced driving section 9100 are released. The Maruman bands 9600 are displaced to the airframe shaft orthogonal direction outer side of the spacecraft by an urging force of the Maruman bands 9600 and come off the spacecraft.

At this time, the hinge section 9800 rotates, whereby the Maruman bands 9600 quickly and equally come off the spacecraft.

The number and setting places of the hinge sections 9800 may be changed by setting of band tension and the like.

Because of the same reason, the position of the rotating shaft member of the hinge section 9800 may be disposed further on the outer side or the inner side than the outer circumferential surface of the spacecraft.

In the hinge section 9800, considering use in a vacuum state, a slide contact section is suitably a bearing obtained by sintering a solid lubricant (molybdenum disulfide $MoS_2$ or the like) that does not evaporate even in a vacuum.

The outer surface of the first attaching section included in the first end member is explained in detail. The outer surface of the first attaching section is formed as a flat surface. The Maruman band is attached such that the inner circumferential surface is in contact with the flat surface. The first attaching section is formed to include the end portion on the opposite side of the side where the separating mechanism is provided in the first end member. The outer surface of the first attaching section is perpendicular to a straight line passing the end portion and the center of the Maruman band. That is, the outer surface of the first coupling section is formed to coincide with, during coupling of the separation target object, a tangential line at an intersection with the end portion of the first attaching section on the inner circumferential surface (the inner circumference) of the Maruman band formed to have a perfect circular shape in positions other than a position in contact with the first attaching section.

Figure 48:
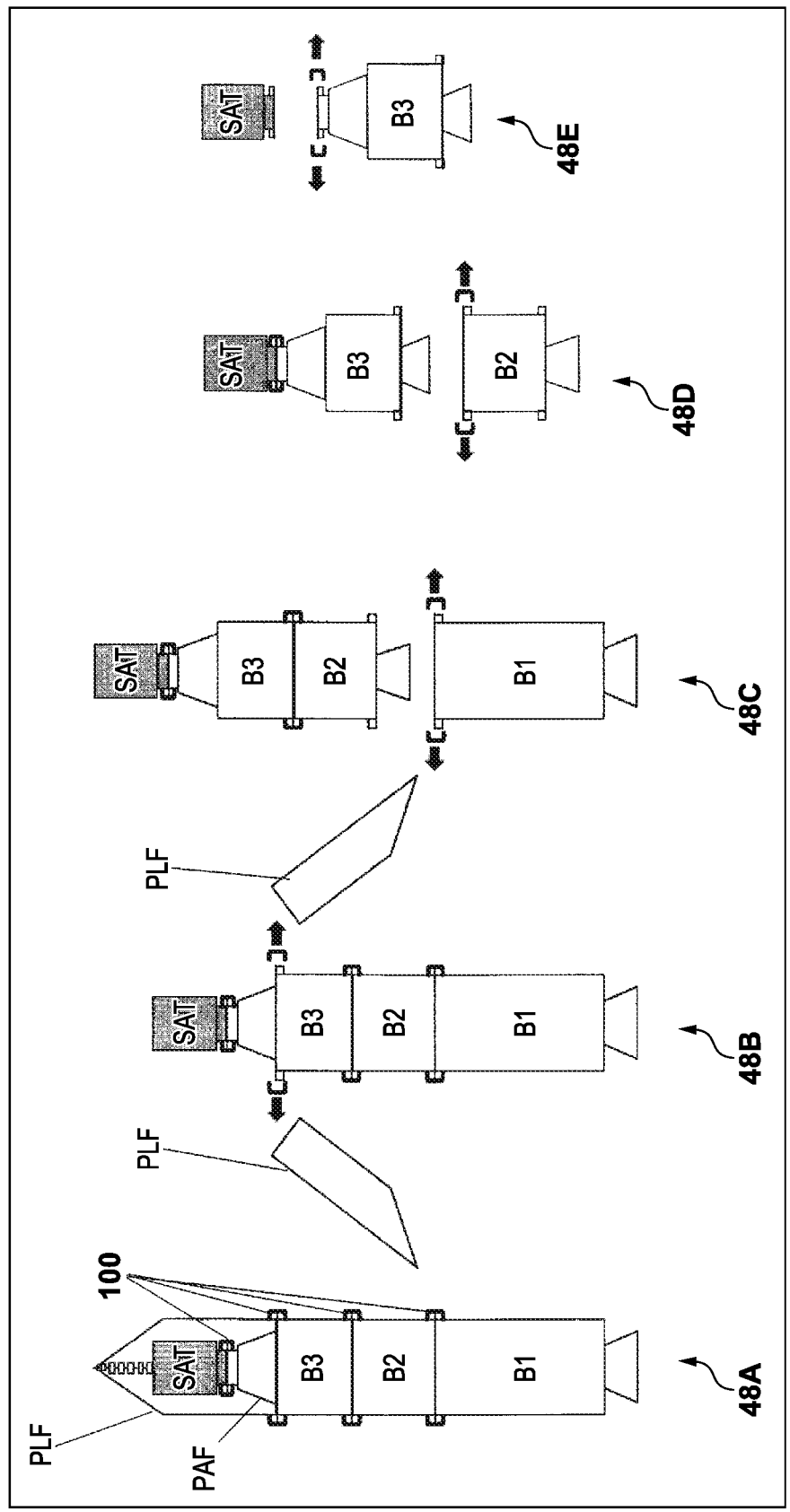
FIG. 48 is a general view of a flight body applied with the coupling/uncoupling device in another embodiment of the present invention.

In FIG. 48, an example is shown in which the coupling/uncoupling device according to the present invention is applied as a separating device, for example, between a fairing on which a satellite or the like is mounted and a rocket. In a state 48A in FIG. 48, a rocket in which loads such as a satellite SAT are mounted in a rocket body configured in three stages and a fairing PLF provided in an upper part of the rocket body is shown. Separating devices 100 including the coupling/uncoupling device according to the present invention are respectively provided between the stages of the rocket and the fairing PLF. The separating device 100 including the coupling/uncoupling device according to the present invention is provided between a satellite joint PAF and the satellite SAT as well. Note that any one of the forms of the coupling/uncoupling devices in the embodiments explained above may be used for the separating device 100.

As shown in a state 48B to a state 48E in FIG. 48, in detachment of stages B1, B2, and B3 of the rocket and the fairing PLF and separation of the satellite SAT and the satellite joint PAF, by using the coupling/uncoupling device according to the present invention, it is possible to surely perform a separating operation while reducing an impact on the coupling/uncoupling device. In particular, in the separation of the satellite SAT and the satellite joint PAF, it is desired to prevent an impact as much as possible. The application of the coupling/uncoupling device according to the present invention is extremely suitable.

The coupling/uncoupling device of the present invention is explained in detail above. However, the present invention is not limited to the embodiment described above. Various improvements and changes can be made in a range not departing from the spirit of the present invention.

In the embodiment described above, the example is explained in which the one coupling/uncoupling device is disposed with respect to the Maruman bands. However, for example, two coupling/uncoupling devices may be disposed in opposed positions in the circumferential shape of the Maruman bands. In that case, the effect of the present invention can be improved. That is, even when an uncoupling instruction is simultaneously given to the two coupling/uncoupling devices, it is difficult to strictly simultaneously drive the two coupling/uncoupling devices. When one coupling/uncoupling device is uncoupled, a restoration force of the Maruman bands to the other suddenly decreases. In that state, it is likely that the other coupling/uncoupling device is not uncoupled. However, if the present invention is applied, the coupling/uncoupling devices can be suitably uncoupled even after the restoration force of the Maruman bands decreases. The present invention can be more suitably applied when three or more coupling/uncoupling devices are provided.

For example, in the embodiment described above, the guide pins 3 are explained using the guide pins having the circular shape in section, that is, the substantially cylindrical shape. However, actually, for example, the guide pins 3 may be changed to a rectangular parallelepiped shape and the guide holes 5 may be changed to an elliptical shape.

Twelfth Embodiment

An embodiment of the present invention is explained with reference to FIG. 49 to FIG. 58. Note that the coupling/uncoupling devices and the separating devices explained in the embodiments above can be suitably used for a space appliance adapter functioning as an example of a separation target object explained in this embodiment.

Figure 49:
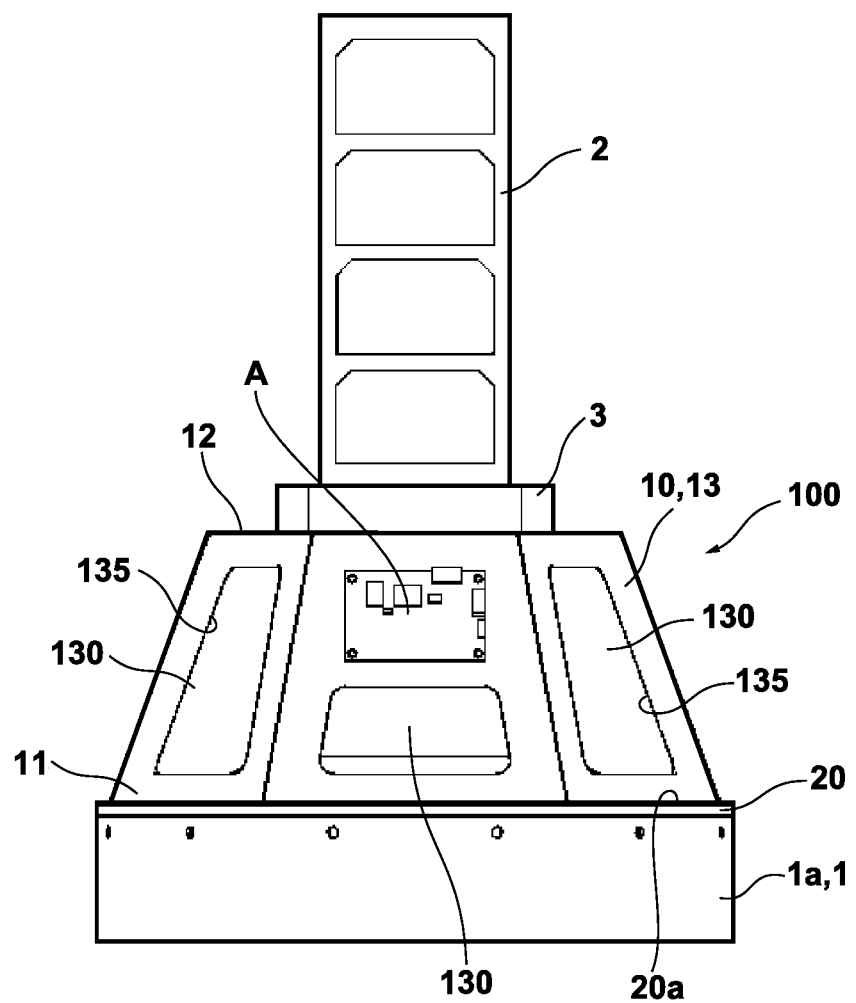
FIG. 49 is a joined diagram of an example of a space appliance adapter in another embodiment of the present invention.

As shown in FIG. 49, a space appliance adapter (hereinafter referred to as adapter as well) 100 in this embodiment is used in a coupling structure of a connecting portion to an artificial satellite 2 fixed, at one end, to a main body 1*a* side of a space transport aircraft 1 such as a rocket and separably mounted on the main body 1*a* of the space transport aircraft 1.

Specifically, the adapter 100 in this embodiment is configured by a first structure 10 connected to the artificial satellite 2 and a second structure 20 connected to the main body 1*a* of the space transport aircraft 1. The first structure 10 and the second structure 20 are integrally (inseparably) joined.

The first structure 10 has a cylindrical shape of a substantially polygonal pyramid (in this embodiment, a substantially hexagonal pyramid) forming an internal space as a whole. An upper surface on the artificial satellite 2 side has a hexagonal shape relatively smaller than a bottom section 11 of a hexagon on the space transport aircraft 1 side. That is, a sidewall of the first structure 10 is configured by a polyhedron structure having an inclined surface inclined from the artificial satellite 2 side toward the space transport aircraft 1 side.

Note that, in the first structure 10 in this embodiment, a three-dimensional structure having a hexagonal pyramid shape is adopted to improve rigidity of the first structure 10 as a whole. However, for example, the first structure 10 may be a trigonal pyramid, a quadrangular pyramid, or other polygonal pyramids. Details concerning the configuration of the first structure 10 are explained below.

On the other hand, in the second structure 20, for example, in this embodiment, a hexagonal through-hole 210 corresponding to an internal space of the first structure 10 is provided according to a connection shape to the space transport aircraft 1 for outer space. Further, the second structure 20 is provided in a ring shape as a whole. The bottom section 11 side of the first structure 10 explained above is coupled to an upper end portion 20*a* of the second structure 20 having the ring shape. Note that the first structure 10 and the second structure 20 can be joined by, for example, bonding or welding.

Figure 51:
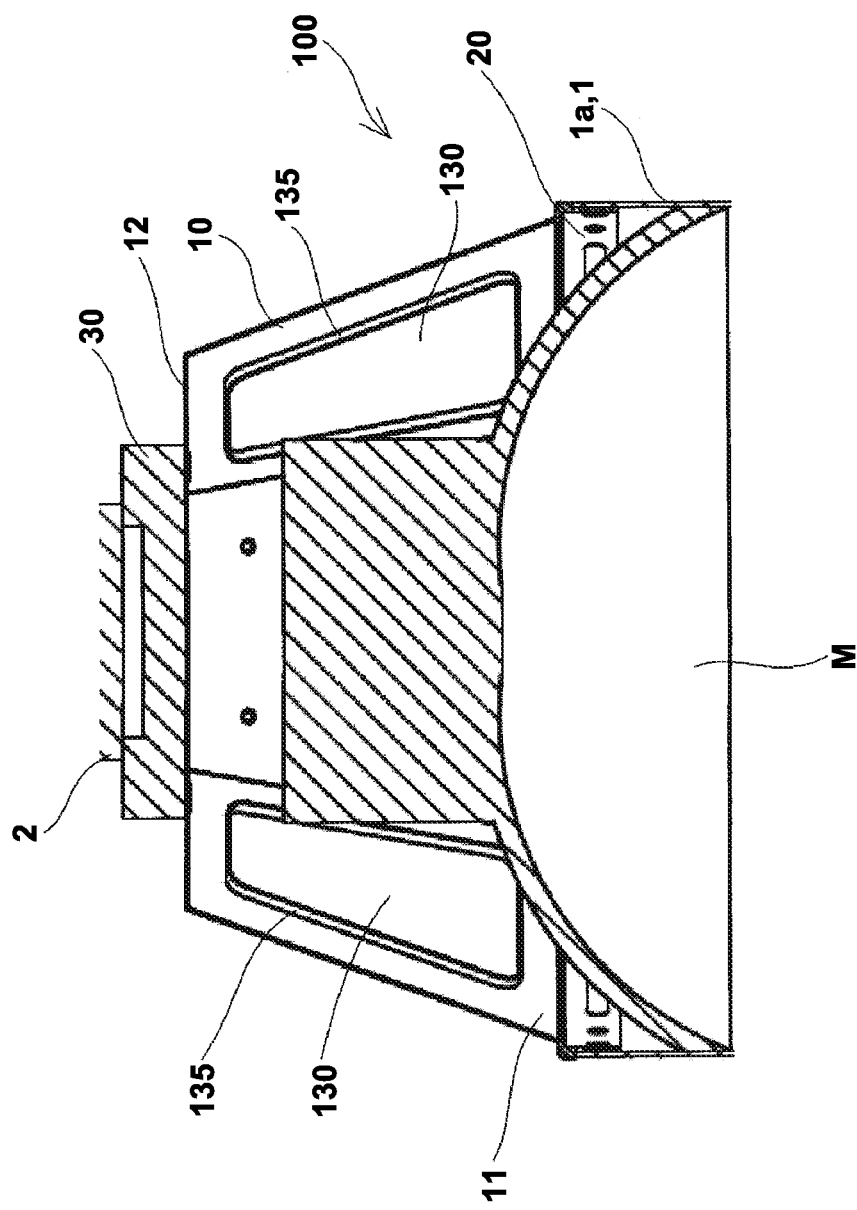
FIG. 51 is a sectional view of the joined diagram of the example of the space appliance adapter in another embodiment of the present invention.

By forming the external shape of such a second structure 20 in the ring shape, as shown in FIG. 51, as a main body configuration on the space transport aircraft 1 side, it is possible to attach the second structure 20 to house a dome-like motor case (a fuel case) M or the like on the inside while surrounding end portions of the motor case M or the like. That is, the second structure 20 is attached to overlap the end portions of the motor case M on the space transport aircraft 1 side. Consequently, the end portions of the motor case M are inserted into internal spaces of the first structure 10 and the second structure 20. Therefore, it is possible to reduce the total length of the space transport aircraft 1 or expand a mounting space of the artificial satellite 2 and the like.

Note that, in the adapter 100 having such a configuration, the first structure 10 and the second structure 20 may be integrated in advance and attached to the main body 1*a* side of the space transport aircraft 1. The second structure 20 may be fixed to the main body 1*a* side of the space transport aircraft 1 and thereafter the first structure 10 may be attached on the second structure 20. An electronic device A such as a circuit board is mounted on a sidewall of the first structure 10 in such an adapter 100.

The artificial satellite 2 is finally separated from the space transport aircraft 1. Therefore, the separating device is interposed between the artificial satellite 2 and the adapter 100 or between the adapter 100 and the main body of the space transport aircraft 1. In this embodiment, the separating device 30 is disposed between the artificial satellite 2 and the adapter 100. Consequently, after the separation of the artificial satellite 2, the adapter 100 remains on the main body 1a side of the space transport aircraft 1.

In any case, the adapter 100 in this embodiment is connected to the space transport aircraft 1 for outer space through the second structure 20 before the artificial satellite 2 is disconnected. The adapter 100 supports the artificial satellite 2 or other loads such as a space device through the first structure 10.

The configuration of the first structure 10 configuring a part of the adapter 100 in this embodiment explained above is explained in detail.

Figure 53:
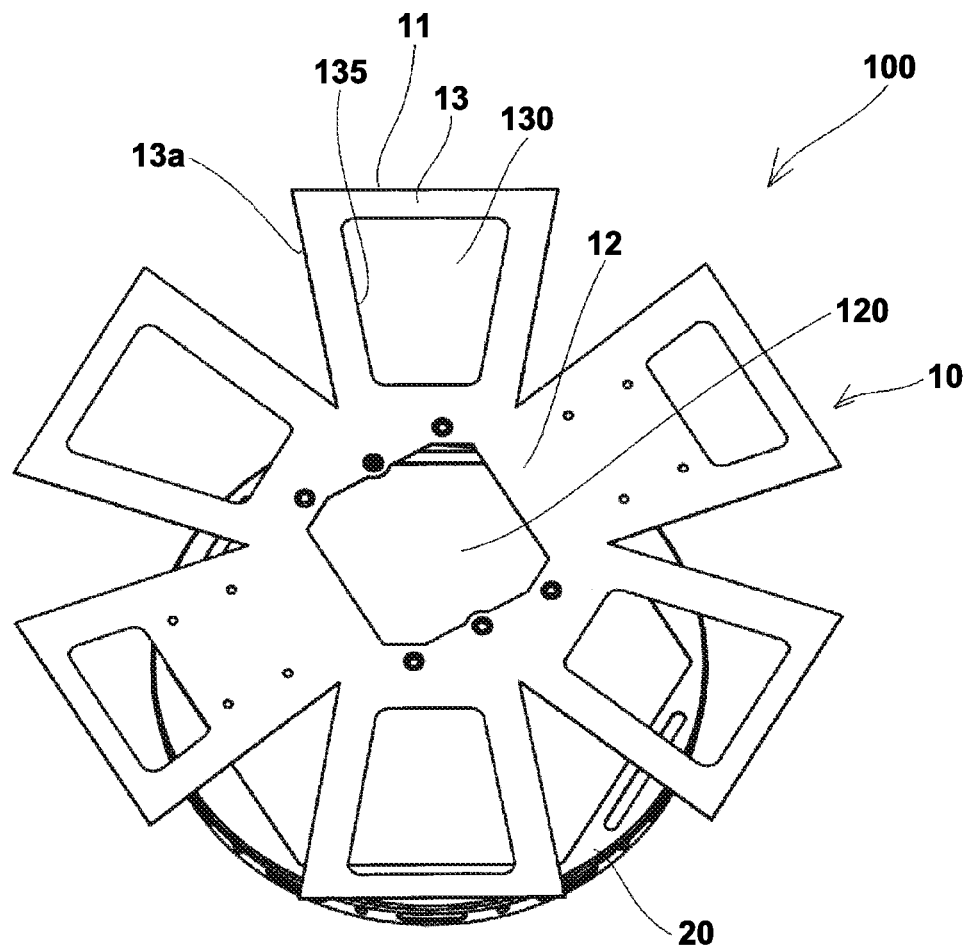
FIG. 53 is a development view of the space appliance adapter in another embodiment of the present invention.
Figure 55:
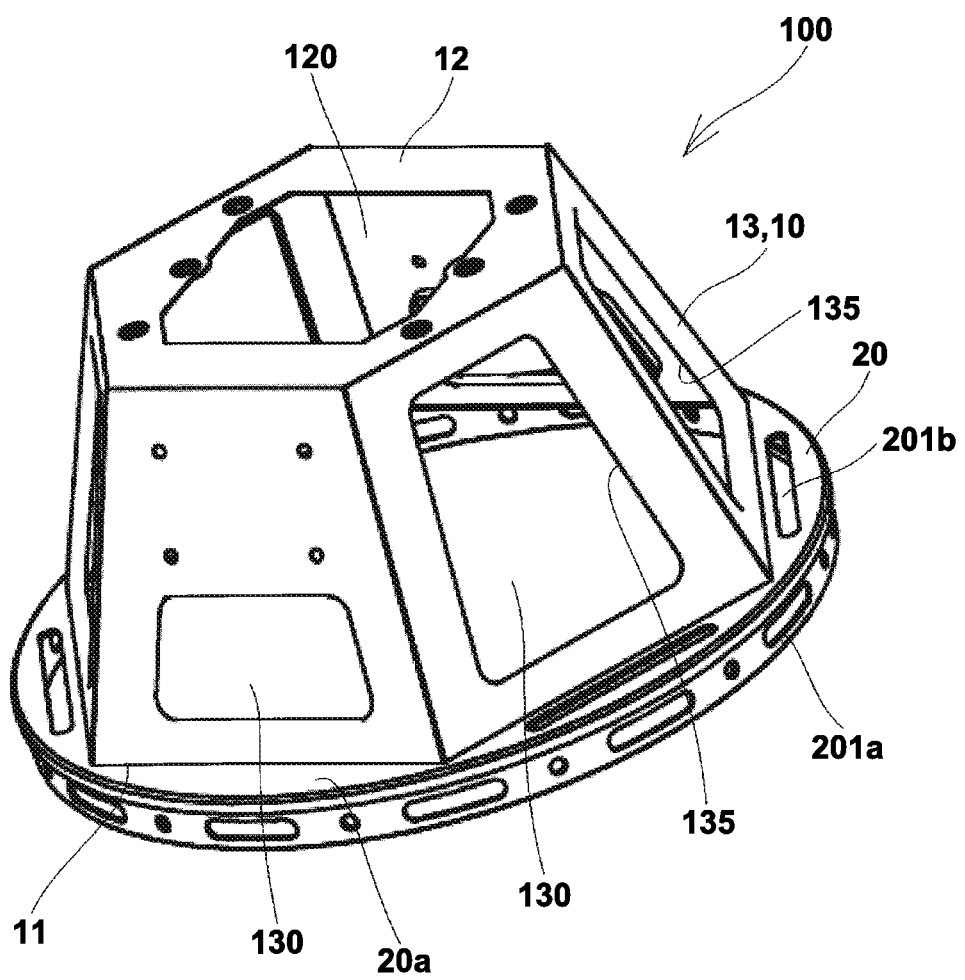
FIG. 55 is a main part enlarged view of the space appliance adapter in another embodiment of the present invention.
Figure 56:
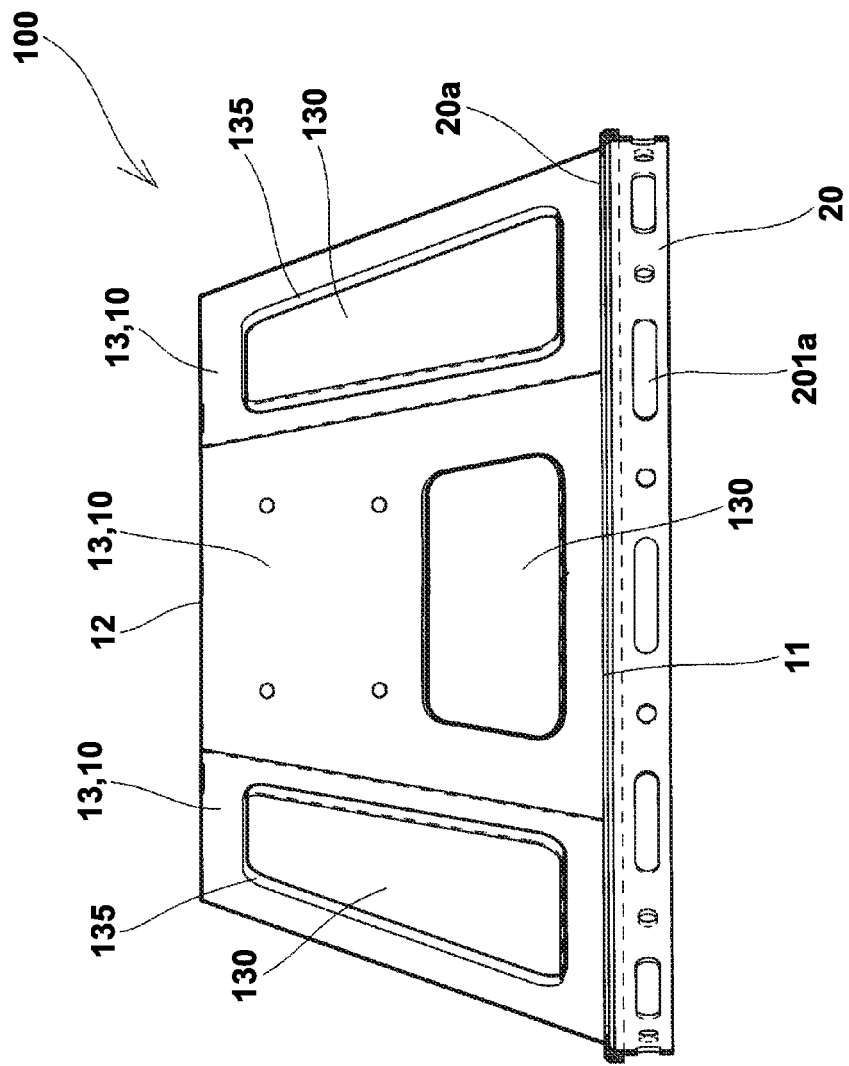
FIG. 56 is a sectional view of the space appliance adapter in another embodiment of the present invention.

As shown in FIG. 53, the first structure 10 in this embodiment has a configuration in which side surface sections radially configuring six sidewalls with respect to sides of a hexagonal upper surface section 12, on which the artificial satellite 2 is mounted, are integrally provided as divided bodies 13 and developed into one tabular member. That is, connecting sections of the upper surface section 12 and the side surface sections (the divided bodies 13) are formed as bending sections 12a and formed as undivided sections. However, end portions of the divided bodies 13 adjacent to one another are separated from each other. The end portions are joined to one another when a three-dimensional configuration is formed.

That is, the divided bodies 13 are bent in the bending sections 12a forming the sides of the upper surface section 12 and the side surface sections (the divided bodies 13) adjacent to one another are joined, whereby this one tabular member configures a three-dimensional structure having a substantially hexagonal pyramid shape, the bottom section 11 of which opposed to the upper surface section 12 is a hexagonal opening section, shown in FIG. 49 to FIG. 52, FIG. 55, and FIG. 56.

Note that, for example, in this embodiment, the first structure 10 is formed by a tabular member made of a metal material such as aluminum. Such a tabular member can be manufactured by, for example, partially bending and joining a structure configured by one aluminum plate as shown in FIG. 53. However, the tabular member may be manufactured by combining divided bodies divided as shown in FIG. 54. Besides, the tabular member may be manufactured as an integrated object by shaving. The material forming the divided bodies 13 is not limited to the metal material explained above and may be other materials such as a carbon fiber. The divided bodies 13 may be configured by a composite body obtained by combining a different plurality of materials.

In this embodiment, in the divided bodies 13 explained above, that is, the side surface sections formed as the three-dimensional structure, through-holes 130 extending through the divided bodies 13 in the thickness direction are respectively provided. Further, in the upper surface section 12, a through-hole 120 extending through the upper surface section 12 in the thickness direction is provided. Note that, in this embodiment, the through-hole 130 is formed small in a portion where the electronic device A is provided on the sidewall of the first structure 10. Rib structure sections 135 projecting in the thickness direction (a piercing-through direction) are provided at opening peripheral edge portions of the through-holes 130 provided in the divided bodies 13.

The rib structure sections 135 in this embodiment are erected in a convex shape in a direction parallel to the thickness direction of the divided bodies 13, that is, the piercing-through direction of the through-holes 130. The divided bodies 13 in which such rib structure sections 135 are formed are explained below.

Figure 50:
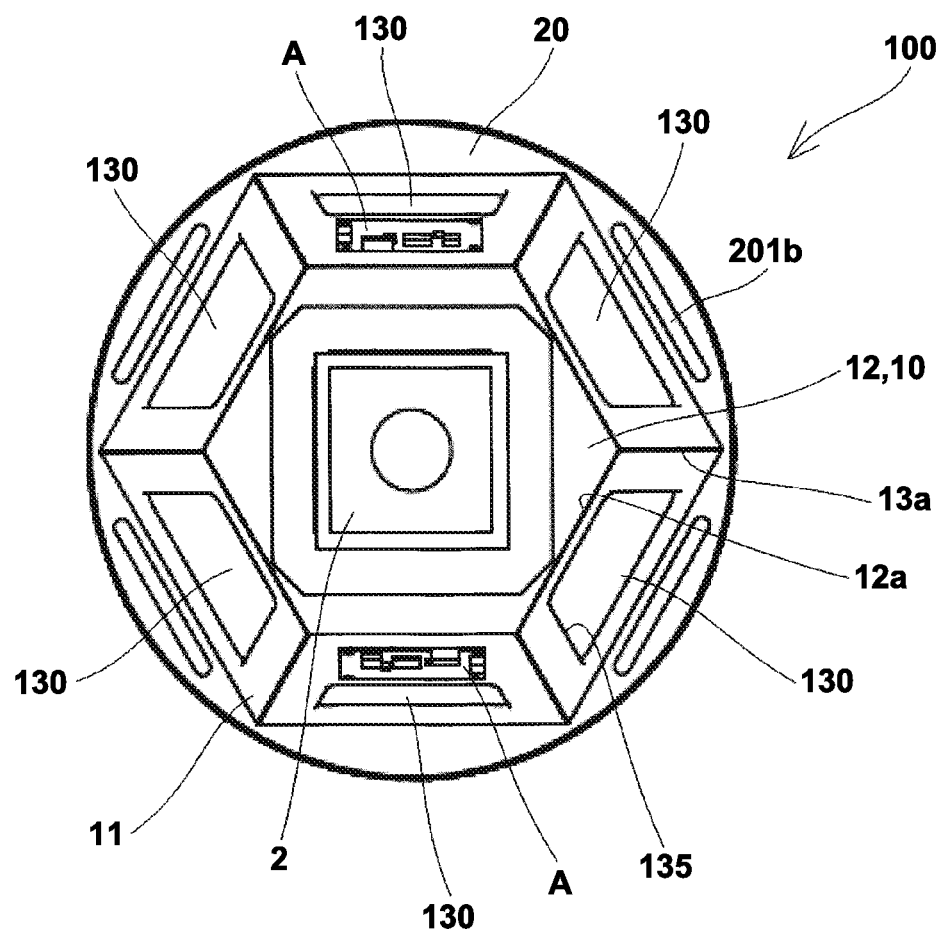
FIG. 50 is a joined diagram of an example of the space appliance adapter in another embodiment of the present invention.

In one divided body 13, as explained above, the through-holes 130 having a substantially rectangular shape (a trapezoidal shape) shown in FIG. 49 and FIG. 50 are respectively provided. Further, the rib structure sections 135 having an annular shape are integrally provided at the opening peripheral edge portions of the through-holes 130. In this embodiment, the shapes of the through-holes 130 provided in the divided bodies 13 are the same shape in a set of the divided bodies 13 opposed to each other in the piercing-through direction. However, the through-holes 130 may have structures different from one another.

In the divided bodies 13 in this embodiment, the annular rib structure sections 135 continuous along the opening peripheral edges of the through-holes 130 are respectively formed by, for example, applying bending, in a convex shape, to a tabular member, which has thickness of a degree for which machining such as bending is possible, by, while punching or molding a part of the tabular member to form the through-holes 130, integrally drawing the opening peripheral edge portions of the through-holes 130. Note that the thickness of the tabular member configuring such divided bodies 13 may be formed smaller than, for example, the thickness of the rib structure sections 135 but may be formed equal to the thickness of the rib structure sections 135.

The plurality of divided bodies 13 are, for example, coupled in an annular shape, although the divided bodies 13 in this embodiment have a thin plate shape as a whole. Therefore, strength does not fluctuate and rigidity is uniformly improved. Further, since the plurality of through-holes 130 are provided and the through-hole 120 is further provided in the upper surface section 12, the divided bodies 13 contribute to a reduction in weight as well. That is, in this embodiment, weight can be adjusted according to the sizes of the through-holes 130 and 120. Strength can be adjusted according to the height, the thickness, and the like of the rib structure sections 135. In this embodiment, since the external shape of the divided bodies 13 is formed as the trapezoidal shape, the shapes of the through-holes 130 and the rib structure sections 135 are also formed as the trapezoidal shape. Therefore, rigidity at the time when the divided bodies 13 are combined to form the three-dimensional structure can be improved.

Further, as shown in FIG. 57, the rib structure sections 135 are respectively provided to surround the substantially trapezoidal through-holes 130. Therefore, the rib structure sections 135 are integrally configured by coupling, in rib structure sections 135d at four corners, rib structure sections 135a and 135b of a short side and a long side parallel to each other and rib structure sections 135c of oblique sides that connect the rib structure sections 135a and 135b of the short side and the long side.

Consequently, a substantially hexagonal pyramid structure is formed in a state in which the divided bodies 13 are annularly joined and integrated like the first structure 10. Therefore, when the artificial satellite 2 is mounted on the upper surface section 12 of the first structure 10, the weight and the like of the artificial satellite 2 are supported by the divided bodies 13 formed as sidewalls. At this time, since the rib structure sections 135 are respectively provided in the divided bodies 13, the divided bodies 13 are reinforced.

Further, since the divided bodies 13 are annularly coupled, the divided bodies 13 are also reinforced as a whole by the rib structure sections 135.

In detail, as shown in FIG. 57, the rib structure sections 135c of the oblique sides provided in the divided bodies 13 are formed as beam structures extending along coupling sections (joining sections) 13a of the divided bodies 13 on the sidewalls of the first structure 10. On the other hand, both ends of the rib structure sections 135a and 135b of the short side and the long side are coupled to the rib structure sections 135c of the oblique sides to be formed as beam structures in the circumferential direction of the first structure 10. A plurality of such rib structure sections 135 are provided side by side in the circumferential direction of the first structure 10. Further, the four corners of the rib structure sections 135 are coupled to one another by the rib structure sections 135d. Therefore, the rigidity of the first structure 10 can be markedly improved.

The rib structure sections 135 in this embodiment are formed in structure in which the rib structure sections 135a and 135b of the short side and the long side and the rib structure sections 135c of the oblique sides are coupled to each other by the rib structure sections 135d having an R shape as the shape of the four corners, that is, configured by arcuate corner sections. Consequently, it is possible to prevent stress from concentrating on the four corners of the rib structure sections 135 when external stress is applied, that is, stress distribution is possible. Note that, naturally, the present invention is not limited to this. The four corners of the rib structure sections 135 may be coupled at a right angle or may be divided to be discontinuous.

As explained above, the adapter 100 in this embodiment is formed by coupling the first structure 10 including the rib structure sections 135 to the second structure 20 and integrating the first structure 10 with the second structure 20. The adapter 100 is adopted for the connecting structure of the artificial satellite 2 and the space transport aircraft 1. Therefore, it is possible to realize a reduction in weight while securing desired rigidity. That is, the desired rigidity is mainly realized by providing the plurality of rib structure sections 135 in the first structure 10. The reduction in weight is mainly realized by providing the rib structure sections 135 to reduce the thickness of the tabular member configuring the first structure 10 in addition to providing the plurality of through-holes 130 in the first structure 10. Therefore, the adapter 100 in this embodiment can realize a structure that can achieve both of the desired rigidity and the reduction in weight.

Figure 52:
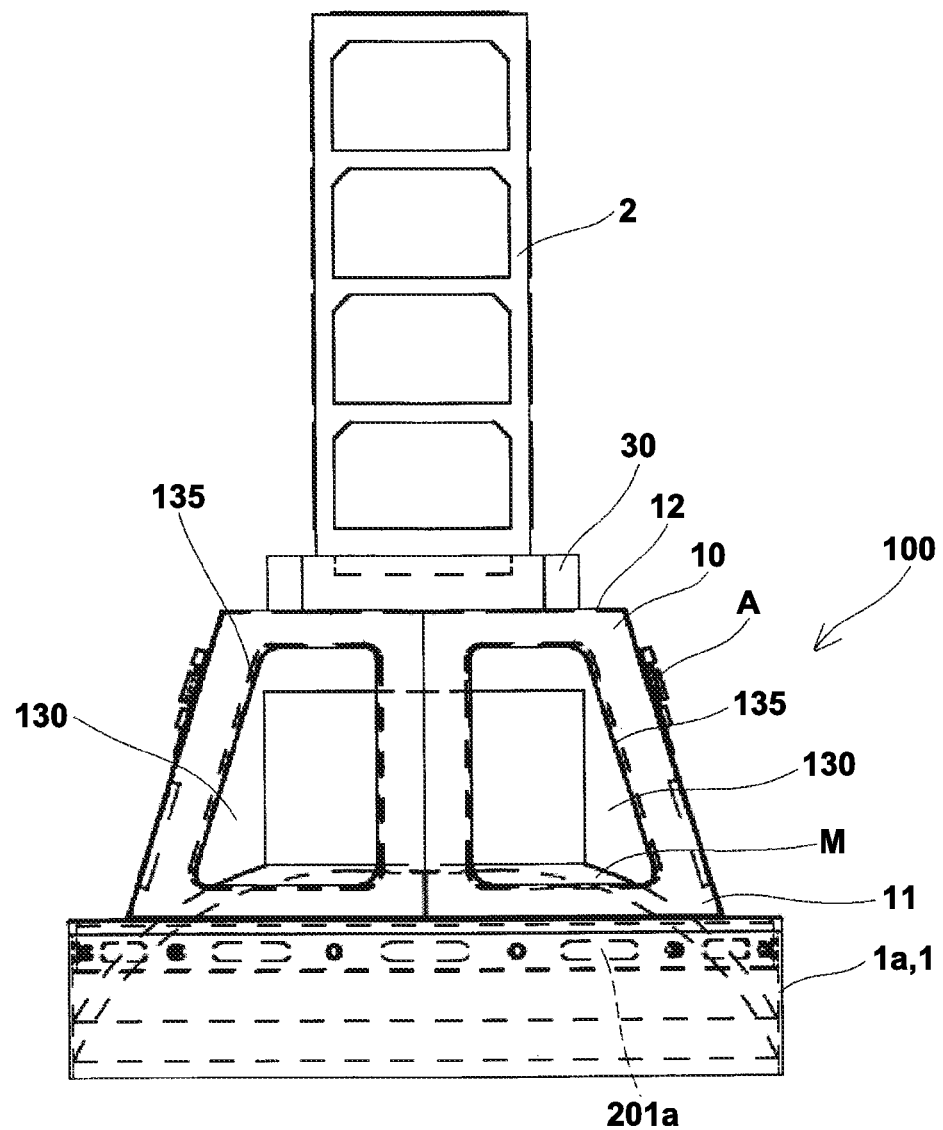
FIG. 52 is a joined diagram of an example of the space appliance adapter in another embodiment of the present invention.

Note that, in the first structure 10, with the through-holes 130 shown in FIG. 52, there is, for example, not only a merit of the reduction in weight but also a merit that it is easy to access a region disposed in the internal space of the first structure 10.

Figure 58:
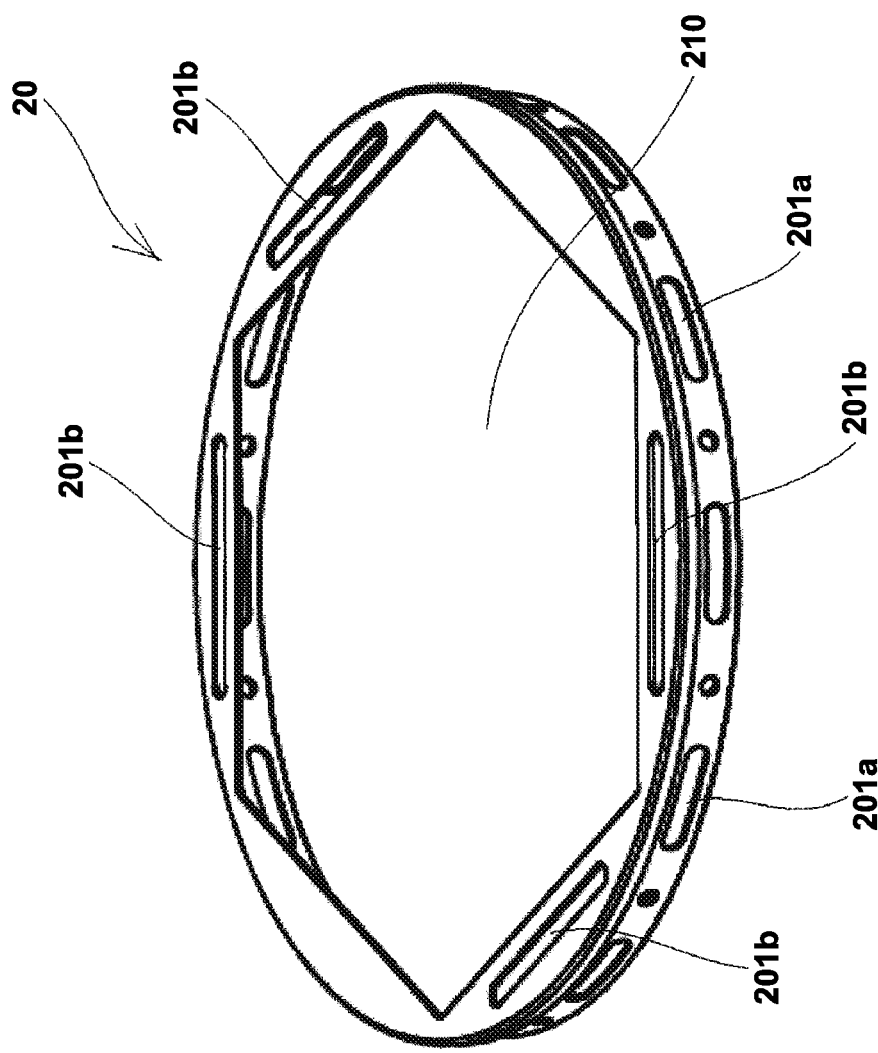
FIG. 58 is a main part enlarged view of the space appliance adapter in another embodiment of the present invention.

In this embodiment, as shown in FIG. 58, a ring-like member including a plurality of hole sections 201a and 201b is adopted as the second structure 20. Therefore, a reduction in the weight of the second structure 20 is achieved. In this embodiment, such a second structure 20 is formed by, for example, a metal material such as aluminum. However, in order to achieve the reduction in weight while maintaining rigidity, the second structure 20 is not limited to the metal material explained above and may be formed by other materials such as a carbon fiber. The second structure 20 may be configured by a composite body obtained by combining a different plurality of materials.

Further, in the adapter 100 in this embodiment, the first structure 10 and the second structure 20 are dividedly configured. However, naturally, the present invention is not limited to this. For example, the first structure 10 and the second structure 20 may be configured by metal casting or integral molding by a material of the same type such as a carbon fiber. Even in this case, it is possible to achieve the reduction in weight while securing the desired rigidity by forming the rib structure sections 135 and the through-holes 130 in at least the first structure 10.

The present invention is explained in detail above on the basis of the twelfth embodiment. However, the present invention is not limited to the twelfth embodiment explained above. For example, in the twelfth embodiment explained above, the rib structure sections 135 are configured by the rib structure sections 135a and 135b of the short side and the long side, the rib structure sections 135c of the oblique sides, and the rib structure sections 135d of the four corners. However, naturally, the present invention is not limited to this. For example, the rib structure section may be configured by only the rib structure sections of the oblique sides.

Figure 59:
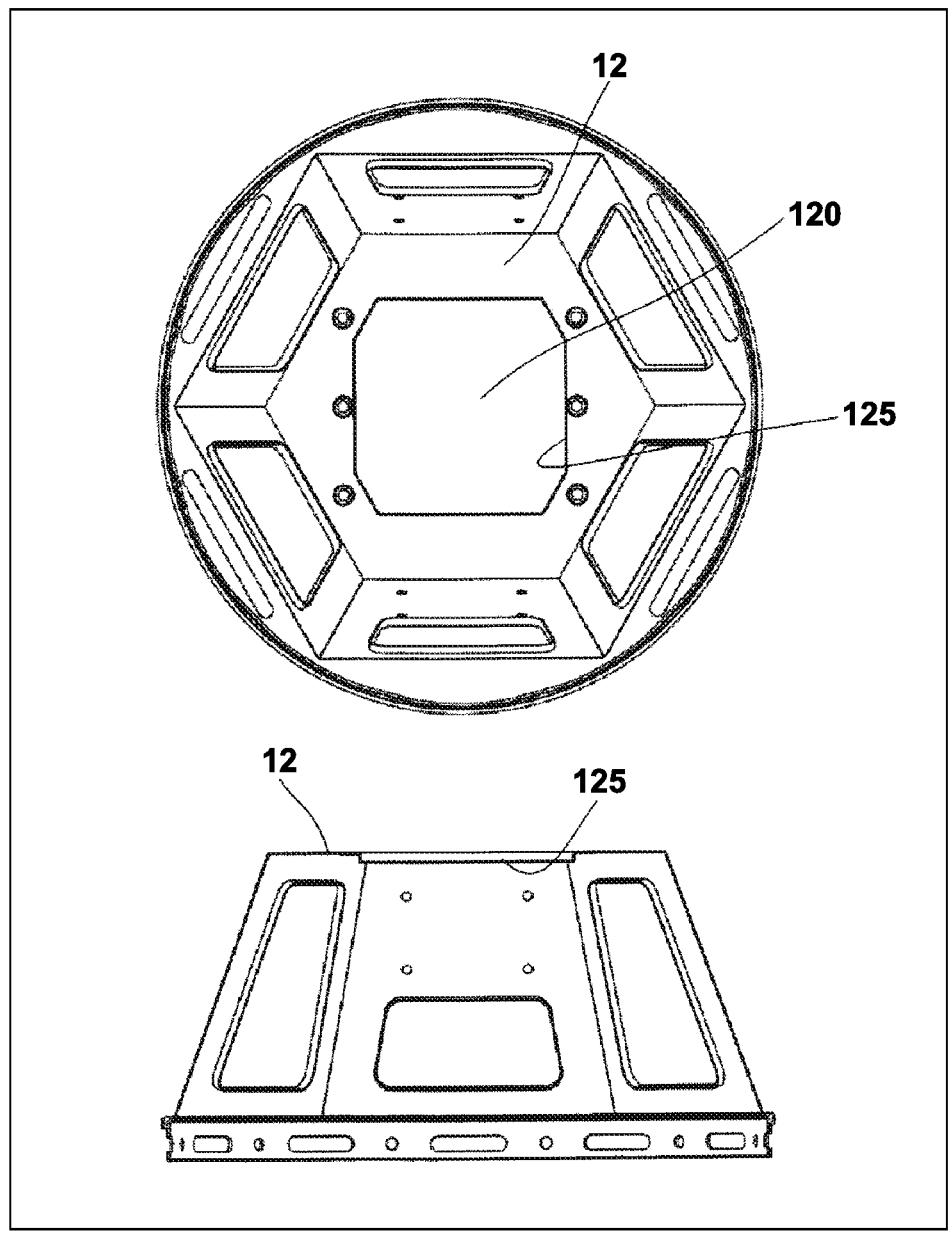
FIG. 59 is a perspective view and a sectional view of the space appliance adapter in another embodiment of the present invention.

As shown in FIG. 59, in the through-hole 120 provided in the upper surface section 12 in the first structure 10 in the twelfth embodiment explained above, the rib structure 125, the opening peripheral edge portion of which is formed in the convex shape to the inner side, may be provided in the same manner as the rib structure sections 135 provided in the divided bodies 13 in the twelfth embodiment explained above. Consequently, the strength in the first structure 10 is further improved.

Figure 60:
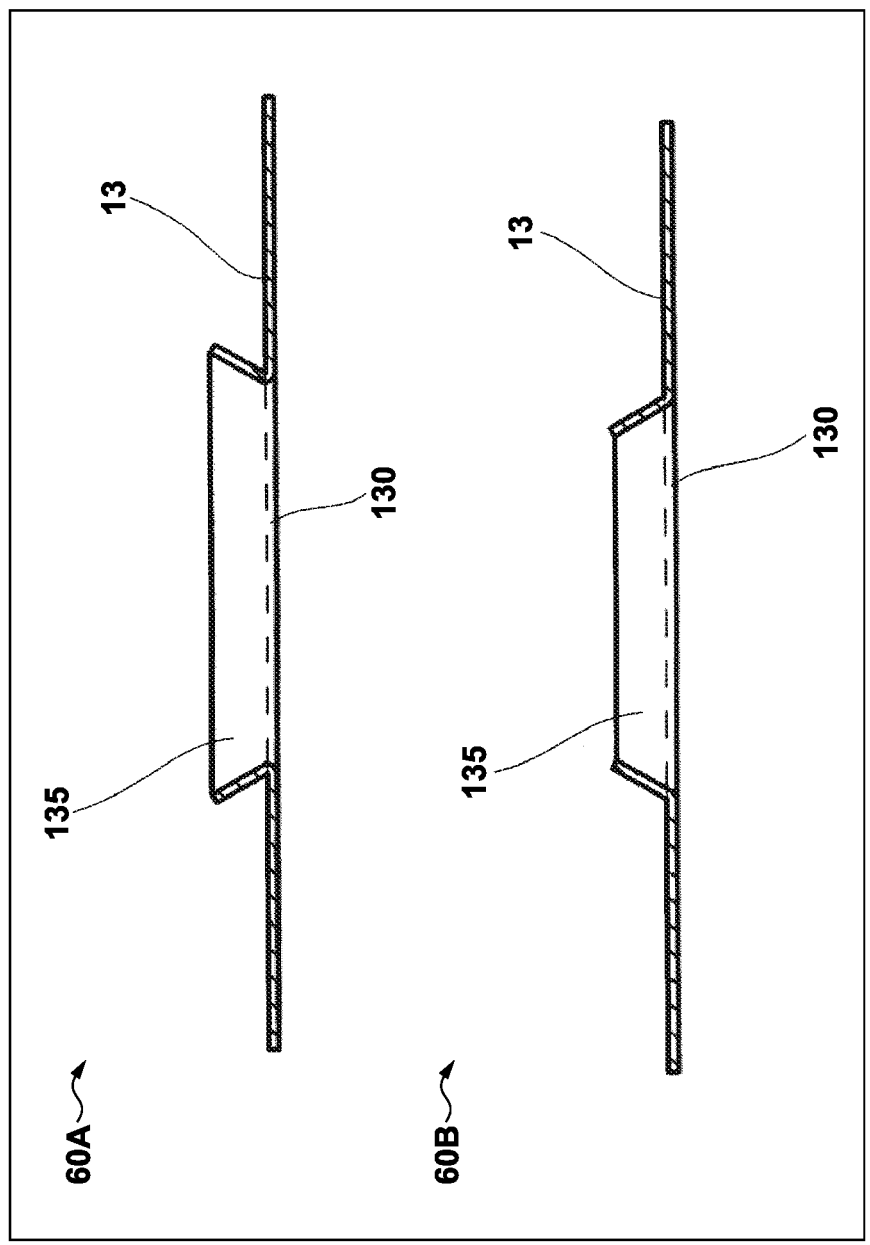
FIG. 60 is a main part enlarged cross-section view of the space appliance adapter in another embodiment of the present invention.

Further, in the twelfth embodiment explained above, the structure is explained in which the rib structure sections 135 convex in the direction parallel to the thickness direction of the divided bodies 13 (at a right angle) are provided. However, naturally, the present invention is not limited to this. For example, as shown in a configuration example 60A and a configuration example 60B in FIG. 60, the rib structure section 135 may be formed in a structure bent in a direction intersecting the thickness direction of the divided bodies 13 (the piercing-through direction of the through-hole 130). However, the strength of the divided body 13 can be improved by forming structure in which, as shown in the configuration example 60A in FIG. 60, an angle formed by one surface of the divided body 13 on a side where the rib structure section 135 is convex and the rib structure section 135 is an acute angle, that is, the rib structure section 135 tilts to the one surface side of the divided body 13.

Note that the present invention is not limited to the adapter (the space appliance adapter) explained above. The present invention is also applicable to a space transport aircraft including such an adapter or an artificial satellite including the adapter.

Thirteenth Embodiment

Figure 61:
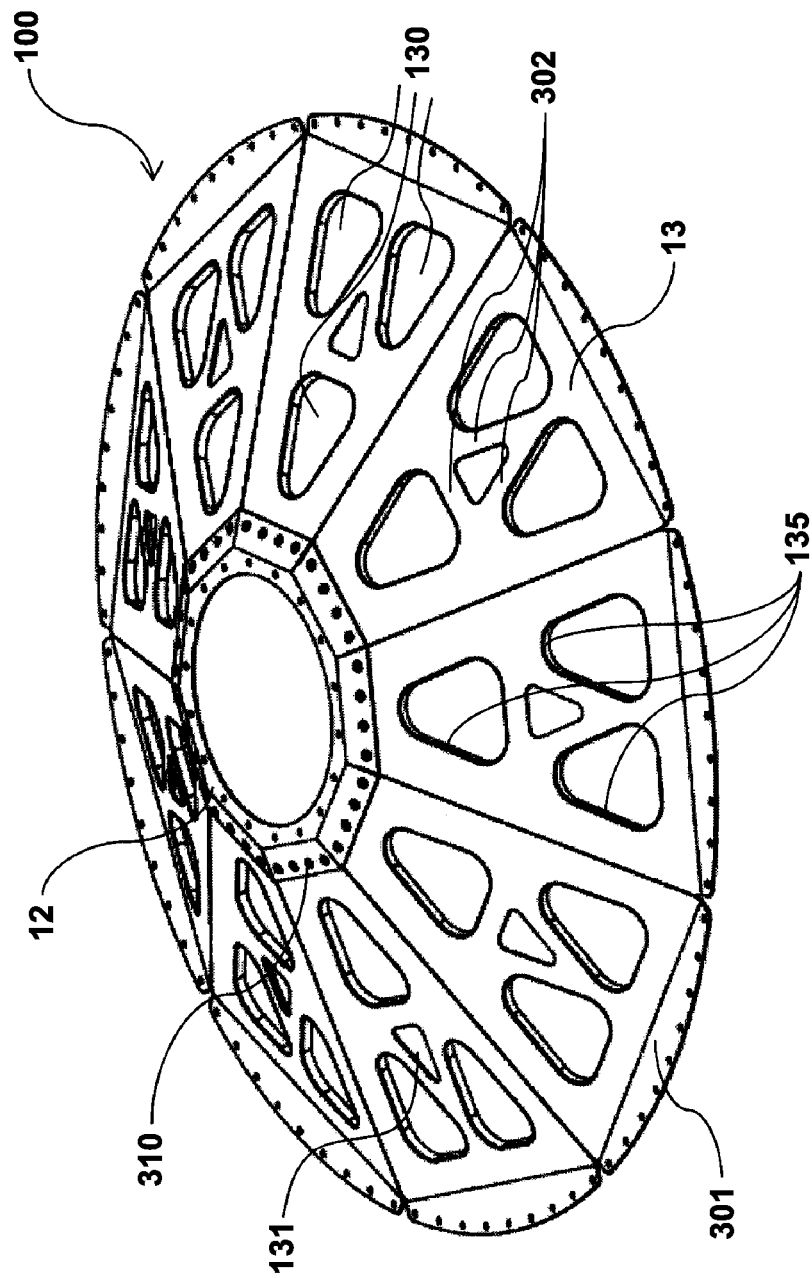
FIG. 61 is a perspective view of a space appliance adapter in another embodiment of the present invention.
Figure 62:
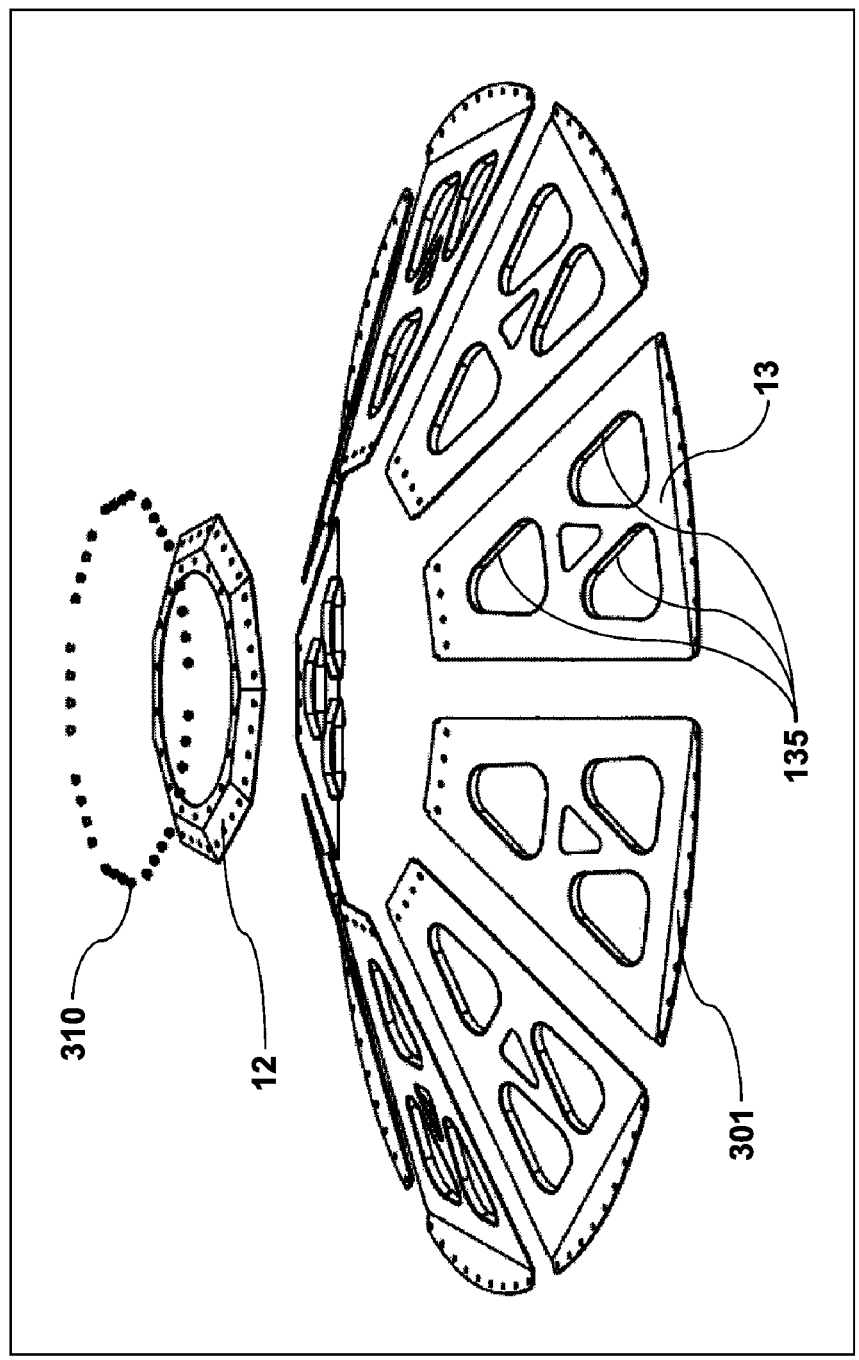
FIG. 62 is a perspective exploded view of the space appliance adapter in another embodiment of the present invention.

A space appliance adapter according to a thirteenth embodiment in the present invention is shown in FIG. 61. A perspective exploded view of the space appliance adapter is shown in FIG. 62. Basic structure in this embodiment is the same as the basic structure in the twelfth embodiment. Therefore, only differences are explained. Explanation of other portions is omitted. Concerning reference numerals and signs in the drawings, the same reference numerals and signs as the reference numerals and signs in the twelfth embodiment are sometimes used.

FIG. 61 shows a perspective view of the space appliance adapter according to this embodiment. In the adapter for space according to this embodiment, application to a carrier rocket or the like having a diameter larger than the diameter of the space appliance adapter in the twelfth embodiment is assumed. A plurality of rib structure sections 135 are provided to secure rigidity of the divided bodies 13 and improve accessibility.

The divided bodies 13 include a connecting section 301 equivalent to the second structure 20 connected to the space transport aircraft in the twelfth embodiment. A reduction in weight is achieved while securing rigidity.

The through-holes 130 are suitably provided large for a reduction in weight. However, it is difficult to secure rigidity. Therefore, in an embodiment shown in FIG. 61, desire rigidity is secured by providing three triangular through-holes 130 provided with the rib structure sections 135 such that the outer peripheral shape of the through-holes 130 is a substantially triangular shape along the external shape of the divided bodies 13 and forming supporting sections 302 for securing rigidity among the through-holes 130.

Note that a through-holes 131 are holes provided for a reduction in weight. The through-hole 131 is provided in a part equivalent to the center portion with respect to the three through-holes 130 where contribution to strength is low. The through-holes 131 are suitably set in a triangular shape opposite to the triangular shape of the through-holes 130 such that the width of the supporting sections 302 can be secured to a certain degree.

Note that, as in the thirteenth embodiment shown in FIG. 61, it is essential not to match a frequency in an airframe shaft direction generated by the carrier rocket during actuation and an eigenfrequency of the space appliance adapter. In general, it is desirable to set the eigenfrequency of the space appliance adapter high. A conical shape is suitable to reduce weight and secure a high eigenfrequency in the airframe shaft direction.

An avionics, a thruster, a propellant storage tank, and the like can be mounted in an internal space of the conical shape.

For the connection of the upper surface sections 12 and the divided bodies 13 and the connection of the divided bodies 13 described above, a connection method having desired strength such as rivets, welding (spot welding, TIG welding, and the like), and bonding may be used. In this embodiment, the upper surface sections 12 and the divided bodies 13 and the divided bodies 13 are fixed by rivets 310.

Further, when the strength is insufficient in the connection method, it is suitable to optionally concurrently use the connection methods such as concurrent use of the rivets and the bonding.

Figure 63:
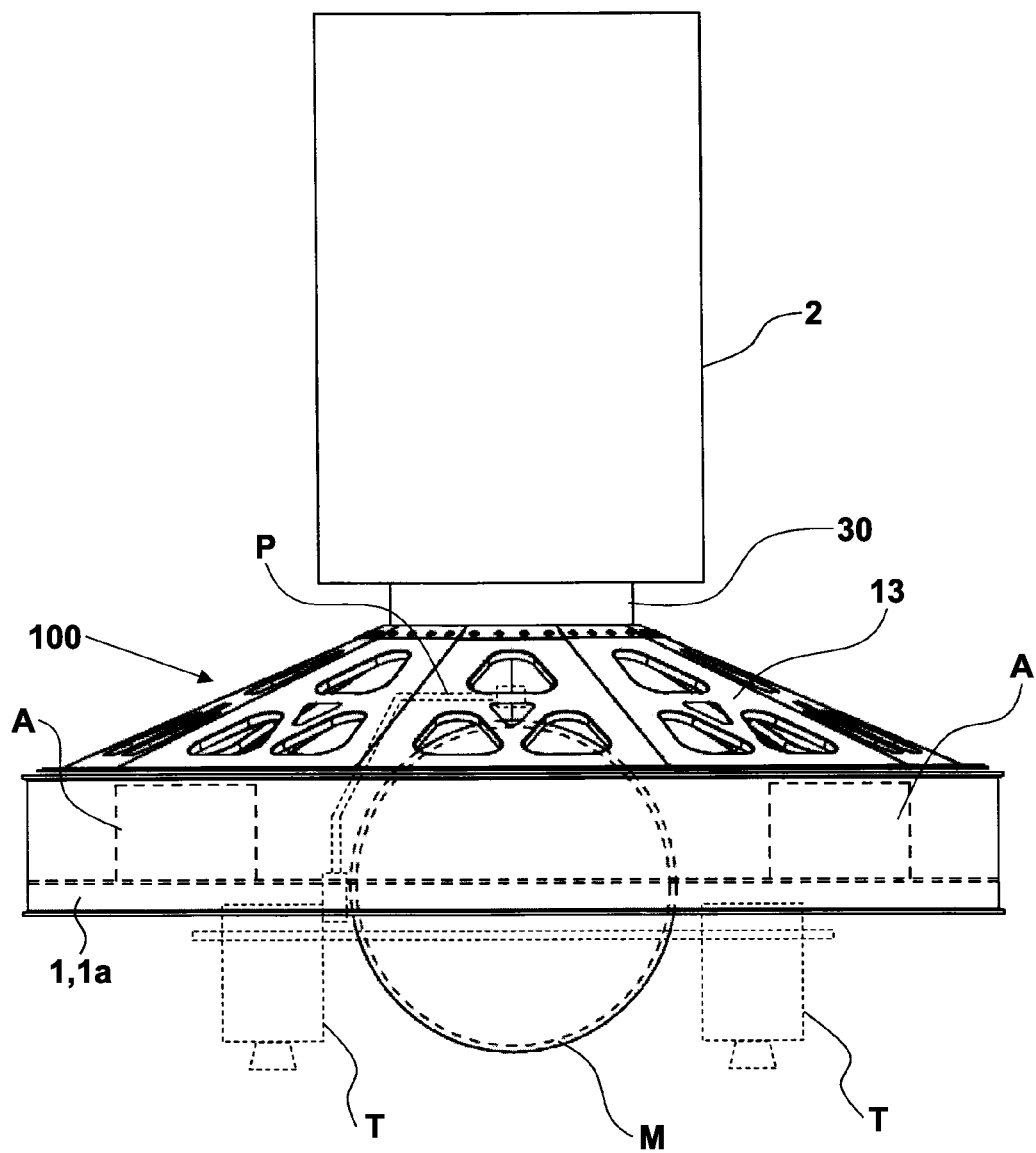
FIG. 63 is a side view showing a joined state of the space appliance adapter in another embodiment of the present invention.

An example of a space appliance applied with the space appliance adapter in this embodiment is shown in FIG. 63. The artificial satellite 2 is mounted on an upper part of the adapter 100 through the separating device 30. The main body 1a of the space transport aircraft 1 such as a rocket is connected to a lower part of the adapter 100 through the connecting section 301.

As shown in FIG. 63, a part of a propellant storage tank M of the space transport aircraft 1 is housed on the inside of the adapter 100. In this embodiment, the electronic device A such as an avionics is housed in the main body 1a of the space transport aircraft 1. However, the electronic device A may be provided in a space in the adapter 100.

In this embodiment, a predetermined space is provided between the upper end portion of the adapter 100 and the propellant storage tank M. In this space, as shown in FIG. 63, a part of a pipe P connecting the propellant storage tank M and a thruster T is provided. Further, in this embodiment, an inclination angle formed by the divided bodies 13 is set such that a predetermined gap is formed from an upper part of the pipe to the upper end portion of the adapter 100.

A predetermined space may be provided in an upper part of the adapter 100 for the purpose of not matching the eigenfrequency of the space transport aircraft 1 and the eigenfrequency of the adapter 100 as explained above. On the other hand, when the eigenfrequency of the space transport aircraft 1 and the eigenfrequency of the adapter 100 do not coincide, the inclination angle of the divided bodies 13 may be adjusted such that the upper end portion of a housed object represented by the propellant storage tank M or the like approaches the upper end portion of the adapter 100.

Fourteenth Embodiment

An embodiment of the present invention is explained with reference to FIG. 64 to FIG. 75. Note that the coupling/uncoupling devices and the separating devices explained in the embodiments can be suitably used in a space appliance adapter, which is an example of a separation target object explained in this embodiment.

A space airframe structure according to a fourteenth embodiment of the present invention is explained with reference to FIG. 64 to FIG. 78.

Figure 64:
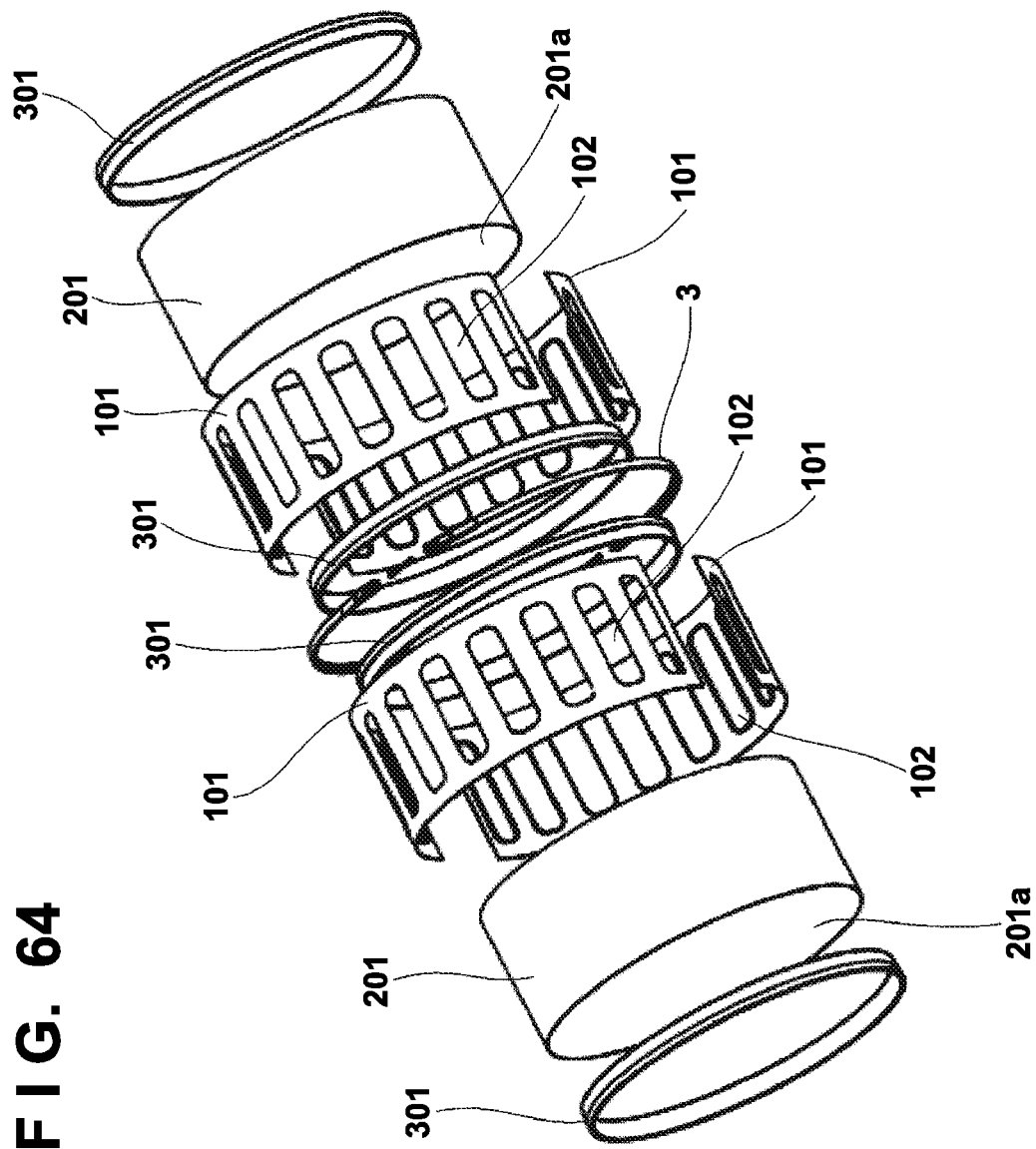
FIG. 64 is an exploded perspective view of a space airframe structure in another embodiment of the present invention.
Figure 65:
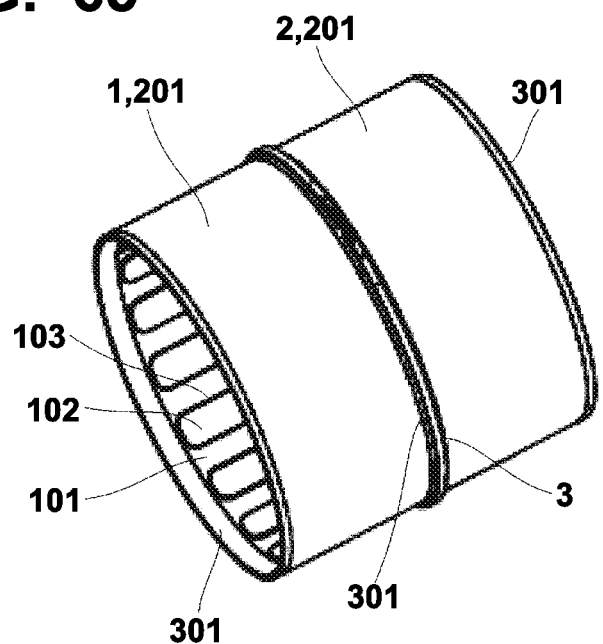
FIG. 65 is a joined diagram of the space airframe structure in another embodiment of the present invention.

As shown in FIG. 64, in the space airframe structure in this embodiment, as explained in detail below, rib structure members 101 functioning as reinforcing members are respectively joined to inner circumferential surfaces 201a of a pair of cylindrical bodies 201 (hereinafter referred to as bodies as well) coupled such that internal spaces thereof communicate in one direction.

Fixing members 301 having a ring shape are respectively joined to both end portions of the bodies 201. A first structure 1 and a second structure 2 obtained by joining rib structure members 101 and the fixing members 301 to the bodies 201 are coupled to each other by, for example, a joining member 3 having a separable band structure (see FIG. 65).

Figure 66:
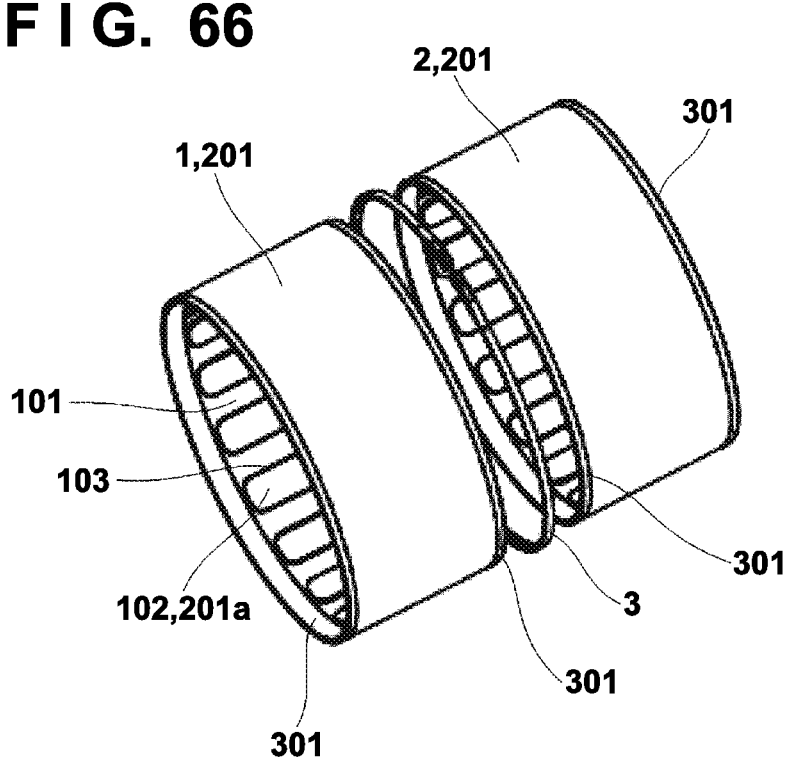
FIG. 66 is an unjoined diagram of the space airframe structure in another embodiment of the present invention.

In this embodiment, it is possible to completely separate the first structure 1 and the second structure 2 by releasing a coupled state of the joining member 3 as shown in FIG. 66.

For example, in this embodiment, the bodies 201 are formed of a metal plate such as aluminum and respectively provided in the same external shape. These bodies 201 can be manufactured by, for example, coupling both ends of one aluminum plate to each other. However, besides, the bodies 201 may be manufactured as an integrated object by shaving. Note that a material forming the bodies 201 is not limited to the metal material explained above and may be other materials such as a carbon fiber. The bodies 201 may be configured by a composite body obtained by combining a different plurality of materials.

The rib structure members 101 are respectively joined to inner circumferential surfaces 201a of such bodies 201. For example, in this embodiment, these rib structure members 101 are configured by a pair of tabular members divided into two (see FIG. 64). Consequently, it is easy to join the rib structure members 101 to the bodies 201.

Figure 68:
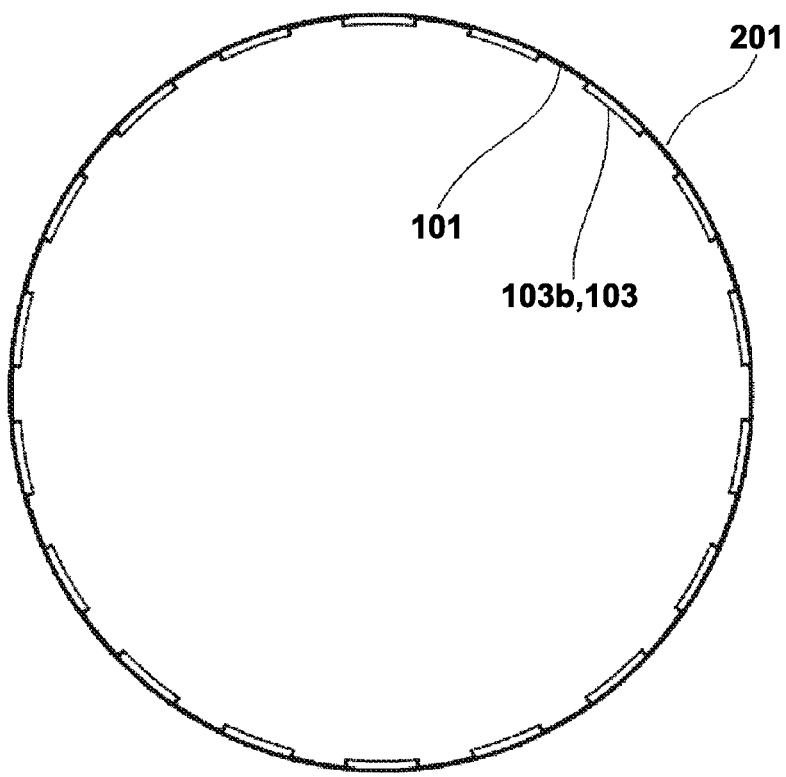
FIG. 68 is a sectional view of the space airframe structure in another embodiment of the present invention.
Figure 70:
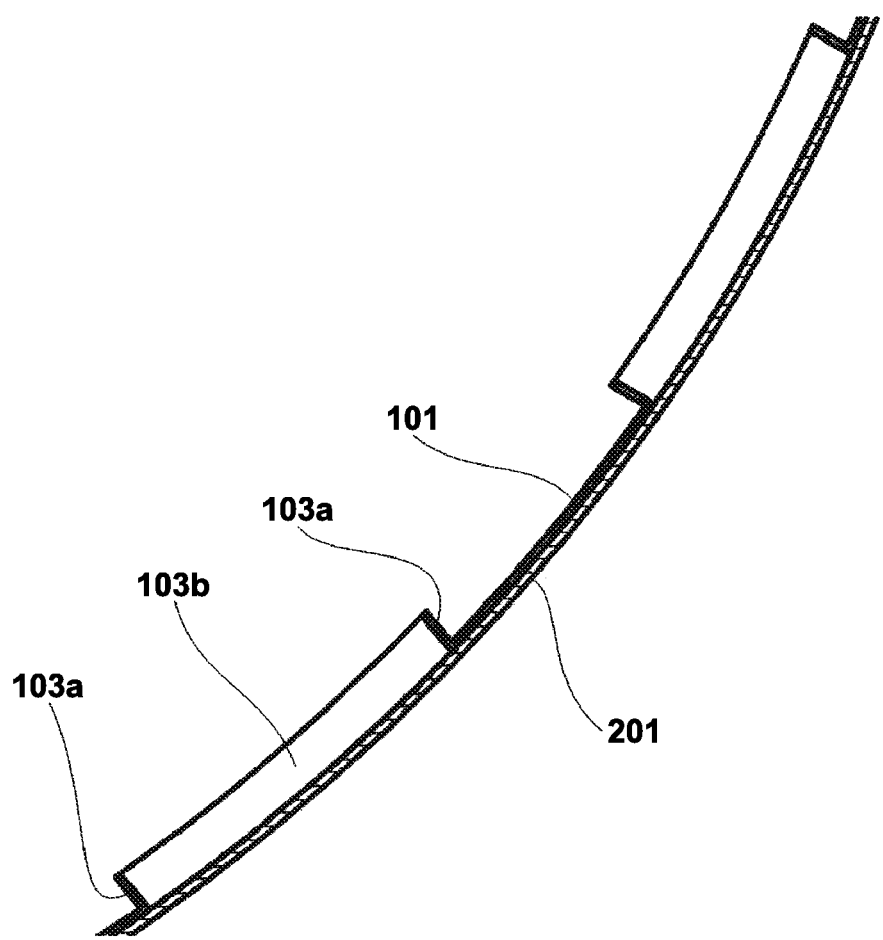
FIG. 70 is a main part enlarged view of the space airframe structure in another embodiment of the present invention.

Further, as shown in FIG. 68, FIG. 69, and FIG. 70, a plurality of substantially rectangular through-holes 102 are provided in one rib structure member 101. Further, rib structure sections 103 are integrally provided at opening peripheral edge portions of the through-holes 102. In this embodiment, the shapes of the through-holes 102 provided in the rib structure members 101 are the same shape. However, different shapes may be combined.

In the rib structure members 101 in this embodiment, the annular rib structure sections 103 continuous along the opening peripheral edges of the through-holes 102 are respectively formed by, for example, applying bending, in a convex shape, to a tabular member, which has thickness of a degree for which machining such as bending is possible, by, while punching or molding a part of the tabular member to form the plurality of through-holes 102, integrally drawing the opening peripheral edge portions of the through-holes 102. The rib structure sections 103 in this embodiment are erected in a convex shape in a direction parallel to the thickness direction of the rib structure members 101, that is, a piercing-through direction of the through-holes 102. Note that the thickness of the tabular member configuring such rib structure members 101 may be formed smaller than, for example, the thickness of the rib structure sections 103 but may be formed equal to the thickness of the rib structure sections 103.

In the plurality of rib structure members 101 in this embodiment, the plurality of rib structure sections 103 are provided uniformly and at equal intervals, although the plurality of rib structure members 101 have a thin plate shape as a whole. Therefore, strength does not fluctuate and rigidity is uniformly improved. Further, since the plurality of through-holes 102 are provided, the rib structure members 101 contribute to a reduction in weight as well. That is, in this embodiment, weight can be adjusted according to the size of the through-holes 102. Strength can be adjusted according to the height, the thickness, and the like of the rib structure sections 103.

Further, the rib structure sections 103 are respectively provided to surround the substantially rectangular through-holes 102 extending in the latitudinal direction of the tabular member. Therefore, the rib structure sections 103 are integrally configured by coupling, in rib structure sections 103c at four corners, rib structure sections 103a of long sides and rib structure sections 103b of short sides.

Consequently, in a state in which the rib structure members 101 are joined to the bodies 201 and integrated, the rib structure sections 103a of the long sides form beam structure in a communicating direction of the bodies 201. On the other hand, both ends of the rib structure sections 103b of the short sides are coupled to the rib structures sections 103a of the long sides to form beam structures in the circumferential direction of the bodies 201. A plurality of such rib structure sections 103 are provided side by side in the circumferential direction of the bodies 201. Further, the rib structure sections 103a of the long sides and the rib structure sections 103b of the short sides are coupled by the rib structure sections 103c at the four corners. Therefore, the rigidity of the structures 1 and 2 can be markedly improved.

The rib structure sections 103 in this embodiment are formed in structure in which the rib structure sections 103a of the long sides and the rib structure sections 103b of the short sides are coupled to each other by the rib structure sections 103c having an R shape as the shape of the four corners, that is, configured by arcuate corner sections. Consequently, it is possible to prevent stress from concentrating on the four corners of the rib structure sections 103 when external stress is applied. That is, stress distribution is possible. Note that, naturally, the present invention is not limited to this. The four corners of the rib structure sections 103 may be coupled at a right angle or may be divided to be discontinuous.

Figure 67:
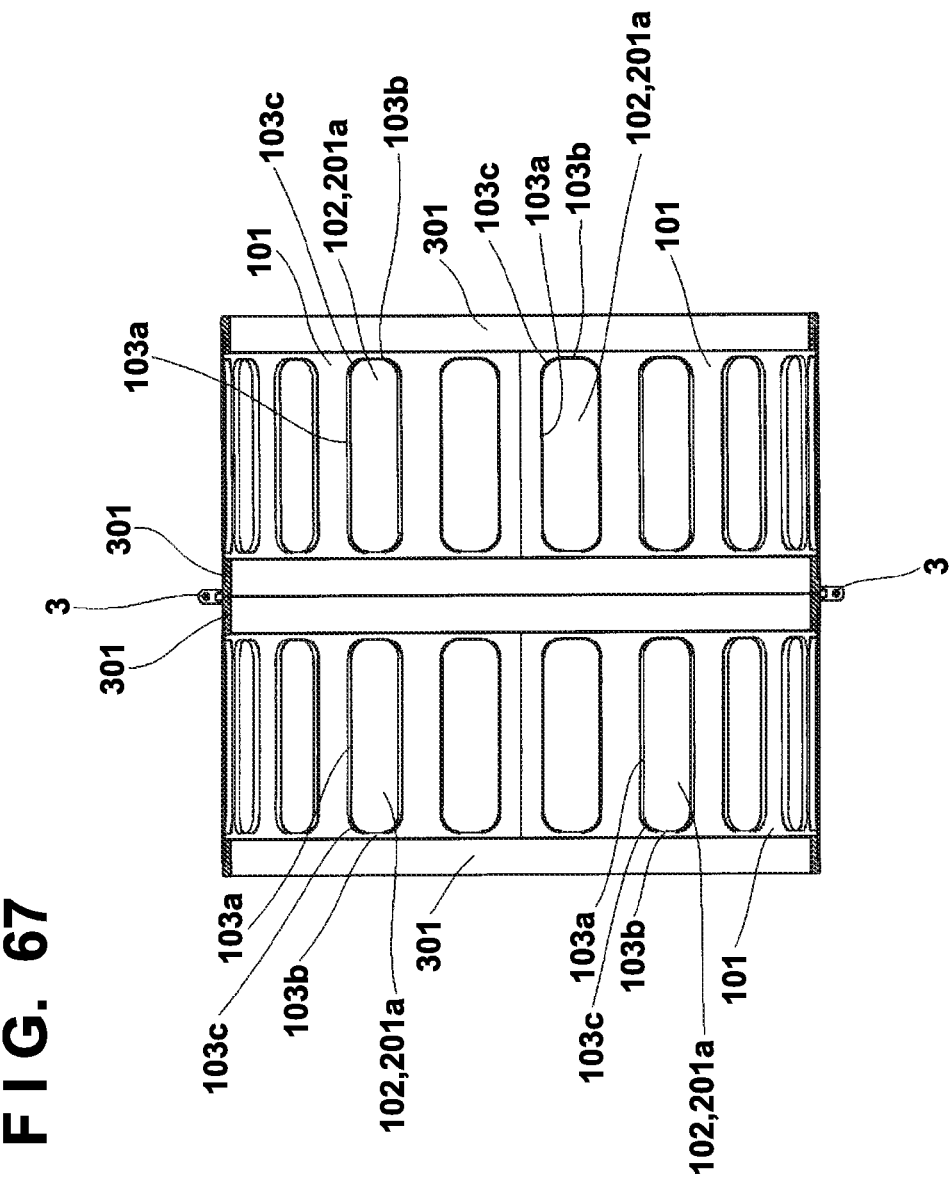
FIG. 67 is a sectional view of the space airframe structure in another embodiment of the present invention.

In FIG. 67, a sectional view of the space airframe structure in which the bodies 201 are reinforced by the rib structure members 101 explained above is shown. As shown in FIG. 67, in the first structure 1 and the second structure 2 (hereinafter referred to as structures as well) coupled to each other by the joining member 3, fixing members 301 are respectively inserted and fit in opening edge portions of both the end portions. Therefore, the fixing members 301 also play a function of reinforcing members.

End portions of the joining member 3 on the coupling side of the first structure 1 and the second structure 2 are configured by the fixing members 301. The fixing members 301 in contact with the joining member 3 are tightened to the radial direction inner side by the joining member 3. Consequently, the structures 1 and 2 are joined with each other.

That is, as shown in FIG. 67, in a state in which the fixing member 301 of the first structure 1 and the fixing member 301 of the second structure 2 are opposed to each other, the joining member 3 tightens and holds, from the radial direction outer side, the fixing members 301 in contact with the joining member 3. Therefore, joining substantially without a gap is possible.

Consequently, the structures 1 and 2 are in a firmly substantially integrated state by the joining member 3. If the joining member 3 is released from the state, the structures 1 and 2 are separable from each other.

Further, in the structures 1 and 2, the surfaces on the opposite side of the side where the rib structure sections 103 project in the rib structure members 101 explained above are joined to the inner circumferential surface 201a. Consequently, the structures 1 and 2 have structure in which the rib structure sections 103 of the rib structure members 101 project toward the radial direction inner side.

For example, in this embodiment, the rib structure members 101 are joined, separately from the fixing members 301, to portions sandwiched by the fixing members 301 other than portions in which the fixing members 301 are inserted and fit in the bodies 201. The fixing members 301 and the rib structure members 101 may not be joined to each other. However, the fixing members 301 and the rib structure members 101 may be joined to each other by, for example, welding or an adhesive.

Further, as shown in FIG. 70, the rib structure members 101 are joined with the bodies 201 by, for example, joining by an adhesive, welding, or the like or fastening by bolts and nuts, rivets, or the like on joining surfaces with the bodies 201 excluding the through-holes 102 of the rib structure sections 103.

In this way, in the space airframe structure in this embodiment, the structures 1 and 2 are respectively configured by the bodies 201 reinforced by the rib structure members 101 and the fixing members 301. The structures 1 and 2 are separably coupled by the joining member 3.

Therefore, in the joined state, a reinforcement relation between the structures 1 and 2 are synergistically acts and strength of the structures 1 and 2 as a whole is improved. Even if the joining is released and the structures 1 and 2 are separated from that state by the joining member 3, the structures 1 and 2 are individually reinforced by the rib structure members 101 and the fixing members 301 each other. Therefore, the structures 1 and 2 can respectively maintain sufficient rigidity even after the separation.

In this embodiment, the rib structure members 101 divided into two are joined in the structures 1 and 2. Therefore, it is easy to insert and dispose the rib structure members 101 and join the rib structure members 101 to the bodies 201. Note that the rib structure members 101 divided into two may not be coupled in the bodies 201. However, the respective rib structure members 101 may be coupled in order to improve rigidity. Note that, in this embodiment, the rib structure members 101 are divided into two. However, the rib structure members 101 may be divided into three or more or may not be divided.

Further, in this embodiment, as explained above, the bodies 201 can be reduced in weight and can be effectively reinforced with a simple configuration by the rib structure members 101. Therefore, it is also possible to achieve a further reduction in weight while securing desired strength by, for example, further reducing the thickness of the bodies 201 or further reducing the thickness of the tabular members configuring the rib structure members 101 or changing the numbers, the shapes, the sizes, the positions, and the like of the through-holes 102 and the rib structure sections 103 as appropriate.

The present invention is explained in detail above on the basis of the fourteenth embodiment. However, the present invention is not limited to the fourteenth embodiment explained above.

In the fourteenth embodiment explained above, the rib structure sections 103 are configured by the rib structure sections 103a of the long sides and the rib structure sections 103b of the short sides. However, naturally, the present invention is not limited to this. For example, the rib structure sections may be configured by only the rib structure sections of the long sides or may be configured by only the rib structure sections of the short sides.

Figure 71:
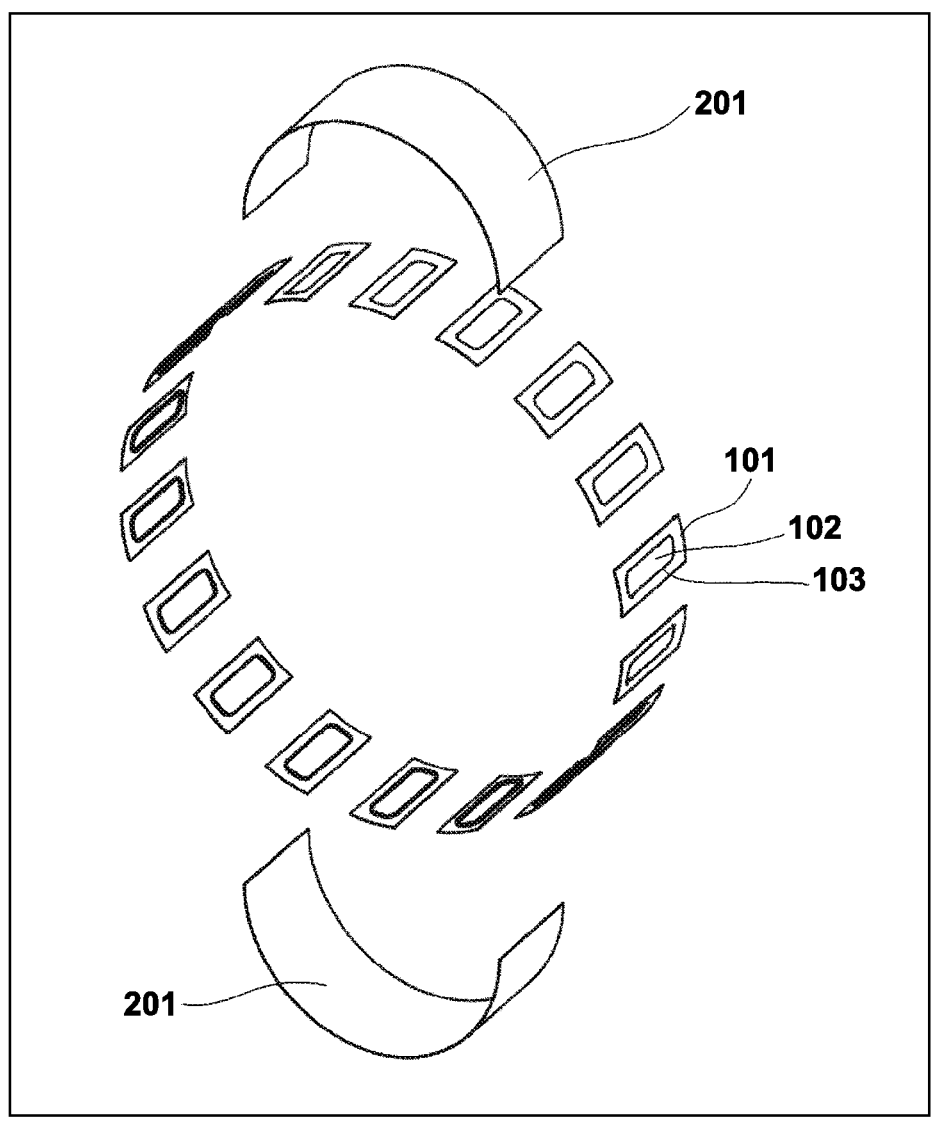
FIG. 71 is an exploded perspective view of the space airframe structure in another embodiment of the present invention.
Figure 72:
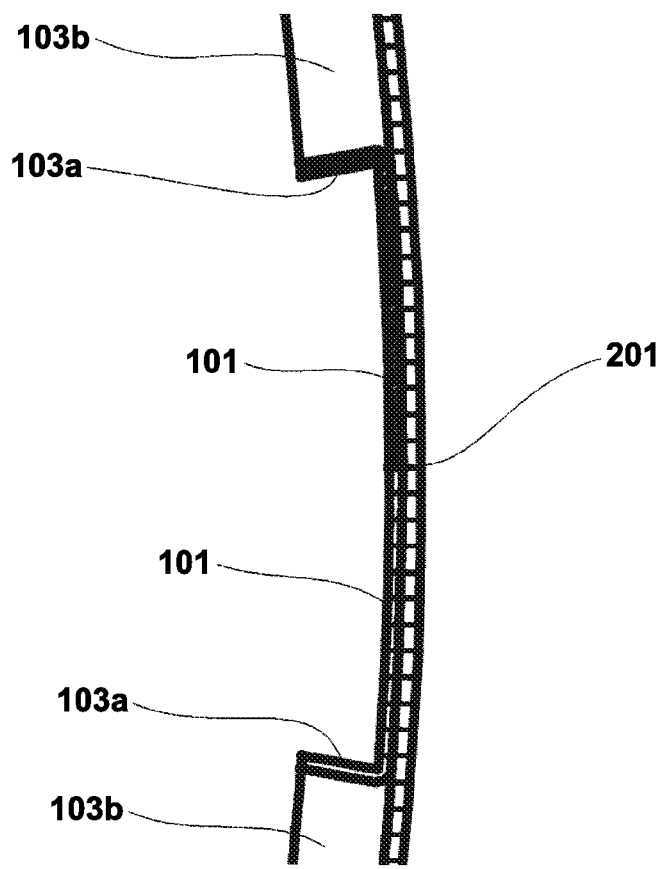
FIG. 72 is a main part enlarged view of the space airframe structure in another embodiment of the present invention.
Figure 73:
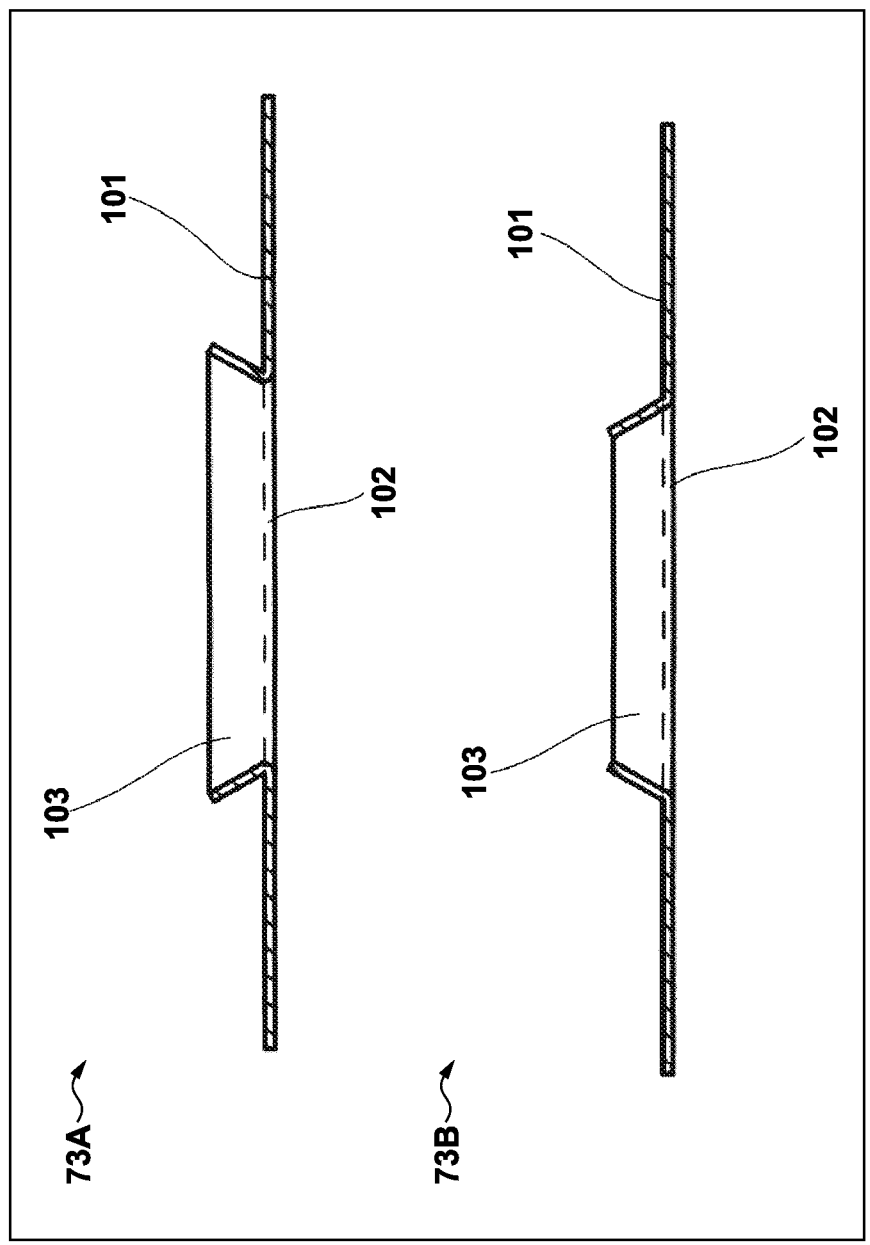
FIG. 73 is a main part enlarged view of the space airframe structure in another embodiment of the present invention.

In the fourteenth embodiment explained above, the structure is illustrated and explained in which the plurality of rib structure sections 103 are provided in the one tabular member. However, as shown in FIG. 71, the plurality of rib structure members 101 including the rib structure sections 103 may be joined to the bodies 201. In this case, as shown in FIG. 72, the plurality of rib structure members 101 including the rib structure sections 103 are respectively joined with the bodies 201. However, the rib structure members 101 adjacent to each other can be molded even if the rib structure members 101 are not joined by an adhesive, welding, or the like or fastened by bolts and nuts, rivets, or the like.

In the fourteenth embodiment explained above, the structures 1 and 2 are respectively explained as having the same configuration. However, naturally, the present invention is not limited to this. The structures 1 and 2 may respectively have different configurations. In this case, the configuration of the present invention only has to be applied to at least one structure. That is, the present invention is not limited to the space airframe structure including the structures 1 and 2 separably joined to each other. The present invention may be applied to, for example, a reinforcing structure of inseparable bodies.

Further, in the fourteenth embodiment explained above, the structure is explained in which the rib structure sections 103 convex in the direction parallel to the thickness direction of the rib structure members 101 (at a right angle) are provided. However, naturally, the present invention is not limited to this. For example, as shown in a configuration example A and a configuration example B in FIG. 73, a rib structure section 103 may be formed in a structure bent in a direction intersecting the thickness direction of the rib structure member 101 (the piercing-through direction of the through-hole 102). However, the strength of the rib structure member 101 can be improved by forming structure in which, as shown in the configuration example A in FIG. 73, an angle formed by one surface on a side of the rib structure member 101 where the rib structure section 103 is convex and the rib structure section 103 is an acute angle, that is, the rib structure section 135 tilts to the one surface side of the rib structure member 101.

Figure 74:
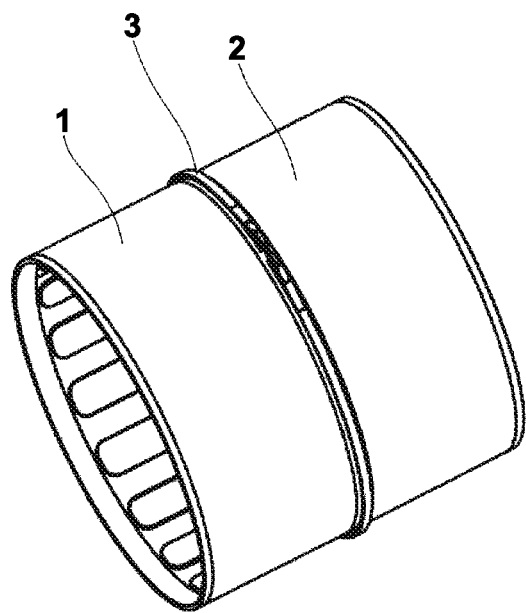
FIG. 74 is a perspective view of the space airframe structure in another embodiment of the present invention.
Figure 75:
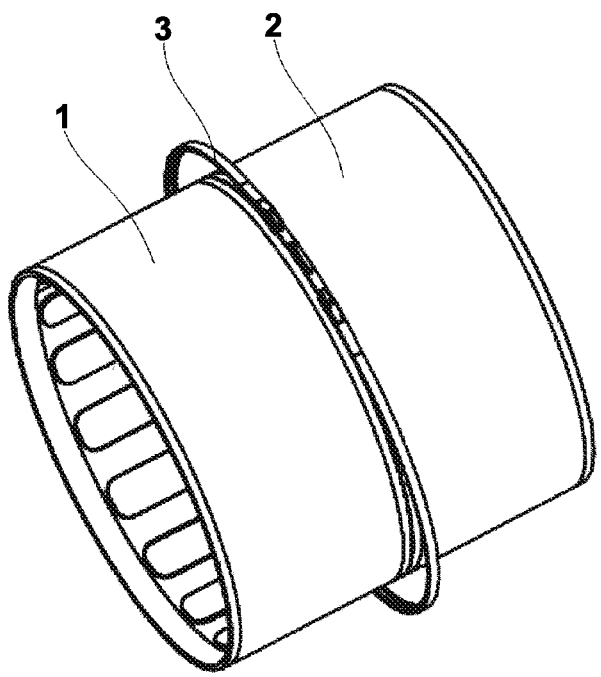
FIG. 75 is a perspective view of the space airframe structure in another embodiment of the present invention.
Figure 76:
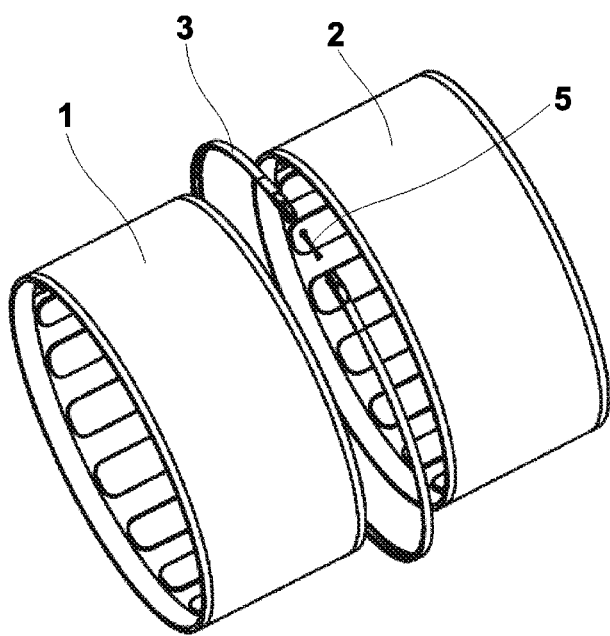
FIG. 76 is a perspective view of the space airframe structure in another embodiment of the present invention.
Figure 78:
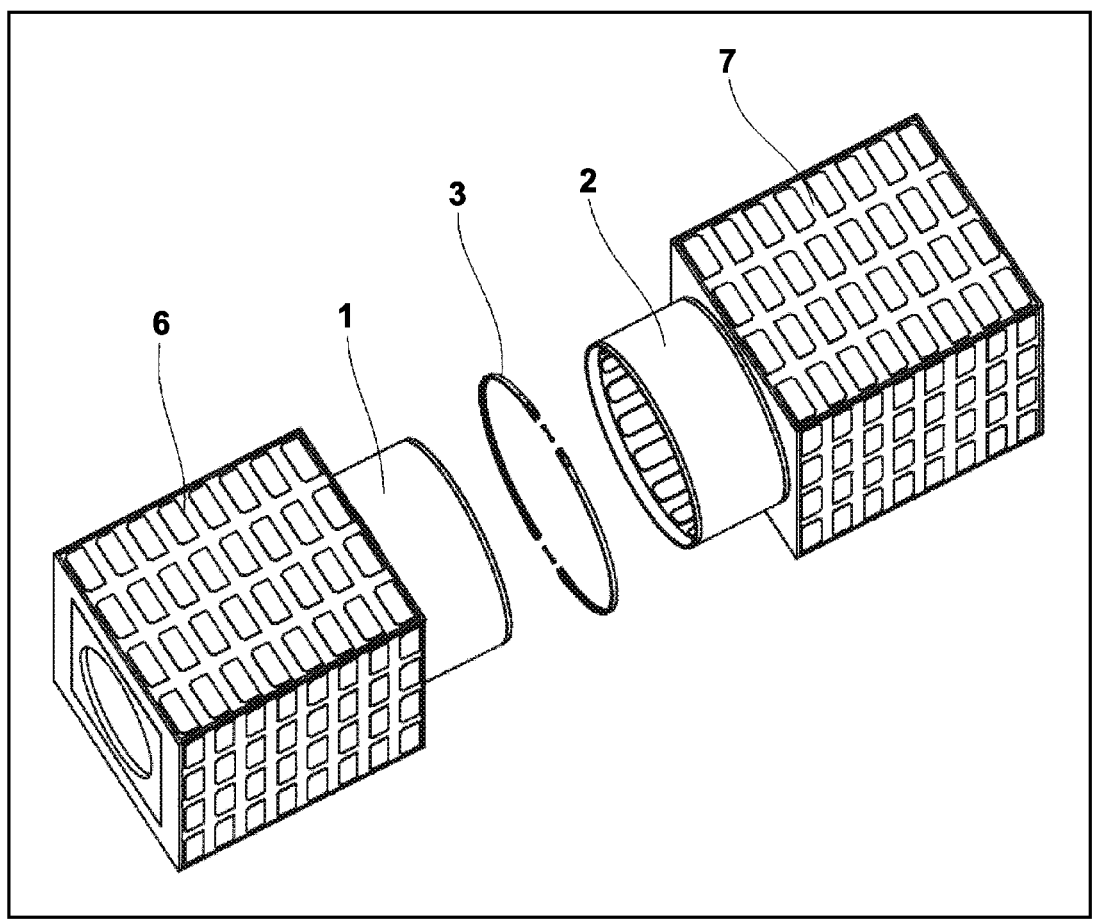
FIG. 78 is a perspective view of an example of the space airframe structure in another embodiment of the present invention.

In the space airframe structure in the fourteenth embodiment explained above, from a state in which the structures 1 and 2 are coupled by the joining member 3 as shown in FIG. 74, joining pins 5 included in the joining member 3 shown in FIG. 75 are uncoupled by gunpowder, a motor, manual operation, or the like. The structures 1 and 2 can be disconnected as shown in FIG. 76. Such a coupling and separating mechanism can be applied to the structure of a separating device of a joint structure in a space airframe in which two artificial satellites 6 and 7 are coupled shown in FIG. 77 and FIG. 78. Besides, the coupling and separating mechanism can also be developed into, for example, the structure (a joint structure) of a separating device of a space airframe such as a multistage rocket or the like.

(Note 1)

The present invention includes:

an engaging section that engages a first member and a second member; and a driving section for releasing the engagement by the engaging section, wherein the engaging section includes:

a columnar member configured by a divided pair of semicircular members; and a pair of coupling members forming a circular holding section that is in contact with the columnar member along an outer circumferential surface of the columnar member and holds the columnar member, the circular holding section includes a circular inner surface section with which an outer circumferential surface of the columnar member is in slide contact, the circular inner surface section being formed from inner circumferential surfaces of a semicircular section in one coupling member and a semicircular section in the other coupling member by disposing the semicircular section in one coupling member and the semicircular section in the other coupling member to be opposed to each other so that the inner circumferential surfaces are continuous, the columnar member includes, on the basis of an uncoupled position, as a reference, where a contact surface of the pair of coupling members and a dividing surface of the columnar member are flush with each other, a first semicircular fixed shaft that forms a semicircle along the circular inner surface section and a second semicircular fixed shaft that forms another semicircle and forms a hole for coupling to the driving section, the driving section includes a driving section for unlocking and a driving section for separation, the driving section for unlocking includes a drive shaft for coupling to one of the columnar member and a housing for coupling to the first member, the driving section for separation includes a spring supporting member coupled to the second member and a tension spring for separating one of the pair of coupling members after the release, when the first member and the second member are engaged, a state in which the columnar member is inserted into the pair of coupling members is maintained in a state in which the contact surface of the pair of coupling members and the dividing surface of the columnar member are not flush with each other, and when the first member and the second member are disengaged, the drive shaft and the second semicircular fixed shaft coupled to the drive shaft turn and the contact surface of the pair of coupling members and the dividing surface of the columnar member become flush with each other, the first member and the second member are not restrained with respect to a tangential direction of the dividing surface, the tension spring contracts, one of the pair of coupling members moves in the tangential direction of the dividing surface, and the first member and the second member are disengaged.

A coupling/uncoupling device including:

a columnar member configured by a divided pair of semicircular members; and a pair of coupling members forming a circular holding section that is in contact with the columnar member along an outer circumferential surface of the columnar member and holds the columnar member, wherein the circular holding section includes a circular inner surface section with which an outer circumferential surface of the columnar member is in slide contact, the circular inner surface section being formed from inner circumferential surfaces of a semicircular section in one coupling member and a semicircular section in the other coupling member by disposing the semicircular section in one coupling member and the semicircular section in the other coupling member to be opposed to each other so that the inner circumferential surfaces are continuous, and the columnar member is configured to be rotatable in both clockwise and counterclockwise directions along the circular inner surface section about a reference position where a contact surface of the pair of coupling members and a dividing surface of the columnar member are flush with each other.

The coupling/uncoupling device including a restricting section that limits a rotation angle of the columnar member, wherein the circular holding section is configured to be capable of holding the columnar member in any direction in which the columnar member is in contact with the circular inner surface section.

The coupling/uncoupling device wherein the restricting section is provided on a normal passing through the columnar member on the contact surface of the coupling member in the coupling member.

The coupling/uncoupling device wherein a coupled state of the pair of coupling members is retained by stopping the columnar member in a position to which the columnar member is rotated counterclockwise about a reference position where the contact surface of the pair of coupling members and the dividing surface of the columnar member are flush with each other, and the coupled state is released by rotating the columnar member clockwise.

The coupling/uncoupling device wherein a coupled state of the pair of coupling members is retained by stopping the columnar member in a position to which the columnar member is rotated clockwise about a reference position where the contact surface of the pair of coupling members and the dividing surface of the columnar member are flush with each other, and the coupled state is released by rotating the columnar member counterclockwise.

The coupling/uncoupling device wherein a coupled state of the pair of coupling members can be retained irrespective of whether the columnar member is rotated clockwise or counterclockwise and stopped about a reference position where the contact surface of the pair of coupling members and the dividing surface of the columnar member are flush with each other.

The coupling/uncoupling device wherein a coupled state of the pair of coupling members is released by rotating the columnar member in a direction in which the pair of coupling members moves when the pair of coupling members is separated.

(Note 2)

If a force for separating the coupling/uncoupling device depends on a restoration force of a separation target object, it is likely that a separating operation cannot be completed when the restoration force of the separation target object disappears halfway in the separating operation.

On the other hand, the coupling/uncoupling device according to the present invention is a coupling/uncoupling device used for separation of a flight body, the coupling/uncoupling device including:

a separably joined pair of separating mechanisms; and a driving section that generates a driving force for uncoupling the separating mechanisms, wherein the coupling/uncoupling device includes urging means for applying, to the separating mechanisms, an urging force in a direction in which the separating mechanisms are separated.

With this configuration, even if a restoration force of a separation target object disappears or decreases during separation, the coupling can be released by the urging force of the urging means.

The coupling/uncoupling device wherein the separating mechanism is configured by:

a separably joined pair of coupling members; and an intermediate member, one side of which is attached to the coupling member and another side of which is attached to the separation target object, the driving section is attached to a first intermediate member in the intermediate member, and the urging means is attached to a second intermediate member in the intermediate member.

The coupling/uncoupling device wherein the coupling member is slidably engaged with the intermediate member by an engaging member, and the urging means is provided in the engaging member.

The coupling/uncoupling device wherein the urging means is provided inside the intermediate member.

The coupling/uncoupling device wherein the pair of separating mechanisms includes a first coupling member and a second coupling member that is opposed to each other in a direction in which the separating mechanisms are separated and is disposed across a separating surface, and the urging means is an elastic member that is provided across the first coupling member and the second coupling member on the separating surface and applies an urging force in a direction in which the separating mechanisms are separated.

The coupling/uncoupling device wherein the urging means are respectively provided at both end portions in a direction orthogonal to a direction in which the separating mechanisms are separated.

The coupling/uncoupling device wherein the urging means is disposed in one of the pair of separating mechanisms, and a separating operation can be performed according to an urging force of the urging means without depending on an external force acting on the separating mechanisms.

(Note 3)

A space appliance adapter that supports a space appliance on an inside of a transport aircraft for outer space, the space appliance adapter being configured by annularly joining a plurality of divided bodies, wherein
each of the divided bodies includes:
a through-hole extending through a tabular member configuring the divided body in a thickness direction; and
a rib structure section formed in a part of the tabular member to surround an opening of the through-hole at an opening peripheral edge portion of the through-hole.

The space appliance adapter wherein the space appliance adapter is configured by a first structure that couples the plurality of divided bodies in a cylinder shape and on which the space device is separably mounted and a second structure that couples the first structure and the transport aircraft to each other.

The space appliance adapter wherein
the first structure includes a polyhedron structure, each one surface of which is configured by one of the divided bodies, and
the second structure includes a ring shape to which an end portion of the first structure is coupled and that is provided to surround an end portion of the transport aircraft side.

A space transport aircraft wherein the space appliance adapter is fixed to a main body of the space transport aircraft that transports an artificial satellite to outer space and uses a coupling structure that separably couples the artificial satellite to the main body.

An artificial satellite comprising the space appliance adapter, wherein the space appliance adapter is mounted on a coupling structure separably coupled to a main body of a space transport aircraft.

The space appliance adapter wherein a plurality of the through-holes are provided such that an outer peripheral shape of the through-holes conforms to an external shape of the divided body.

(Note 4)

A space airframe structure transported to outer space, the space airframe structure including:
a pair of cylindrical bodies coupled such that internal spaces of the cylindrical bodies communicate in one direction; and
reinforcing members that are respectively joined to inner circumferential surfaces of bodies configuring the pair of cylindrical bodies and reinforce the bodies, wherein
the reinforcing member includes a through-hole extending through a tabular member configuring the reinforcing member in a thickness direction and a rib structure section formed in a part of the tabular member to surround an opening of the through-hole at an opening peripheral edge portion of the through-hole.

The space airframe structure wherein a plurality of the through-holes are provided at equal intervals in the reinforcing member.

The space airframe structure wherein the rib structure section is configured by an annular convex section continuously provided to surround the opening of the through-hole.

The space airframe structure wherein four corners of the rib structure section are coupled by arcuate corner sections.

The space airframe structure wherein thickness of the pair of cylindrical bodies is smaller than thickness of the tabular member.

The space airframe structure wherein the reinforcing member is configured by annularly coupling a plurality of tabular members.

A space airframe including the space airframe structure as a separating device.

Fifteenth Embodiment

Figure 79:
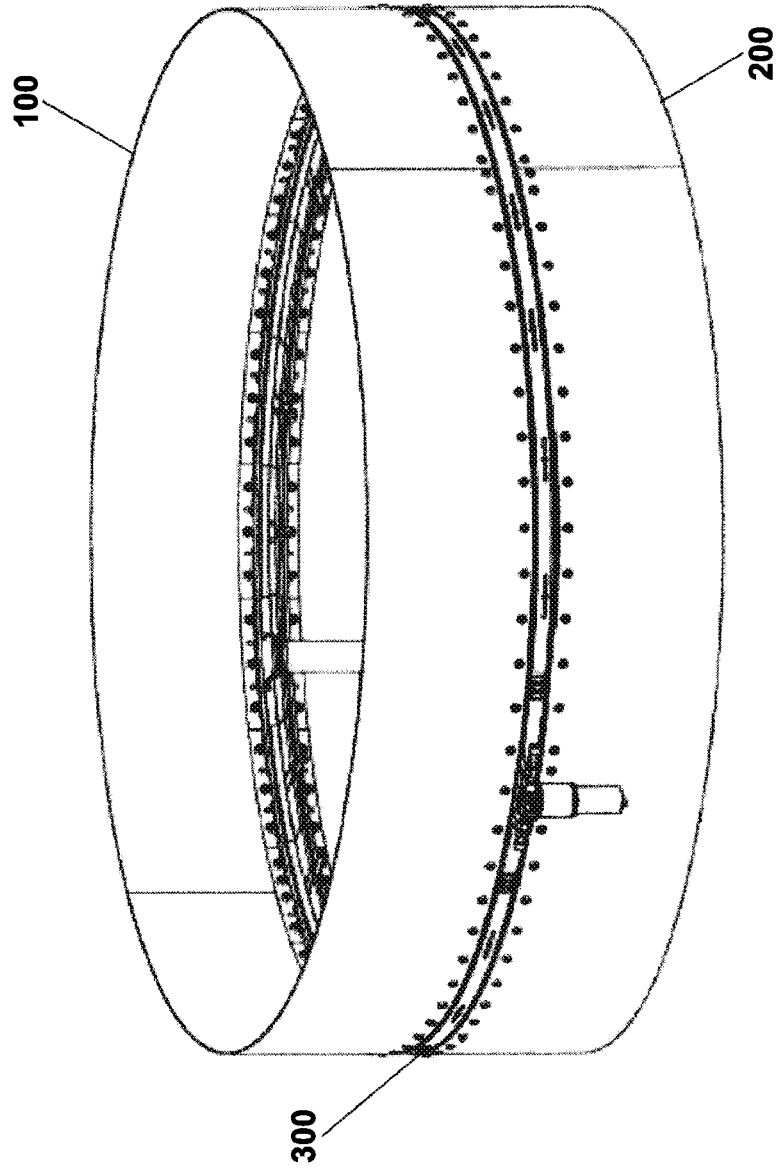
FIG. 79 is a perspective view of an annular fastening device in another embodiment of the present invention.

An annular fastening device according to an embodiment of the present invention is explained in detail with reference to the figures. As shown in a perspective view of FIG. 79, the annular fastening device according to an embodiment of the present invention is configured in a state in which an upper stage member 100 and a lower stage member 200 are set in contact with each other. An external force is applied to the upper stage member 100 and the lower stage member 200 in a ring center direction by a Maruman band 300. The upper stage member 100 and the lower stage member 200 are engaged.

Figure 80:
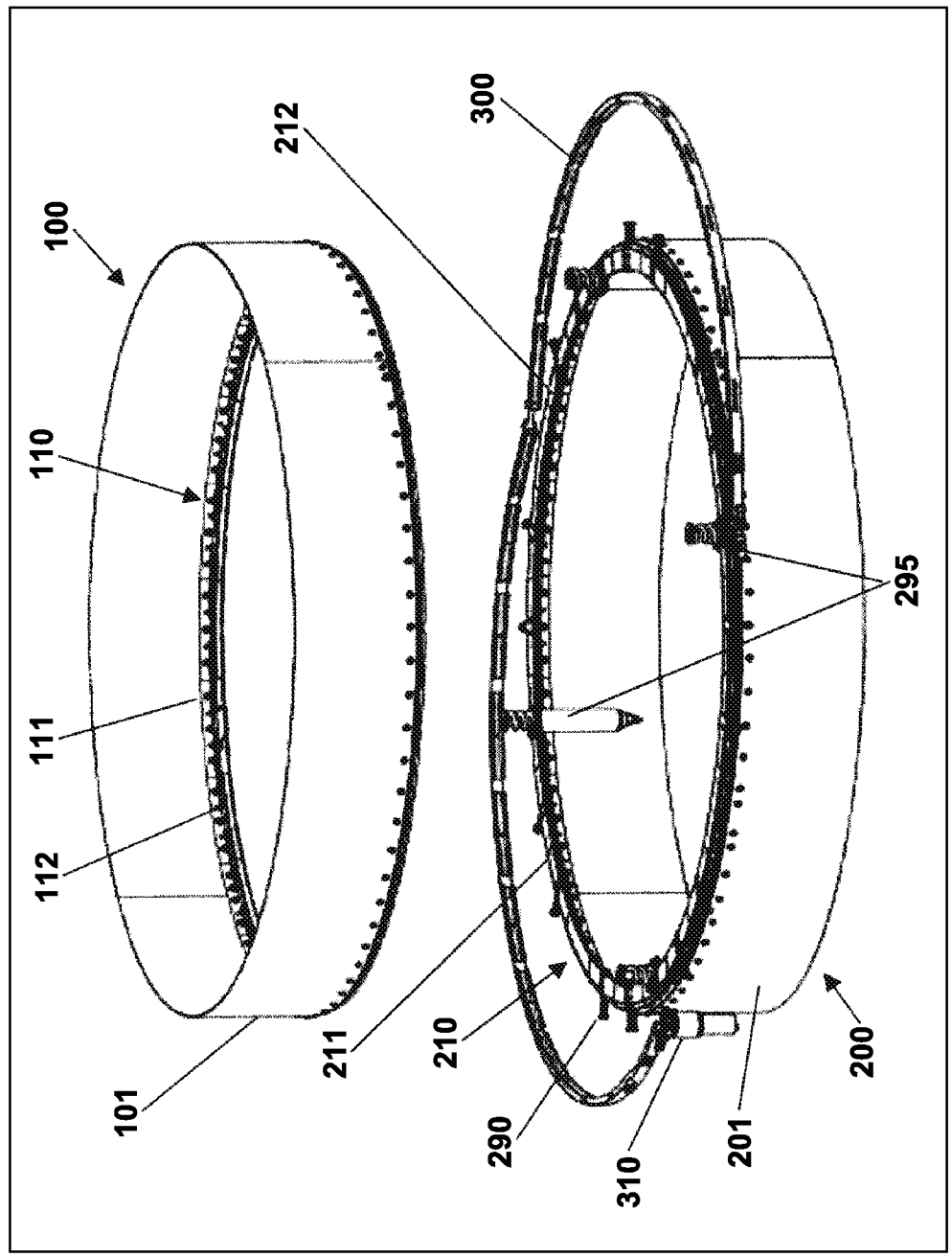
FIG. 80 is a perspective view showing an operation state of the annular fastening device in another embodiment of the present invention.

As shown in a perspective view of FIG. 80, in a state in which a separating device 310 joined to an end portion of the Maruman band 300 is actuated and the Maruman band 300 is cut, engagement by the Maruman band 300 is released. The Maruman band 300 is displaced to a ring outer side with distortion energy of the Maruman band 300 and is displaced to the ring outer side by a side spring 290 disposed in a lower stage ring 210. In this embodiment, an annular fastening device is explained that fixes the upper stage ring 110, which is an example of a fastened member fixed to an upper stage positioning ring 112, and the lower stage ring 210, which is an example of a fastened member fixed to a lower stage positioning ring 212, to an upper stage outer shell 101 and a lower stage outer shell 201, which are examples of fastening target objects, and fastens the upper stage ring 110 and the lower stage ring 210 with the Maruman band 300 functioning as a band member.

The upper stage member 100 is displaced in a center axis direction of a ring (the upward direction in FIG. 80) by elastic energy generated by a separation spring 295 disposed in the lower stage ring 210. In the following explanation, the upward direction in FIG. 80 is sometimes simply referred to as upward direction.

The lower stage member 200 is configured from the lower stage outer shell 201 and the lower stage ring 210.

The lower stage outer shell 201 is a plate molded into a cylindrical shape. The upper side of the lower stage outer shell 201 is joined to the lower stage ring 210 by screws, rivets, an adhesive, or the like. When the diameter of the ring is large, it is suitable to combine a plurality of lower stage outer shells 201 to form an integral ring. Further, when a reduction in the weight of a rocket or the like is necessary, an aluminum alloy that is excellent in moldability and is a low-density member and allows for a reduction in weight is suitable.

The lower stage ring 210 is configured by a plurality of lower stage divided rings 211 and the lower stage positioning ring 212. As shown in FIG. 80, the lower stage divided rings 211 adjacent to one another are disposed be in contact with one another in an annular shape and the lower stage positioning ring 212 is fixed to the inner side of the lower stage divided rings 211 to position the lower stage divided rings 211 and configure the lower stage ring 210. The lower stage positioning ring 212 is an example of a joining member.

The upper stage member 100 is configured from the upper stage outer shell 101 and the upper stage ring 110.

The upper stage outer shell 101 is a plate molded into a cylindrical shape. The lower side of the upper stage outer shell 101 is joined to the upper stage ring 110 by screws, rivets, an adhesive, or the like. When the diameter of the ring is large, it is suitable to combine a plurality of upper stage outer shells 101 to form an integrated ring. Further, when a reduction in the weight of a rocket or the like is necessary, an aluminum alloy that is excellent in moldability and is a low-density member that allows for a reduction in weight is suitable.

The upper stage ring 110 is configured by a plurality of upper stage divided rings 111 and the upper stage positioning ring 112. As shown in FIG. 80, the upper stage divided rings 111 adjacent to one another are disposed be in contact with one another in an annular shape and the upper stage positioning ring 112 is fixed to the inner side of the upper stage divided rings 111 to position the upper stage divided rings 111 and configure the upper stage ring 110. The upper stage positioning ring 112 is an example of the joining member.

Figure 81:
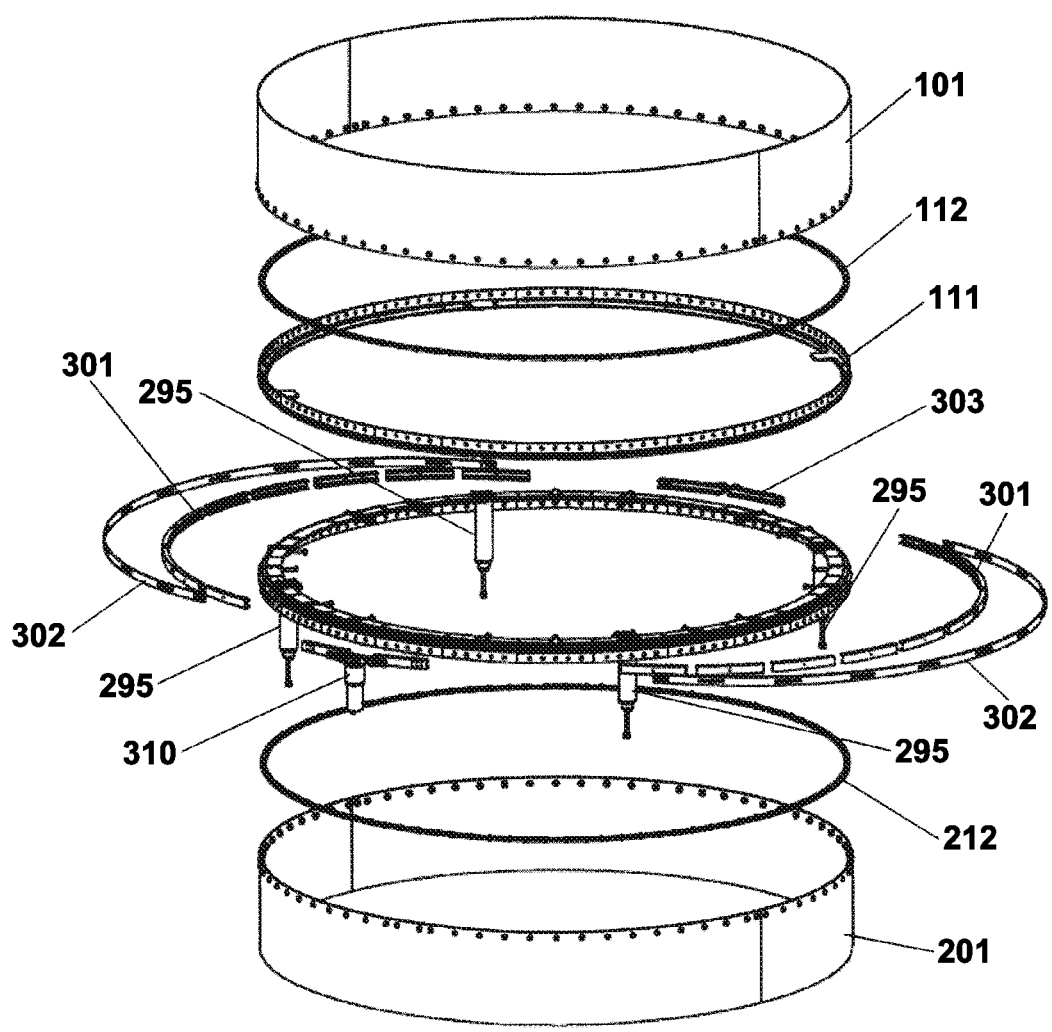
FIG. 81 is an exploded perspective view of the annular fastening device in another embodiment of the present invention.

As shown in FIG. 81, the Maruman band 300 is configured from a clamp 301, a band 302, a separating device 310, and a tension adjusting clamp 303.

The clamp 301 is formed in a concave shape on the ring inner side. The clamp 301 has a function of joining a convex shape formed when the upper stage ring 110 and the lower stage ring 210 are in contact and engaging the upper stage ring 110 and the lower stage ring 210.

The band 302 is joined to the clamp 301 through a bolt. One end portion of the band 302 is joined to the separating device 310 through a bolt. The other end portion of the band 302 is joined to the tension adjusting clamp 303 through a bolt. Consequently, the band 302 has a function of urging the clamp 301 in a ring center direction.

The separating device 310 has a function of disengaging the band 302 using an explosive device or the like. However, the separating device 310 may disengage the band 302 without using the explosive device or the like.

The tension adjusting clamp 303 has a function of pulling the band 302 in the circumferential direction of the ring and applying tension to the band 302.

Figure 82:
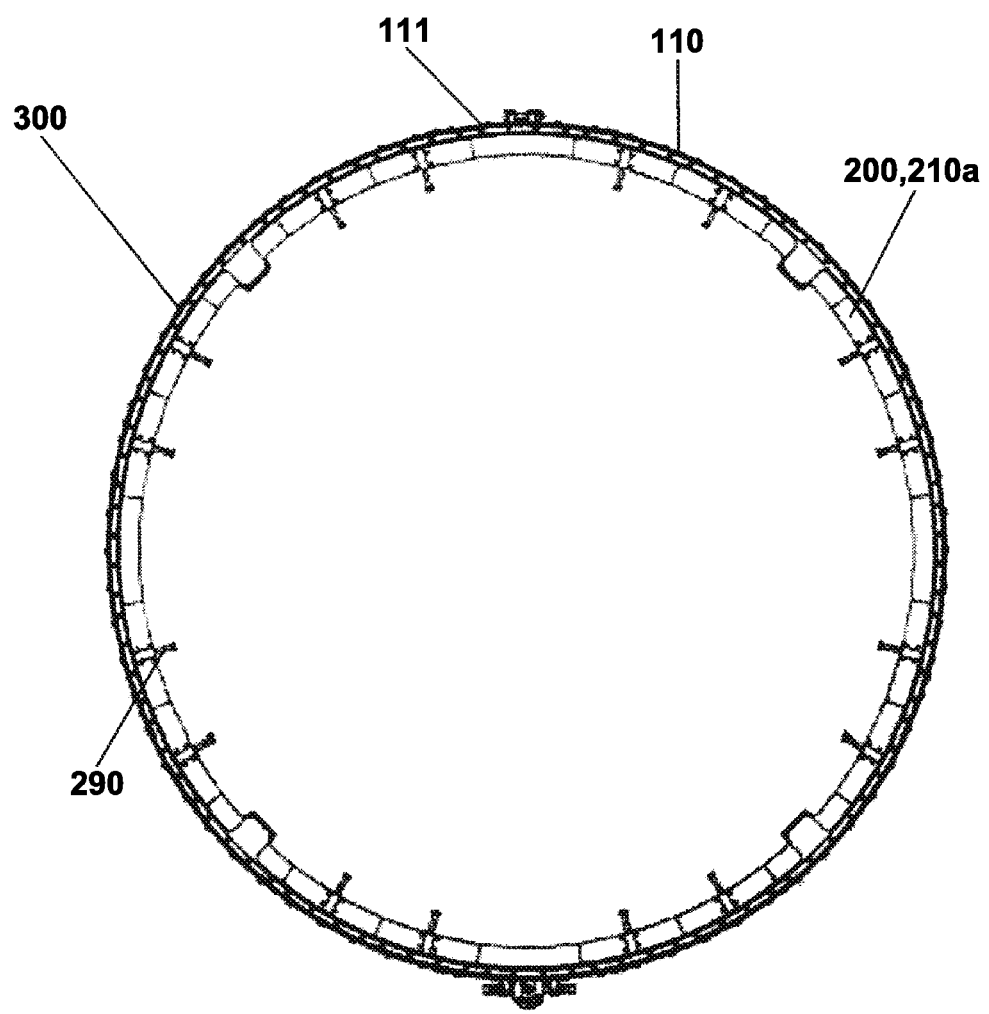
FIG. 82 is a top view of the annular fastening device in another embodiment of the present invention.

A top view of the annular fastening device according to this embodiment is shown in FIG. 82. FIG. 82 shows a state in which the upper stage member 100 and the lower stage member 200 are fastened by the Maruman band 300.

As shown in FIG. 82, the upper stage divided rings 111 are in a state in which the upper stage divided rings 111 adjacent to one another are in contact with one another. On the inner circumference side of the annular fastening device, a reinforcing rib 210a provided in the lower stage ring 210 explained below is provided to configure the inner circumferential surface of the annular fastening device. Rigidity of the device against a fastening force by the Maruman band 300 is kept by the reinforcing rib 210a. As shown in this figure, the outer circumferential surfaces of the upper stage ring 110 and the lower stage ring 210 are formed in an annular shape and, more desirably, formed in an arcuate shape. Therefore, it is possible to cause the fastening force by the Maruman band 300 to suitably act.

The configurations of the upper stage ring 110 and the lower stage ring 210 are explained with reference to FIG. 83.

Figure 83:
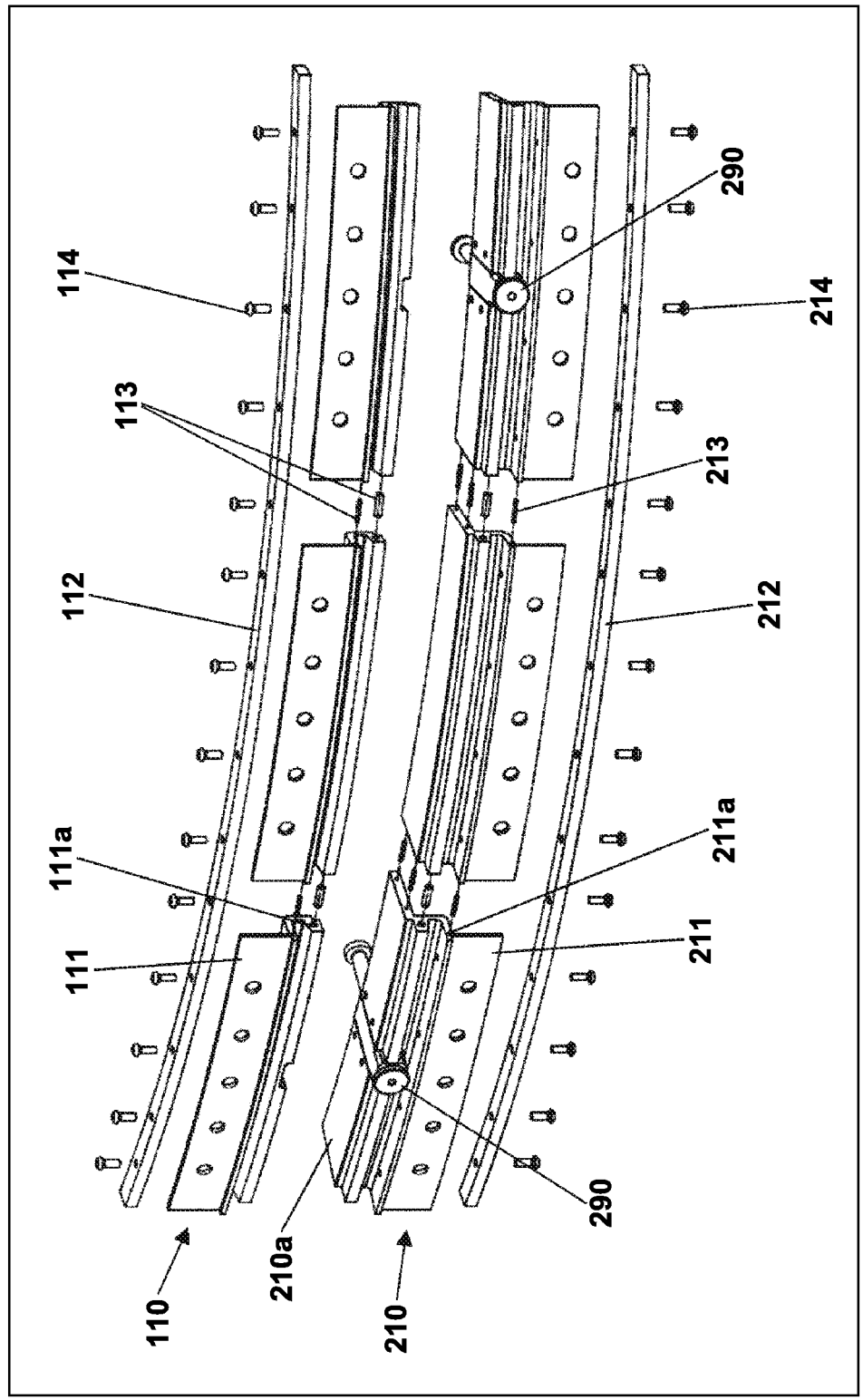
FIG. 83 is a main part exploded view of the annular fastening device in another embodiment of the present invention.

As shown in FIG. 83, the upper stage ring 110 is configured from the plurality of upper stage divided rings 111, the upper stage positioning ring 112, upper stage pins 113, and upper stage bolts 114.

The upper stage divided ring 111 is joined to the other upper stage divided rings 111 disposed in the circumferential direction to form a ring. Therefore, the upper stage divided rings 111 are engaged while being precisely positioned by inserting the upper stage pins 113, which are an example of fixing pins, into upper stage holes 111a. A plurality of upper stage holes 111a are desirably provided on the outer circumference side of the upper stage member. In this embodiment, the upper stage holes 111a are vertically provided side by side in positions corresponding to the upper stage pins 113 shown in FIG. 83.

The upper stage pins 113 are disposed among the annularly arrayed upper stage divided rings 111. The upper stage pins 113 have not only a function of precise positioning of the upper stage divided rings 111 but also a function of transmitting a load applied in the airframe shaft direction to the upper stage divided rings 111.

The upper stage positioning ring 112 fixes the plurality of upper stage divided rings 111 engaged as explained above. Therefore, the upper stage positioning ring 112 is disposed in contact with the inner side of the upper stage divided rings 111 and joined to the upper stage divided rings 111 by a plurality of upper stage bolts 114. Specifically, the upper stage positioning ring 112 is attached to be in contact with, from above, a step portion provided on the inner circumferential surface of the upper stage divided ring 111 and is fixed by fastening the upper stage bolts 114 with respect to the up-down direction. By fastening the upper stage bolt 114 in this direction, it is possible to improve strength in the radial direction of the ring in which an external force is easily applied.

However, the upper stage positioning ring 112 is attached for one purpose of preventing the upper stage divided rings 111 and the upper stage pins 113 from coming apart. Note that the same applies when an internal pressure (a force applied from the airframe shaft center direction to the outward direction) is applied. Only the upper stage divided rings 111 and the upper stage pins 113 can withstand the tightening of the Maruman band 300. However, even in that case, it is possible to improve strength by providing the upper stage positioning ring 112.

Note that, it suitable to design so that machining of the upper stage positioning ring 112 is to be completed by laser cutting because manufacturing cost is low and a delivery time is short. For example, if the upper stage member 100 is integrally configured, since members required to have strength are integrally molded by lathe machining or the like. Therefore, there is a lot of waste. In this embodiment, the diameter in the axial direction of the ring of the upper stage positioning ring 112 is set smaller than the diameter of the upper stage divided rings 111. The upper stage positioning ring 112 can be molded in a smaller amount than the upper stage ring 110. Therefore, the plurality of upper stage divided rings 111 are molded unmanned by a general-purpose small multi-axis automatic working machine and the like. In particular, only the upper stage positioning ring 112 required to have strength is cut out by laser cutting or the like. Consequently, the upper stage positioning ring 112 can be efficiently cut out.

Further, when necessary strength of the upper stage positioning ring 112 is smaller than the necessary strength of the upper stage divided rings 111, it is suitable to use an aluminum alloy or the like having small strength because the upper stage positioning ring 112 can be inexpensively manufactured.

The lower stage divided ring 211 is joined to the other lower stage divided rings 211 disposed in the circumferential direction to form a ring. Therefore, the lower stage divided rings 211 are engaged while inserting lower stage pins 213, which are an example of the fixing pins, into lower stage holes 211a and performing precise positioning. A plurality of lower stage holes 211a are desirably provided on the outer circumference side of the lower stage member 200. In this embodiment, the lower stage holes 211a are vertically provided side by side in positions corresponding to the lower stage pins 213 shown in FIG. 83.

In addition, this embodiment includes the reinforcing rib 210a explained below. The same lower stage holes 211a are provided in the reinforcing rib 210a. The lower stage pins 213 are inserted into the lower stage holes 211a. In this embodiment, the lower stage holes 211a are provided at both end portions in the radial direction of the reinforcing rib 210a.

The reinforcing rib 210a forming a part of the lower stage divided ring 211 is a strength retaining part for preventing ring buckling when a force is applied in the airframe shaft center direction by the Maruman band 300. In a device in which a reduction in the weight of the upper stage member 100 side is desired and that is actuated while separating the structure of the device, it is suitable to provide the reinforcing rib 210a on a side to be separated (the lower stage member 200 side in this embodiment) because the reinforcing rib 210a can contribute to a reduction in weight.

The lower stage pins 213 have not only a precise positioning function but also a function of transmitting a load applied in the airframe shaft direction to the lower stage divided rings 211.

The lower stage positioning ring 212 fixes the plurality of lower stage divided rings 211 engaged as explained above. Therefore, the lower stage positioning ring 212 is disposed to be in contact with the inner side of the lower stage divided rings 211 and joined to the lower stage divided rings 211 by a plurality of lower stage bolts 214. Specifically, the lower stage positioning ring 212 is attached to be in contact with, from below, step portions provided on the inner circumferential surfaces of the lower stage divided rings 211 and is fixed by fastening the lower stage bolts 214 in the up-down direction. By tightening the lower stage bolts 214 in this direction, strength in the radial direction of the ring in which an external force is easily applied can be improved. Note that the lower stage positioning ring 212 may be attached to the reinforcing rib 210a.

However, like the upper stage positioning ring 112, the lower stage positioning ring 212 is attached for one purpose of preventing the lower stage divided rings 211 and the lower stage pins 213 from coming apart. Note that the same applies when an internal pressure (a force applied from the airframe shaft center direction to the outward direction) is applied. Structure that withstands the tightening of the Maruman band 300 only with the lower stage divided rings 211 and the lower stage pins 213 can be realized. However, even in that case, it is possible to improve strength by providing the lower stage positioning ring 212.

Note that, when machining of the lower stage positioning ring 212 is suitably designed to be completed by laser cutting because manufacturing cost is low and a delivery time is short.

Further, when necessary strength of the lower stage positioning ring 212 is smaller than necessary strength of the lower stage divided rings 211, it is suitable to use an aluminum alloy or the like having small strength because the lower stage positioning ring 212 can be inexpensively manufactured.

Figure 84:
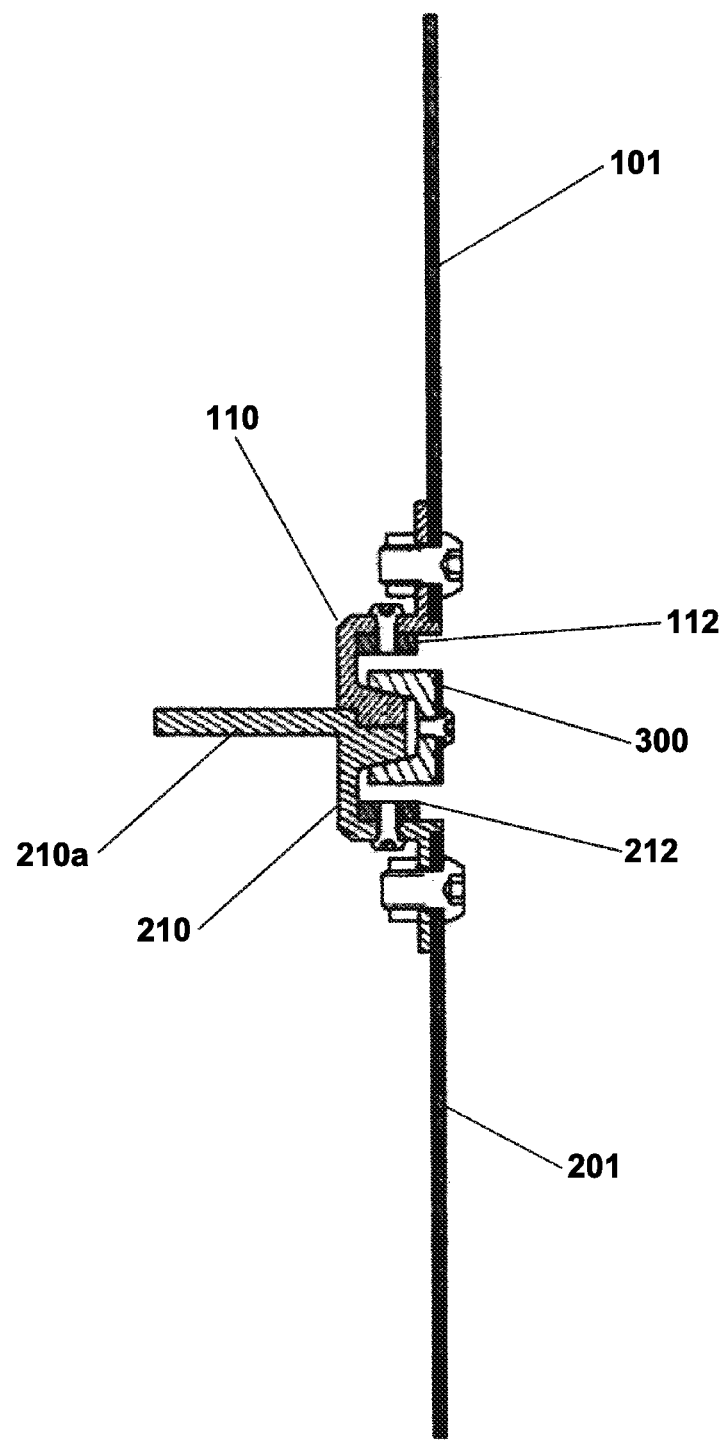
FIG. 84 is a sectional view of the annular fastening device in another embodiment of the present invention.

Note that, when it is desired to secure a space on the inner side of the upper stage member 100 and the lower stage member 200, as shown in a sectional view of FIG. 84, the upper stage positioning ring 112 and the lower stage positioning ring 212 can also be respectively disposed on the outer sides of the upper stage divided rings 111 and the lower stage divided rings 211.

Functions can be partially added to the upper stage divided rings 111 and the lower stage divided rings 211 by respectively changing the shapes of the upper stage divided rings 111 and the lower stage divided rings 211. For example, as explained below, side springs or separation springs are provided in one of the plurality of upper stage divided rings 111 and the plurality of lower stage divided rings 211 to make it possible to easily perform the separating operation. In addition, it is possible to change a material of only that portion to a material having different strength.

Figure 85:
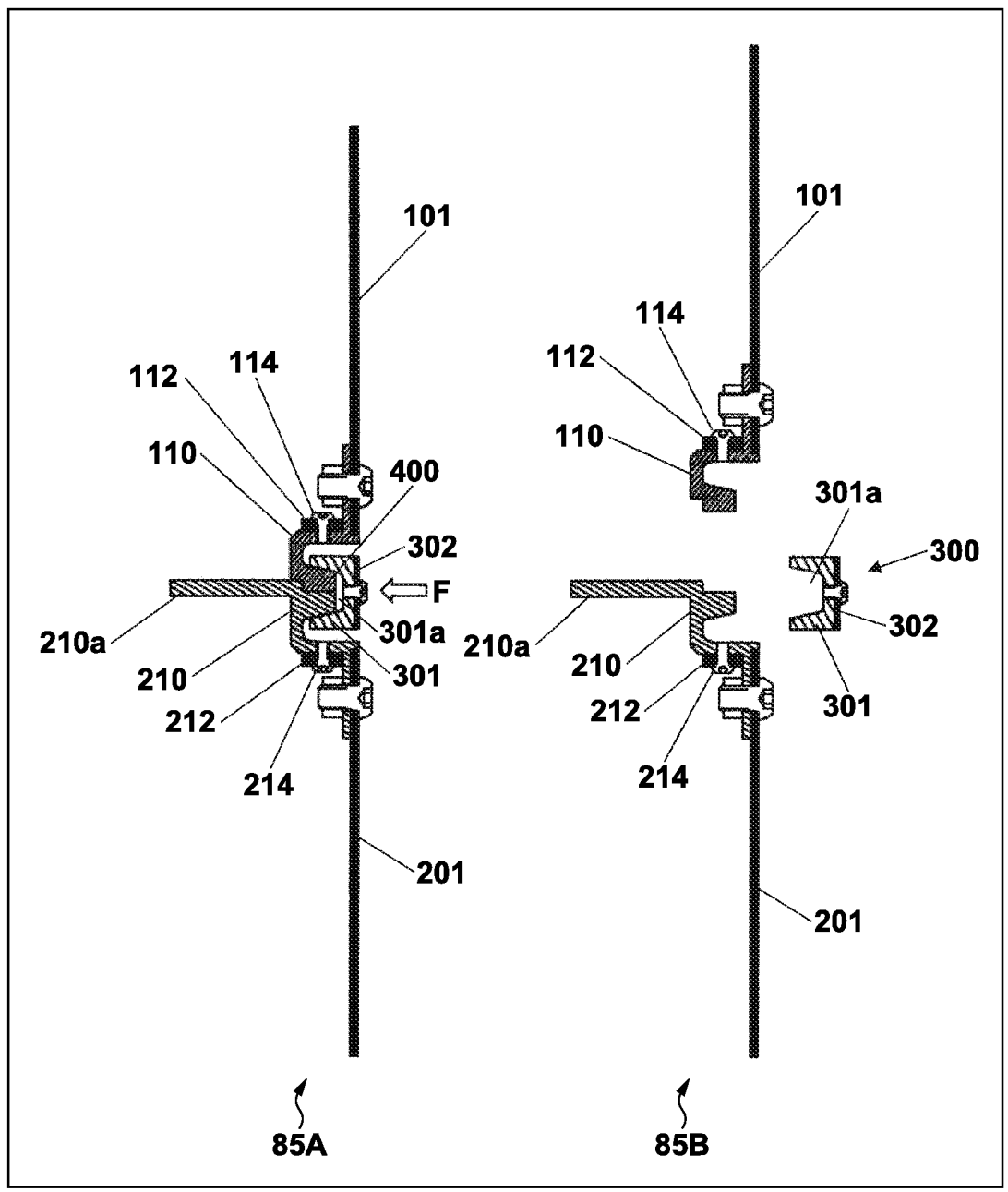
FIG. 85 is a sectional view showing an operation state of the annular fastening device in another embodiment of the present invention.
Figure 86:
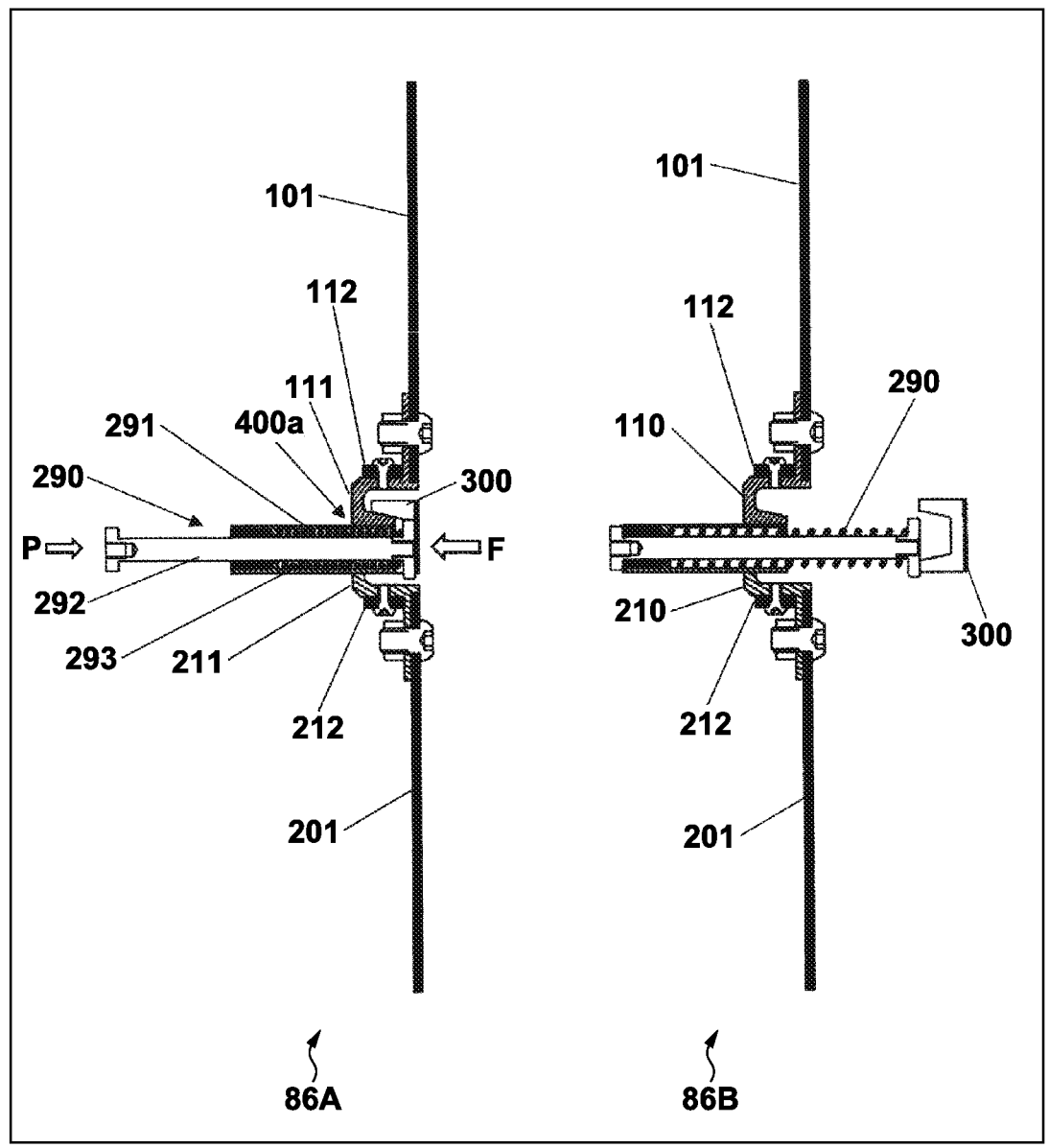
FIG. 86 is a sectional view showing another operation state of the annular fastening device in another embodiment of the present invention.
Figure 87:
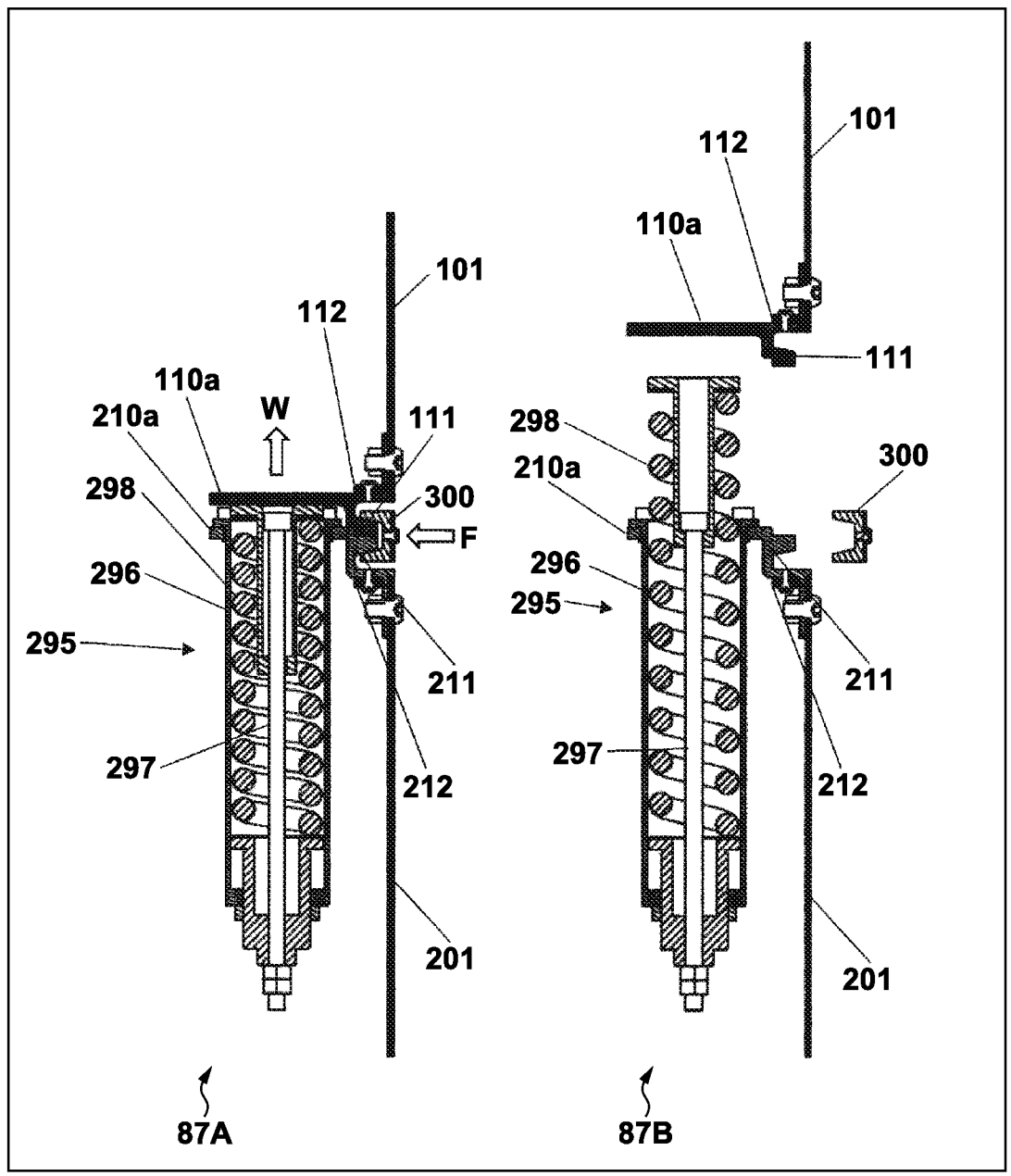
FIG. 87 is a sectional view showing another operation state of the annular fastening device in another embodiment of the present invention.

A sectional view of a contact section of the upper stage member 100 and the lower stage member 200 is shown in FIG. 85. A sectional view at the time when a side spring is set is shown in FIG. 86. A sectional view at the time when a separation spring is set is shown in FIG. 87.

As shown in a state 85A in FIG. 85, the upper stage ring 110 (the upper stage divided ring 111) and the lower stage ring 210 (the lower stage divided ring 211) include flange sections in a position in contact with the other divided ring, that is, on the lower end side in the upper stage ring 110 and on the upper end side in the lower stage ring 210. During joining, the upper stage ring 110 and the lower stage ring 210 come into contact to form a convex section 400. A clamp concave section 301a of the clamp 301 is joined to the convex section 400 and an urging force F is applied to the convex section 400 from the clamp 301, whereby the upper stage ring 110 and the lower stage ring 210 are engaged.

As shown in a state 85B in FIG. 85, during separation, the urging force F disappears and the clamp 301 is displaced to the ring outer side, whereby restriction of the upper stage ring 110 and the lower stage ring 210 is released. The upper stage ring 110 and the lower stage ring 210 are separated.

Note that, with the urging force F during the joining, in some case, the clamp concave section "a" of the clamp 301 is deformed by biting in the convex section 400 formed by setting the upper stage ring 110 and the lower stage ring 210 in contact with each other and prevents the clamp 301 from being displaced to the ring outer side during the separation. Therefore, friction of the convex section 400 and the clamp concave section 301a is desirably reduced. It is suitable to carry out, on the surfaces of the convex section 400 and the clamp concave section 301a, molybdenum disulfide coating (equivalent to MIL-L-23398), surface treatment by a film combined with fluororesin by a hard anode, or the like. Note that corresponding inclined surfaces are respectively provided in the convex section 400 and the clamp concave section 301a. The clamp 301 is easily displaced to the outer side.

In order to prevent the clamp 301 from not being displaced to the ring outer side by the biting or the like, the side spring 290 shown in FIG. 86 is set to forcibly displace the clamp 301 to the ring outer side.

As shown in a state 86A in FIG. 86, when the side spring 290 is mounted, a hole 400a is opened on a contact surface of the upper stage divided ring 111 and the lower stage divided ring 211. The side spring 290 is set in the part of the hole 400a.

The side spring 290 is configured from a housing 291, a shaft 292, and a compression spring 293.

The housing 291 is fixed to the lower stage ring 210 by not-shown screws.

The shaft 292 is inserted into the housing 291. The shaft 292 can slide in the ring radial direction.

The compression spring 293 is inserted between the housing 291 and the shaft 292. The compression spring 293 generates an urging force P for displacing the band 302 to the ring outer side with respect to the shaft 292.

Note that, since the clamp 301 is joined to the band 302 through bolts, when the band 302 is displaced, the clamp 301 is displaced in the same manner. In this embodiment, the band 302 urged by the side spring 290 is explained. However, the clamp 301 may be provided in the same manner as the other parts and configured to be urged in a position where the distal end of the side spring 290 is housed in the hole 400a of the convex section 400.

During the joining, since the urging force F by the band 302 is larger than the urging force P by the side spring 290, the band 302 is not displaced from a predetermined position during the joining.

As shown in a state 86B in FIG. 86, during the separation, the urging force F by the band 302 disappears. Therefore, the band 302 and the clamp 301 are displaced to the ring outer side by the urging force P generated by the side spring 290.

A structure is explained in which, in order to separate the upper stage member 100 and the lower stage member 200 in the airframe shaft direction, a separation spring 295 is disposed to apply an urging force W for separating the upper stage member 100 and the lower stage member 200 in the airframe shaft direction.

As shown in a state 87A in FIG. 87, when the separation spring 295 is mounted, a hole 210b is opened in the reinforcing rib 210a of the lower stage divided ring 211. The separation spring 295 is set in the part of the hole 210b.

The separation spring 295 is configured from a housing 296, a piston 297, and a compression spring 298.

The housing 296 is inserted into the hole 210b opened in the reinforcing rib 210a of the lower stage divided ring 211 and is fixed to the lower stage ring 210 by not-shown screws.

The piston 297 is inserted into the housing 296 and can slide in the airframe shaft direction.

The compression spring 298 is inserted between the housing 296 and the piston 297. The compression spring 298 generates an urging force W for displacing the upper stage divided ring 111 to the airframe shaft direction with respect to the piston 297.

The upper stage divided ring 111 receives the urging force W from the piston 297. Therefore, the upper stage divided ring 111 has structure in which a rib for fixing 110a is provided.

Note that, when the urging force W is large, in the upper stage positioning ring 112, like the rib for fixing 110a, a second rib 112a may be provided in a position where the urging force W from the piston 297 is received to prevent deformation of the rib for fixing 110a by the urging force W.

During the joining, since the distance between the rib for fixing 110a and the reinforcing rib 210a is short, the compression spring 298 is held in a compressed and urged state.

As shown in a state 85B in FIG. 87, during the separation, since the restriction of the upper stage member 100 and the lower stage member 200 is released, the upper stage member 100 and the lower stage member 200 are separated by the urging force W of the separation spring 295.

Figure 88:
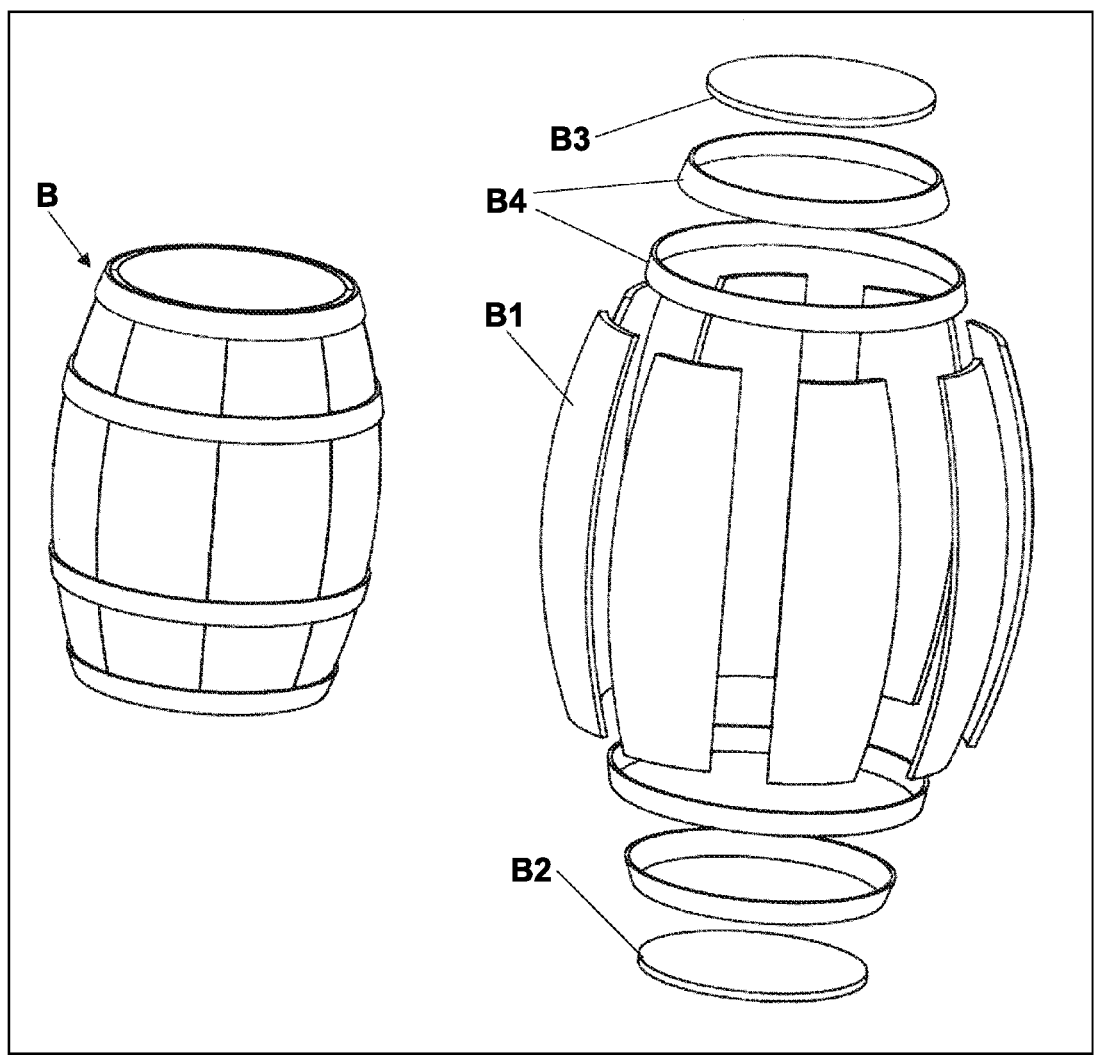
FIG. 88 is a mounting example of the annular fastening device in another embodiment of the present invention.

In FIG. 88, an example is shown in which the annular fastening device in this embodiment is used for fastening of a barrel as an example. The upper stage member 100 in the annular fastening device in this embodiment is attached to a barrel B, which is an example of a fastening target object, to fasten the barrel B. The upper stage member 100 receives an external force from the barrel B to the outside. The barrel B is configured from a plurality of side plates B1, a lower mirror plate B2, an upper mirror plate B3, and a plurality of hoops B4.

Fastening of the side plates B1 and fastening of the side plates B1 and the lower mirror plate B2 or the upper mirror plate B3 can be performed by configuring the upper stage member 100 from the upper stage divided rings 111 and the upper stage positioning ring 112 as explained above and used as the hoops B4. With this configuration, while secur-ing rigidity necessary for the fastening of the barrel B, it is possible to configure the upper stage member 100 (the upper stage divided rings 111 and the upper stage positioning ring 112) that can be easily manufactured. Note that the upper stage member 100 is explained above. However, the lower stage member 200 can be used in the same manner. In this way, the annular fastening device according to the present invention can be suitably used for fastening of the two members.

The separating device 310 attached to the Maruman band 300 is explained in detail with reference to the drawings.

Figure 89:
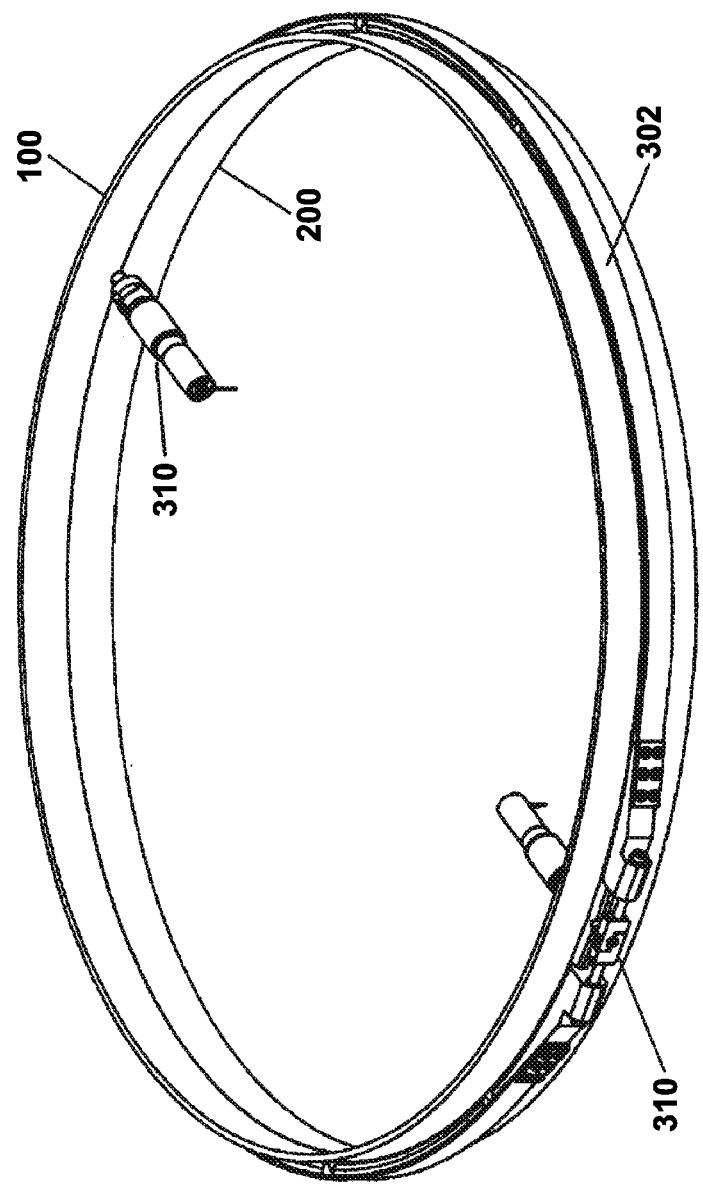
FIG. 89 is another perspective view of the annular fastening device in another embodiment of the present invention.

FIG. 89 is a perspective view of the Maruman band 300 in this embodiment. One separating device 310 in this embodiment only has to be provided in any part in the circumferential direction of the Maruman band 300. In the embodiment explained above, the tension adjusting clamp 303 is provided in the position opposed to the separating device 310. However, in FIG. 89, another separating device 310 is provided instead of the tension adjusting clamp 303. The Maruman band 300 is separated by simultaneously driving the two separating devices.

Figure 90:
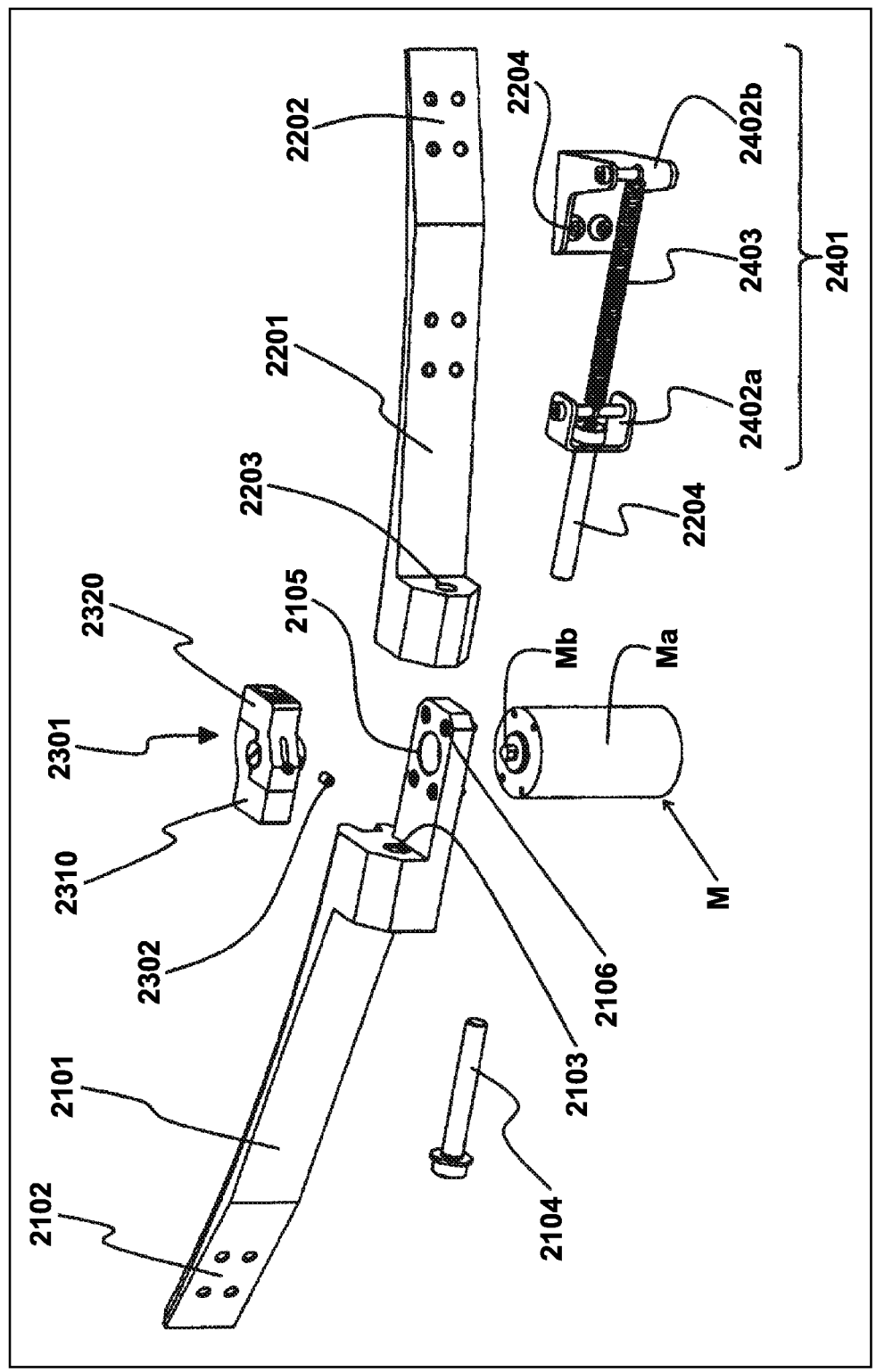
FIG. 90 is another main part exploded view of the annular fastening device in another embodiment of the present invention.

FIG. 90 is an enlarged view of the separating device 310. The separating device 310 is configured from a first end member (a first intermediate member) 2101 and a second end member (a second intermediate member) 2201, a separating mechanism 2301, the unlocking motor M, and a separation assisting mechanism 2401.

A first end member 2101 and a second end member 2201 couple a separation target object and the separating mechanism 2301 or the like. Therefore, the first end member 2101 and the second end member 2201 include, at one end portions, a first coupling section 2102 and a second coupling section 2202 for coupling to the separation target object.

The other end portion of the first end member 2101 is coupled to the separating mechanism 2301 through a first adjusting member 2104 inserted into a guide hole 2103 and coupled to the unlocking motor M inserted into the motor hole 2105 through a motor fixing member 2106.

The other end portion of the second end member 2201 is coupled to the separating mechanism 2301 through a second adjusting member 2204 inserted into a guide hole 2203. The separation assisting mechanism 2401 is fixed to both of the vicinity of the other end portion of the second end member 2201 and the second adjusting member 2204 through a supporting-section fixing member 2404.

The separating mechanism 2301 and the unlocking motor M are fixed by a shaft fixing member 2302. Rotation power generated by the unlocking motor M is transmitted to the separating mechanism 2301.

Figure 91:
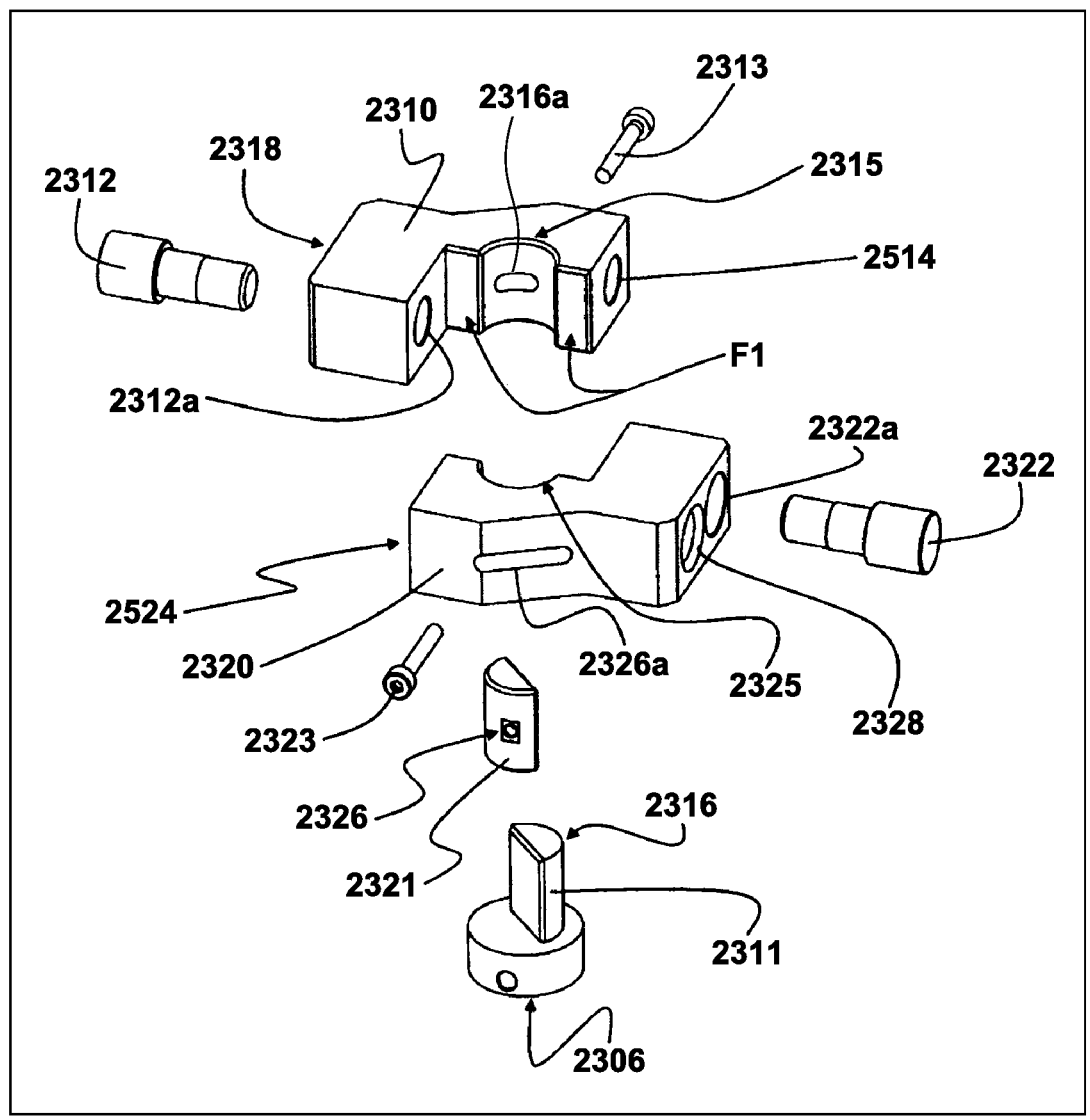
FIG. 91 is another main part exploded view of the annular fastening device in another embodiment of the present invention.

As shown in FIG. 91, the separating mechanism 2301 is configured from a first coupling member 2310 and a second coupling member 2320 and a first semicircular fixed member (a first semicircular member) 2311 functioning as a first fixed shaft and a second semicircular fixed member (a second semicircular member) 2321 functioning as a second fixed shaft.

The first coupling member 2310 and the second coupling member 2320 are respectively formed in L shapes and configured such that external shapes of the first coupling member 2310 and the second coupling member 2320 are substantially equal. Consequently, a gap is not formed when the first coupling member 2310 and the second coupling member 2320 are point-symmetrically disposed and set in contact with each other as shown in FIG. 91. Note that, in the following explanation, the first coupling member 2310 and the second coupling member 2320 are collectively described as coupling members 2001.

A first guide pin 2312 and a second guide pin 2322 are respectively provided in the first coupling member 2310 and the second coupling member 2320. The first guide pin 2312 is fixed to a first guide pin hole 2312a. The second guide pin 2322 is fixed to a second guide pin hole 2322a. Note that, in the following explanation, the first guide pin 2312 and the second guide pin 2322 are collectively described as guide pins 2003.

In a state in which the first coupling member 2310 and the second coupling member 2320 are in contact with each other (hereinafter, coupled state), the guide pin 2312 is inserted through a not-shown second guide hole 2524 provided in the second coupling member and the guide pin 2322 is inserted through a first guide hole 2514 provided in the first coupling member. Consequently, moving directions of the first coupling member 2310 and the second coupling member 2320 are restricted. The first coupling member 2310 and the second coupling member 2320 are capable of moving only in a direction in which the guide pins 2003 extend. Note that, in the following explanation, the first guide hole 2514 and the second guide hole 2524 are collectively described as guide holes 2005.

The first coupling member 2310 includes a first concave section 2315 on a surface (the contact surface F1) parallel to the guide pin 2003 among three surfaces in contact with the second coupling member 2320 in the coupled state. Similarly, the second coupling member 2320 includes a second concave section 2325 on a surface (the contact surface F1) parallel to the guide pin 2003 among three surfaces in contact with the first coupling member 2310 in the coupled state.

The first concave section 2315 and the second concave section 2325 are respectively recessed along semicircles, more specifically, shapes (in the following explanation, referred to as semi-columns) obtained by dividing a columnar shape, which has perfect circles as a top surface and a bottom surface, along a surface (the dividing surface F2) passing the center of the perfect circles forming the top surface and the bottom surface. That is, in the coupled state, the first concave section 2315 and the second concave section 2325 are opposed to front surfaces thereof each other and form a through-hole (a circular holding section) 2006. The through-hole 2006 has a columnar shape obtained by extending a perfect circular shape. For explanation, the sectional shape of the through-hole 2006 is explained as the perfect circle. However, when the through-hole 2006 is actually machined, it is difficult to accurately form the through-hole 2006 as the perfect circle. It goes without saying that the perfect circle includes a circle close to the perfect circle. As explained below, even in a state in which a gap is formed between the first concave section 2315 and the second concave section 2325, the first concave section 2315 and the second concave section 2325 can be regarded as forming a perfect circular shape in a state in which the first concave section 2315 and the second concave section 2325 are opposed to each other. Naturally, if the through-hole 2006 can be formed in the perfect circle, adhesion of coupling in a coupling principle explained below can be suitably increased.

A first fixed shaft (a first semicircular fixed member) 2311 having a semi-columnar shape and a second fixed shaft (a second semicircular fixed member) 2321 having a semi-columnar shape are inserted into the through-hole 2006. The first fixed shaft 2311 and the second fixed shaft 2321 are formed in the same shape in portions opposed in the through-hole 2006. The first fixed shaft 2311 and the second fixed shaft 2321 form a columnar fixed shaft (a columnar member) 2002. In this embodiment, an end portion on the opposite side of a side inserted into the first coupling member 2310 in the first fixed shaft 2311 includes a not-shown insertion hole 2306 for fitting with the unlocking motor M. Desired rotation power necessary for unlocking can be obtained by coupling the end portion to the drive shaft Ma of the unlocking motor M.

Note that the unlocking motor M is coupled to not only the first fixed shaft 2311 but also the first end member 2101. Therefore, the first coupling member 2310 and the first fixed shaft 2311 are coupled to the unlocking motor M through the first end member 2101 and integrally formed. With the structure, even if the coupling member 2001 is displaced with respect to the separation target object during unlocking, since the unlocking motor M is also displaced in the same manner, an unexpected load is not generated in the drive shaft Ma. Transmission of power is not interrupted.

A cable for supplying electric power to the unlocking motor M is formed in sufficiently long structure with respect to the displacement. Consequently, an unexpected load is not generated in the cable. Even if the coupling members 2001 are displaced with respect to the separation target object, a driving force to the unlocking motor M is transmitted and the displacement is not restricted.

In the through-hole 2006, the fixed shaft 2002 formed by the first fixed shaft 2311 and the second fixed shaft 2321 is in slide contact with through-hole 2006. That is, the inner surface of the through-hole 2006 forms a circular inner surface section. The fixed shaft 2002 functioning as a columnar member is smoothly in slide contact with the circular inner surface section.

The driving force from the unlocking motor M is transmitted through the drive shaft Ma. The fixed shaft 2002 is driven to rotate. That is, the driving shaft Mb rotates with a rotational driving force generated in the unlocking motor M. Subsequently, the drive shaft Ma in contact to be turnable in association with the driving shaft Mb rotates. The first fixed shaft 2311 formed integrally with the drive shaft Ma and the second fixed shaft 2321 that receives a load from the first fixed shaft 2311 are supported to be integrally rotatable along the circumferential direction of the through-hole 2006 in the through-hole 6.

The first fixed shaft 2311 and the second fixed shaft 2321 respectively include a first restricting hole 2316 and a second restricting hole 2326 on columnar (semi-columnar) side surfaces of the first fixed shaft 2311 and the second fixed shaft 2321 in order to restrict movement in an extending direction of the fixed shaft 2002 when the first fixed shaft 2311 and the second fixed shaft 2321 are driven to rotate in the through-hole 2006.

A first long hole 2316a extending in an extending direction of the guide pin 2003 is provided in the first coupling member 2310 to be opposed to the first restricting hole 2316 of the first fixed shaft 2311. A first restricting member 2313 is fit in the first restricting hole 2316 extending through the first long hole 2316a to limit (restrict) the movement of the second fixed shaft 2321 in the extending direction of the fixed shaft 2002 to a predetermined range.

When a separating operation explained below acts on the coupling members 2001, the first restricting member 2313 restricts the first fixed shaft 2311 from separating from the first coupling member 2310. As an example, the first restricting hole 2316 is configured by a screw. The first restricting member 2313 is configured by a screw hole. If the diameter of a head shape of the screw is larger than the width (the length in an axial direction in which the fixed shaft 2002 extends) of the first long hole 2316a, the first restricting member 2313 can be restricted from separating from the first coupling member 2310.

Further, the first restricting member 2313 comes into contact with an end face in the extending direction of the guide pin 2003 of the first long hole 2316a to thereby restrict a rotation angle of the first fixed shaft 2311.

Similarly, a second long hole 2326a extending in the extending direction of the guide pin 2003 is provided in the second coupling member 2320 to be opposed to the second restricting hole 2326 of the second fixed shaft 2321. A second restricting member 2323 is fit in the second restricting hole 2326 extending through the second long hole 2326a to limit (restrict) the movement of the second fixed shaft 2321 in the extending direction of the fixed shaft 2002 to a predetermined range.

When the separating operation explained below acts on the coupling member 2001, the second restricting member 2323 restricts the second fixed shaft 2321 from separating from the second coupling member 2320. As an example, the second restricting hole 2326 is configured by a screw hole. The second restricting member 2323 is configured by a screw. If the diameter of a head shape of the screw is larger than the width (the length in the extending direction of the fixed shaft 2) of the second long hole 2326a, the second restricting member 2323 can be restricted from separating from the second coupling member 2320.

Further, the second restricting member 2323 comes into contact with an end face in the extending direction of the guide pin 2003 of the second long hole 2326a to thereby restrict a rotation angle of the second fixed shaft 2321.

Targets coupled by the separating mechanism 2301 configured in this way are coupled through the separating mechanism 2301 by being fixed to a not-shown first coupling section 2318 provided adjacent to a position through which the first guide pin 2312 is inserted on an outer surface on which the guide pin hole 2312a is provided in the first coupling member 2310 and a second coupling section 2328 provided adjacent to a position through which the second guide pin 2322 is inserted on an outer surface on which the guide pin hole 2322a is provided in the second coupling member 2320. The targets are uncoupled by performing the separating operation explained below.

Stress due to an external force in a separating direction explained below concentrates on contact parts of the coupling members 2001 and the fixed shaft 2002 and the coupling members 2001 and the other guide pin 2003. Therefore, SUS630-H900, which is a high-strength material, is suitable. It is also suitable to divide the components into pluralities of pieces and apply the high-strength material to only contact points of the components.

From the viewpoint of prevention of corrosion due to aging, SUS630-H900, which is a type of stainless steel that is a material with corrosion resistance, is suitable.

In surface states of the members, sliding occurs among the members when the separating operation explained below acts. Therefore, it is necessary to form surface states and the like having a desired coefficient of friction. In particular, an output of the unlocking motor M for obtaining a desired separating operation can be reduced by reducing a coefficient of friction of a sliding section. Therefore, it is suitable to reduce surface roughness and apply molybdenum disulfide coating (equivalent to MIL-L-23398) or DLC (Diamond-Like Carbon) coating.

Figure 92:
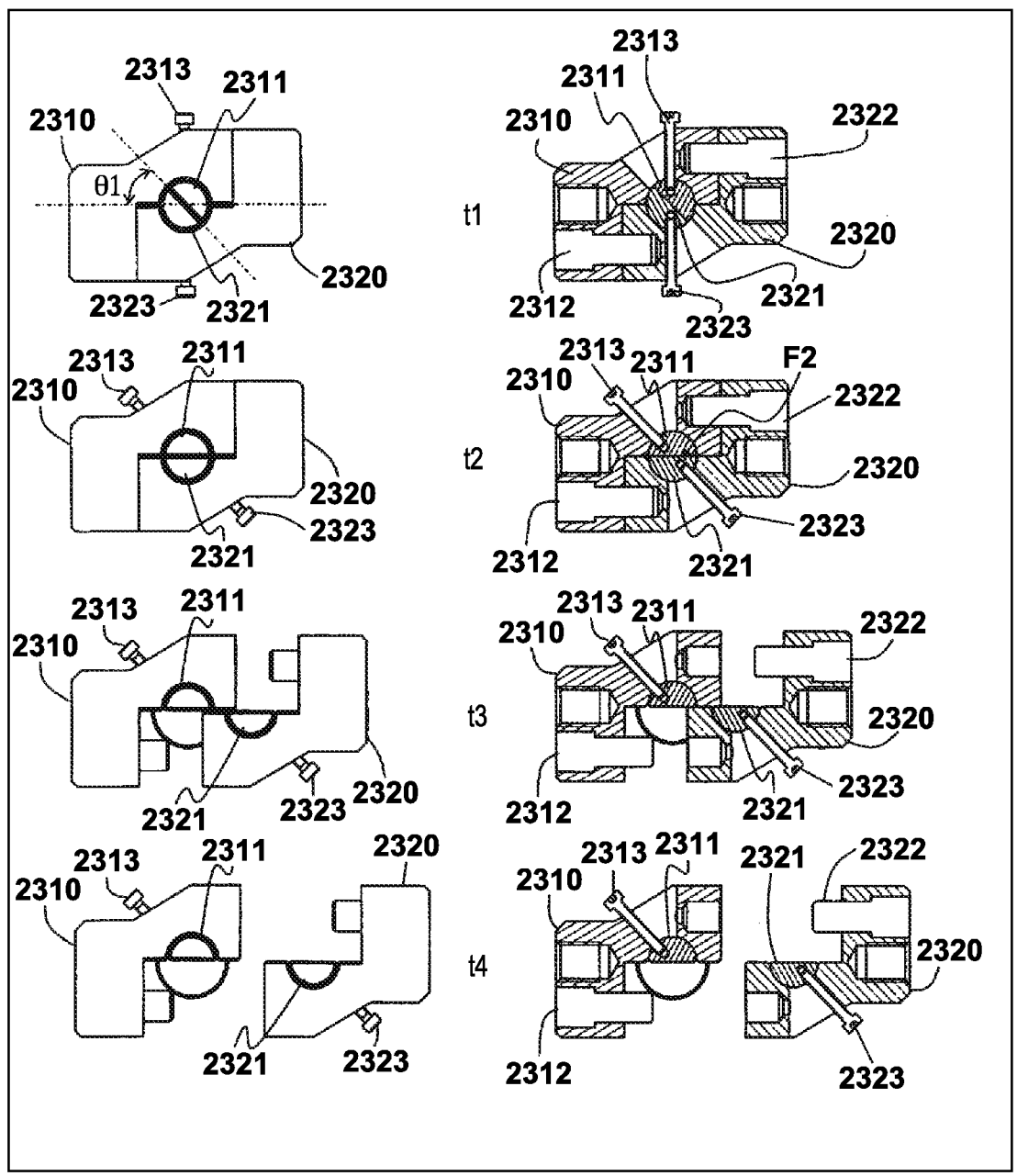
FIG. 92 is a separating operation explanatory diagram of the annular fastening device in another embodiment of the present invention.

An explanatory diagram of a separating operation (counterclockwise separation) of the coupling/uncoupling device in an embodiment of the present invention is shown in FIG. 92. A front view of the separating device 310 is shown on the left side of the figure. A sectional view of the separating device 310 is shown on the right side of the figure.

In FIG. 92, t1 to t4 indicate steps in coupling or separation. In the following explanation, each of the steps is explained in order.

Step t1 indicates a coupled state of the separating device 310 according to this embodiment. In step t1, both of the first fixed shaft 2311 and the second fixed shaft 2321 in the fixed shaft 2002 are in positions across the first coupling member 2310 and the second coupling member 2320. More in detail, the separating device 310 changes to a state in which the fixed shaft 2 is rotated by a first predetermined angle (an initial angle) θ1 in a clockwise (CW) direction as shown in step t1 from an uncoupled state in which the dividing surface F2 of the fixed shaft 2 is in an uncoupled position flush with the contact surface F1 of the coupling member 2001 shown in step t2.

When the fixed shaft 2002 is rotated in a counterclockwise (CCW) direction in FIG. 92 by the unlocking motor M, the first fixed shaft 2311 and the second fixed shaft 2321 gradually escape from the inside of the other coupling member 2001. When the rotation is further continued, the separating operation reaches a state in step t2. Note that, in this embodiment, an example is explained in which the fixed shaft 2002 is rotated using the unlocking motor M. However, the present invention is not limited to this. The present invention includes, for example, a form in which the fixed shaft 2002 is urged by a torsion spring in a held state by an electromagnetic clutch and rotated by a restoration force of the torsion spring by releasing the electromagnetic clutch.

When the separating operation reaches step t2, the first fixed shaft 2311 is present only in the first coupling member 2310 and the second fixed shaft 2321 is present only in the second coupling member 2320.

At this time, as shown in FIG. 90, the second coupling member 2320 is coupled to, through the second adjusting member 2204, a first spring supporting member 2402a, and a second spring supporting member 2402b, a tension spring 2403 urged in a direction in which the first coupling member 2310 and the second coupling member 2320 are separated. Since a restoration force of the separation target object is generated in the same direction, the first coupling member 2310 and the second coupling member 2320 slide while being guided by the guide pins 2003. Relative positions of the first coupling member 2310 and the second coupling member 2320 become wider apart.

In step t3, a state is shown in which the first coupling member 2310 and the second coupling member 2320 slide while being guided by the guide pins 2003 and the relative positions become wider apart. At a point in time of step t3, the guide pins 2003 slip off from the guide holes 2005 and the separation target is completely uncoupled through the separating device 310.

Note that, when the coupling members 2001 are urged in a separating direction only by the restoration force of the separation target object, the restoration force of the separation target object decreases because the relative positions of the first coupling member 2310 and the second coupling member 2320 become wider apart. The restoration force disappears before the guide pins 2003 come off the guide holes 2005 and the separation is not completed. It is likely that the separating operation of the present invention cannot be appropriately actuated.

On the other hand, in the coupling/uncoupling device according to this embodiment, the restoration force of the tension spring 2403 decreases because the relative positions of the first coupling member 2310 and the second coupling member 2320 become wider apart. However, by disposing a tension spring having a displacement amount equal to or larger than a distance for the guide pins 2003 to come off the guide holes 2005, an urging force in the separating direction of the first coupling member 2310 and the second coupling member 2320 can be applied irrespective of the restoration force of the separation target object. The separating operation can be appropriately actuated.

Note that the tension spring 2403 is provided to be separated from the second end member 2201 by the supporting-section fixing member 2404 such that a restoration force by the tension spring 2403 acts in the extending direction of the guide pins 2003. More in detail, the tension spring 2403 is disposed on extension of the second adjusting member 2204. The second coupling section 2328, to which the second adjusting member 2204 is connected, is provided to be adjacent to the second guide pin hole 2322a as much as possible.

In step t4, a state is shown in which engagement is released and the first coupling member 2310 and the second coupling member 2320 are separated.

Note that, in the separating operation, separating and moving directions of the first coupling member 2310 and the second coupling member 2320 are restricted by the first guide pin 2312 and the second guide pin 2322. The first coupling member 2310 and the second coupling member 2320 move in the extending direction of the guide pins 2003 at least up to step t3. By restricting moving directions of the coupling members 2001 with the guide pins 2003, it is possible to restrict the movement of the coupling members 2001 in a direction orthogonal to the extending direction of the guide pins and cause the separating operation of the present invention to appropriately operate.

In the coupling/uncoupling device according to this embodiment, by rotating the fixed shaft 2 in the CCW direction to release engagement, it is possible to slightly loosen the adhesion state of the first coupling member 2310 and the second coupling member 2320 while the coupling/uncoupling device transitions from the coupled state in step t1 to the uncoupled state in step t2. A principle for this is explained below, For explanation, a state is assumed in which an external force in the separating direction is applied to the coupling members 2001 by the separation target object. The state is a state in which the first coupling member 2310 is pulled to the left side in FIG. 92 by an external force of an object connected to the first coupling section 2318 and the second coupling member 2320 is pulled to the right side in FIG. 92 by an external force of an object connected to the second coupling section 2328.

In that case, in a state in step t1, the first fixed shaft 2311 receives a force in the left direction in FIG. 92 from the first coupling member 2310. At that time, with an adjustment gap S formed between the first guide pin 2312 and the second guide hole 2524 with respect to the radial direction of the first guide pin 2312, the first coupling member 2310 receives a force in a pulling direction to the upper side while being in slide contact with the first fixed shaft 2311. The first coupling member 2310 slightly moves to the left side while moving to the upper side by the adjustment gap S.

As a result, before the transition to step t2, the first coupling member 2310 can slightly move to the left side with respect to the second coupling member 2320. The movement becomes conspicuous because dethroughtion between the first concave section 2315 and the second concave section 2325 increases as the fixed shaft 2002 advances to the CCW direction (counterclockwise direction). Therefore, the coupled state of the first coupling member 2310 and the second coupling member 2320 can be gradually loosened with rotation of the fixed shaft 2002 before the transition to the state in step t2. An impact at the time when the coupling is released can be reduced.

In the above explanation, the state in which the external force is applied is assumed. However, the same applies when the external force is not applied. It is possible to loosen the coupled state of the first coupling member 2310 and the second coupling member 2320 before the transition to step t2.

Figure 93:
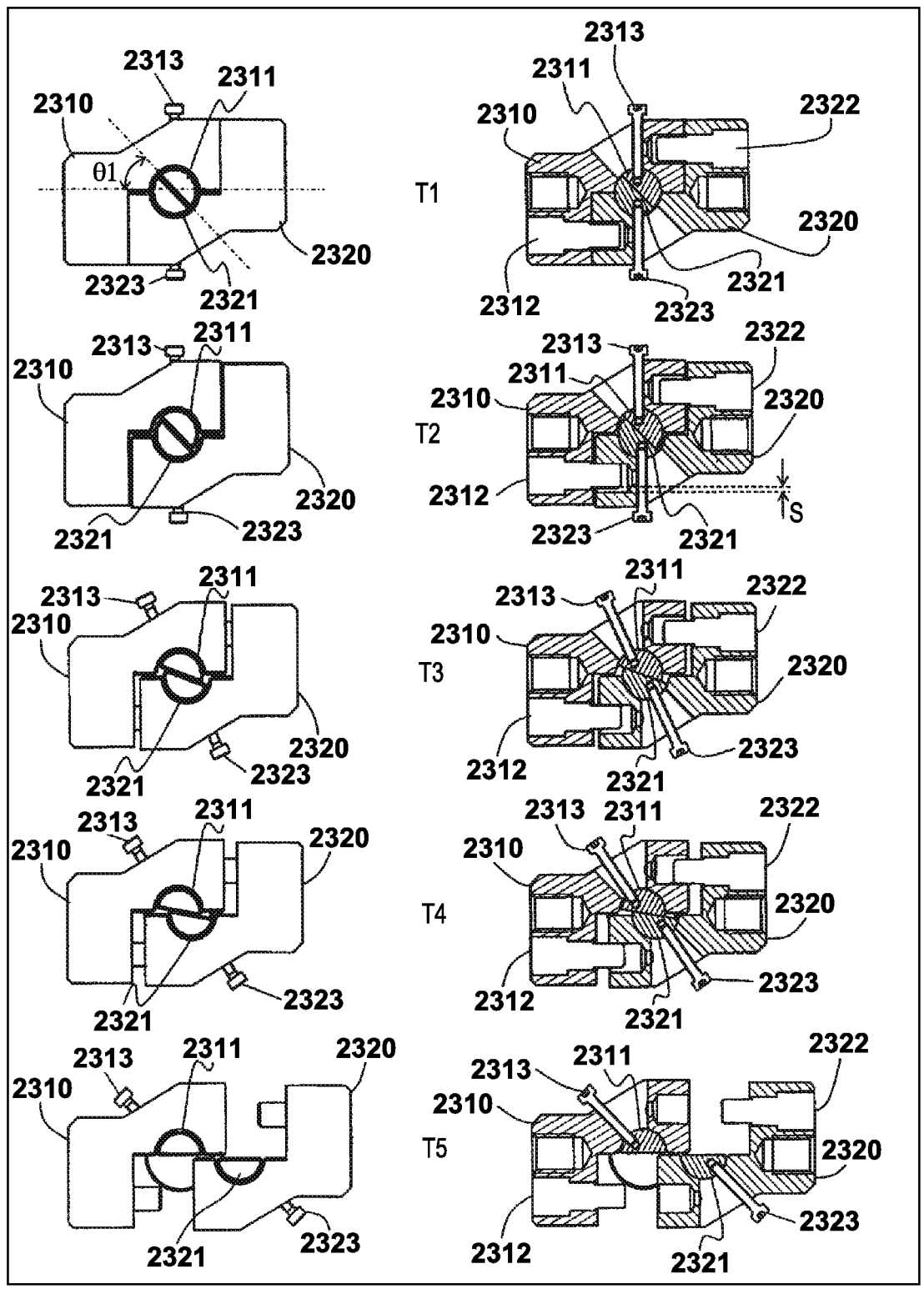
FIG. 93 is a detailed separating operation explanatory diagram of the annular fastening device in another embodiment of the present invention.

To make the above explanation clearer, a figure showing the adjustment gap S large is shown in FIG. 93. The separating operation advances in the order of steps T1 to T5. The separating operation is specifically explained below with reference to FIG. 94 to FIG. 98. Note that steps T1 and T5 respectively correspond to steps t1 and t2 (or t3) in FIG. 92.

Figure 94:
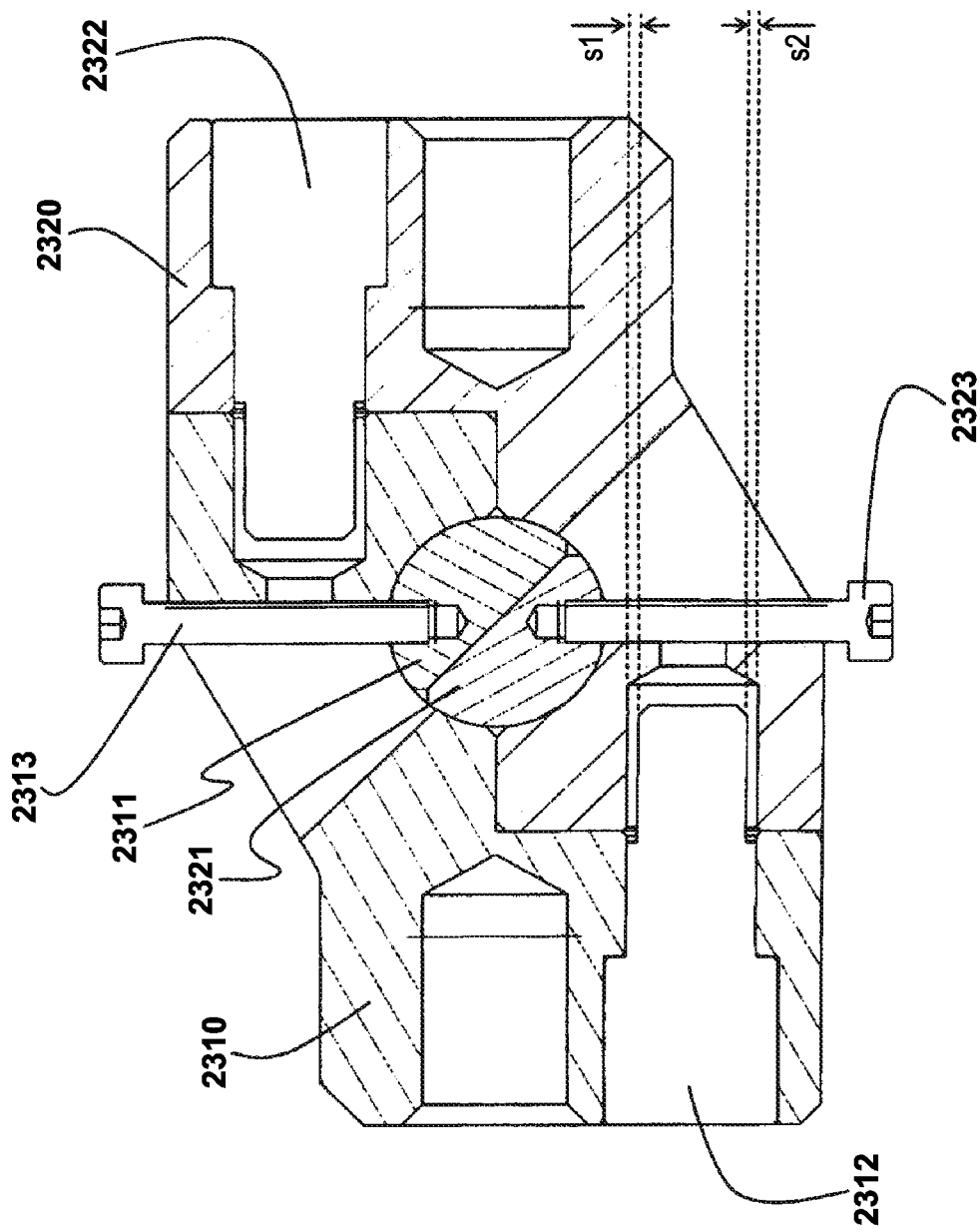
FIG. 94 is an actuation principle explanatory diagram of the annular fastening device in another embodiment of the present invention.

A state in step T1 in FIG. 93 is shown in FIG. 94. In this state, when tension due to an external force does not act on the coupling members 2001, the adjustment gap S is given between the guide pins 2003 and the guide holes 2005. In the state shown in FIG. 93, a total of a gap s1 and a gap s2 formed beside the guide pin is the adjustment gap S.

Figure 95:
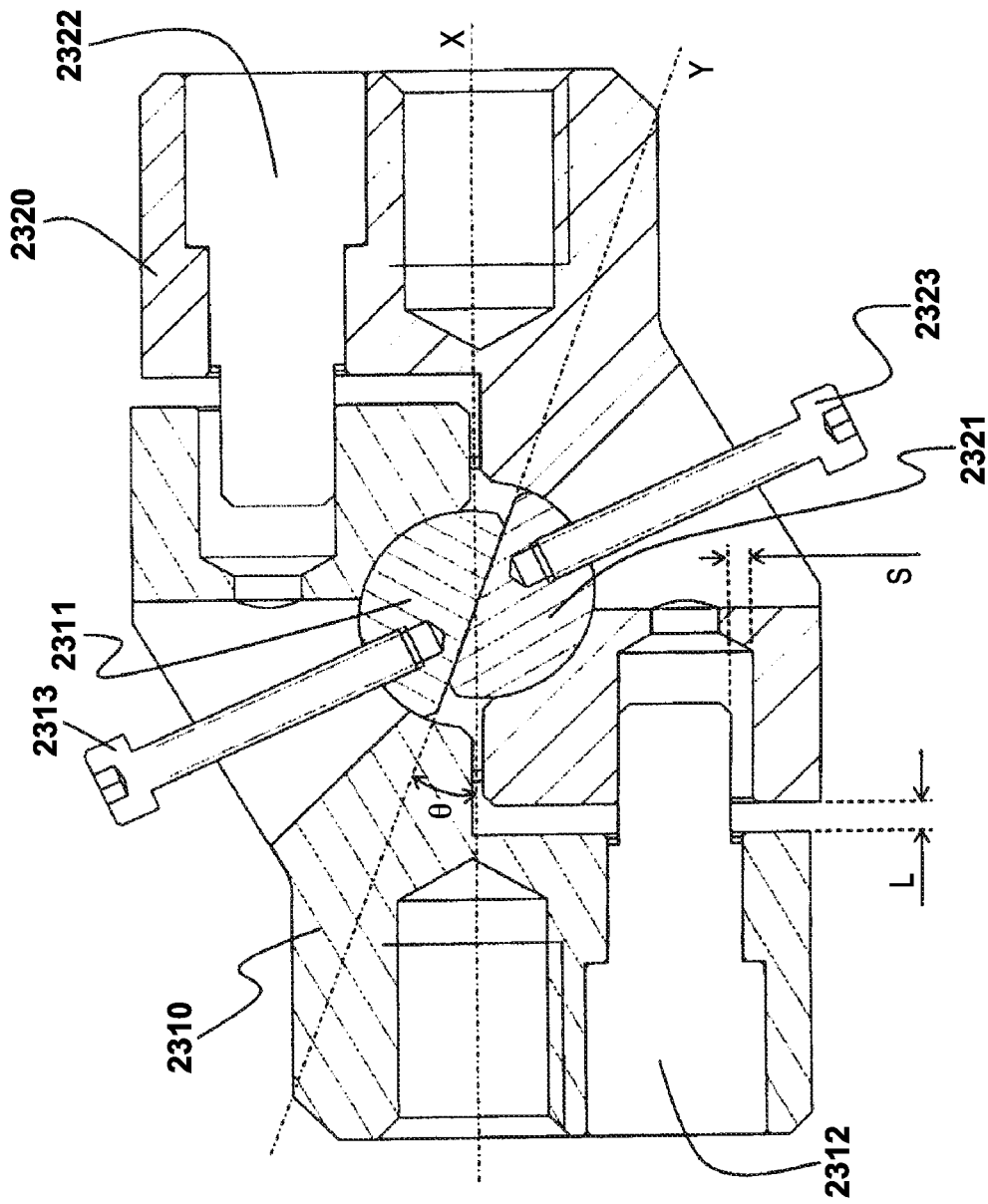
FIG. 95 is another actuation principle explanatory diagram of the annular fastening device in another embodiment of the present invention.

In FIG. 95, a state is shown in which tension due to an external force acts on the coupling members 2001 in the same state as FIG. 94. The state corresponds to step T2 in FIG. 93. In this state, the fixed shaft 2002 slides on the dividing surface F2 with the tension.

When the first coupling member 2310 moves by S upward in FIG. 95, the guide pin 2312 and the guide hole 2524 come into contact and the sliding stops. When an angle formed by the reference plane X and the contact surface Y is represented as θ, the movement amount L in the reference plane X direction at this time is L=S/tan θ.

As it is seen from the equation for calculating the movement amount L, a relation between the first predetermined angle θ1 and the movement amount L can be optionally determined by setting a dimension of S to an appropriate value during design of the guide pins 2003 and the guide holes 2005. Note that, when the movement amount L is increased to a certain degree, the centers of the first coupling section 2318 and the second coupling section 2328 dethroughte. Therefore, when an external force is applied by the separation target object connected to the first coupling section 2318 and the second coupling section 2328, attachment positions of the first coupling section 2318 and the second coupling section 2328 with respect to the direction perpendicular to the reference plane X may be set such that the centers of the first coupling section 2318 and the second coupling section are aligned in the state shown in FIG. 95, that is, a state in which the first coupling member 2310 and the second coupling member 2320 respectively move up and down and the guide pins 2003 come into contact with surfaces on the outer side of the guide holes 2005.

When the rotation of the fixed shaft 2002 is advanced by the unlocking motor M or the like, the movement amount L gradually increases as the angle θ decreases. That state is shown in step T3 in FIG. 93. Even if the number of revolutions is fixed, the movement amount L does not linearly increase. That is, as it is seen from the equation for calculating the movement amount L, a change in the movement amount L is small with respect to a change in the angle θ when the angle θ is 90 degrees or less and is relatively large. An impact applied to the separating mechanism 2301 is also small. It is seen from the equation for calculating L that the movement amount L suddenly diverges to infinity as the angle θ decreases and approaches 0.

Actually, at a point in time when L reaches predetermined magnitude, the guide pins 2003 come off the guide holes 2005, whereby restriction of the first coupling member 2310 and the second coupling member 2320 is released and the first coupling member 2310 and the second coupling member 2320 are separated. However, depending on setting of parameters such as the force of rotation of the unlocking motor M, a rotating direction distal end of the fixed shaft 2002 comes into contact with the surfaces forming the contact surfaces F1 of the coupling members 2001 and then the guide pins 2003 come off the guide holes 2005 and the coupling members 2001 are separated. In this embodiment, it is possible to control a temporal change amount of L by controlling the number of revolutions of the unlocking motor M.

Figure 96:
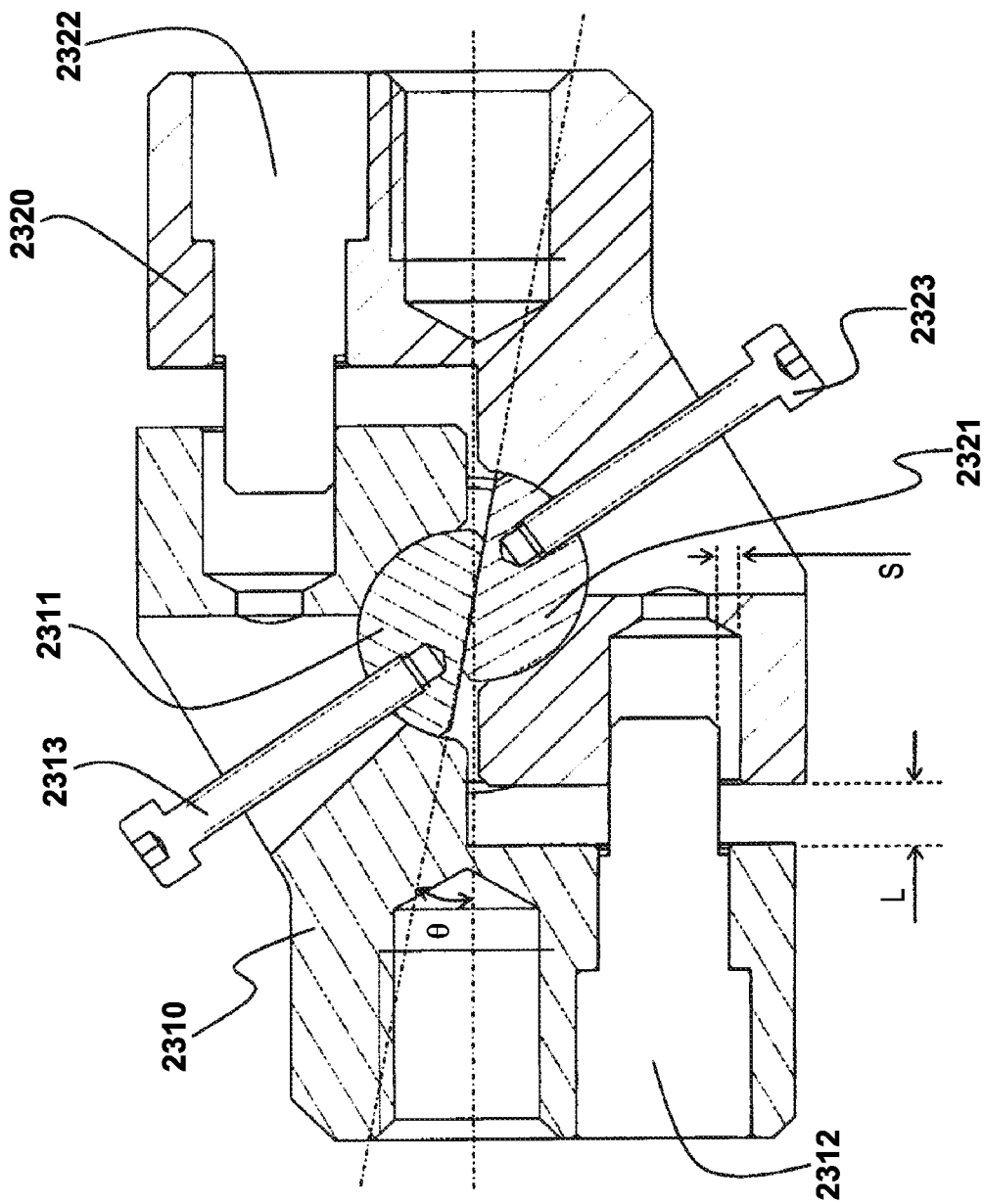
FIG. 96 is another actuation principle explanatory diagram of the annular fastening device in another embodiment of the present invention.

That is, the length of the guide pins 2003 may be set such that the separating device 310 changes to the uncoupled state in which the guide pins 2003 come off the guide holes 2005 in the state shown in FIG. 96 (step T4 in FIG. 93) and the first coupling member 2310 and the second coupling member 2320 are uncoupled. The separating device 310 may change to the uncoupled state in which the first coupling member 2310 and the second coupling member 2320 are uncoupled in a position where the reference plane X and the contact surface Y coincide with each other (step T5 in FIG. 93).

That is, to summarize the above explanation, step T1 in FIG. 93 is the coupled state corresponding to t1 in FIG. 92. When the rotation of the fixed shaft 2002 is advanced, the coupled state changes to the state in step T5 in FIG. 93, which is the uncoupled state, through a transitional state after the start of the separating operation shown in steps T2 and T3 in FIG. 93. Step T5 in FIG. 93 corresponds to t2 or t3 in FIG. 92. Note that steps t3 and t4 in FIG. 92 show a separated state in the case in which a force in a direction for separating the first coupling member 2310 and the second coupling member 2320 is applied by an external force after the uncoupled state.

A case of a change of the first predetermined angle θ1 will be explained. When the first predetermined angle θ1 is reduced, torque necessary for rotating the fixed shaft 2002 with the driving force of the unlocking motor M can be reduced when the separating operation is started from the coupled state. That is, a small motor can be used as the unlocking motor M. The separating device 310 or the entire apparatus can be reduced in size.

Note that, in the embodiment described above, the first predetermined angle θ1 is set to approximately 30 degrees. Driving at relatively small driving torque can be performed while keeping a certain degree of tension as the coupled state. A reduction in the size of the separating device 310 is achieved.

Figure 97:
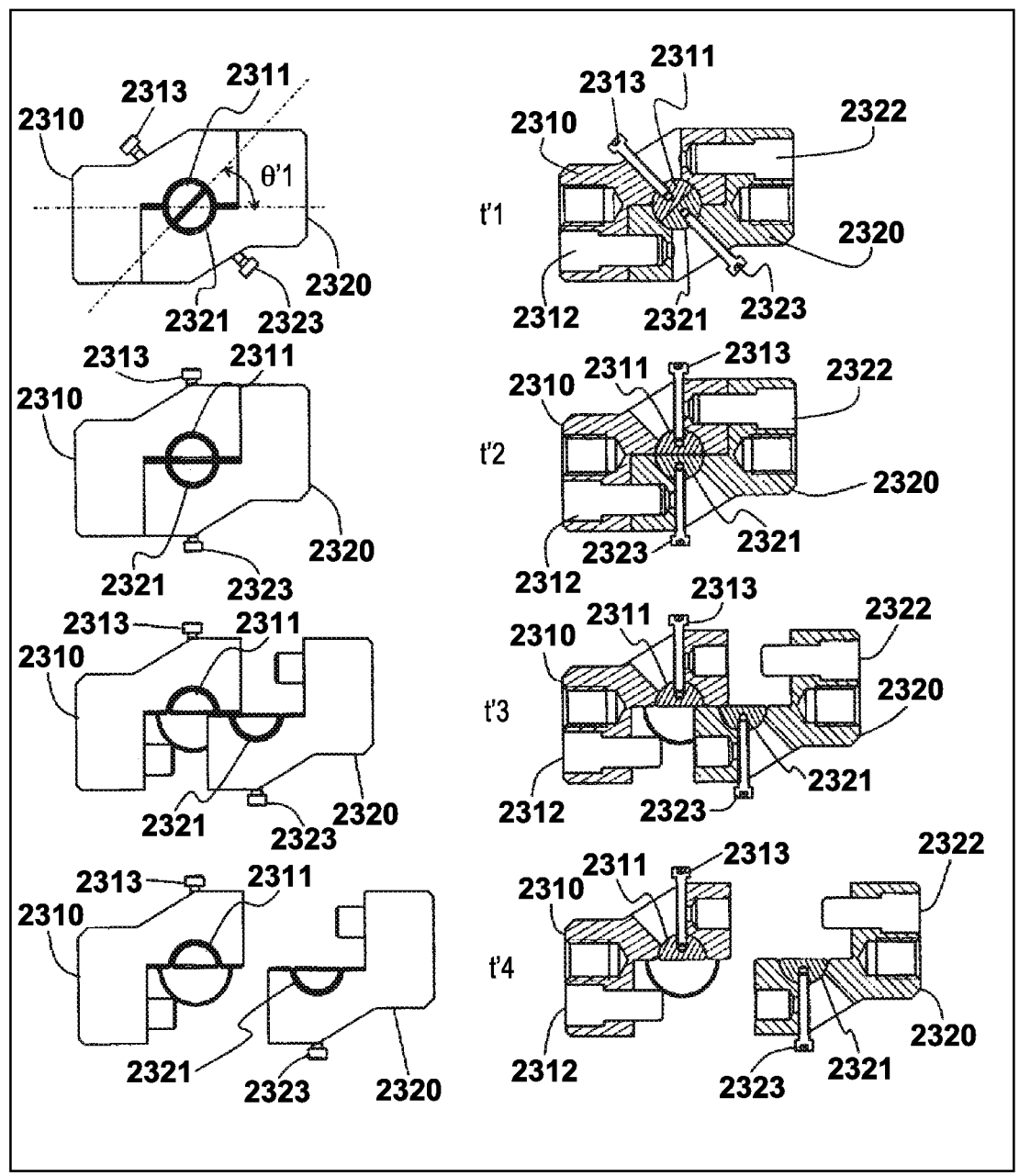
FIG. 97 is another separating operation explanatory diagram of the annular fastening device in another embodiment of the present invention.

An explanatory diagram of another separating operation (clockwise separation) of the coupling/uncoupling device in an embodiment of the present invention is shown in FIG. 97. A front view of the separating device 310 is shown on the left side of the figure. A sectional view of the separating device 310 is shown on the right side of the figure. A method of a basic separating operation is the same as the separating operation explained above. Therefore, details are omitted. Only differences are explained.

Step t'1 shows the coupled state of the coupling/uncoupling device according to this embodiment. In step t'1, both of the first fixed shaft 2311 and the second fixed shaft 2321 in the fixed shaft 2002 are in positions across the first coupling member 2310 and the second coupling member 2320. More in detail, the coupling/uncoupling device changes to a state in which the fixed shaft 2002 is rotated by the second predetermined angle (an initial angle) θ'1 in a counterclockwise (CCW) direction as shown in step t'1 from a state in which the dividing surface F2 of the fixed shaft 2002 is in flush with the contact surface F1 of the coupling member 2001 shown in step t'2.

When the fixed shaft 2002 is rotated in the clockwise (CW) direction in FIG. 97 by the unlocking motor M, the first fixed shaft 2311 and the second fixed shaft 2321 gradually escape from the inside of the other coupling member 2001. When the rotation is further continued, the separating operation reaches a state in step t2. Note that the rotation of the fixed shaft 2002 does not always need to be performed by the unlocking motor M. For example, the fixed shaft 2002 may be urged by a torsion spring in a state in which the fixed shaft 2002 is held by an electromagnetic clutch. The rotation of the fixed shaft 2002 may be performed by a restoration force of the torsion spring by release of the electromagnetic clutch.

When the separating operation reaches step t'2, the first fixed shaft 2311 is present only in the first coupling member 2310 and the second fixed shaft 2321 is present only in the second coupling member 2320. Separation of the coupling members 2001 is possible.

By rotating the fixed shaft 2002 in the CW direction to release engagement, the coupled state of the first coupling member 2310 and the second coupling member 2320 can be secured and the adhesion state of the first coupling member 2310 and the second coupling member 2320 can be kept until transition from step t'1 to step t'2. Separation can be quickly performed according with reaching step t'3 compared with the separating operation in the counterclockwise direction. A principle for this is explained below.

For explanation, a state is assumed in which an external force in a separating direction is applied to the coupling members 2001 by the separation target object. The state is a state in which the first coupling member 2310 is pulled to the left side in FIG. 97 by an external force of an object connected to the first coupling section 2318 and the second coupling member 2320 is pulled to the right side in FIG. 97 by an external force of an object connected to the second coupling section 2328.

In that case, in the state in step t'1, the first fixed shaft 2311 receives a leftward force in FIG. 97 from the first coupling member 2310. At that time, the first fixed shaft 2311 is in direct contact with the second coupling member 2320 and receives a rightward force in FIG. 97 from the second coupling member 2320. Even if the adjustment gap S is formed between the guide pins 2003 and the guide holes 2005 as in the separating method between the members or by the rotation in the CCW direction, a relative position to the second coupling member 2320 changes only by the adjustment gap S or less.

As a result, the first coupling member 2310 does not move to the left side with respect to the second coupling member 2320 before transition to step t'2. The coupled state of the first coupling member 2310 and the second coupling member 2320 can be kept until transition to the state in step t'2. The coupling can be relatively suddenly released by reach to step t'2.

That is, the coupling/uncoupling device in this embodiment is used in a state immediately before the reach to step t'2. The coupling can be released immediately after the start of the uncoupling operation (a rising time of the uncoupling operation can be reduced) by slight rotation in the CW direction. Therefore, the device is used by setting the second predetermined angle θ'1 in the coupled state to an angle for uncoupling by small rotation unlike the first predetermined angle θ1 set to a certain degree of magnitude to perform sure coupling. Consequently, uncoupling can be instantaneously performed when it is requested to quickly perform the uncoupling. Naturally, the second predetermined angle θ'2 may be equal to the first predetermined angle θ1 or is not prevented from being set larger than the first predetermined angle θ1.

Starting the uncoupling operation means, for example, a point in time when a driving command for the uncoupling operation is output to the unlocking motor M or a point in time when a release command is output to the electromagnetic clutch in order to release a restoration force of the torsion spring to rotate the fixed shaft 2002.

Figure 98:
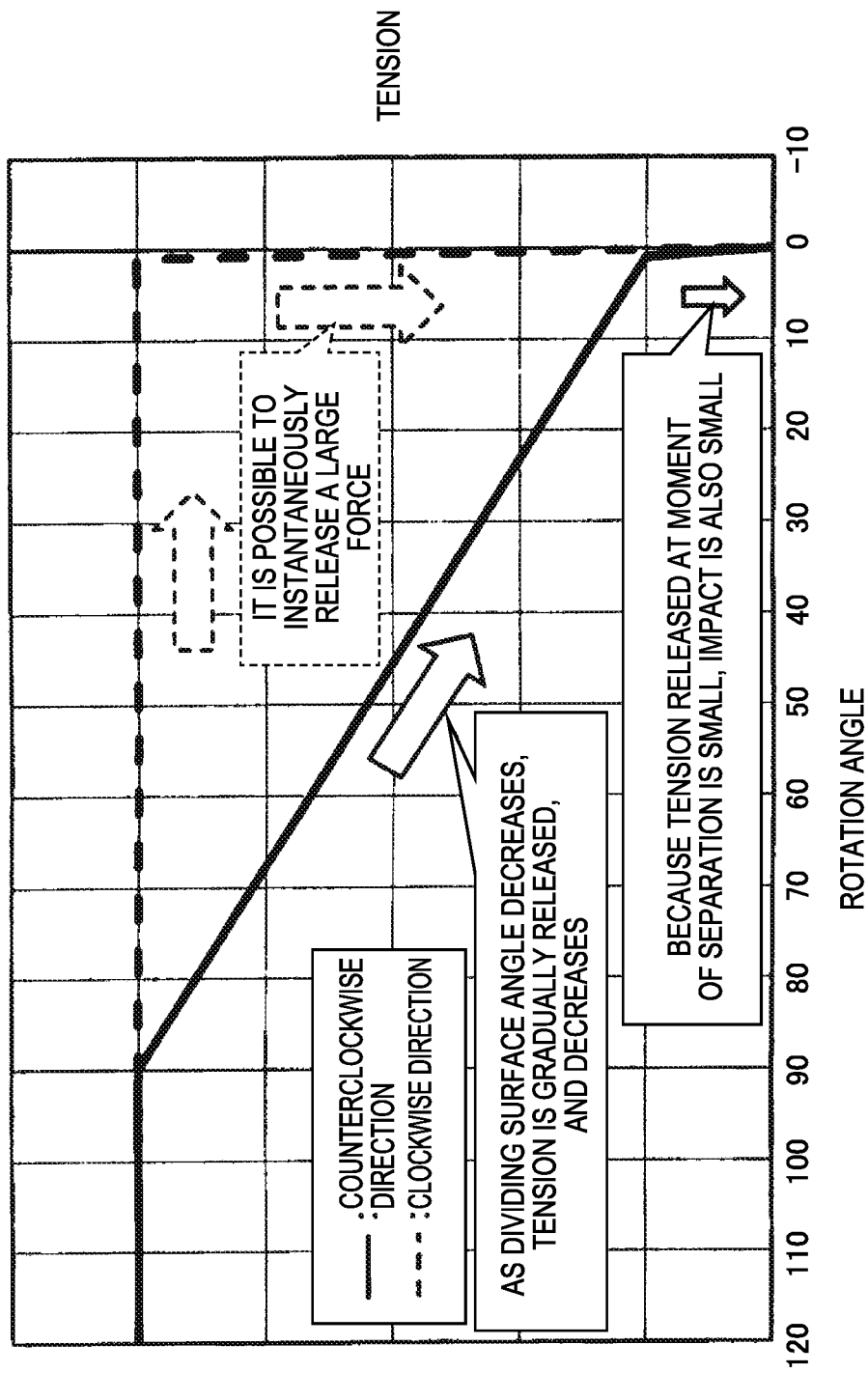
FIG. 98 is a comparative diagram of the operation of the annular fastening device in another embodiment of the present invention.

FIG. 98 is a conceptual diagram showing comparison of tensions applied to the coupling members 2001 when the counterclockwise separation (the separation in the CCW direction) is performed and when the clockwise separation (the separation in the CW direction) is performed. Note that, like the change in the movement amount L with respect to the angle θ explained above, actually, the tensions do not linearly decrease. However, in FIG. 98, the tensions are simplified and linearly represented for explanation.

The tension applied when the counterclockwise separation is performed indicated by a solid line in FIG. 98 decreases as the angle θ of the dividing surface (the contact surface) F2 of the first fixed shaft 2311 and the second fixed shaft 2321 decreases as explained above. On the other hand, the tension applied when the clockwise separation is performed indicated by a broken line in FIG. 98 instantaneously decreases to 0 when the angle θ' of the dividing surface (the contact surface) F2 of the first fixed shaft 2311 and the second fixed shaft 2321 approaches 0 as explained above.

On the other hand, the impact applied to the coupling members 2001 and the like during the uncoupling can be set smaller when the counterclockwise separation is performed.

By realizing structure including a plurality of methods of uncoupling in one coupling/uncoupling device in this way, it is possible to select an uncoupling method according to a use and a purpose of an apparatus. It is possible to increase versatility of the coupling/uncoupling device.

Sixteenth Embodiment

Figure 99:
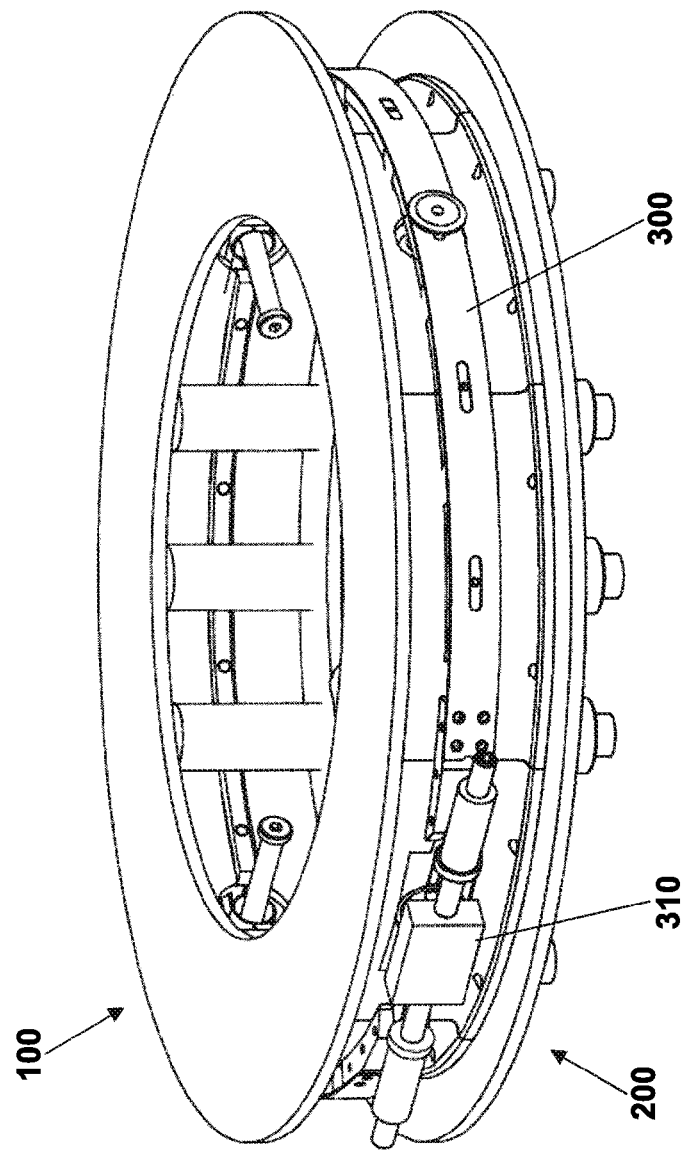
FIG. 99 is a perspective view of an annular fastening device in another embodiment of the present invention.

In FIG. 99, an annular fastening device according to a sixteenth embodiment in the present invention is shown. Basic structure in this embodiment is the same as the basic structure in the fifteenth embodiment. Therefore, only differences are explained. Explanation of other portions is omitted. Concerning reference numerals and signs in the drawings, the same reference numerals and signs as the reference numerals and signs in the fifteenth embodiment are sometimes used.

FIG. 99 shows a perspective view of the annular fastening device according to this embodiment. The annular fastening device according to this embodiment is configured in a state in which the upper stage member 100 and the lower stage member 200 are in contact with each other. An external force is applied in a ring center direction by the Maruman band 300. The upper stage member 100 and the lower stage member 200 are engaged.

Figure 100:
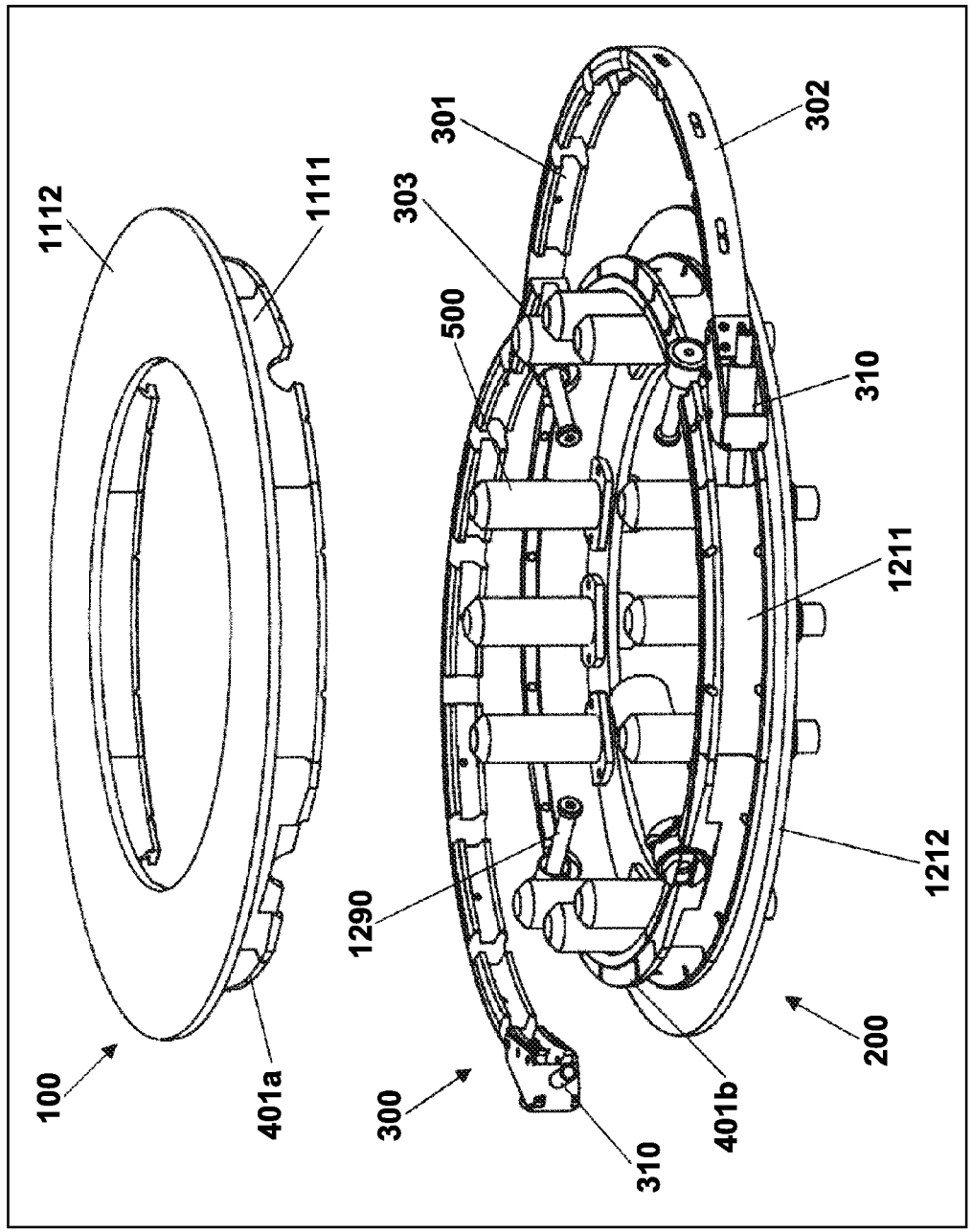
FIG. 100 is an exploded perspective view of the annular fastening device in another embodiment of the present invention.

As shown in a perspective view of FIG. 100, in a state in which the separating device 310 joined to the end portion of the Maruman band 300 is actuated and the Maruman band 300 is cut, the engagement by the Maruman band 300 is released. The Maruman band 300 is displaced to a ring outer side with distortion energy of the Maruman band 300 and is displaced to the ring outer side by side springs 1290 disposed in the lower stage member 200. In this embodiment, a plurality of side springs 1290 are disposed in the circumferential direction. More in detail, the side springs 1290 are respectively provided in a position opposed to the separating device 310 and positions shifted 90 degrees from the position. Three side springs 1290 are disposed.

The upper stage member 100 is displaced in a center axis direction of a ring (the upward direction in FIG. 100) by elastic energy generated by separating means 500 disposed in the lower stage member 200. In the following explanation, the upward direction in FIG. 100 is sometimes simply referred to as upward direction. In this embodiment, a plurality of separating means 500 are disposed along the inner circumference of the ring. Three separating means 500 are disposed along the circumference and thereafter the side springs 1290 are disposed to set a load applied to the upper stage member 100 uniform along the circumferential direction. More in detail, three separating means 500 are provided between the side springs 1290 or the separating devices 310. Twelve separating means 500 in total are provided.

The lower stage member 200 is configured from a lower stage fastening plate 1212 and lower stage divided rings 1211.

The lower stage fastening plate 1212 is a plate molded into a disk shape. The upper side of the lower stage fastening plate 1212 is fastened to the lower stage divided ring 1211 by screws. The lower side of the lower stage fastening plate 1212 is joined to a rocket or the like. Further, when a reduction in the weight of the rocket or the like is necessary, an aluminum alloy that is excellent in moldability and is a low-density member that allows for a reduction in weight is suitable.

The lower stage fastening plate 1212 can be cut by laser machining. Therefore, the lower stage fastening plate 1212 has flexibility of machining for a reduction in weight and is inexpensive.

The upper stage member 100 is configured from an upper stage fastening plate 1112 and upper stage divided rings 1111.

The upper stage fastening plate 1112 is a plate molded into a disk shape. The lower side of the upper stage fastening plate 1112 is fastened to an upper stage divided clamp by screws. The upper side of the upper stage fastening plate 1112 is joined to a satellite or the like. Further, when a reduction in the weight of a rocket or the like is necessary, an aluminum alloy that is excellent in moldability and is a low-density member that allows for a reduction in weight is suitable.

The upper stage fastening plate 1112 can be cut by laser machining. Therefore, the upper stage fastening plate 1112 has flexibility of machining for a reduction in weight and is inexpensive.

The Maruman band 300 is configured from the clamp 301, the band 302, the separating device 310, and the tension adjusting clamp 303.

The clamp 301 forms a clamp concave section 301a, a ring inner side of which is a concave shape. The clamp 301 has a function of joining a convex section 401 formed when an upper stage convex section 401a of the upper stage divided ring 1111 and a lower stage convex section 401b of the lower stage divided ring 1211 are in contact and engaging the upper stage convex section 401a and the lower stage convex section 401b.

The tension adjusting clamp 303 has a function of pulling the band 302 in the circumferential direction of the ring and applying tension to the band 302.

The separating device 310 has a function of disengaging the band 302 using an explosive device or the like. However, the separating device 310 may disengage the band 302 without using the explosive device or the like.

As shown in FIG. 100, the upper stage convex section 401a is configured from a plurality of upper stage divided rings 1111 and not-shown upper stage pins 113 inserted through among the upper stage divided rings 1111.

The upper stage divided ring 1111 is joined to the other upper stage divided rings 1111 disposed in the circumferential direction to form a ring. Therefore, the upper stage divided rings 1111 are engaged while being precisely positioned by inserting the upper stage pins 113 into the upper stage holes 111a. A plurality of upper stage holes 111a are desirably provided on the outer circumference side of the upper stage member 100. In this embodiment, at least one upper stage pin 113 is provided inside the upper stage convex section 401a.

The upper stage pins 113 have not only a function of precise positioning but also a function of transmitting a load applied in the airframe shaft direction to the upper stage divided rings 1111.

Further, when necessary strength of the upper stage pins 113 is smaller than the necessary strength of the upper stage divided rings 1111, it is suitable to use an aluminum alloy or the like having small strength because the upper stage pins 113 can be inexpensively manufactured.

The lower stage convex section 401b is configured from a plurality of lower stage divided rings 1211 and not-shown lower stage pins 213 inserted through among the lower stage divided rings 1211.

The lower stage divided ring 1211 is joined to the other lower stage divided rings 1211 disposed in the circumferential direction to form a ring. Therefore, the lower stage divided rings 1211 are engaged while being precisely positioned by inserting the lower stage pins 213 into the lower stage holes 211a. The plurality of lower stage holes 211a are desirably provided on the outer circumference side of the lower stage member. In this embodiment, at least one lower stage pin 213 is provided inside the lower stage convex section 401b.

The lower stage pins 213 have not only a function of precise positioning but also a function of transmitting a load applied in the airframe shaft direction to the lower stage divided rings 1211.

Further, when necessary strength of the lower stage pins 213 is smaller than the necessary strength of the lower stage divided rings 1211, it is suitable to use an aluminum alloy or the like having small strength because the lower stage pins 213 can be inexpensively manufactured.

Functions can be partially added to the upper stage divided rings 1111 and the lower stage divided rings 1211 by respectively changing the shapes of the upper stage divided rings 1111 and the lower stage divided rings 1211. For example, as explained below, side springs or separation springs are provided in one of the plurality of upper stage divided rings 1111 and the plurality of lower stage divided rings 1211 to make it possible to easily perform the separating operation. In addition, it is possible to change a material of only that portion to a material having different strength. When an apparatus relatively light in weight such as a satellite is mounted on the upper stage member 100 side, an interval among the upper stage divided rings 1111 can be set wider than an interval among the lower stage divided rings 1211 to make the upper stage lighter in weight than the lower stage. This is suitable for posture control and the like in operation of the satellite. When it is desired to further increase separation energy of the upper stage member 100 or when mass eccentricity occurs, separation springs can be added among the upper stage divided rings 1111 or the lower stage divided rings 1211. As explained below, when gaps are provided among the divided rings, separation springs or side springs may be provided in the gaps.

Figure 101:
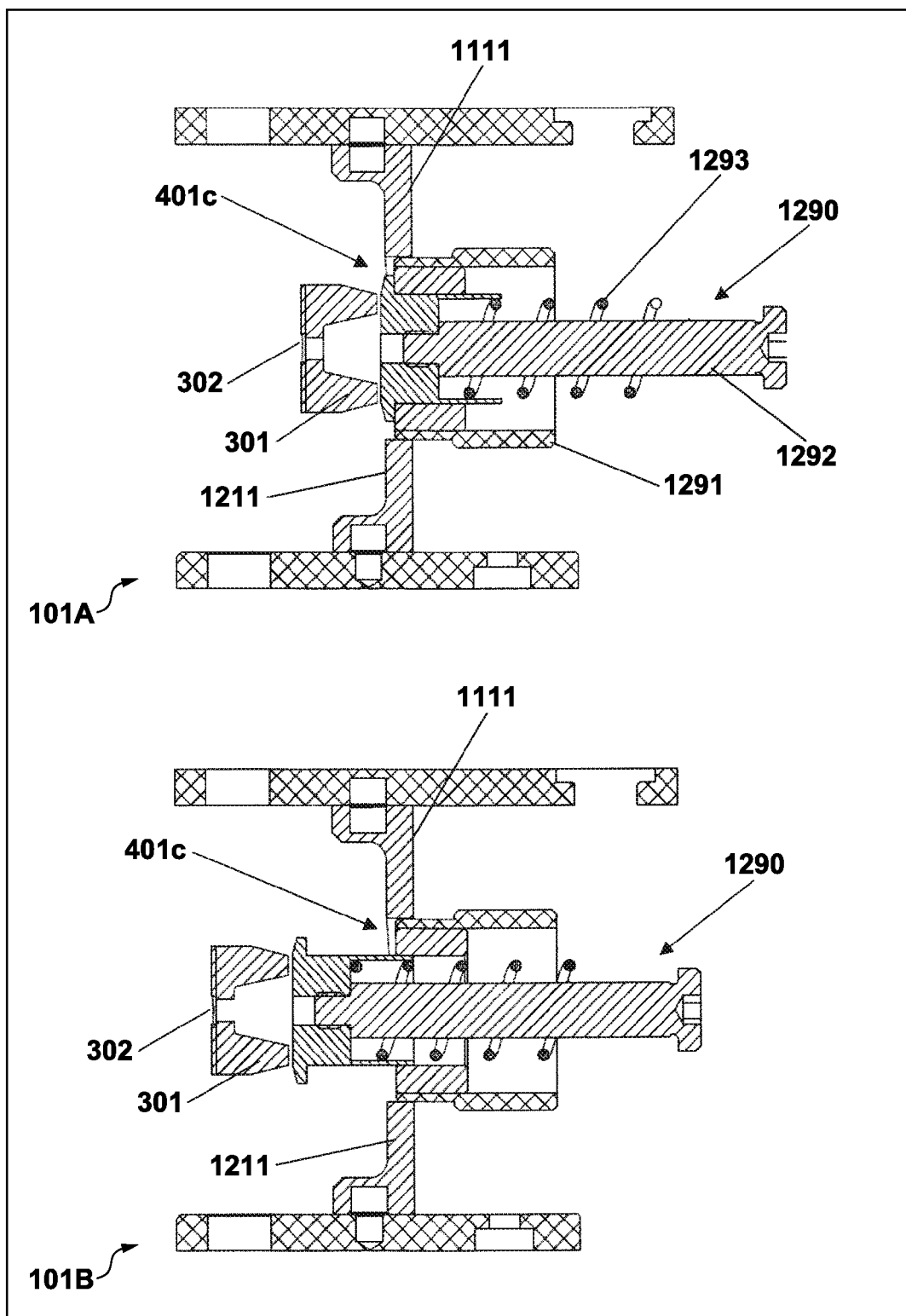
FIG. 101 is a sectional view showing an operation state of the annular fastening device in another embodiment of the present invention.

A sectional view of a portion where the side spring is set is shown in FIG. 101.

As shown in a state 101A in FIG. 101, during the joining, the clamp 301 comes into contact with a contact surface provided in a position in contact with the clamp 301 in the side spring 1290 and an urging force F is applied from the clamp 301, whereby the upper stage divided ring 1111 and the lower stage divided ring 1211 are engaged. Note that, in FIG. 101, a shape corresponding to the convex section 401 is not provided on the contact surface of the side spring 1290. However, actually, as explained above, the side springs 1290 are only disposed at equal intervals with respect to the circumferential direction. The upper stage member 100 and the lower stage member 200 in portions where the side springs 1290 are not provided respectively include the upper stage convex section 401a and the lower stage convex section 401b and form the convex section 401. The upper stage member 100 and the lower stage member 200 are engaged by joining the clamp concave section 301a of the clamp 301 with the convex section 401.

Note that, as another form of the side spring 1290, the convex section 401 may be provided on the contact surface.

As shown in a state 101B in FIG. 101, during separation, the urging force F disappear and the clamp 301 is displaced to the ring outer side. Therefore, restriction of the upper stage convex section 401a and the lower stage convex section 401b is released. The upper stage convex section 401a and the lower stage convex section 401 are separated.

Note that, with the urging force F during the joining, the clamp concave section 301a of the clamp 301 sometime bites into the convex section 401, which is formed by contact of the upper stage convex section 401a and the lower stage convex section 401b, to be deformed and prevents the clamp 301 from being displaced to the ring outer side during the separation. Therefore, it is desirable to reduce friction of the convex section 401 and the clamp concave section 301a. It is suitable to carry out, on the surfaces of the convex section 401 and the clamp concave section 301a, molybdenum disulfide coating (equivalent to MIL-L-23398), surface treatment by a film combined with fluororesin by a hard anode, or the like.

When the clamp 301 is not displaced to the ring outer side according to the biting or the like, the clamp 301 is forcibly displaced to the ring outer side by an urging force of the side spring 1290. Note that the side spring 1290 may always exert the urging force on the ring outer side.

As shown in FIG. 101, when the side spring 1290 is mounted, a hole 401c is opened on the contact surface of the upper stage divided ring 1111 and the lower stage divided ring 1211. The side spring 1290 is set in the part of the hole 401c.

The side spring 1290 is configured from a housing 1291, a shaft 1292, and a compression spring 1293.

The housing 1291 is fixed to the lower stage fastening plate 1212 by not-shown screws. However, the housing 1291 does not always have to be fixed to the lower stage fastening plate 1212. When the upper stage member 100 and the lower stage member 200 are separated, the housing 1291 only has to be fixed to the lower stage member 200 side. For example, the housing 1291 may be attached to any one of the lower stage divided rings 1211.

The shaft 1292 is inserted into the housing 1291 and can slide in the ring radial direction.

The compression spring 1293 is inserted between the housing 1291 and the shaft 1292. The compression spring 1293 generates an urging force P for displacing the band 302 to the ring outer side to the shaft 1292.

Note that, since the clamp 301 is joined to the band 302 through a bolt, when the band 302 is displaced, the clamp 301 is displaced in the same manner.

During the joining, the urging force F by the band 302 is larger than the urging force P by the side spring 1290. Therefore, the band 302 is not displaced from a predetermined position during the joining.

As shown in the state 101B in FIG. 101, during the separation, the urging force F by the band 302 disappears. Therefore, the band 302 and the clamp 301 are displaced to the ring outer side by the urging force P by the side spring 1290.

Structure is explained in which the separating means 500 is disposed in order to separate the upper stage member 100 and the lower stage member 200 in the airframe shaft direction and an urging force W for separating the upper stage member 100 and the lower stage member 200 in the airframe shaft direction is applied.

Figure 102:
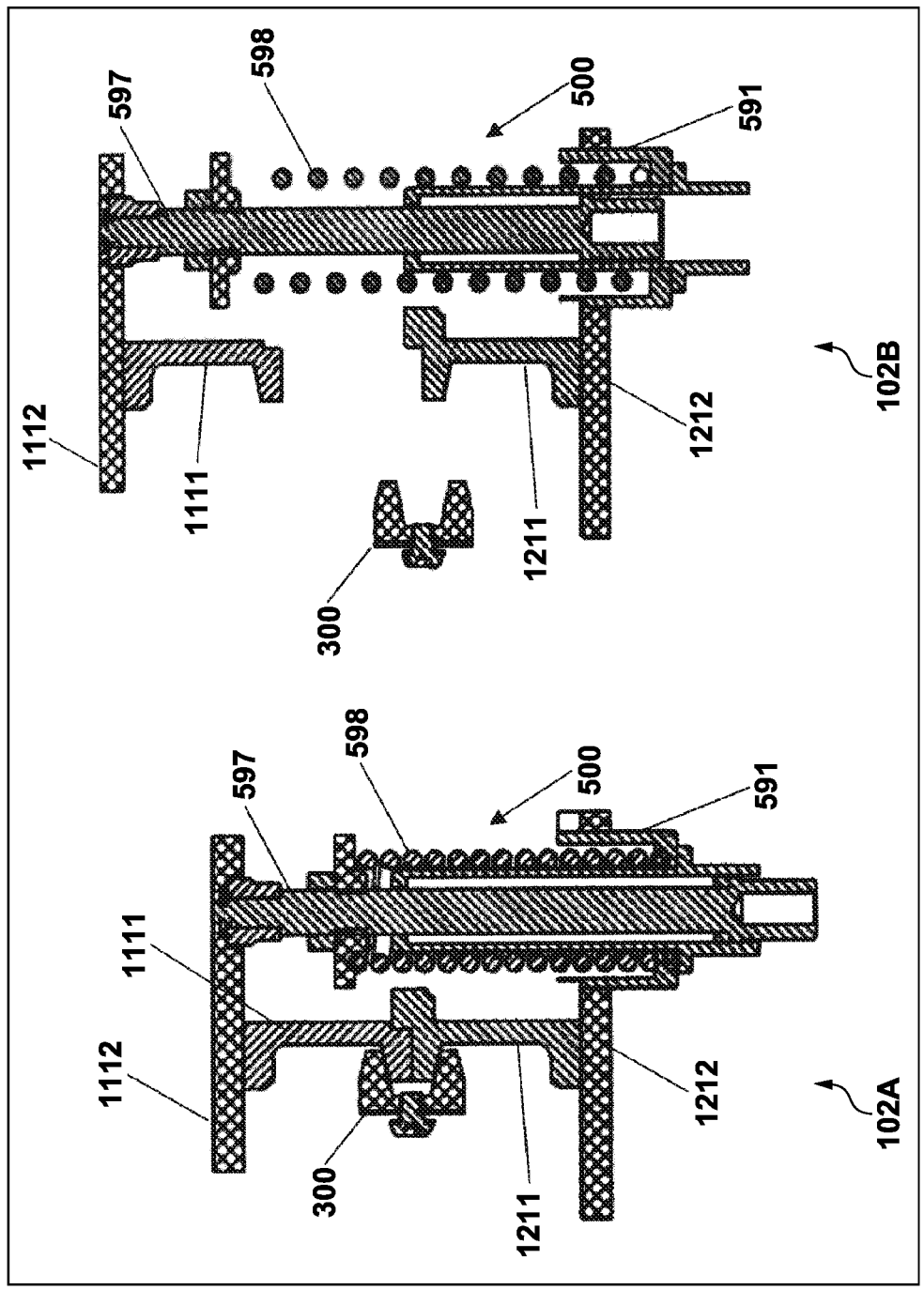
FIG. 102 is a sectional view showing an operation state of the annular fastening device in another embodiment of the present invention.

As shown in a state 102A of FIG. 102, when the separating means 500 is mounted, a hole is opened in the lower stage fastening plate 1212 and the separating means 500 is set in the part of the hole.

The separating means 500 is configured from a housing 591, a piston 597, and a compression spring 598.

The housing 591 is inserted into the hole opened in the lower stage fastening plate 1212 and fixed to the lower stage fastening plate 1212 by not-shown screws.

The piston 597 is inserted into the housing 591 and can slide in the airframe shaft direction.

The compression spring 598 is inserted between the housing 591 and the piston 597. The compression spring 598 generates the urging force W for causing the piston 597 to displace the upper stage fastening plate 1112 in the airframe shaft direction.

Note that, when the urging force W is large, rigidity can be imparted to the shape of the upper stage fastening plate 1112.

During the joining, since the distance between the upper stage fastening plate 1112 and the lower stage fastening plate 1212 is short, the compression spring 598 is compressed and held in an urged state.

As shown in a state 102B in FIG. 102, during the separation, the restriction of the upper stage member 100 and the lower stage member 200 is released. Therefore, the upper stage member 100 and the lower stage member 200 are separated by the urging force W of the separating means 500.

Seventeenth Embodiment

Figure 103:
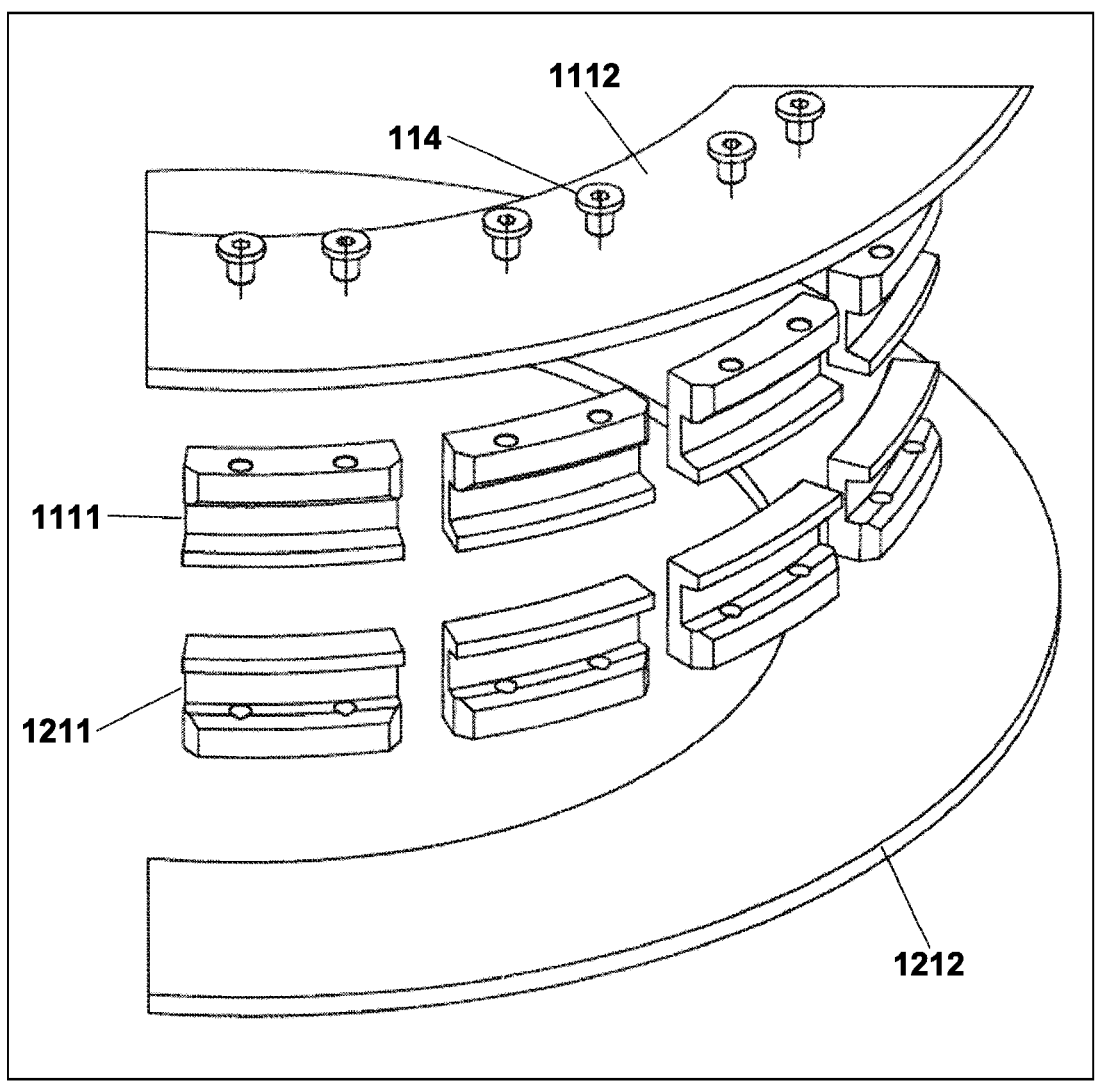
FIG. 103 is an exploded perspective view of an annular fastening device in another embodiment of the present invention.

In FIG. 103, an exploded perspective view of an annular fastening device according to a seventeenth embodiment in the present invention is shown. Basic structure in this embodiment is the same as the basic structure in the fifteenth embodiment and the sixteenth embodiment. Therefore, only differences are explained. Explanation of other portions is omitted. Concerning reference numerals and signs in the drawings, the same reference numerals and signs as the reference numerals and signs in the fifteenth embodiment are sometimes used.

As shown in FIG. 103, in the upper stage member 100 of the annular fastening device in this embodiment, the upper stage divided rings 1111 are annularly attached to the upper stage fastening plate 1112 not to be adjacent to one another. For the attachment, as shown in FIG. 103, the upper stage divided rings 1111 are fixed to the upper stage fastening plate 1112 from the axial direction by the upper stage bolts 114. In the lower stage member 200, similarly, the lower stage divided rings 1211 are annularly attached to the lower stage fastening plate 1212 not to be adjacent to one another. Note that, in this embodiment, the annularly disposed upper stage divided rings 1111 may be formed in a flat shape such that outer surfaces and inner surfaces of the upper stage divided rings 1111 with respect to the radial direction of the ring are planes. Even in that case, the upper stage divided rings 1111 are considered to be annularly disposed. The shape of the clamp 301 formed in the Maruman band 300 explained below may be the same as the shape in the fifteenth embodiment. However, the clamp concave section 301a is suitably formed in a shape corresponding to the flat shape.

With this structure, an amount of use of the upper stage divided rings 1111 and the lower stage divided rings 1211 (hereinafter collectively referred to as divided rings 11) can be reduced. Fixing of the divided rings 11 does not have to be performed. The attachment can be easily performed.

Since the fixing of the divided rings 11 is not performed, rigidity against a fastening force by the Maruman band 300 decreases. However, the annular fastening device can be suitably used for a fastening structure having a relatively low fastening force such as, for example, an inter-stage joint of a satellite and a rocket. The number of divided rings 11 in use can also be set as appropriate. Besides, for example, the annular fastening device is suitable when performing simple fastening such as fastening of a wine barrel and a sake barrel shown in FIG. 88.

Figure 104:
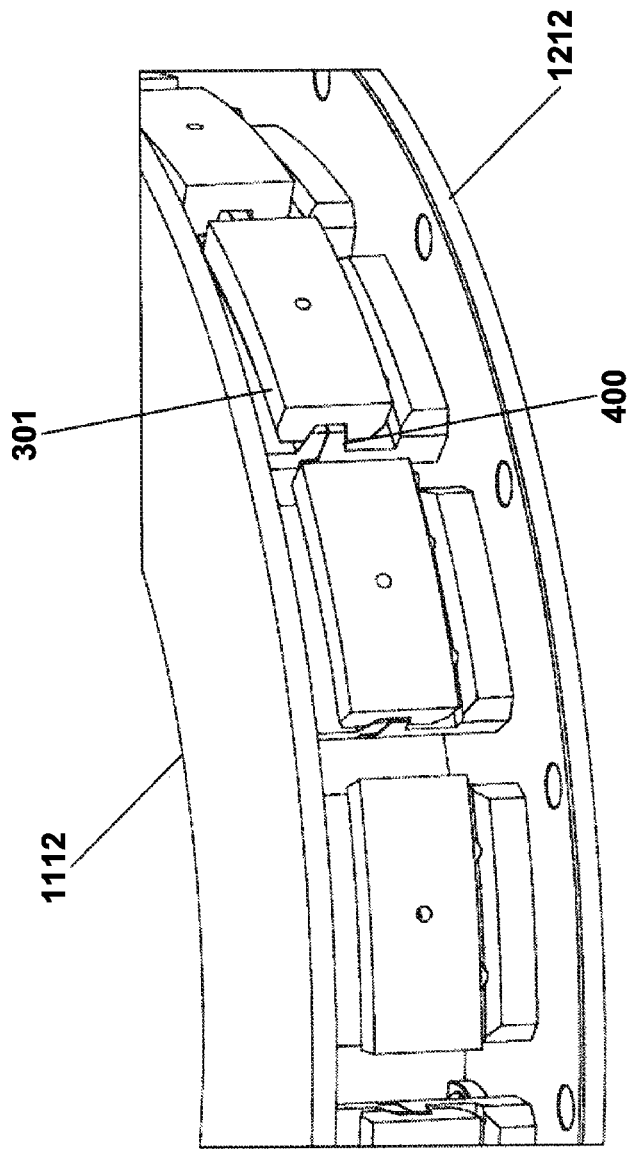
FIG. 104 is an enlarged perspective view of the annular fastening device in another embodiment of the present invention.

In FIG. 104, a perspective view of the annular fastening device in this embodiment is shown. FIG. 104 is a figure for explanation in which only the band 302 is deleted in a state in which the upper stage member 100 and the lower stage member 200 are fastened by the Maruman band 300.

With this structure, the clamps 301 on the Maruman band 300 side only have to be provided in positions corresponding to the convex sections 400 of the divided rings 11. Materials in use can be reduced.

The clamps 301 may be continuously provided over the inner circumference of the band 302 or may be provide at a predetermined interval across two convex sections 400.

Eighteenth Embodiment

Figure 105:
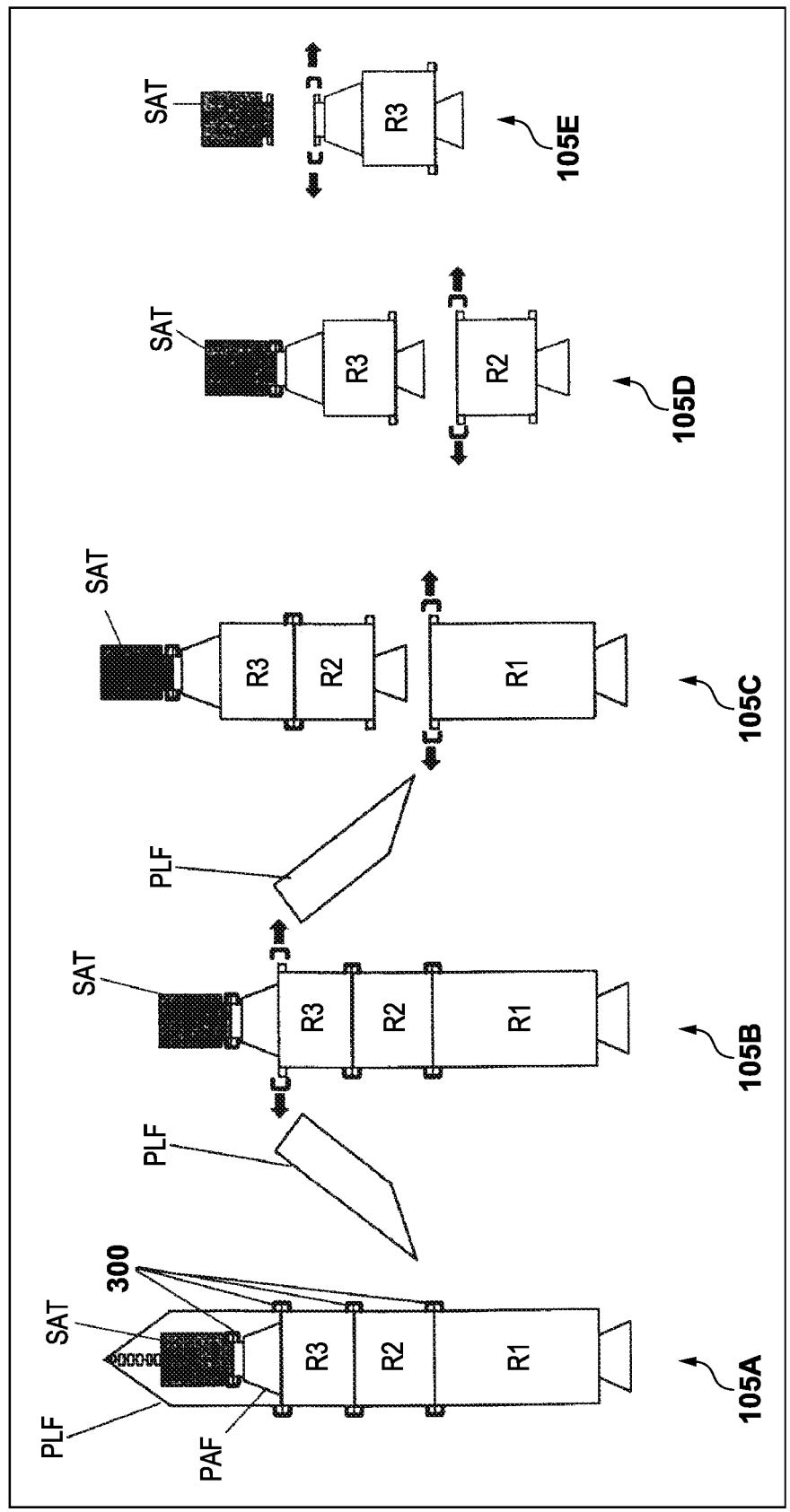
FIG. 105 is an explanatory diagram of an application example of an annular fastening device according to the present invention.

In FIG. 105, an example is shown in which the annular fastening device according to the present invention is applied as a separating device for a fairing on which a satellite or the like is mounted and a rocket. In a state 105A in FIG. 105, a rocket in which loads such as a satellite SAT are mounted in a rocket body configured in three stages and a fairing PLF provided in an upper part of the rocket body is shown. The annular fastening devices according to the present invention are respectively provided between the stages of the rocket and the fairing PLF. The annular fastening device according to the present invention is provided between a satellite joint PAF and the satellite SAT as well. Note that any one of the forms of the annular fastening devices in the embodiments explained above may be used.

As shown in a state 105B to a state 105E in FIG. 105, in detachment of stages R1, R2, and R3 of the rocket and the fairing PLF and separation of the satellite SAT and the satellite joint PAF, by using the annular fastening device according to the present invention, it is possible to perform secure fastening. Further, in the fastening of the satellite SAT and the satellite joint PAF, as explained above, the annular fastening device can be simply configured while securing strength. Manufacturing cost can be reduced. If the separating device 310 according to the present invention is used, in particular, the separating device 310 is extremely suitable in separation of the satellite SAT and the satellite joint PAF in which it is desired to reduce an impact as much as possible.

Summary of the Fifteenth Embodiment to the Eighteenth Embodiment

The annular fastening device of the present invention is explained in detail above. However, the present invention is not limited to the embodiments described above. Various improvement and changes can be made in a range not departing from the spirit of the present invention.

For example, the positioning rings (the upper stage positioning ring 112 and the lower stage positioning ring 212) are explained as the examples of the joining member. However, the upper stage pins 113 and the lower stage pins 213 may be configured to function as the joining member. In that case, the upper stage pins 113 are desirably formed integrally or formed by approximately two members to pierce through the plurality of upper stage divided rings 111. The same applies to the lower stage pins 213.

(Notes)

Concerning an annular fastening device that has a relatively large diameter of a ring and needs to be reduced in thickness in order to reduce weight, a dedicated large lathe or the like is necessary for machining. A dedicated large jig for preventing deformation due to own weight is also necessary to secure dimension accuracy. Therefore, there is a problem in that manufacturing cost tends to be high and a delivery time tends to be long and design change cannot be easily performed.

As functions of the ring, if the annular fastening device is integrally formed, it is difficult to take measures when necessary functions are unevenly distributed, for example, there are a part that needs strength and a part that does not need strength and there are a part where friction on a surface is desired to be reduced and a part where friction on a surface is not desired to be reduced.

A annular fastening device of the present invention includes:

a plurality of members to be fastened that receive an external force and are fastened to a fastening target object; and a joining member attached to the plurality of members to be fastened that are annularly disposed, wherein the joining member annularly couples the plurality of members to be fastened resisting the external force.

The annular fastening device having a large diameter can be formed to be divided into the plurality of members to be fastened and can be manufactured by a general-purpose manufacturing apparatus. Therefore, the annular fastening device can be inexpensively and easily manufactured. Configurations explained below can also be adopted.

The annular fastening device including an annularly formed band member, wherein the band member is annularly disposed to surround a periphery of the member to be fastened and applies the external force to the member to be fastened and tightens and fixes the member to be fastened to the fastening target object.

The annular fastening device wherein the member to be fastened includes a flange section, and the band member includes a clamp shape section that engages with the flange section.

The annular fastening device wherein an outer circumferential surface of the member to be fastened is formed in an arcuate shape, and an outer circumferential surface of the annularly disposed plurality of members to be fastened is a ring.

The annular fastening device wherein the members to be fastened are disposed adjacent to one another.

The annular fastening device wherein the annular fastening device includes a fixing pin inserted through between the members to be fastened adjacent to each other.

The annular fastening device wherein the joining member is attached to an inner circumference side of the members to be fastened.

The annular fastening device wherein the joining member is attached to a step portion provided on an inner circumferential side of the members to be fastened.

The annular fastening device wherein the members to be fastened are disposed a predetermined interval apart from one another.

The annular fastening device wherein the joining member is attached to a side opposed to the fastening target object side in the members to be fastened.

The annular fastening device wherein the fastening target object is another member to be fastened attached to another joining member different from the joining member.

The present invention is not limited to the above embodiments and various changes and modifications can be made within the spirit and scope of the present invention. Therefore, to apprise the public of the scope of the present invention, the following claims are made.

The invention claimed is:

1. A coupling/uncoupling device comprising:
   a columnar member configured by a divided pair of semicircular members; and
   a pair of coupling members comprised of first and second coupling members which form a circular holding section that is in contact with the columnar member along an outer circumferential surface of the columnar member and which hold the columnar member,
   wherein the circular holding section includes a circular inner surface section with which an outer circumferential surface of the columnar member is in slide contact, the circular inner surface section being formed from inner circumferential surfaces of a semicircular section in the first coupling member and a semicircular section in the second coupling member by disposing the semicircular section in the first coupling member and the semicircular section in the second coupling member to be opposed to each other so that the inner circumferential surfaces are continuous,
   the columnar member is configured to be rotatable along the circular inner surface section about a reference position where a contact surface of the pair of coupling members and a dividing surface of the columnar member are flush with each other,
   a first guide hole is provided with the first coupling member, a second guide hole is provided with the second coupling member, a first guide pin which is inserted into the second guide hole is provided with the first coupling member, a second guide pin which is inserted into the first guide hole is provided with the second coupling member, there is a first gap between the second guide hole and the first guide pin which is inserted into the second guide hole, the first gap permits the first guide pin to move, in the second guide hole, away from the contact surface in the radial direction of the first guide pin when the first guide pin moves with the first coupling member in an extending direction of the first guide pin, the first gap being formed between the first guide pin and the second guide hole with respect to the radial direction of the first guide pin, there is a second gap between the first guide hole and the second guide pin which is inserted into the first guide hole, the second gap permits the second guide pin to move, in the first guide hole, away from the contact surface in the radial direction of the second guide pin when the second guide pin moves with the second coupling member in an extending direction of the second guide pin, the second gap being formed between the second guide pin and the first guide hole with respect to the radial direction of the second guide pin, the coupling members are coupled when the columnar member rotates in a first rotating direction by a first predetermined angle from the reference position so that the contact surface and the dividing surface intersect with each other, a coupling state of the first and second coupling members is released when the columnar member rotates in a second rotating direction to the reference position, where the dividing surface is flush with the contact surface, the second rotating direction being opposite to the first rotating direction, and the second rotating direction is a direction in which the pair of semicircular members are permitted to radially and oppositely slide so that the first guide pin and the second guide pin are permitted to move away from the contact surface.

2. The coupling/uncoupling device according to claim 1, comprising a restricting section that limits a rotation angle of the columnar member, wherein the circular holding section is configured to be capable of holding the columnar member in any direction in which the columnar member is in contact with the circular inner surface section.

3. The coupling/uncoupling device according to claim 2, wherein the restricting section is provided on a normal passing through the columnar member on the contact surface of the coupling members in the coupling members.

4. The coupling/uncoupling device according to claim 1, wherein the coupled state of the first and second coupling members is retained by stopping the columnar member.

\* \* \* \* \*